(12) United States Patent
Funabashi

(10) Patent No.: US 11,058,065 B2
(45) Date of Patent: Jul. 13, 2021

(54) INFORMATION PROCESSING DEVICE AND INFORMATION PROCESSING METHOD

(71) Applicant: Sony Corporation, Tokyo (JP)

(72) Inventor: Masatoshi Funabashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/765,042

(22) PCT Filed: Sep. 23, 2016

(86) PCT No.: PCT/JP2016/077941
§ 371 (c)(1),
(2) Date: Mar. 30, 2018

(87) PCT Pub. No.: WO2017/061281
PCT Pub. Date: Apr. 13, 2017

(65) Prior Publication Data
US 2018/0271027 A1    Sep. 27, 2018

(30) Foreign Application Priority Data

Oct. 8, 2015    (JP) .............................. JP2015-199862

(51) Int. Cl.
*A01G 7/00* (2006.01)
*G06T 19/00* (2011.01)
(Continued)

(52) U.S. Cl.
CPC .............. *A01G 7/00* (2013.01); *A01B 79/005* (2013.01); *G06Q 50/02* (2013.01); *G06T 11/00* (2013.01); *G06T 19/00* (2013.01); *G09B 5/065* (2013.01)

(58) Field of Classification Search
CPC combination set(s) only.
See application file for complete search history.

(56) References Cited

U.S. PATENT DOCUMENTS 5,566,069 A * 10/1996 Clark, Jr. ................ G06F 3/033
                                                                    702/2
5,699,244 A * 12/1997 Clark, Jr. ................ G06F 3/033
                                                                    701/469
(Continued)

FOREIGN PATENT DOCUMENTS

CN          102405404 A      4/2012
EP          2871609 A1       5/2015
(Continued)

OTHER PUBLICATIONS

Okayama et al., The "Smart Garden" System using Augmented Reality, IFAC Proc. vol. 46, 2013, pp. 307-310 (Year: 2013).*
(Continued)

*Primary Examiner* — Motilewa Good Johnson
(74) *Attorney, Agent, or Firm* — Wolf, Greenfield & Sacks, P.C.

(57) ABSTRACT

The present technology relates to an information processing device and an information processing method, in which Synecoculture (registered trademark) can be assisted.
An ecosystem object indicating an ecosystem constituent configuring an ecosystem of an agricultural field in which a plurality of types of vegetation are mixed up and a task object indicating a task performed with respect to the ecosystem constituent are acquired, and the ecosystem object is subjected to augmented reality (AR) display in a position in a predetermined background space, corresponding to a real position of the ecosystem constituent, and the task object is subjected to AR display in the background space. The present technology, for example, can be applied to a case or the like where information of assisting Synecoculture (registered trademark) is provided.

18 Claims, 70 Drawing Sheets

(51) Int. Cl.
  *G06Q 50/02* (2012.01)
  *A01B 79/00* (2006.01)
  *G06T 11/00* (2006.01)
  *G09B 5/06* (2006.01)

(56) References Cited

U.S. PATENT DOCUMENTS

| | | | | |
|---|---|---|---|---|
| 5,721,679 | A * | 2/1998 | Monson | A01B 79/005 345/7 |
| 8,511,936 | B2 * | 8/2013 | Van de Riet | E02B 3/04 405/21 |
| 8,957,916 | B1 * | 2/2015 | Hedman | G09G 3/003 345/633 |
| 9,129,429 | B2 * | 9/2015 | Hammond | G06T 19/006 |
| 9,521,806 | B2 * | 12/2016 | Takahara | A01B 76/00 |
| 9,652,840 | B1 * | 5/2017 | Shriver | G01N 33/0098 |
| 2006/0106539 | A1 * | 5/2006 | Choate | G06Q 10/10 702/2 |
| 2010/0198736 | A1 | 8/2010 | Marino | |
| 2011/0115816 | A1 * | 5/2011 | Brackney | G06Q 10/06 345/629 |
| 2012/0231425 | A1 * | 9/2012 | Calman | G06Q 30/0261 434/93 |
| 2013/0069985 | A1 * | 3/2013 | Wong | G02B 27/017 345/633 |
| 2013/0185104 | A1 * | 7/2013 | Klavins | G06Q 10/063 705/7.12 |
| 2013/0288719 | A1 * | 10/2013 | Alonzo | G01C 21/00 455/457 |
| 2013/0317632 | A1 * | 11/2013 | Moon | G05B 13/02 700/79 |
| 2013/0321245 | A1 * | 12/2013 | Harper | G06F 3/147 345/7 |
| 2014/0136286 | A1 * | 5/2014 | Hovis | A01B 69/00 705/7.34 |
| 2014/0168412 | A1 * | 6/2014 | Shulman | H04N 7/18 348/89 |
| 2014/0172323 | A1 | 6/2014 | Marino | |
| 2014/0176688 | A1 * | 6/2014 | Ibamoto | G06Q 50/02 348/61 |
| 2014/0288714 | A1 | 9/2014 | Poivet | |
| 2014/0354690 | A1 * | 12/2014 | Walters | G06T 19/006 345/633 |
| 2015/0123997 | A1 * | 5/2015 | Hayasaka | G02B 27/017 345/633 |
| 2015/0186387 | A1 | 7/2015 | Funabashi | |
| 2015/0187109 | A1 * | 7/2015 | Mentzer | G06T 11/00 345/632 |
| 2015/0302649 | A1 * | 10/2015 | Komatsu | G06T 19/006 345/633 |
| 2015/0325047 | A1 * | 11/2015 | Conner | G06T 19/006 345/633 |
| 2016/0307373 | A1 * | 10/2016 | Dean | G06T 19/006 |
| 2016/0308954 | A1 * | 10/2016 | Wilbur | H04L 67/18 |
| 2017/0169523 | A1 * | 6/2017 | Xu | G06Q 10/06315 |
| 2017/0199880 | A1 * | 7/2017 | Funabashi | A01G 7/00 |
| 2017/0228475 | A1 * | 8/2017 | Aldor-Noiman | G06K 9/00 |
| 2017/0277697 | A1 | 9/2017 | Funabashi | |

FOREIGN PATENT DOCUMENTS

| | | |
|---|---|---|
| JP | 2013-230088 A | 11/2013 |
| WO | WO 2014/007109 A1 | 1/2014 |
| WO | WO 2014/146046 A1 | 9/2014 |

OTHER PUBLICATIONS

Choate et al., U.S. Patent Publication No. 2006/0106539 A1, further in view of Liu et al., Research of Mobile Augmented Reality Technology Applied in Agriculture, ICACSEI 2013, pp. 311-314 (Year: 2013).*
Written Opinion and English translation thereof dated Nov. 22, 2016 in connection with International Application No. PCT/JP2016/077941.
International Preliminary Report on Patentability and English translation thereof dated Apr. 19, 2018 in connection with International Application No. PCT/JP2016/077941.
International Search Report and English translation thereof dated Nov. 22, 2016 in connection with International Application No. PCT/JP2016/077941.
Extended European Search Report dated Jan. 23, 2019 in connection with European Application No. 16853435.2.
Japanese Office Action dated Jun. 2, 2020 in connection with Japanese Application No. 2017-544447, and English translation thereof.

* cited by examiner

FIG. 6

SEEDING DB

| RECORDING DATE | FIELD LOT | RIDGE NUMBER | RIDGE LOT | SEEDS/SAPLINGS | CROP NAME | SAKUMOTSU MEI | QUANTITY | MANUFACTURER |
|---|---|---|---|---|---|---|---|---|
| 12/01/18 | SW | All | | SAPLINGS | POTATO (MAY QUEEN) | JAGAIMO | 0.5kg | A |
| 12/01/18 | SW | All | | SAPLINGS | POTATO (BARON POTATO) | JAGAIMO | 0.5kg | A |
| 12/01/18 | SW | All | | SAPLINGS | POTATO (KITAAKARI) | JAGAIMO | 0.5kg | A |
| 12/01/18 | SE | 1, 4 | d1 | SAPLINGS | ASPARAGUS | ASUPARAGASU | 4 PLANTS | B |
| 12/01/18 | All | | | SEEDS | LETTUCE (KING CROWN) | RETASU | 2 BAGS | C |
| 12/01/18 | All | | | SEEDS | LETTUCE (RED WAVE) | RETASU | 2 BAGS | C |
| 12/01/18 | All | | | SEEDS | LETTUCE (LEAF LETTUCE) | RETASU | 2 BAGS | C |
| 12/01/18 | All | | | SEEDS | LETTUCE (AKABANE CHIMASANCHU) | RETASU | 2 BAGS | C |
| 12/01/18 | All | | | SEEDS | STEM BROCCOLI | BUROKKORI | 2 BAGS | C |
| 12/01/18 | All | | | SEEDS | LETTUCE (SEMI-HEAD-FORMED MINI LETTUCE) | RETASU | 2 BAGS | D |

FIG. 7

| VEGETATION DB | | |
|---|---|---|
| RECORDING DATE | 12/01/23 | 12/02/25 |
| OBSERVATION LOT COORDINATES | | |
| NE | BROAD BEAN/ BUDBREAK IS ROOTED | BROAD BEAN/ BUDBREAK IS ROOTED |
| | CARROT/HARVEST IS AVAILABLE | CARROT/HARVEST IS AVAILABLE |
| | RADISH/HARVEST IS AVAILABLE | RADISH/HARVEST IS AVAILABLE |
| | GREEN ONION/ROOTED | GREEN ONION/ROOTED |
| | SAPLING BROCCOLI/ROOTED | SAPLING BROCCOLI/ROOTED |
| | SAPLING CABBAGE/ROOTED | SAPLING CABBAGE/ROOTED/ HARVEST IS AVAILABLE |
| | SAPLING CHINESE CABBAGE/ ROOTED/HARVEST IS AVAILABLE | SAPLING CHINESE CABBAGE/ ROOTED/HARVEST IS AVAILABLE |
| | GRAMINEAE | GRAMINEAE |
| | ASTERACEAE | ASTERACEAE |
| | FABACEAE | FABACEAE |
| | RED ROLL CHICORY/ HARVEST IS AVAILABLE | RED ROLL CHICORY/ HARVEST IS AVAILABLE |
| | | PEA/BUDBREAK IS ROOTED |
| | | SAPLING CAULIFLOWER/ ROOTED/HARVEST IS AVAILABLE |
| | | ITALIAN PARSLEY/ ROOTED/HARVEST IS AVAILABLE |

FIG. 8

YIELD DB

| UNIT: g | | | | | | | |
|---|---|---|---|---|---|---|---|
| | TYPE | 1/14 | 1/24 | 1/29 | 1/30 | 1/31 | 2/20 |
| 1 | BITTERSWEET LETTUCE | 100 | | | | | |
| 2 | RADISH | | 1700 | 4000 | 1500 | 740 | 1500 |
| 3 | SMALL TURNIP | 95 | | | | 100 | |
| | SMALL TURNIP (W AGRICULTURAL FARM) | | | | | | |
| 4 | PETROSELINUM NEAPOLITANUM | | | | | 75 | |
| 5 | SALAD CHIVES | | | | | | |
| 6 | MINT | | | | | | |
| 7 | ROSEMARY | | 240 | | | 300 | 300 |
| 8 | JAPANESE MUSTARD SPINACH | | | | | | |
| 9 | SHREDDED RADISH | | | | | | |
| 10 | GREEN ONION | 120 | | | | 240 | |
| 11 | RADIOXENON | | | | | | |
| | RADIOXENON (W) | | | | | | |
| 12 | CELERY | 45 | | | | | |
| 13 | BURDOCK ROOT | | | | | | |
| 14 | BOK-CHOY | | | | | | |
| 15 | GARLAND CHRYSANTHEMUM | | | | | | |
| 16 | SMALL GINSENG | 50 | | 320 | 260 | 90 | |
| | SMALL GINSENG (W) | | | | | | |
| | LARGE AND MEDIUM GINSENGS (w) | | 540 | | 313 | 6 AVAILABLE | |
| 17 | CAULIFLOWER | | | | | 200 | |
| 18 | CABBAGE (STEM CABBAGE?) | 100 | | | | 160 | |
| 19 | OKINAWAN SHALLOTS | 30 | | | | | |
| 20 | CHINESE CABBAGE | | 2700 | 11800 | 570 | 850 | 4000 |
| 21 | PETASITES JAPONICUS | | | | | | 300 |

FIG. 9

MANAGEMENT RECORD DB

| DATE | MANAGEMENT OPERATION |
|---|---|
| 12/01/19 | ENGINEERING CONSTRUCTION SUCH AS SETTLED PLANTING OF SAPLING AND MAKING OF WINDPROOF SHELF |
| 12/01/20 | ENGINEERING CONSTRUCTION SUCH AS SETTLED PLANTING OF SAPLING AND MAKING OF WINDPROOF SHELF |
| 12/01/21 | ENGINEERING CONSTRUCTION SUCH AS SETTLED PLANTING OF SAPLING AND MAKING OF WINDPROOF SHELF |
| 12/01/22 | ENGINEERING CONSTRUCTION SUCH AS SETTLED PLANTING OF SAPLING AND MAKING OF WINDPROOF SHELF |
| 12/01/23 | ENGINEERING CONSTRUCTION SUCH AS SETTLED PLANTING OF SAPLING AND MAKING OF WINDPROOF SHELF |

FIG. 10

PHENOLOGY DB

| RECORDING DATE AND TIME | PHENOLOGY |
|---|---|
| 2011/01/09 | UNKNOWN GRASS SEEDS |
| 2011/01/09 | UNKNOWN GRASS SEEDS HAVE GROWN FASTER THAN OTHER |
| 2011/01/09 | LOWER PORTION OF PEA HAS WITHERED |
| 2011/01/09 | PORTION OF WHICH GROWN IS OBVIOUSLY FASTER THAN OTHER |

FIG. 12

INSECT FAUNA DB

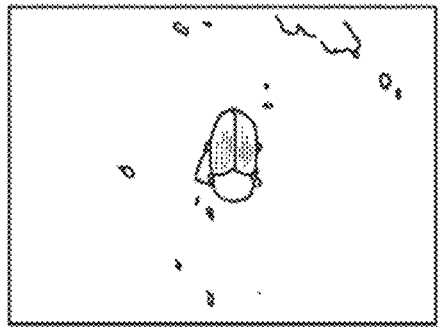

20:20218 ISE_087
OBSERVATION VALUE: NEW ISE AGRICULTURAL FARM  INSECT:  FAMILY NAME: BEETLES
ORDINAL NAME: TENEBRIONIDAE  CLASSIFICATION: HETEROTARSUS CARINULAS?:
OVERALL CONDITION: INSECTS OVERWINTER UNDER STONE

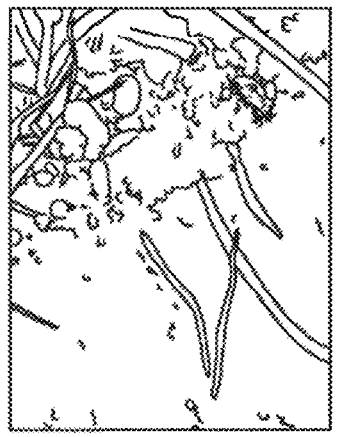

20:20218 ISE_088
OBSERVATION VALUE: NEW ISE AGRICULTURAL FARM  INSECT:  FAMILY NAME: BEETLES
ORDINAL NAME: TENEBRIONIDAE  CLASSIFICATION: HETEROTARSUS CARINULAS?:
OVERALL CONDITION: INSECTS OVERWINTER UNDER STONE

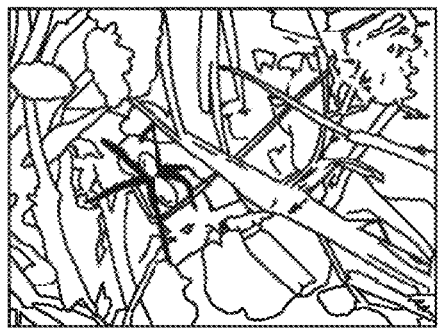

20:20218 ISE_089
OBSERVATION VALUE: NEW ISE AGRICULTURAL FARM  CREATION: SPIDERS  FAMILY NAME: SPIDER
ORDINAL NAME: WOLF SPIDER  SPECIES NAME: PARDOSA ASTRIGERA  OVERALL CONDITION: CREATION IS MOST
COMMON SPECIES OF WOLF SPIDER, AND IT IS OFTEN OBSERVED THAT CREATION PROWLS IN VICINITY OF LAND SURFACE

FIG. 13

WEATHER DB

| MONTH | SEASON | ATMOSPHERIC PRESSURE (hPa) | | RAINFALL AMOUNT (mm) | | | ATMOSPHERIC TEMPERATURE (°C) | | | | | HUMIDITY (%) | |
|---|---|---|---|---|---|---|---|---|---|---|---|---|---|
| | | SITE | SEA SURFACE | TOTAL | MAXIMUM | | AVERAGE | | | MAXIMUM | MINIMUM | AVERAGE | MINIMUM |
| | | AVERAGE | AVERAGE | | DAY | FOR 1 HOUR | FOR 10 MINUTES | DAILY AVERAGE | DAILY MAXIMUM | DAILY MINIMUM | | | | |
| 1 | BEGINNING | 1018.7 | 1021.0 | 0.5 | 0.5 | 0.5 | 0.5 | 5.2 | 9.2 | 2.0 | 11.6 | 0.2 | 62 | 24 |
| 1 | MIDDLE | 1016.8 | 1019.1 | 36.0 | 19.5 | 3.5 | 1.0 | 5.2 | 8.6 | 1.8 | 11.1 | −1.1 | 64 | 32 |
| 1 | END | 1015.4 | 1017.7 | 3.0 | 3.0 | 1.0 | 0.5 | 4.8 | 8.5 | 2.2 | 12.8 | −0.1 | 60 | 25 |
| 2 | BEGINNING | 1015.0 | 1017.3 | 33.0 | 27.5 | 9.0 | 2.5 | 3.8 | 7.4 | 0.7 | 10.2 | −2.5 | 60 | 29 |
| 2 | MIDDLE | 1018.1 | 1020.4 | 9.5 | 7.0 | 2.5 | 1.0 | 4.0 | 7.9 | 1.2 | 10.3 | −2.7 | 63 | 25 |
| 2 | END | 1015.6 | 1017.8 | 58.0 | 34.5 | 7.0 | 1.5 | 6.8 | 10.7 | 3.6 | 14.5 | −0.8 | 63 | 29 |
| 3 | BEGINNING | 1013.1 | 1015.3 | 83.0 | 43.0 | 6.0 | 1.5 | 9.6 | 13.0 | 6.9 | 20.4 | 4.1 | 71 | 28 |
| 3 | MIDDLE | 1016.2 | 1018.5 | 9.0 | 8.5 | 2.5 | 1.0 | 7.0 | 10.9 | 3.4 | 14.4 | 0.1 | 62 | 26 |

FIG. 14

ALLELOPATHY DB

| | | NEGI | SUIKA OR MERON (URIKA) | NINJIN | AWA·KIBI | MUGI | KABOCHA | SUIKA·KYURI·KABOCHA (URIRUI) | NINNIKU OR TAMANEGI |
|---|---|---|---|---|---|---|---|---|---|
| | | onion | cucurbit | carrot | foxtail millet· millet | barley/wheat | squash | watermelon· cucumber·squash | garlic·onion |
| NEGI | onion | | 1 | 1 | 0 | 0 | 0 | 0 | 0 |
| SUIKA OR MERON (URIKA) | cucurbit | 1 | | 0 | 0 | 1 | 1 | 0 | 0 |
| NINJIN | carrot | 1 | 0 | | 0 | 0 | 0 | 0 | 0 |
| AWA·KIBI | foxtail millet· millet | 0 | 0 | 1 | | 1 | 0 | 0 | 0 |
| MUGI | barley/wheat | 0 | 1 | 0 | 1 | | 1 | 0 | 0 |
| KABOCHA | squash | 1 | 0 | 0 | 0 | 1 | | 0 | 0 |
| SUIKA·KYURI·KABOCHA (URIRUI) | watermelon· cucumber·squash | 0 | 0 | 0 | 0 | 0 | 0 | | 1 |
| NINNIKU OR TAMANEGI | garlic·onion | 0 | 0 | 0 | 0 | 0 | 0 | 1 | |

FIG. 15

ROTATION APTITUDE DB

| | SUIKA, MERON (URIKA) cucurbit | RAKKASEI peanut |
|---|---|---|
| SUIKA, MERON (URIKA) cucurbit | 0 | 1 |
| RAKKASEI peanut | 1 | 0 |

FIG. 17

| | SERORI (celery) | TOUGARASHI chile pepper /sweet pepper | HAKUSAI chinese cabbage /napa cabbage /chinese leaf /chinese leaf lettuce | INGEN common bean | ZERANIUMU stork's bill | GOBOU edible burdock /greater burdock /beggar's button | HOURENSOU spinach | MERON muskmelon | KABU turnip |
|---|---|---|---|---|---|---|---|---|---|
| TOUMOROKOSHI corn | | | | | | | | | |
| SUIKA OR MERON (URIKA) (cucurbit) | TOMATO (tomato) | KYABETSU (napa cabbage) | KYURI (cucumber) | ASAGAO (whiteedge morning-glory) | KYABETSU (cabbage) | HOURENSOU (spinach) | NEGI (onion) | KABOCHA (squash) | SERORI (celery) |
| KABOCHA (squash) | KYABETSURU (cabbage) | HAKUSAI (chinese cabbage /napa cabbage /chinese leaf /chinese leaf lettuce) | TOMATO (tomato) | | TOUMOROKOSHI (corn) | KOMATSUNA (komatsuna /turnip leaf /turnip green /japanese mustard spinach) | HATSUKADAIKON RADISH (radish) | TOUMOROKOSHI (corn) | KABU (turnip) |
| MAMERUI (bean) | HAKUSAI (chinese cabbage /napa cabbage /chinese leaf /chinese leaf lettuce) | | SERORI (celery) | | BARA (rose) | | TOUMOROKOSHI (corn) | ASAGAO (whiteedge morning-glory) | PASERI (parsley) |
| RETASU/SARADANA (lettuce) | KABU (turnip) | TOUGARASHI (chile pepper /sweet pepper) | | | DAIZU (soybean) | | GOBOU (edible burdock /greater burdock /beggar's button) | | |
| URIKA (cucurbitaceae) | ENDOU (pea) | SHUNGIKU (crown daisy) | | | BUDOU (grape) | | ICHIGO (strawberry) | | |
| SUITOBAZIRU (sweet basil) | | | | | | | SATOIMO (eddoe) | | |
| INGEN (common bean) | | | | | | | | | |
| ZERANIUMU (stork's bill) | | | | | | | | | |
| MERON (muskmelon) | | | | | | | | | |
| PASERI (parsley) | | | | | | | | | |
| DAIZU (soybean) | | | | | | | | | |
| ASAGAO (whiteedge morning-glory) | | | | | | | | | |
| KOMATSUNA (komatsuna /turnip leaf /turnip green /japanese mustard spinach) | | | | | | | | | |
| YOUSAIRU (leaf vegetable) | | | | | | | | | |

FIG. 21

| | 12 | | 13 |
|---|---|---|---|
| S41 | ACQUIRE LEVEL SELECTION OF FIELD | S61 | RECEIVE INFORMATION OF SELECTED LEVEL OF FIELD |
| S42 | RECEIVE AND DISPLAY LIST | S62 | GENERATE AND TRANSMIT LIST OF FIELDS OF SELECTED LEVEL |
| S43 | TRANSMIT INFORMATION OF FIELD SELECTED FROM LIST | S63 | RECEIVE INFORMATION OF SELECTED FIELD |
| | | S64 | SEARCH DB OF RECEIVED INFORMATION OF FIELD |
| S44 | RECEIVE LIST OF SEARCHED DBS OF FIELD | S65 | TRANSMIT LIST OF SEARCHED DBS OF FIELD |
| S45 | DISPLAY LIST OF RECEIVED DBS OF FIELD | | |
| S46 | ACQUIRE INFORMATION OF REFERENCE DB AND COORDINATES OF FIELD | | |
| S47 | TRANSMIT ACQUIRED INFORMATION | S66 | RECEIVE ACQUIRED INFORMATION |
| | | S67 | READ OUT INFORMATION OF FIELD OF DESIGNATED COORDINATES OF DESIGNATED DB |
| | | S68 | TRANSMIT READ INFORMATION OF FIELD |
| S48 | RECEIVE READ INFORMATION OF FIELD | | |
| S49 | DISPLAY RECEIVED INFORMATION OF FIELD | | |
| S50 | ACQUIRE AND TRANSMIT INFORMATION OF SELECTION OF DATE OF REFERENCE INFORMATION | S69 | RECEIVE INFORMATION OF SELECTION OF DATE OF REFERENCE INFORMATION |
| | | S70 | READ OUT INFORMATION OF DESIGNATED DATE |
| S51 | RECEIVE READ INFORMATION OF DATE | S71 | TRANSMIT READ INFORMATION OF DATE |
| S52 | DISPLAY RECEIVED INFORMATION OF DATE | | |

FIG. 23

| 12 | | 13 | |
|---|---|---|---|
| S101 | RECEIVE SELECTION OF KEY EVENT ICON | | |
| S102 | ACQUIRE PICTURE DATA AND DATE | | |
| S103 | ACQUIRE GPS COORDINATES | | |
| S104 | ACQUIRE INPUT CHARACTER | | |
| S105 | TRANSMIT INFORMATION | S121 | RECEIVE INFORMATION |
| | | S122 | RECORD RECEIVED INFORMATION IN META DB |
| | | S123 | RECEIVE INFORMATION OF SELECTED LEVEL OF FIELD |
| S106 | ACQUIRE INFORMATION OF SELECTION OF LEVEL OF FIELD | | |
| | | S124 | GENERATE AND TRANSMIT LIST OF FIELDS OF SELECTED LEVEL |
| S107 | RECEIVE AND DISPLAY LIST | | |
| S108 | TRANSMIT INFORMATION OF FIELD SELECTED FROM LIST | S125 | RECEIVE INFORMATION OF SELECTED FIELD |
| | | S126 | SEARCH DB OF RECEIVED INFORMATION OF FIELD |
| S109 | RECEIVE LIST OF SEARCHED DB OF INFORMATION OF FIELD | S127 | OUTPUT LIST OF SEARCHED DBS OF INFORMATION OF FIELD |
| S110 | DISPLAY LIST OF RECEIVED DB OF INFORMATION OF FIELD | | |
| S111 | ACQUIRE INFORMATION OF DB TO BE LINKED AND COORDINATES OF FIELD | | |
| S112 | TRANSMIT ACQUIRED INFORMATION | S128 | RECEIVE TRANSMITTED INFORMATION |
| | | S129 | READ OUT INFORMATION OF FIELD OF DESIGNATED COORDINATES OF DESIGNATED DB |
| S113 | RECEIVE READ INFORMATION OF FIELD | S130 | TRANSMIT READ INFORMATION OF FIELD |
| S114 | TRANSMIT COMMAND FOR LINKAGE | S131 | RECEIVE COMMAND FOR LINKAGE |
| | | S132 | LINK NEWLY RECORDED KEY EVENT TO FIELD OF DESIGNATED DB |

FIG. 25

|  | AGRICULTURAL FIELD OBSERVED ALONG WITH VEGETATION #1 | RELATIONSHIP SCORE WITH RESPECT TO VEGETATION #1 |
|---|---|---|
| VEGETATION #2 | AGRICULTURAL FIELD #1, #2, #3 | 3/4 |
| VEGETATION #3 | AGRICULTURAL FIELD #3 | 1/4 |
| VEGETATION #4 | NONE | 0 |
| VEGETATION #5 | NONE | 0 |
| VEGETATION #6 | NONE | 0 |

|  | AGRICULTURAL FIELD OBSERVED ALONG WITH VEGETATION #3 | RELATIONSHIP SCORE WITH RESPECT TO VEGETATION #3 |
|---|---|---|
| VEGETATION #1 | AGRICULTURAL FIELD #3 | 1/4 |
| VEGETATION #2 | AGRICULTURAL FIELD #3, #4 | 2/4 |
| VEGETATION #4 | AGRICULTURAL FIELD #4 | 1/4 |
| VEGETATION #5 | AGRICULTURAL FIELD #4 | 1/4 |
| VEGETATION #6 | AGRICULTURAL FIELD #4 | 1/4 |

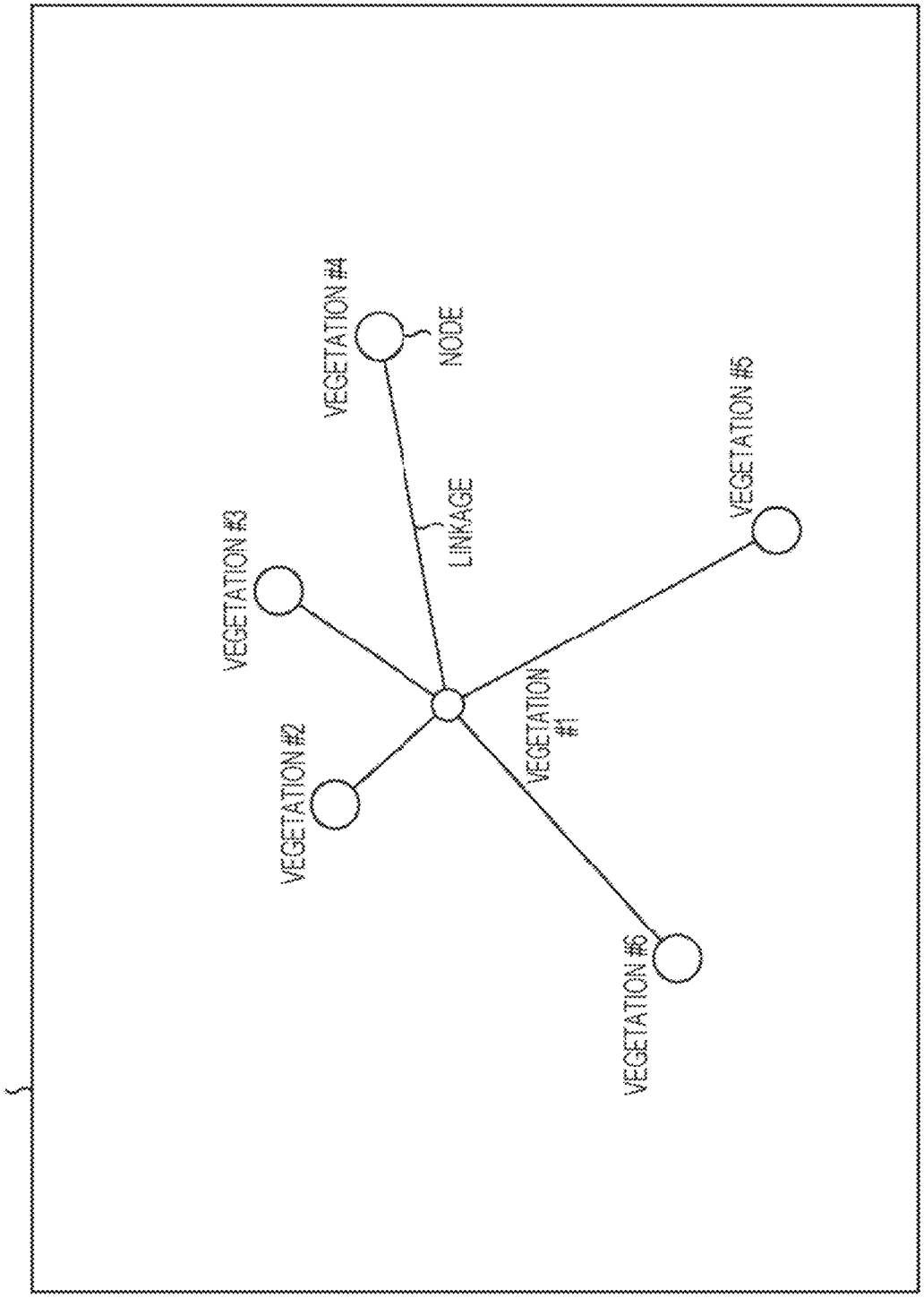

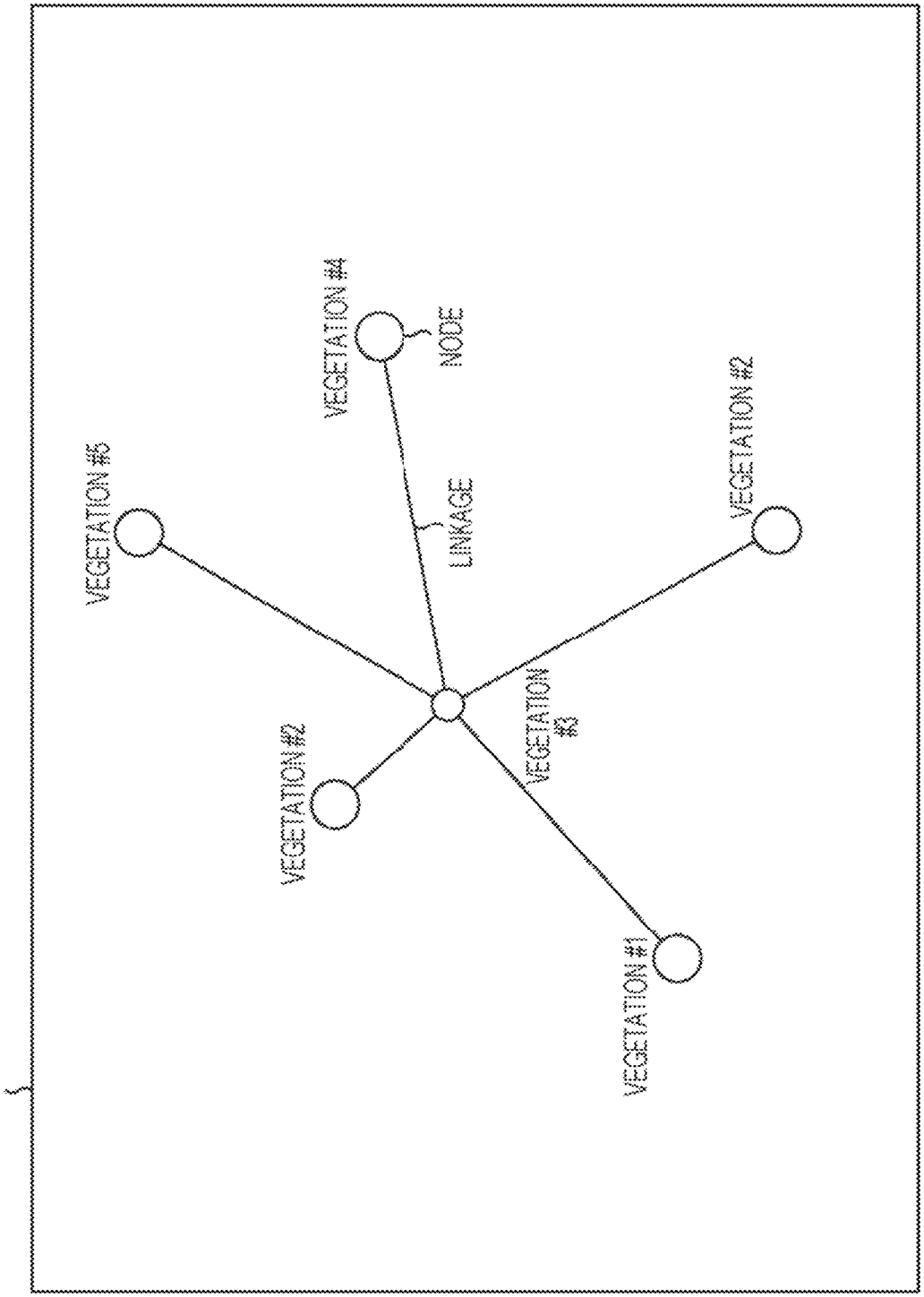

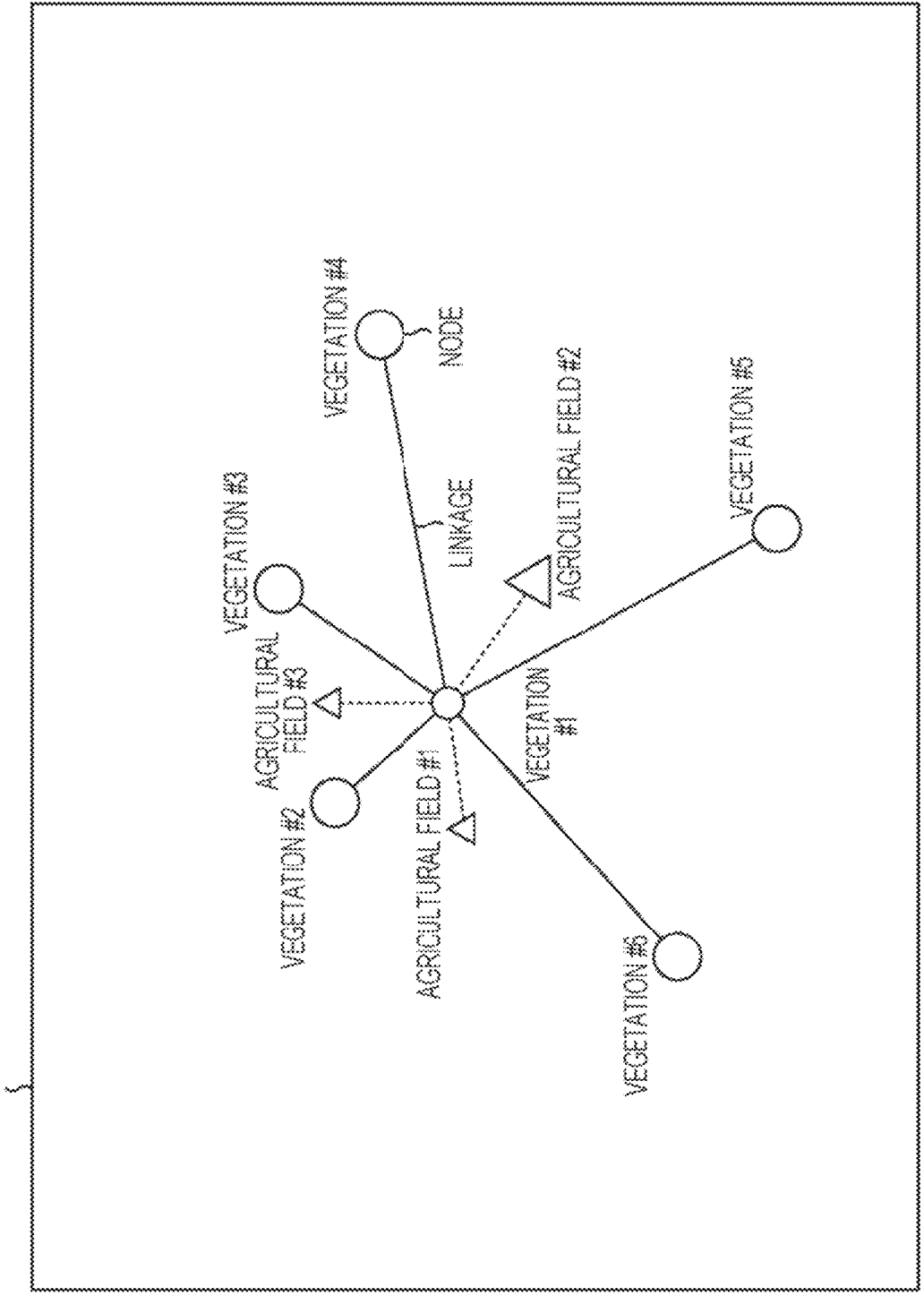

FIG. 29

|  | VEGETATION ALSO OBSERVED IN AGRICULTURAL FIELD #1 | RELATIONSHIP SCORE WITH RESPECT TO AGRICULTURAL FIELD #1 |
|---|---|---|
| AGRICULTURAL FIELD #2 | VEGETATION #1, #2 | 2/6 |
| AGRICULTURAL FIELD #3 | VEGETATION #1 | 1/6 |
| AGRICULTURAL FIELD #4 | NONE | 0 |

|  | VEGETATION ALSO OBSERVED IN AGRICULTURAL FIELD #3 | RELATIONSHIP SCORE WITH RESPECT TO AGRICULTURAL FIELD #3 |
|---|---|---|
| AGRICULTURAL FIELD #1 | VEGETATION #1, #2 | 2/6 |
| AGRICULTURAL FIELD #2 | VEGETATION #1, #2 | 2/6 |
| AGRICULTURAL FIELD #4 | VEGETATION #2, #3 | 2/6 |

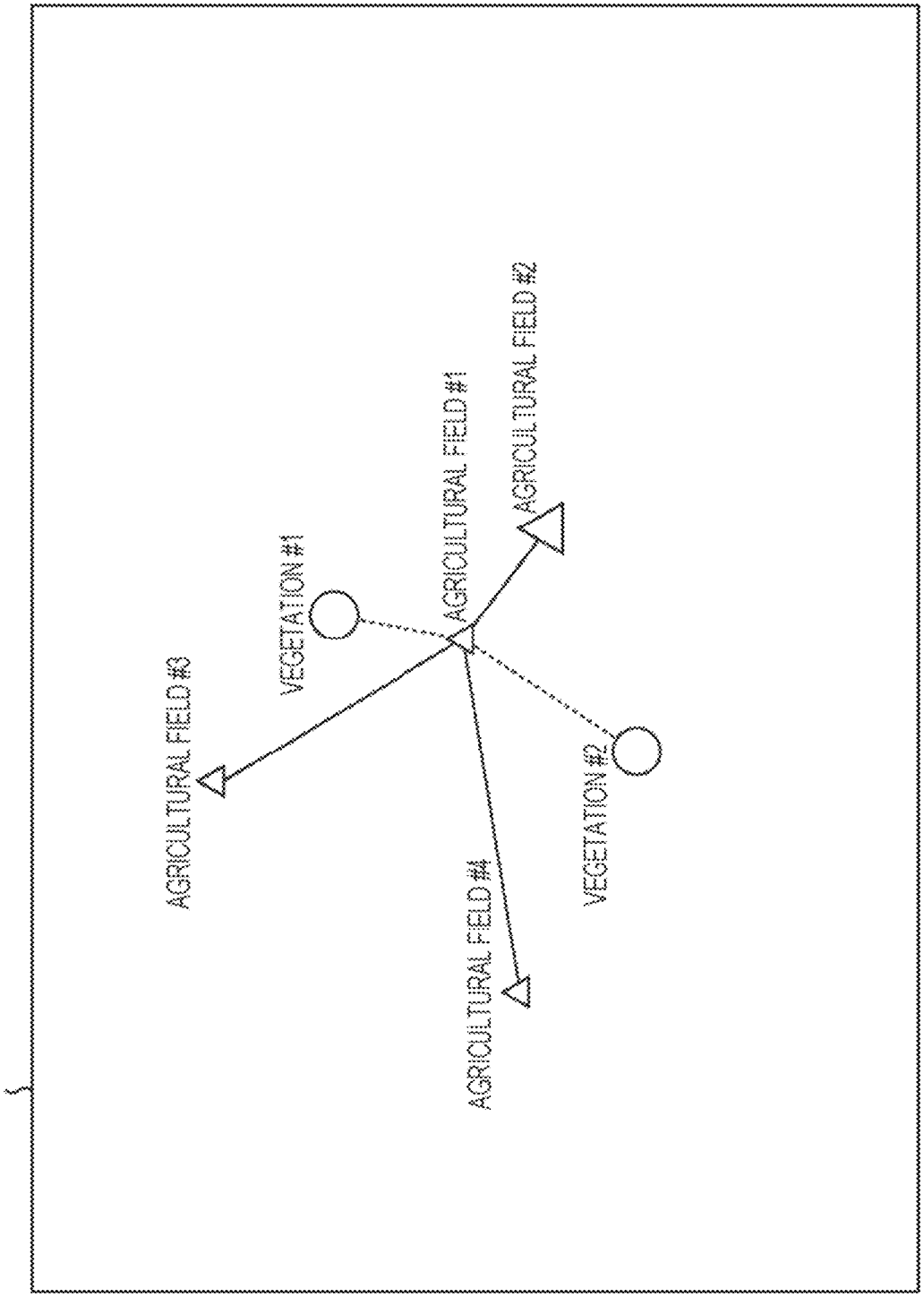

| | RECIPE OBSERVED ALONG WITH VEGETATION #1 | RELATIONSHIP SCORE WITH RESPECT TO VEGETATION #1 |
|---|---|---|
| VEGETATION #2 | RECIPE #1, #2 | 2/3 |
| VEGETATION #3 | RECIPE #1, #3 | 2/3 |
| VEGETATION #4 | RECIPE #3 | 1/3 |
| VEGETATION #5 | RECIPE #3 | 1/3 |
| VEGETATION #6 | NONE | 0 |

TRANSITION DISPLAY (OVERVIEW SCREEN) AT TIME OF PERFORMING TRANSITION TO OTHER AGRICULTURAL FIELD

INFORMATION PROCESSING DEVICE AND INFORMATION PROCESSING METHOD

CROSS-REFERENCE TO RELATED APPLICATIONS

This application claims the benefit under 35 U.S.C. § 371 as a U.S. National Stage Entry of International Application No. PCT/JP2016/077941, filed in the Japanese Patent Office as a Receiving Office on Sep. 23, 2016, which claims priority to Japanese Patent Application Number JP 2015-199862, filed in the Japanese Patent Office on Oct. 8, 2015, each of which is hereby incorporated by reference in its entirety.

TECHNICAL FIELD

The present technology relates to an information processing device and an information processing method, and in particular, for example, relates to an information processing device and an information processing method, in which Synecoculture (registered trademark) can be assisted.

BACKGROUND ART

Currently, according to various human activities, the ecosystem of the planet earth has been destroyed, and it is expected that it will be difficult to collect the natural resources in the near future. Therefore, recently, the utilization of an ecosystem has attracted attention.

Examples of the utilization of the ecosystem include a method of utilizing a ladybird in extirpation of a pest insect with respect to agriculture crops without using a pesticide, Synecoculture (registered trademark) based on a symbiotic effect of an ecosystem and utilization of useful species, and the like.

Here, Synecoculture (registered trademark) is a farming method in which a high yield based on a diversity exceeding a natural state according to vegetation arrangement, and a thinning harvest from mixed dense, is realized in total under a constraint condition where others except for seeds and saplings are not taken in at all with no tillage, no fertilization, no pesticide.

In Synecoculture (registered trademark), a device assisting an operator to be capable of determining an optimal combination of vegetation is proposed (for example, refer to Patent Document 1).

CITATION LIST

Patent Document

Patent Document 1: International Publication WO2014/007109

SUMMARY OF THE INVENTION

Problems to be Solved by the Invention

Synecoculture (registered trademark) is affected by various ecosystem constituents configuring an ecosystem, and thus, it is necessary for an operator of an agricultural field to be assisted by a skilled person in Synecoculture (registered trademark) in order to acquaint oneself with Synecoculture (registered trademark).

However, it is difficult for the skilled person to go to each agricultural field, to actually observe an ecosystem constituent configuring an ecosystem of the agricultural field, such as vegetation or insects existing in the agricultural field, and to give advice to the operator.

The present technology has been made in consideration of such circumstances, and is capable of easily assisting Synecoculture (registered trademark).

Solutions to Problems

An information processing device of the present technology is an information processing device, including: an acquisition unit that acquires an ecosystem object indicating an ecosystem constituent configuring an ecosystem of an agricultural field in which a plurality of types of vegetation are mixed up, and a task object indicating a task performed with respect to the ecosystem constituent; and a display control unit that performs display control of performing augmented reality (AR) display of the ecosystem object in a position in a predetermined background space, corresponding to a real position of the ecosystem constituent, and performing AR display of the task object in the background space.

An information processing method of the present technology is an information processing method, including: acquiring an ecosystem object indicating an ecosystem constituent configuring an ecosystem of an agricultural field in which a plurality of types of vegetation are mixed up, and a task object indicating a task performed with respect to the ecosystem constituent; and performing display control of performing augmented reality (AR) display of the ecosystem object in a position in a predetermined background space, corresponding to a real position of the ecosystem constituent, and performing AR display of the task object in the background space.

In the information processing device and the information processing method of the present technology, the ecosystem object indicating the ecosystem constituent configuring the ecosystem of the agricultural field in which the plurality of types of vegetation are mixed up, and the task object indicating the task performed with respect to the ecosystem constituent are acquired. Then, the ecosystem object is subjected to the augmented reality (AR) display in the position in the predetermined background space, corresponding to the real position of the ecosystem constituent, and the task object is subjected to the AR display in the background space.

Furthermore, the information processing device may be an independent device, or may be an internal block configuring one device.

In addition, the information processing device can be realized by executing a program in a computer. The program executed in the computer can be provided by being transmitted through a transmission medium, or by being recorded in a recording medium.

Effects of the Invention

According to the present technology, it is possible to assist Synecoculture (registered trademark).

Furthermore, the effect of the present technology is not necessarily limited to the effects described herein, and may be any one effect described in this disclosure.

BRIEF DESCRIPTION OF DRAWINGS

FIG. 6 is a diagram illustrating a configuration example of a seeding DB.

FIG. 7 is a diagram illustrating a configuration example of a vegetation DB.

FIG. 8 is a diagram illustrating a configuration example of a yield DB.

FIG. 9 is a diagram illustrating a configuration example of a management record DB.

FIG. 10 is a diagram illustrating a configuration example of a phenology DB using a character.

FIG. 12 is a diagram illustrating a configuration example of an insect fauna DB.

FIG. 13 is a diagram illustrating a configuration example of a weather DB.

FIG. 14 is a diagram illustrating a configuration example of an allelopathy DB.

FIG. 15 is a diagram illustrating a configuration example of a rotation aptitude DB.

FIG. 17 is a diagram illustrating an output example of a symbiotic allelopathy.

FIG. 21 is a flowchart illustrating a processing example in a case where a user refers to information of an agricultural field (a field).

FIG. 23 is a flowchart illustrating a processing example of registering a key event.

FIG. 25 is a diagram illustrating an example of a relationship score obtained from a bipartite graph of a vegetation/agricultural field DB.

FIG. 26 is a diagram illustrating an example of a graph display screen.

FIG. 27 is a diagram illustrating an example the graph display screen.

FIG. 28 is a diagram illustrating an example of the graph display screen.

FIG. 29 is a diagram illustrating an example of the relationship score.

FIG. 30 is a diagram illustrating an example of the graph display screen.

MODE FOR CARRYING OUT THE INVENTION

<One Embodiment of Ecosystem Utilization System>

Figure 1:
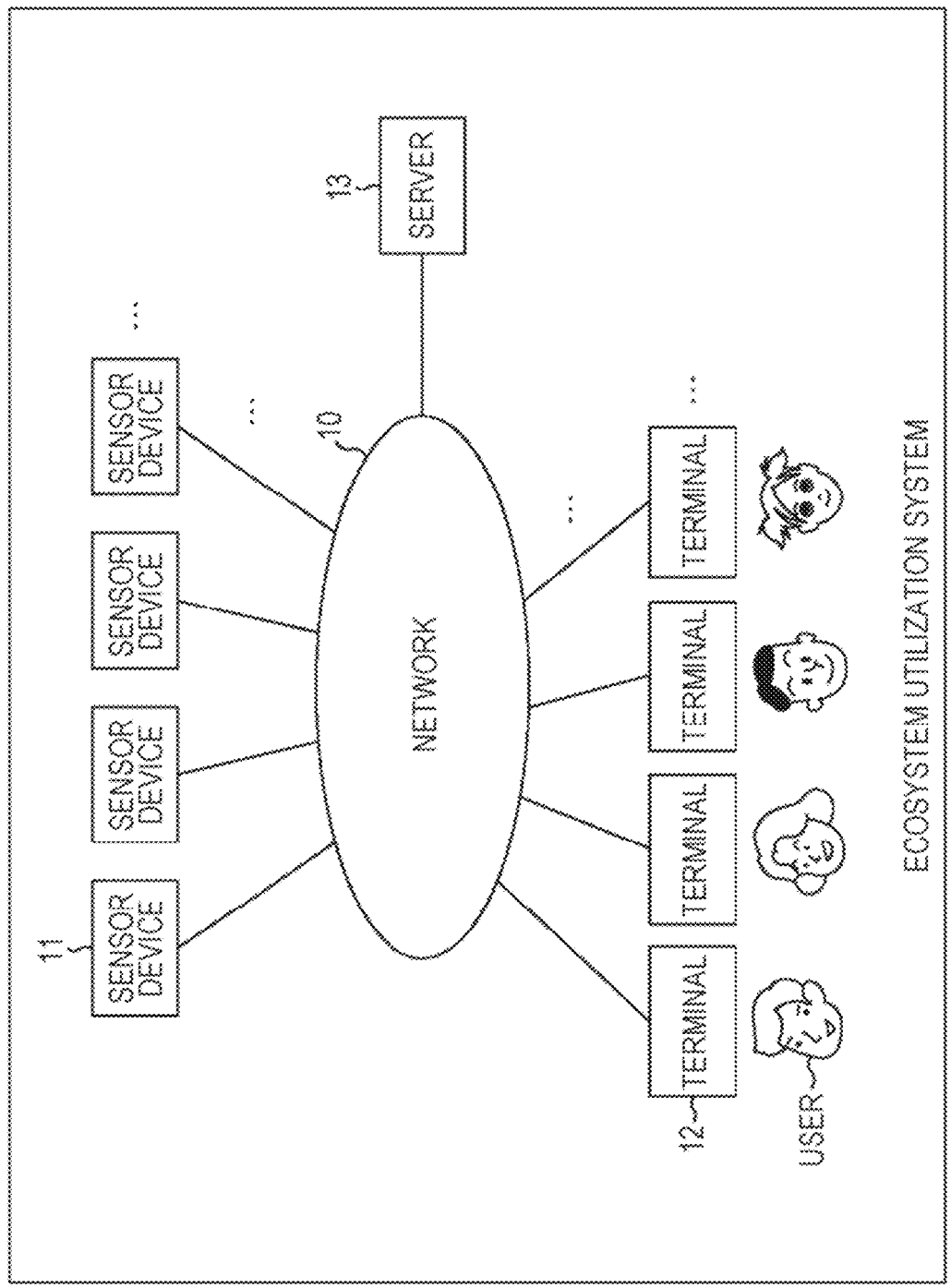
FIG. 1 is a block diagram illustrating a configuration example of one embodiment of an ecosystem utilization system to which the present technology is applied.

FIG. 1 is a block diagram illustrating a configuration example of one embodiment of an ecosystem utilization system to which the present technology is applied.

In FIG. 1, the ecosystem utilization system includes a network 10, one or more sensor devices 11, one or more terminals 12, and one or more servers 13. The ecosystem utilization system collects various information items observed in an ecosystem, obtains information for utilizing an ecosystem on the basis of the information described above, and provides the obtained information to a user.

The sensor device 11, the terminal 12, and the server 13 are connected to a network 10 in a wired or wireless manner, and are capable of communicating with each other.

The sensor device 11 includes a sensor sensing various physical amounts, and has a communication function of transmitting sensor data obtained from a sensing result of the sensor (data indicating sensed physical amount). Further, the sensor device 11, for example, has a position detecting function of detecting the position of the sensor device 11 itself, using a global positioning system (GPS) or the like, as necessary.

The sensor device 11 senses a physical amount by the sensor. Further, the sensor device 11 transmits the sensor data obtained by sensing the physical amount according to the communication function to the server 13 through the network 10. The sensor data is transmitted from the sensor device 11 to the server 13 along with positional information indicating the position of the sensor device 11 detected according to a position detecting function of the sensor device 11, as necessary.

For example, a sensor sensing an electromagnetic wave including light, such as a sensor capturing an image by sensing light (an image sensor), and a sensor sensing a sound (a microphone) can be adopted as the sensor of the sensor device 11. Further, for example, a sensor sensing a physical amount as various environment information items such as a temperature, humidity, humidity, terrestrial magnetism, an atmospheric pressure, and smell can be adopted as the sensor of the sensor device 11.

The sensor device 11 is disposed in a location to be subjected to observation (sensing) of an ecosystem such as the forest, the river, the sea, the lake, and an agricultural field (an agricultural farm) of a district to be subjected to ecosystem utilization (hereinafter, referred to as a utilization district). The sensor device 11 can be manually disposed in a predetermined position. In addition, the sensor device 11, for example, can be disposed by dispersing the sensor device 11 while being moved by an airplane, a ship, an automobile, and the like.

According to the sensor device 11, in various locations of the utilization district, for example, an image of vegetable organisms or bugs, a sound such as the sound of wind, the sound of bugs, and rubbing sound of leaves, an atmospheric temperature or a temperature of the soil, humidity, terrestrial magnetism, and the like are sensed, and sensor data obtained by the sensing is transmitted to the server 13 through the network 10.

Here, the utilization district, for example, may be the municipalities or a part thereof, or may be the prefectural and city governments or the entire Japan, or all the countries of the world. In addition, the utilization district, for example, may be separated districts such as Hokkaido and Kyushu, or Japan and the United States of America.

The terminal 12 is an information processing device used by a user who receives assistance of the ecosystem utilization including Synecoculture (registered trademark), or a user who cooperates with the ecosystem utilization.

Here, the user who receives the assistance of the ecosystem utilization, for example, is an operator or the like of the agricultural field in which Synecoculture (registered trademark) is implemented. The user who cooperates with the ecosystem utilization, for example, is not the operator of the agricultural field in which Synecoculture (registered trademark) is implemented, but is a cooperator such as a neighborhood resident who cooperates in collecting the information of the ecosystem of the agricultural field, a cooperator such as a scholar who cooperates in sending advice, and the like.

For example, a portable terminal such as a smart phone, a tablet, a head mounted display (HMD), and an eyeglass type wearable device can be adopted as the terminal 12. In addition, for example, a notebook personal computer (PC) or a desktop PC, and a device having a communication function, and an input/output function (an interface) of information with respect to the user can be adopted as the terminal 12.

Furthermore, the HMD as the terminal 12 may be any one of a see-through HMD and an immersive (impermeant) HMD.

In addition, it is desirable that the terminal 12 which is used by the user in the agricultural field, is a portable terminal such that the operation of the user in the agricultural field is not hindered.

The user performs observation in various locations of the utilization district by using the terminal 12, and transmits an observation value indicating an observation result to the server 13 through the network 10.

Here, for example, observation of a certain vegetation or bug, and species of other creations in a certain location, an image of species, a harvest of a certain crop and a harvested amount of the crop, rosette formation of Chinese cabbage, and all information items obtained by observing the ecosystem by the user (including an image obtained by operating the terminal 12 by the user (a picture and a moving image), a sound, or the like) can be adopted as the observation value transmitted from the terminal 12 to the server 13.

The terminal 12 transmits data other than the observation value to the server 13 through the network 10. In addition, the terminal 12 receives necessary data from the server 13 through the network 10. For example, the terminal 12 receives (acquires) information for utilizing the ecosystem from the server 13, and presents the information to the user. The information, for example, can be presented to the user by displaying an image or by outputting an audio.

The server 13 is an information processing device managed by an assistant who assists the ecosystem utilization.

The server 13 receives the sensor data transmitted from the sensor device 11 through the network 10, or the observation value transmitted from the terminal 12 through the network 10, and registers the sensor data and the observation value. Further, the server 13 generates the information for utilizing the ecosystem on the basis of the sensor data from the sensor device 11 (as necessary, including the positional information of the sensor device 11), the observation value from the terminal 12, or other necessary information items, and transmits the information to the terminal 12 through the network 10.

The terminal 12 receives the information transmitted from the server 13 through the network 10, and presents the information from the server 13 to the user by displaying the information as an image or by outputting the information as an audio.

Furthermore, the processing of the terminal 12 or the processing of the server 13 described below can be performed by being shared between the terminal 12 and the server 13 in an allowable range. In addition, the processing of the server 13 can be performed by being shared in a plurality of servers.

<Configuration Example of Network 10>

Figure 2:
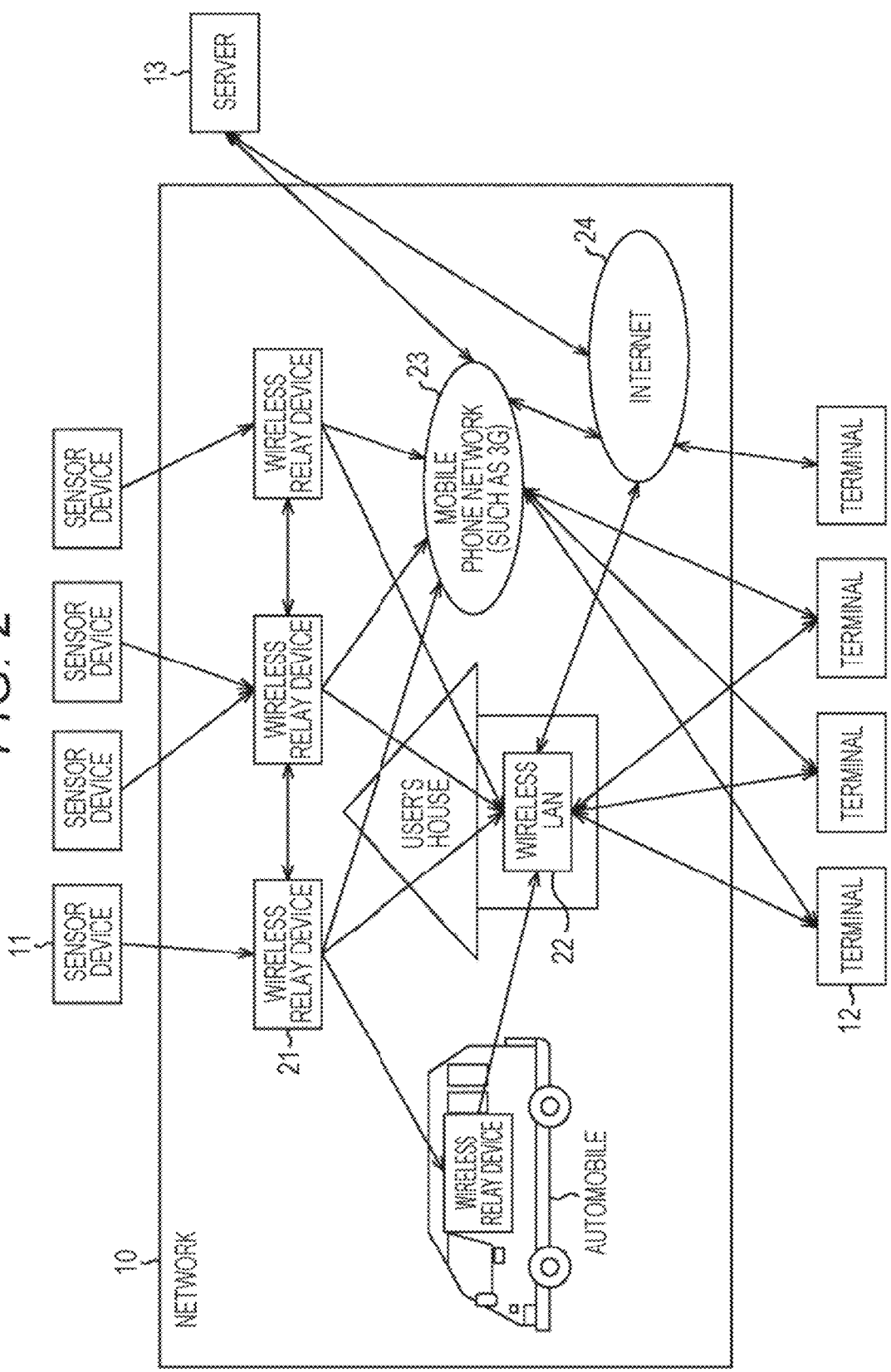
FIG. 2 is a diagram illustrating a configuration example of a network 10.

FIG. 2 is a diagram illustrating a configuration example of the network 10 of FIG. 1.

The network 10 includes arbitrary number of wireless relay devices 21, arbitrary number of wireless local area networks (LAN) 22, a mobile phone network 23, the Internet 24, and the like.

The wireless relay device 21 is a device performing wireless communication, and has a router function.

The wireless relay device 21, for example, is disposed in all around the utilization district such that the sensor data obtained by the sensor device 11 can be collected.

The wireless relay device 21, for example, can be manually disposed or can be disposed by dispersing the wireless relay device 21 while being moved by an airplane, a ship, an automobile, or the like, as with the disposition of the sensor device 11. In addition, the wireless relay device 21 can be disposed on a movable ride such as an automobile (for example, a routine-run bus or the like), a bike, or a ship.

The wireless relay device 21 performs communication with the sensor device 11, and thus, receives the sensor data which is transmitted from the sensor device 11. In addition, the wireless relay device 21 performs communication with other wireless relay devices 21, and thus, receives sensor data which is transmitted from the other wireless relay devices 21. Further, the wireless relay device 21 performs communication with other wireless relay devices 21, and thus, transmits the sensor data to the other wireless relay devices 21.

In addition, the wireless relay device 21 performs communication with the wireless LAN 22 or the mobile phone network 23, and thus, transmits the sensor data which is received from the sensor device 11 or the other wireless relay devices 21, to the wireless LAN 22 or the mobile phone network 23.

The wireless LAN 22 is constructed in a user's house or an arbitrary location. The wireless LAN 22 performs communication with the terminal 12, the wireless relay device 21, or the Internet 24, and thus, transmits the data from the terminal 12 or the sensor data from the wireless relay device 21 to the server 13 through the Internet 24.

In addition, the wireless LAN 22 receives the data which is transmitted from the server 13 through the Internet 24, and transmits the data to the terminal 12.

The mobile phone network 23, for example, is a 3G line or the like, and performs communication with the terminal 12, the server 13, the wireless relay device 21, or the Internet 24.

The Internet 24 performs communication with the terminal 12, the server 13, the wireless LAN 22, or the mobile phone network 23.

Here, the sensor data transmitted by the wireless relay device 21, the data transmitted through the wireless LAN 22, or the data transmitted by the terminal 12 is transmitted to the server 13 through one or both of the mobile phone network 23 and the Internet 24. In addition, the data transmitted by the server 13 is transmitted to the terminal 12 through one or both of the mobile phone network 23 and the Internet 24.

In the network 10 configured as described above, the wireless relay device 21 has a router function, and thus, even in a case where a certain wireless relay device 21 is not capable of performing communication due to a failure or the like, and a wireless communication route through the wireless relay device 21 is not capable of being used, it is possible to transmit the sensor data which is transmitted from the sensor device 11, to the server 13 by using wireless communication routes through the other wireless relay devices 21.

That is, the wireless relay device 21 has a router function, and thus, the sensor data obtained by the sensor device 11 can be transmitted to the server 13 through various wireless communication routes through the wireless relay device 21. For this reason, in the server 13, even in a case where a certain wireless relay device 21 is not capable of performing communication, the sensor data obtained by the sensor device 11 can be collected (received) through the other wireless relay devices 21.

In addition, the user of the automobile on which the wireless relay device 21 is disposed, for example, is capable of contributing to the collection of information for utilizing the ecosystem by only traveling a mountain road or the like in the utilization district.

That is, the automobile on which the wireless relay device 21 is disposed, travels the utilization district, and thus, in various locations, the wireless relay device 21 disposed on the automobile configures a wireless communication route along with the other wireless relay devices 21 in a position close to the location, and contributes to the collection of the sensor data obtained by the sensor device 11 in the server 13.

Furthermore, a wireless communication device based on one of a standard specification of a short distance wireless network, for example, ZIGBEE (registered trademark), and a small wireless communication device with low power consumption, which is capable of performing wireless communication of a certain level of distance and of being provided with a router function, can be adopted as the wireless relay device 21.

<Configuration Example of Terminal 12>

Figure 3:
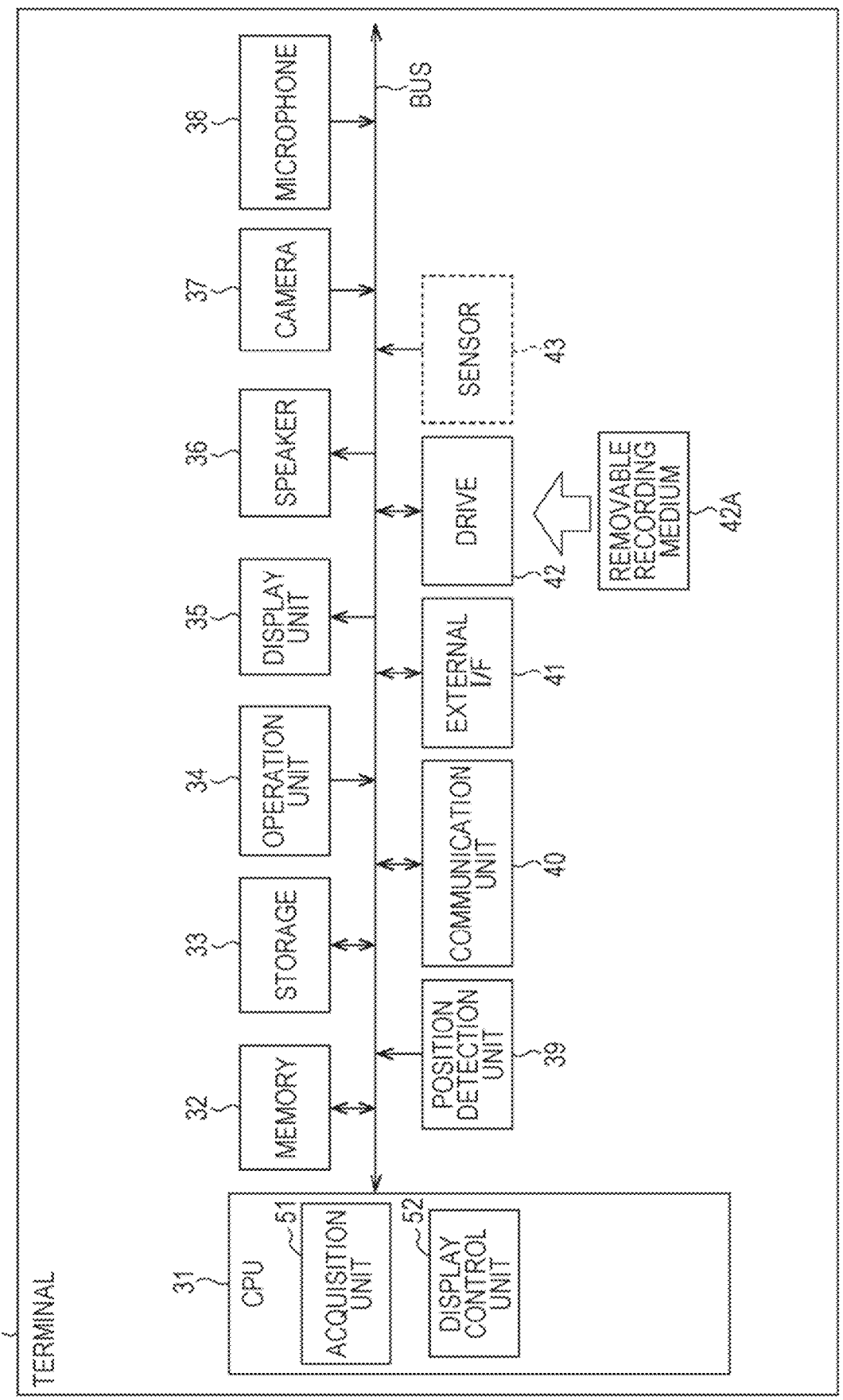
FIG. 3 is a block diagram illustrating a configuration example of a terminal 12.

FIG. 3 is a block diagram illustrating a configuration example of the terminal 12 of FIG. 1.

The terminal 12 includes a central processing unit (CPU) 31, a memory 32, a storage 33, an operation unit 34, a display unit 35, a speaker 36, a camera 37, a microphone 38, a position detection unit 39, a communication unit 40, an external interface (I/F) 41, and a drive 42. The CPU 31 to the drive 42 are connected to a bus, and perform necessary communication with each other.

The CPU 31 executes a program which is installed in the memory 32 or the storage 33, and thus, performs various processings.

The memory 32, for example, includes a volatile memory or the like, and temporarily stores the program executed by the CPU 31, or necessary data.

The storage 33, for example, includes a hard disk or a non-volatile memory, and stores the program executed by the CPU 31, or necessary data.

The operation unit 34 includes a physical key (including a keyboard), a mouse, a touch panel, or the like. According to the operation of the user, the operation unit 34 outputs an operation signal corresponding to the operation onto the bus.

The display unit 35, for example, includes a liquid crystal display (LCD) or the like, and displays an image according to data supplied from the bus.

Here, a touch panel as the operation unit 34 can be configured of a transparent member, and can be integrated with the display unit 35. With this arrangement, the user is capable of inputting information by operating an icon, a button, or the like displayed on the display unit 35.

The speaker 36 outputs a sound according to the data supplied from the bus.

The camera 37 captures an image (a still image (a picture) and a moving image) (senses light), and outputs the corresponding image data onto the bus.

The microphone 38 collects the sound (senses the sound), and outputs the corresponding acoustic data onto the bus.

The position detection unit 39, for example, includes a circuit, an antenna, and the like, using a global positioning system (GPS), detects the position of the terminal 12 as the position of the user or the like, and outputs positional information indicating the position onto the bus.

The communication unit 40 includes a communication circuit, an antenna, or the like, and performs communication with the wireless LAN 22, the mobile phone network 23, the Internet 24, or the like.

The external I/F 41, for example, is an interface for exchanging data with respect to a headphone or other external devices.

The drive 42, for example, allows a removable recording medium 42A such as a memory card to be detachable, and drives the mounted removable recording medium 42A.

In the terminal 12 configured as described above, the program executed by the CPU 31 can be recorded in advance in the storage 33 as a recording medium which is built in the terminal 12.

In addition, the program can be stored (recorded) in the removable recording medium 42A, can be provided as so-called package software, and can be installed in the terminal 12 from the removable recording medium 42A.

In addition, the program can be downloaded from the Internet 24 through the communication unit 40, and can be installed in the terminal 12.

The CPU 31 executes the program installed in the terminal 12, and thus, functions as an acquisition unit 51 and a display control unit 52.

The acquisition unit 51 acquires various information (data) items such as an augmented reality (AR) object as described later. For example, processing of receiving data through the communication unit 40, processing of reading out data from the memory 32, the storage 33, and the removable recording medium 42A, or the like can be performed as acquisition processing.

The display control unit 52 performs display control of displaying the information or the like which is acquired by the acquisition unit 51, on the display unit 35, and thus, of presenting the information to the user.

Furthermore, a sensor other than the camera 37 sensing light and the microphone 38 sensing a sound, that is, a sensor 43 sensing a physical amount other than light and a sound, for example, a temperature, a pressure, or the like, can be disposed on the terminal 12. In a case where the sensor 43 is disposed on the terminal 12, the terminal 12 is capable of functioning as the sensor device 11.

In addition, an operation (input) with respect to the terminal 12 can be performed by an audio, a gesture, or other arbitrary means in addition to the operation of the operation unit 34.

<Configuration Example of Server 13>

Figure 4:
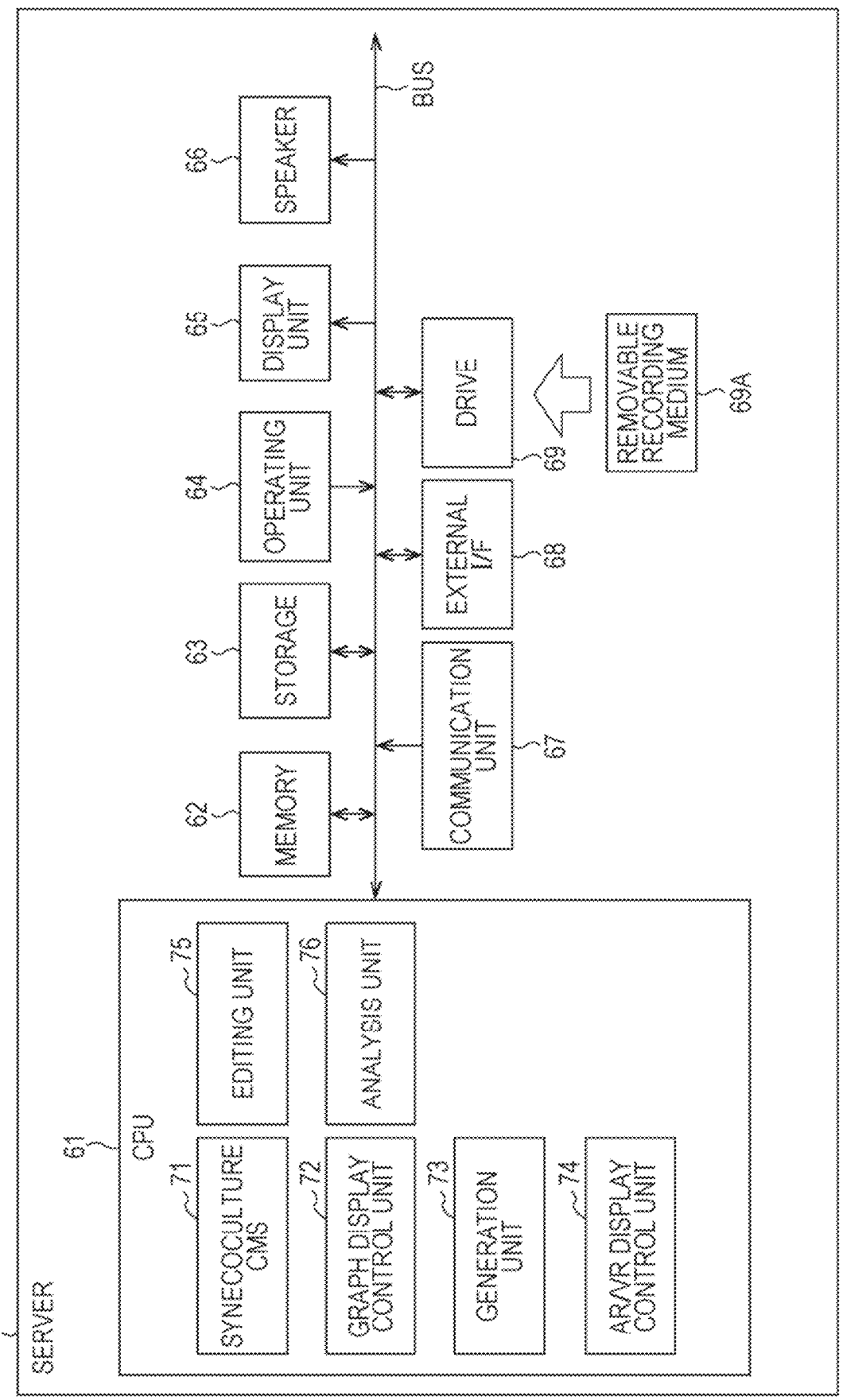
FIG. 4 is a block diagram illustrating a configuration example of a server 13.

FIG. 4 is a block diagram illustrating a configuration example of the server 13 of FIG. 1.

The server 13 includes a CPU 61, a memory 62, a storage 63, an operation unit 64, a display unit 65, a speaker 66, a communication unit 67, an external I/F 68, and a drive 69.

The CPU 61 to the drive 69 are configured as with the CPU 31 to the speaker 36, and the communication unit 40 to the drive 42 of FIG. 3.

In the server 13, as with the terminal 12, a program executed by the CPU 61 can be recorded in advance in the storage 63 as a recording medium which is built in the server 13.

In addition, the program can be stored (recorded) in a removable recording medium 69A, can be provided as package software, and can be installed in the server 13 from the removable recording medium 69A.

In addition, the program can be downloaded from the Internet 24 through the communication unit 67, and can be installed in the server 13.

The CPU 61 executes the program installed in the server 13, and thus, functions as a Synecoculture (registered trademark) content management system (CMS) 71, a graph display control unit 72, a generation unit 73, an AR/VR display control unit 74, an editing unit 75, and an analysis unit 76.

The Synecoculture (registered trademark) CMS 71 manages contents configuring a webpage performing delivery of information associated with Synecoculture (registered trademark) (hereinafter, also referred to as a Synecoculture (registered trademark) page) (a text, an image, or the like), layout information, or the like, by registering the contents, the layout information, or the like in a database (DB) which is stored in the storage 63. Further, the Synecoculture (registered trademark) CMS 71 constructs the Synecoculture (registered trademark) page, and transmits the Synecoculture (registered trademark) page as a web server on the Internet 24 to the terminal 12 (a device functioning as the other web browser) from the communication unit 67.

In the terminal 12 (FIG. 3), the acquisition unit 51 acquires the Synecoculture (registered trademark) page from the Synecoculture (registered trademark) CMS 71 through the communication unit 40, and the display control unit 52 displays the Synecoculture (registered trademark) page on the display unit 35.

The graph display control unit 72 generates a multi-partite graph (a graph model) such as a bipartite graph necessary for generating a relationship graph as described later from the DB recorded in the storage 63 or the like, and transmits the multi-partite graph from the communication unit 67 to the terminal 12, and thus, displays the relationship graph on the terminal 12 by generating the relationship graph from the bipartite graph. Alternatively, the graph display control unit 72 generates the relationship graph from the bipartite graph, and transmits the relationship graph from the communication unit 67 to the terminal 12, and thus, displays the relationship graph on the terminal 12.

That is, in the terminal 12 (FIG. 3), the acquisition unit 51 acquires the bipartite graph or the relationship graph from the graph display control unit 72 through the communication unit 40. In a case where the bipartite graph is acquired, the acquisition unit 51 generates the relationship graph from the bipartite graph, and thus, acquires the relationship graph. Then, in the terminal 12, the display control unit 52 displays the relationship graph which is acquired by the acquisition unit 51, on the display unit 35.

The generation unit 73 generates an AR object or a virtual reality (VR) space (an image thereof) or the like displaying the AR object in a superimposed manner, and registers (records) the AR object or the virtual reality (VR) space in the storage 63.

The AR/VR display control unit 74 performs processing necessary for allowing the terminal 12 to perform AR display or VR display of displaying the AR object in a real space, a captured real space (an image thereof) in which the real space is captured, or a VR space (an image thereof) in which the real space is modeled.

For example, the AR/VR display control unit 74 acquires information indicating the AR object, or the captured real space or the VR space which is a background space where the AR object is displayed in a superimposed manner, from the storage 63, and transmits the information from the communication unit 67 to the terminal 12, and thus, allows the terminal 12 to perform the AR display or the VR display of displaying the AR object in a superimposed manner in the background space.

Alternatively, for example, the AR/VR display control unit 74 acquires the AR object from the storage 63, and transmits the AR object from the communication unit 67 to the terminal 12, and thus, allows the terminal 12 to perform the AR display of displaying the AR object in a superimposed manner in the background space by using the real space as a background space.

The editing unit 75 edits the AR object which is registered in the storage 63 according to the operation or the like of the user in the terminal 12.

The analysis unit 76 analyzes the sensor data from the sensor device 11.

However, in the server 13, various DBs are registered in the storage 63, and various DBs of assisting the management of Synecoculture (registered trademark) (hereinafter, also referred to as a Synecoculture (registered trademark) DB) are included as a part of the various DBs.

Hereinafter, the Synecoculture (registered trademark) DB registered in the storage 63 of the server 13 will be described.

<Configuration Example of Synecoculture (registered trademark) DB>

Figure 5:
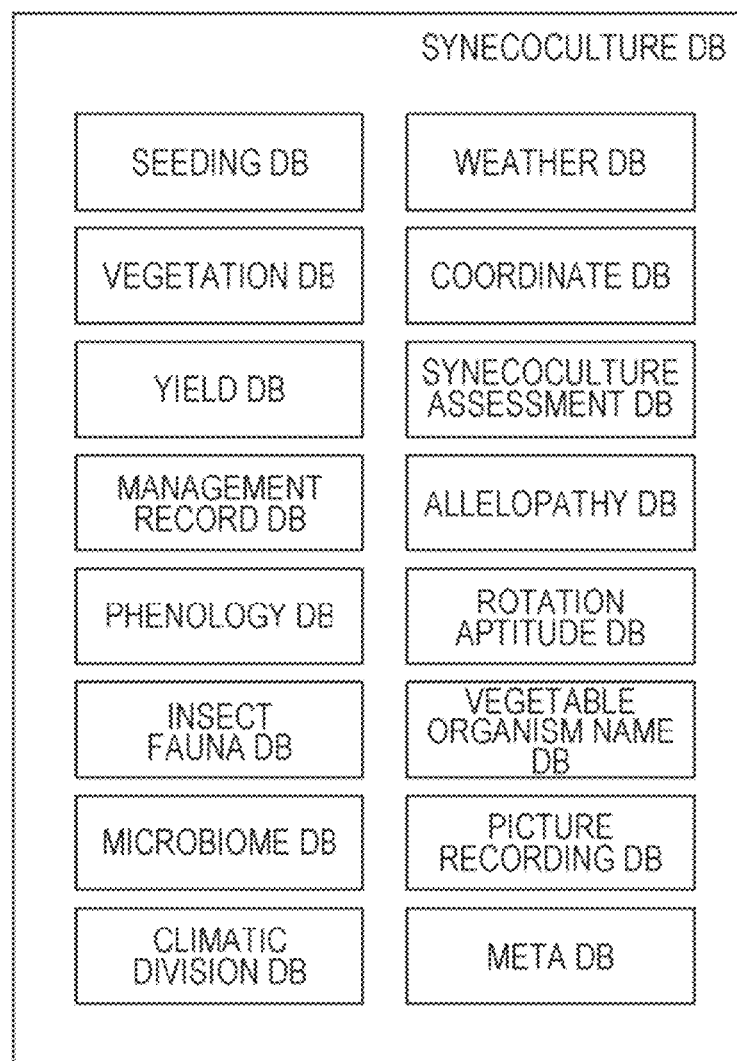
FIG. 5 is a diagram illustrating a configuration example of a Synecoculture (registered trademark) DB.

FIG. 5 is a diagram illustrating a configuration example of the Synecoculture (registered trademark) DB.

In FIG. 5, the Synecoculture (registered trademark) DB includes a seeding DB, a vegetation DB, a yield DB, a management record DB, a phenology DB, an insect fauna DB, a microbiome DB, a climatic division DB, a weather DB, a coordinate DB, a Synecoculture (registered trademark) assessment DB, an allelopathy DB, a rotation aptitude DB, a vegetable organism name DB, a picture record DB, a meta DB, and the like.

In the Synecoculture (registered trademark) DB, data is stored in a comma separated values (csv) file (for example, a file in the format of a two-dimensional matrix) or an image file. The Synecoculture (registered trademark) DB, and all or a part of the DB stored in the storage 63, can be independently arranged from the server 13, and can be connected to the server 13 through the network 10.

FIG. 6 is a diagram illustrating a configuration example of the seeding DB.

The seeding DB, for example, is configured of a csv file. In this example, a recording date, a field lot, a ridge number, a ridge lot, distinguishment of seeds and saplings, a crop name, "Sakumotsu Mei", a quantity, and information associated with a manufacturer are recorded. Even in a case of seeds or saplings of the same breed variety, a collecting method or a growing method is different according to the manufacturer, and a manufacturer name is also a kind of cultivation condition, and thus, it is preferable to manage and record the manufacturer name.

Here, a field (an agricultural farm) of the utilization district is partitioned into field lots. A ridge is formed in the field lot, and the ridge is partitioned into one or more ridge lots. A ridge number for specifying the ridge is attached to the ridge.

For example, it is recorded that only 0.5 Kg of the saplings of the potato (May Queen) of a manufacturer A is planted in all ridges in a field lot SW, on Jan. 18, 2012. In addition, it is recorded that only two bags of the seeds of the lettuce (King Crown) of a manufacturer C are sowed in all field lots.

Furthermore, information including breed variety is recorded in the crop name by including Chinese characters, as with "potato (baron potato)", and only information of the name is simply recorded in "Sakumotsu Mei" by only Katakana, as with "JAGAIMO", without distinguishing the breed variety. The search is easily performed by the expression only of such unified characters.

FIG. 7 is a diagram illustrating a configuration example of the vegetation DB.

The vegetation DB, for example, is configured of a csv file. In this example, the recording date and positional information as observation lot coordinates are recorded. For example, in observation lot coordinates NE, observation performed as described below is recorded. It is recorded that the budbreak of the broad bean is rooted, the carrot can be harvested, the radish can be harvested, the green onion is rooted, the sapling broccoli is rooted, the sapling cabbage is rooted, and the sapling Chinese cabbage is rooted and can be harvested, on Jan. 23, 2012.

In addition, it is recorded that weeds of Gramineae, Asteraceae, and Fabaceae are observed, and the red roll chicory can be harvested. Furthermore, for example, it is theoretically possible to more specifically classify a predetermined vegetable organism than Gramineae, but in practice, there is no meaning to more specifically classify the vegetable organism.

An entry observed in the observation lot coordinates NE is also recorded on Feb. 25, 2012.

FIG. 8 is a diagram illustrating a configuration example of the yield DB.

The yield DB, for example, is configured of a csv file. In this example, the yield of the harvested crop is recorded on each harvest date. For example, 100 g of the bittersweet lettuce is harvested on Jan. 14, 2012, 1700 g of the radish is harvested on Jan. 24, 2012, 4000 g of the radish is harvested on Jan. 29, 2012, 1500 g of the radish is harvested on Jan. 30, 2012, 740 g of the radish is harvested on Jan. 31, 2012, and 1500 g of the radish is harvested on Feb. 20, 2012.

In addition, the yield of the small turnip, the small turnip of a W agricultural farm, the Petroselinum neapolitanum, the salad chives, the mint, the rosemary, the Japanese mustard spinach, the shredded radish, the green onion, the radioxenon, the radioxenon of the W agricultural farm, the celery, the burdock root, the bok-choy, the garland chrysanthemum, the small ginseng, the small ginseng of the W agricultural farm, the large and medium ginsengs of the W agricultural farm, the cauliflower, the cabbage (the stem cabbage), the Okinawan shallots, the Chinese cabbage, the *Petasites japonicus*, and the like is recorded. Furthermore, "W agricultural farm" is the name of the agricultural farm, and "stem cabbage?" indicates that an observer (the user) was not capable of accurately identifying whether or not the cabbage is the stem cabbage. "Shredded radish" is not the general name, but is a name named by the observer in the vegetable organism. In FIG. 8, the recording of the coordinates as the positional information is omitted, but it is possible to record the field in which the crop is observed, the GPS coordinates as the positional information of the lot such as the ridge, or the like.

Furthermore, the yield DB can be input by using input information of the seeding DB. For example, in a case where the yield DB is input, it is possible to display the information itself of the vegetable organism which is managed by the seeding DB.

FIG. 9 is a diagram illustrating a configuration example of the management record DB.

The management record DB, for example, is configured of a csv file. In this example, the management operation which has been performed and the date which has been used are recorded. For example, it is recorded that engineering construction such as settled planting of sapling and making of windproof shelf is performed, on Jan. 19, 2012, Jan. 20, 2012, Jan. 21, 2012, Jan. 22, 2012, and Jan. 23, 2012.

FIG. 10 is a diagram illustrating a configuration example of a csv file as the phenology DB.

The phenology DB, for example, is configured of an image file and a csv file. FIG. 10 illustrates an example of the csv file, and the contents of the phenology and the recording date and time are recorded in the csv file by a character. For example, it is recorded that unknown grass seeds are observed, the unknown grass seeds have grown faster than the other, a lower portion of the pea has withered, and a portion of which the grown is obviously faster than the other is observed, on Jan. 9, 2011.

Figure 11:
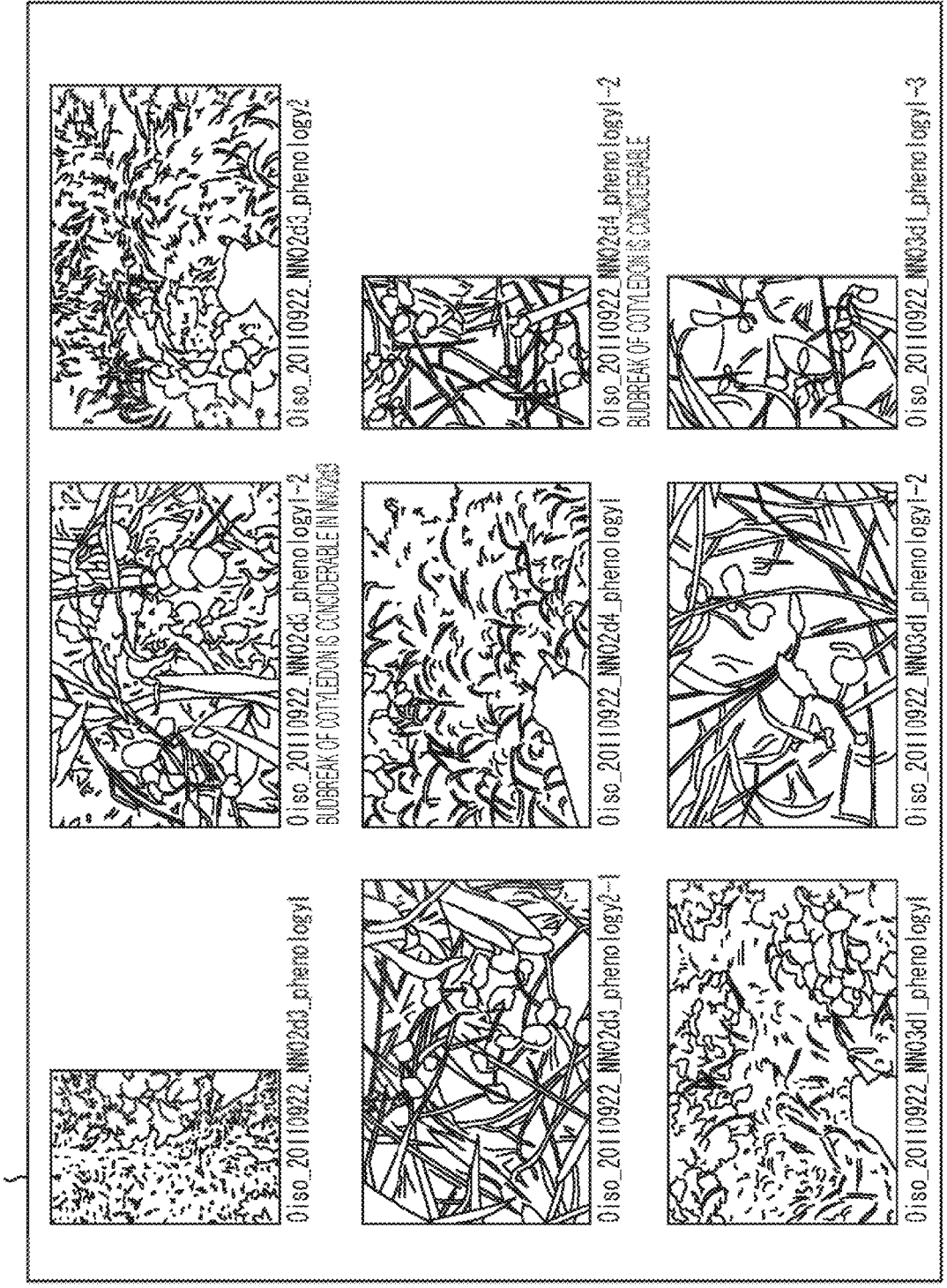
FIG. 11 is a diagram illustrating a configuration example a phenology DB using an image.

FIG. 11 is a diagram illustrating a configuration example of an image file as the phenology DB.

In the image file of FIG. 11, the phenology observed in a field with a name of "Oiso cooperation agricultural farm" is recorded along with a simple comment attached with a captured picture for each date.

The upper left portion of the drawing illustrates phenology 1 which is an image captured in a condition where the location is Oiso, the date is Sep. 22, 2011, the field lot is NN, the ridge number is 02, and the ridge lot is d3. The upper central portion of the drawing illustrates phenology 1-2 which is an image captured in the same location, along with a comment of "the budbreak of the cotyledon is considerable in NN02d3".

Thus, the phenology observed by the operator (the user) is recorded in the phenology DB by a character and an image.

FIG. 12 is a diagram illustrating a configuration example of the insect fauna DB.

The insect fauna DB, for example, is configured of an image file and a csv file. A of FIG. 12 illustrates an image of an insect which is captured in a field 087 of a new Ise agricultural farm, on Feb. 18, 2012. It is recorded that an observation station is the new Ise agricultural farm, the family name of the insect is beetles, the ordinal name thereof is Tenebrionidae, the classification thereof is considered as *Heterotarsus carinulas*, and the insects overwinter under the stone in a group, as a comment.

B of FIG. 12 illustrates an image of the insect captured in a field 088 of the new Ise agricultural farm, on Feb. 18, 2012. The same contents as those in the case of A of FIG. 12 are recorded as a comment.

C of FIG. 12 illustrates an image of a still object captured in a field 089 of the new Ise agricultural farm, on Feb. 18, 2012. It is recorded that the observation station is the new Ise agricultural farm, the creation is spiders, the family name thereof is spider, the ordinal name thereof is wolf spider, the species name thereof is *Pardosa astrigera*, the creation is the most common species of the wolf spider, and it is often observed that the creation prowls in the vicinity of the land surface, as a comment.

FIG. 13 is a diagram illustrating a configuration example of the weather DB.

In this example, weather information of Tsu Province in 2012, such as an atmospheric pressure, a rainfall amount, an atmospheric temperature, and humidity, is recorded in the beginning, the middle, and the end of each month. For example, in the beginning of January, the average atmospheric pressure at the site 1018.7 hPa, and the average atmospheric pressure at the sea surface is 1021.0 hPa. The maximum rainfall amount is 0.5 mm per 10 minutes, 0.5 mm per 1 hour, 0.5 mm per a day, and is 0.5 mm in total. The maximum atmospheric temperature is 11.6° C., the minimum atmospheric temperature is 0.2° C., and the maximum daily average atmospheric temperature is 9.2° C., the minimum daily average atmospheric temperature is 2.0° C., and the daily average atmospheric temperature is 5.2° C. The average humidity is 62%, and the minimum humidity is 24%.

FIG. 14 is a diagram illustrating a configuration example of the allelopathy DB.

The allelopathy DB, for example, is configured of a csv file. In this example, allelopathy is recorded with respect to the green onion, the watermelon or the melon (the Cucurbitaceae), the carrot, the foxtail millet/millet, the barley/wheat, the squash, the watermelon-cucumber-squash (the cucurbits), and the garlic-onion. "1" indicates that a symbiotic mutual interaction (that is, a facilitated action) is confirmed between vegetable organisms which area target, and "0" indicates that the symbiotic mutual interaction is not confirmed. For example, the symbiotic mutual interaction is confirmed between the green onion and the carrot, but the symbiotic mutual interaction is not confirmed between the green onion and the barley/wheat. Furthermore, it is possible to gradually indicate the degree of mutual interaction by using a numerical character such as 0 to 10.

FIG. 15 is a diagram illustrating a configuration example of the rotation aptitude DB.

The rotation aptitude DB is configured of a csv file. In this example, a rotation aptitude of the watermelon, the melon (the Cucurbitaceae), and the peanut is recorded. "1" indicates that an excellent rotation aptitude is confirmed between vegetable organisms which are a target in this field, and "0" indicates that an excellent rotation aptitude is not confirmed. For example, an excellent rotation aptitude is confirmed between the watermelon or the melon (the Cucurbitaceae) and the peanut.

The allelopathy DB or the rotation aptitude DB is prepared from not only information known in documents or the like, but also other information items. For example, it is possible to prepare the allelopathy DB or the rotation aptitude DB in the same manner from a combination of vegetation in which a mixed up state is actually established in the cooperation agricultural farm, and a combination in which vegetation transition (that is, a temporal change in the vegetation) occurs, by being compared with reference to the seeding DB, the vegetation DB, and the yield DB.

The microbiome DB is configured of an image file and a csv file. The microbiome DB records information associated with a minute creation which is analyzed from a soil sample acquired in the cooperation agricultural farm.

The climatic division DB is configured of a csv file. The climatic division DB is a DB recording information associated with a climatic division where the agricultural farm (the agricultural field) is positioned, and includes a partition such as laurel forest, deciduous forest, subtropical climate, and tropical climate.

The weather DB, for example, records an image file graphed from weather data of a weather satellite such as Automated Meteorological Data Acquisition System, a csv file, and various weather data items as the sensor data of the sensor device 11, which is observation equipment disposed in the agricultural field.

The coordinate DB is configured of a csv file. The coordinate DB records GPS coordinates of each ridge of the field. The coordinates have an accuracy of approximately 10 cm.

The Synecoculture (registered trademark) assessment DB is configured of a pdf or an image file. A Synecoculture (registered trademark) assessment is a certification got through an examination as Synecoculture (registered trademark), and a server manager examines the field on the basis of an application filed from a manager of a field 21, and issues the Synecoculture (registered trademark) assessment in a case where it is confirmed that a condition as Synecoculture (registered trademark) is satisfied. It is confirmed that using Synecoculture (registered trademark) is noted in the crop from the agricultural farm in which the issue is received.

The vegetable organism name DB records names and images of various vegetable organisms. The picture record DB records various pictures. The meta DB records a key event as described later.

In addition, various information items necessary for obtaining a vegetation design of a vegetable organism cultivated by Synecoculture (registered trademark) are recorded in the Synecoculture (registered trademark) DB.

<Assist Processing of Vegetation Design>

Figure 16:
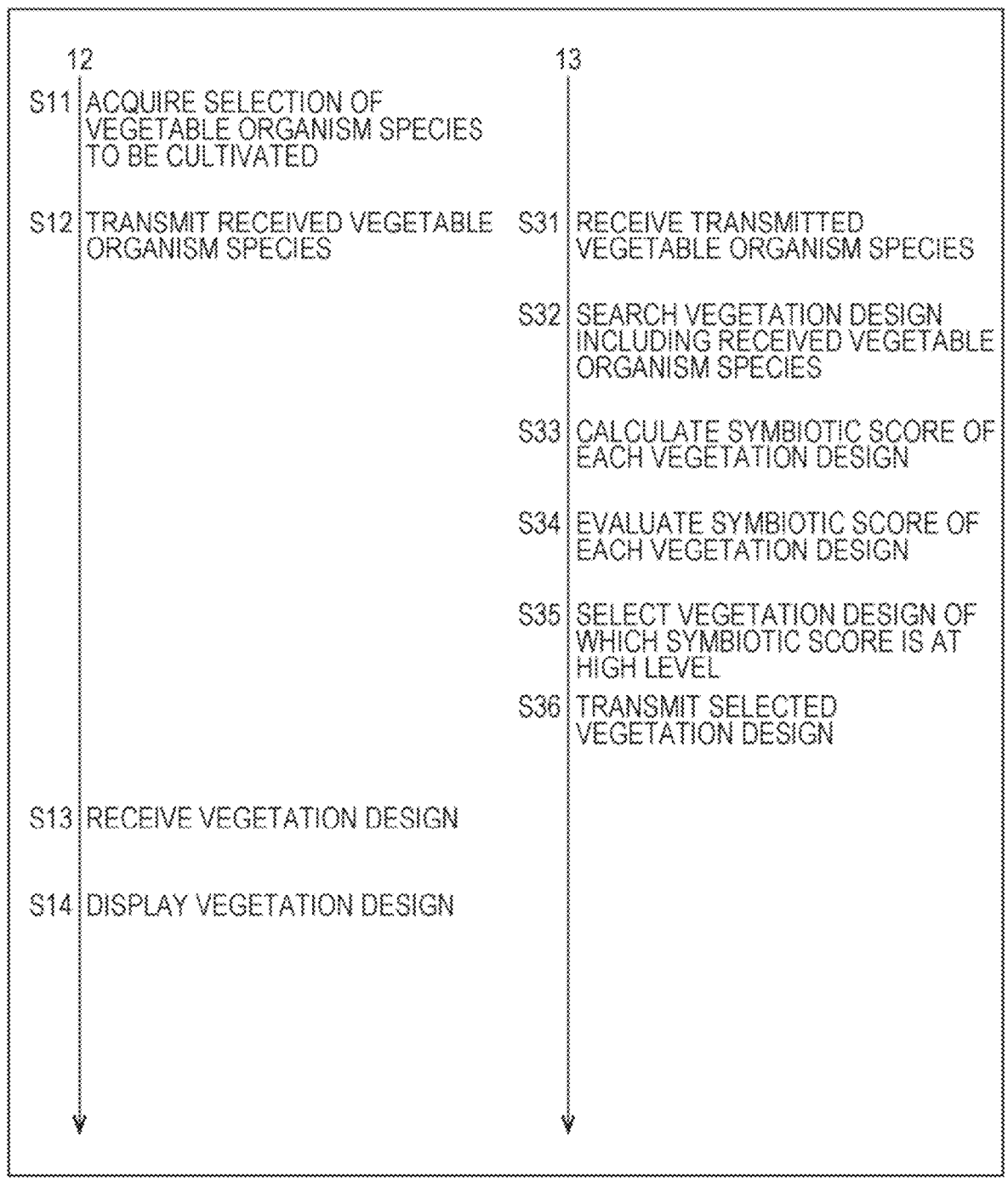
FIG. 16 is a flowchart illustrating a processing example of assisting a vegetation design.

FIG. 16 is a flowchart illustrating a processing example of assisting the vegetation design.

The ecosystem utilization system of FIG. 1 assists the vegetation design of Synecoculture (registered trademark) as one type of assistance of the ecosystem utilization. In the ecosystem utilization system, in a case where the user inputs the crops (vegetation) planned to be cultivated, a combination of the crops and vegetation suitable for constructing a mixed dense state, that is, the vegetation design of Synecoculture (registered trademark) is searched from the allelopathy DB and the rotation aptitude DB. Then, spatiotemporal arrangement of the vegetation design which is assumed to have the lowest cost and the highest yield is output.

Synecoculture (registered trademark) is on the basis of the mixed dense, and thus, seeds of a plurality of crops are sown by being mixed, and the grown-up crops are harvested. It is necessary to predict how to further increase the degree of mixed dense by mixing the seeds with which combination, from both of a mutual interaction between vegetable organisms (the allelopathy or the rotation aptitude) which is adequate with respect to the vegetable organisms or a land condition and is known in advance, and a combination which is actually performed in the agricultural field.

It is not possible to completely control the ecosystem including the weather or the like, and thus, an object of the vegetation design is to assume the combination of the vegetation in which the cost is maximally reduced and the yield is maximized even though it is not possible to harvest all of the sown seeds or the planted saplings. The vegetation design is conceptually homologous with the configuration of the portfolio in the stock investment, and thus, the vegetation design can be referred to as a seed portfolio.

In the processing of assisting the vegetation design, as illustrated in FIG. 16, in step S11, the acquisition unit 51 of the terminal 12 acquires the selection of vegetable organism species (vegetation) to be cultivated. That is, in a case where the user operates the operation unit 34, and designates the vegetable organism species to be cultivated, such an operation is acquired by the acquisition unit 51. The input may be performed by a method of causing the user to input an arbitrary vegetable organism name, or may be performed by displaying a list of vegetable organism names prepared in advance on the display unit 35, and by selecting a predetermined name from the list. With this arrangement, the designation of the vegetable organism to be cultivated is received.

In step S12, the communication unit 40 transmits the vegetable organism species (the names of the vegetable organism species) acquired by the acquisition unit 51 to the server 13 through the network 10.

In step S31, the communication unit 67 of the server 13 receives the vegetable organism species transmitted from the terminal 12. That is, the vegetable organism species the transmitted from the terminal 12 in step S12 are received by the server 13. With this arrangement, the vegetable organism to be cultivated by the user is received in the server 13. In step S32, the Synecoculture (registered trademark) CMS 71 searches the vegetation design including the vegetable organism species from the terminal 12, in the server 13. That is, the Synecoculture (registered trademark) CMS 71 exhaustively searches a combination of the vegetable organism designated by the user (the vegetable organism species from the terminal 12) and vegetation suitable for constructing the mixed dense state, from at least one of the allelopathy DB and the rotation aptitude DB. Furthermore, the received vegetable organism species are confirmed by also using the vegetable organism name DB, as necessary.

In step S33, the Synecoculture (registered trademark) CMS 71 calculates a symbiotic score of each vegetation design searched in step S32. That is, a symbiotic score of each combination of the vegetable organism designated by the user and vegetation suitable for constructing the mixed dense state, which is one or more vegetation designs searched in step S32, is calculated.

The symbiotic score is defined as an average value of all elements which are recorded in the allelopathy DB and the rotation aptitude DB to which an aggregation of seeds to be planted corresponds. The all elements are all weighted scores of the seeds, and the weighted score is a value obtained by evaluating a mutual interaction between the respective vegetable organisms with positive and negative numerical values. That is, when the number of weighted scores of all vegetable organisms is set to n, and a value of a weighted score of the i-th (i=1, 2, . . . , n) vegetable organism is set to Ei, a symbiotic score SC is represented by Expression $SC=\Sigma Ei/n$. Furthermore, the value Ei of the weighted score is a value which increases as the degree of aptitude constructing the mixed dense state increases. In addition, $\Sigma$ represents a summation obtained by changing i to an integer value of 1 to n.

It is indicated that a symbiotic mutual interaction becomes stronger as the value of the symbiotic score SC increases, that is, there is an experimental rule where a symbiotic mutual interaction is strong, and the competitive mutual interaction becomes stronger as the numerical value decreases (negatively increases).

The value of the weighted score which is obtained by evaluating the mutual interaction with the positive and negative numerical values for each combination of the vegetable organism species prepared from the documents and the date of the agricultural field is recorded in the allelopathy DB and the rotation aptitude DB. That is, a vegetation state of the vegetable organism of the seeds which are recorded in the seeding DB as being seeded, is recorded in the vegetation DB, and a yield obtained from the vegetable organism is recorded in the yield DB. Then, a weighted score of the vegetable organism is added to the seeding DB, the vegetation DB, and the yield DB for each observation, and finally, a large weighted score is applied to a combination having a large yield. Similarly, a large weighted score is recorded to a combination of vegetable organisms suitable for a rotation, in the rotation aptitude DB. Then, a symbiotic score based thereon is recorded in the allelopathy DB.

For example, in a case where the peanut is designated, an average value of weighted scores with respect to elements such as various conditions and results in a case where the peanut and the watermelon are subjected to vegetation as the mixed dense state is calculated as the symbiotic score of the peanut and the watermelon which is one of other vegetable organisms recorded as a target of the combination. A large weighted score is allocated into the element as the yield increases, and a small weighted score is allocated into the element as the yield decreases. An average value thereof is calculated, and is set to the symbiotic score. Furthermore, the calculation may be performed whenever the vegetable organism is designated, or may be automatically performed at a predetermined timing.

In a case where the symbiotic score is calculated by using an integrated value of both of the allelopathy DB and the rotation aptitude DB, a case where vegetable organism species to easily grow up every year according to the vegetation transition is changed, is also averaged. Therefore, a symbiotic score which is an average value of variable differences for a long period of time demarcated for last few years can also be evaluated. In consideration thereof, it is possible to realize response and utilization with respect to the vegetation transition.

In step S34, the Synecoculture (registered trademark) CMS 71 evaluates the symbiotic score of each vegetation design searched in step S31. That is, the symbiotic scores of each vegetation design including the vegetable organism designated by the user are compared to each other.

In step S35, the Synecoculture (registered trademark) CMS 71 selects a vegetation design of which the symbiotic score is at a high level. That is, one or more combinations of the vegetable organism species having a large value of the symbiotic score evaluated in step S34 are selected in descending order.

Furthermore, all of the searched vegetation designs can be directly presented to the user. In this case, the processing of evaluating the symbiotic score and of selecting the vegetation design of which the value of the symbiotic score is at a high level can be omitted.

In addition, the symbiotic score can be evaluated by the user. In this case, the processing of evaluating the symbiotic score and of selecting the vegetation design of which the value of the symbiotic score is at a high level can be omitted.

In step S36, the communication unit 67 of the server 13 transmits the selected vegetation design to the terminal 12, which transmits the vegetable organism species received in step S31 to the server 13, through the network 10.

In step S13, the acquisition unit 51 of the terminal 12 acquires the vegetation design transmitted from the server 13 by receiving the vegetation design in the communication unit 40. With this arrangement, the vegetation design of the vegetable organism designated by the user in step S11 is acquired. In step S14, the display control unit 52 displays the vegetation design acquired from the server 13 on the display unit 35.

Accordingly, the user is capable of recognizing each combination of the vegetable organism species input in step S11 and vegetation suitable for constructing the mixed dense state. The user is capable of selecting a predetermined combination from combinations proposed and displayed from the ecosystem utilization system, and of actually performing cultivation in the field. The displayed combination is each combination of the vegetable organism species designated by the user and the vegetation suitable for constructing the mixed dense state, and thus, it is possible to improve a yield compared to a case where cultivation is performed in a random combination. As a result thereof, it is possible to decrease the cost, compared to a case where the vegetable organism is cultivated in a random combination. Here, information to be presented to the user is not a prediction. The information to be presented to the user is reference information of the prediction based on the previous experimental rule. The prediction is performed by the user on the basis of the reference information.

In addition, in Synecoculture (registered trademark), the vegetable organism is subjected to vegetation in the mixed dense state, and thus, as with a case of a monoculture where a cultivation section is divided for each vegetable organism (a conventional farming method), even in a case where the farm operation is formulated into several operations, and any one of the operations is selected, it is not possible to necessarily obtain an excellent result. In the ecosystem utilization system, a new combination can be proposed to the user on the basis of the observation of the user, and thus, for example, in a case where the user finds that a symbiotic mutual interaction is strong for a combination of a certain vegetation and an insect, it is possible to perform a vegetation design using the combination.

Further, in Synecoculture (registered trademark), a plurality of types of vegetable organisms are subjected to vegetation in the mixed dense state, and thus, it is possible to disperse a risk and to obtain a large yield in average, compared to a case where only one type of vegetable organism is cultivated. This is the reason that the vegetation design of the ecosystem utilization system is referred to as a seed portfolio. Therefore, the number of combinations at a high level, which is presented, can be designated by the user. Obviously, the number of more suitable vegetable organisms can also be presented. With this arrangement, it is possible to perform risk management.

FIG. 17 is a diagram illustrating an output example of the symbiotic allelopathy.

FIG. 17 is a display example in step S14 of FIG. 16. In FIG. 17, vegetable organisms suitable for constructing the mixed dense state with ten types of vegetable organisms represented in the uppermost section (that is, companion plants) are represented in the lower section thereof. For example, vegetable organisms suitable for construct the mixed dense state with the corn are the watermelon or the melon (the Cucurbitaceae), the squash, the beans, the lettuce/butter lettuce, the Cucurbitaceae, the sweet basil, the dwarf bean, the geranium, the melon, the parsley, the soybean, the Japanese morning glory, the Japanese mustard spinach, and the leaf vegetables. In addition, vegetable organisms suitable for constructing the mixed dense state with the celery are the tomato, the cabbages, the Chinese cabbage, the turnip, and the pea.

That is, in a case where the user inputs the vegetable organism name in the uppermost section, the vegetable organism name represented in the lower section thereof is displayed as the vegetable organism suitable for constructing the mixed dense state. Accordingly, the user is capable of selecting one or more vegetable organisms from the display, and of performing vegetation with respect to the selected vegetable organism in the mixed dense state along with the designated vegetable organism.

Furthermore, in the example of FIG. 17, only the vegetable organism name is represented, but the corresponding symbiotic score may be displayed in the order from a high level.

<Display Example of AR Object>

Figure 18:
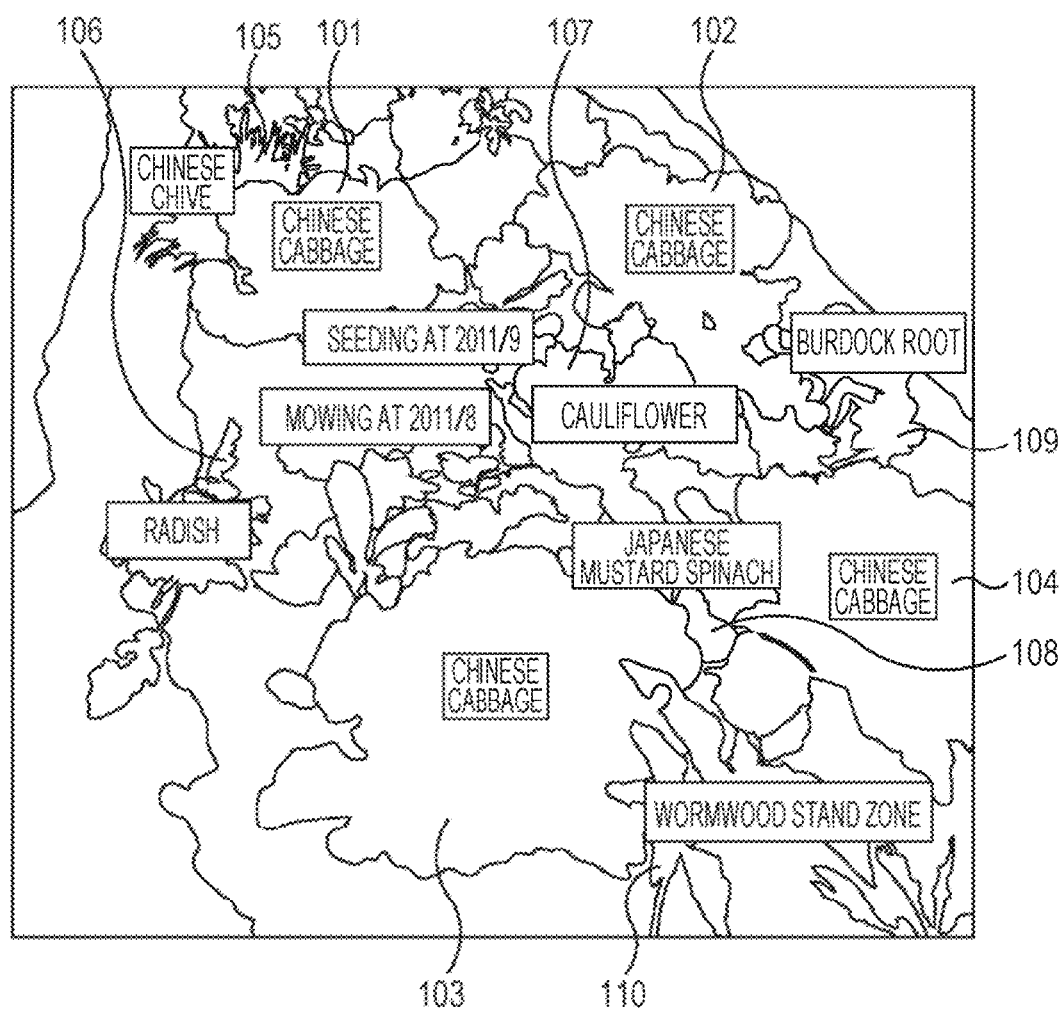
FIG. 18 is a schematic view illustrating a display example of an AR object.

FIG. 18 is a schematic view illustrating a display example of the AR object.

In Synecoculture (registered trademark), vegetation management with an accuracy for each vegetable organism in the agricultural field, such as management of determining which vegetable to remain and which grass to be mowed, is ultimately necessary, and thus, an information amount to be processed in the site is enormous. Therefore, in the ecosystem utilization system, it is possible to adopt an augmented reality (AR) technology in order to process the information amount regardless of individual difference in ability.

In the AR display using the AR technology, for example, object data (an image (data) as the object data) is displayed in a predetermined background space such as a real space actually seen by the user, in a superimposed manner, as if the object data existed in the background space. Here, object data which can be subjected to the AR display is also referred to as an AR object.

Examples of a method of performing the AR display include a method of performing image recognition of a background space (an image as the background space), of detecting a marker, and of displaying the AR object in a position corresponding to the marker, and a method of displaying the AR object in an absolute position such as GPS coordinates.

In addition, there are a case of using an object originally existing in the background space, and a case of using printed matter on which an image such as a predetermined pattern is printed, as the marker.

In the ecosystem utilization system, for example, the AR display can be performed in which the AR object is superimposed in a position in the background space corresponding to the marker or the GPS coordinates, in association with the marker or the GPS coordinates.

That is, in the ecosystem utilization system, in the server 13, for example, for the vegetable which is actually subjected to vegetation in predetermined GPS coordinates (a position represented by the predetermined GPS coordinates), the AR object representing the species name of the vegetable can be associated with the predetermined GPS coordinates; for a ridge of the predetermined GPS coordinates, the AR object representing information of the seeding or the management operation can be associated with the predetermined GPS coordinates; and for indigenous vegetation of the predetermined GPS coordinates, the AR object representing the indigenous vegetation can be associated with the predetermined GPS coordinates.

Then, in the terminal 12, as illustrated in FIG. 18, the AR object associated with the predetermined GPS coordinates can be displayed in a position corresponding to the predetermined GPS coordinates in an image of a real space (a real world) of a moving image or a still image obtained by being captured with the camera 37 or a background space (an image of the background space) of a real space or the like which is directly seen by the user with a see-through HMD.

In the display example of FIG. 18, the user performs mowing in the location in August, 2011, and seeding in September, 2011. Information indicating which kind of seeds is seeded is recorded in the Synecoculture (registered trademark) DB in association with the AR object of the seeding. Then, currently, in the location, the Chinese cabbage, the Chinese chive, the radish, the cauliflower, the Japanese mustard spinach, and the burdock root are subjected to vegetation.

As illustrated in FIG. 18, Chinese cabbages 101 to 104, Chinese chive 105, radish 106, cauliflower 107, Japanese mustard spinach 108, burdock root 109, and a wormwood stand zone 110 are respectively subjected to vegetation in a position represented by predetermined GPS coordinates of a certain field. In the Synecoculture (registered trademark) DB, AR objects of the Chinese cabbage 101 to the wormwood stand zone 110 are recorded and managed, in association with GPS coordinates of a position where the Chinese cabbage 101 to the wormwood stand zone 110 are subjected to vegetation.

That is, in a case where the user observes a certain vegetable organism, and for example, the name of the vegetable organism is input by operating the operation unit 34 of the terminal 12, in the server 13, the name input by the user (an image displaying the name) is set to an AR object, and the GPS coordinates where the vegetable organism the name of which is input by the user is subjected to vegetation, are associated with the AR object.

After that, in a case where the user captures a predetermined vegetable organism of the field with the camera 37, the image is displayed on the display unit 35. Further, in a case where a predetermined instruction is input, as illustrated in FIG. 18, the corresponding AR object, that is, the name of "Chinese cabbage" or the like (an image displaying the name) is displayed on an image of a real vegetable organism which is subjected to vegetation in the position of the GPS coordinates, in a superimposed manner.

Here, the wormwood stand zone 110 is not a vegetable organism which is subjected to vegetation as a result of seeding of the user, but an indigenous vegetable organism, and in FIG. 18, an AR object is also applied to such an indigenous vegetable organism by the user.

Furthermore, the vegetable organism which is subjected to vegetation is changed according to the season, and thus, the AR object can be managed by adding date.

In addition, in the case described above, the AR object is displayed by using the GPS coordinates, and the AR object can be displayed by using a marker. That is, the AR object can be displayed in a position in a background space corresponding to the GPS coordinates in association with the GPS coordinates, and can be displayed in a position in a background space corresponding to the marker in association with the marker.

<Synecoculture (Registered Trademark) Page>

Figure 19:
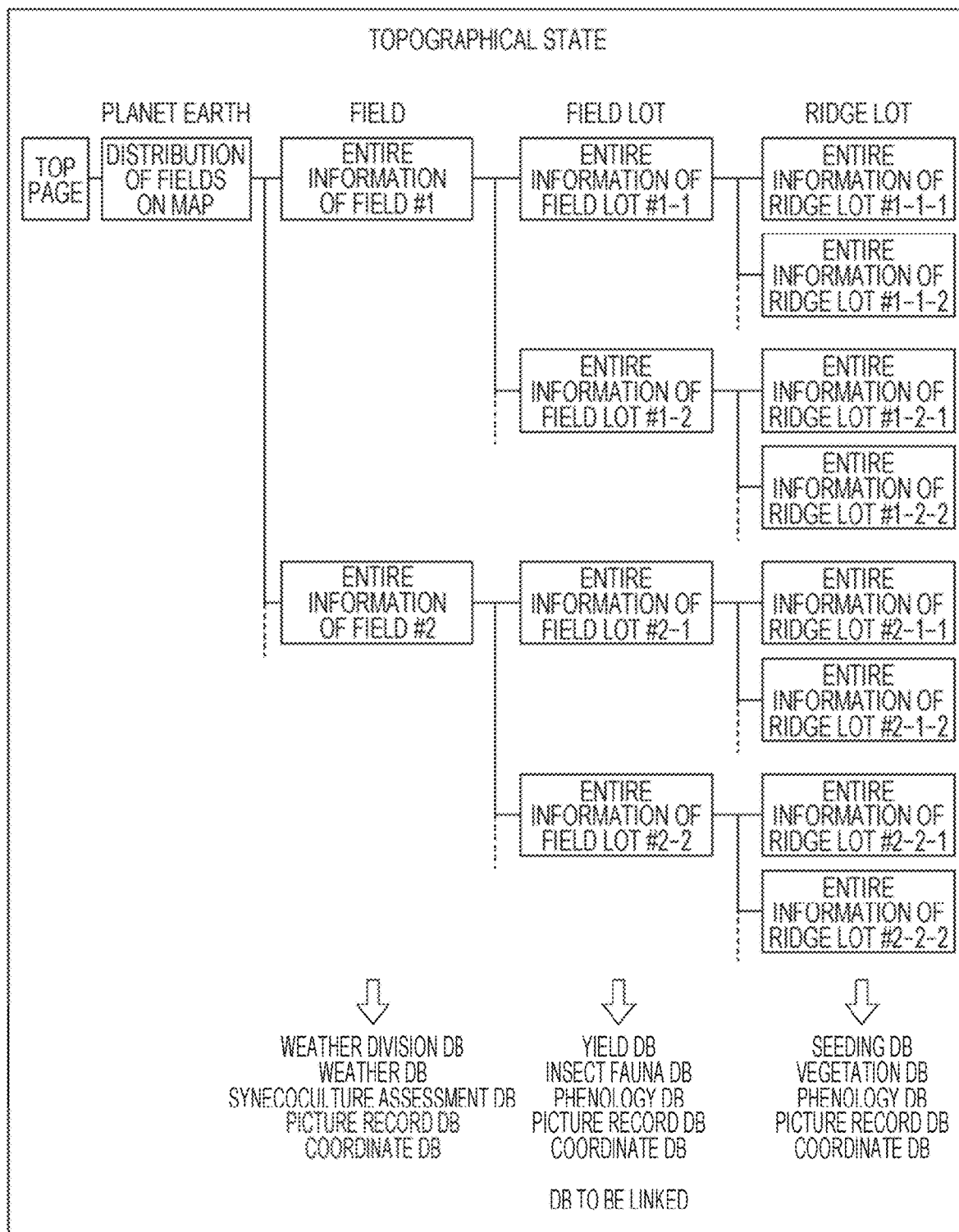
FIG. 19 is a diagram illustrating an example of a site map of a webpage as a Synecoculture (registered trademark) page.

FIG. 19 is a diagram illustrating an example of a site map of a webpage as the Synecoculture (registered trademark) page.

The server 13 provides the Synecoculture (registered trademark) page, which is a webpage linked with the Synecoculture (registered trademark) DB according to a topographical state illustrated in FIG. 19, to the user of the terminal 12. In order to perform an operation from a touch panel of the terminal 12, an icon of selecting the Synecoculture (registered trademark) DB is displayed on a top page of the Synecoculture (registered trademark) page.

As illustrated in the same drawing, the Synecoculture (registered trademark) page is configured of states of the top page, a distribution of fields on the map, the entire information of the field, the entire information of a field lot, and the entire information of a ridge lot in the order of a lower level state from a high level state. The states of the top page, the distribution of the fields on the map, the entire information of the field, the entire information of the field lot, and the entire information of the ridge lot respectively correspond to topographical states of a planet earth, the field, the field lot, and the ridge lot. Therefore, the display unit 35 of the terminal 12 outputs displays the field according to such a state structure. For example, the user is capable of selecting screens of field lots #1-1, #1-2, . . . of which a field #is partitioned, from a screen of the field #1, and of selecting screens of ridge lots #1-1-1, #1-1-2, . . . in a field lot #1-1 from a screen of the field lot #1-1. Furthermore, in this example, the state of the ridge is omitted, but may be provided.

In addition, the entire information of the field is linked to the climatic division DB, the weather DB, the Synecoculture (registered trademark) assessment DB, the picture record DB, and the coordinate DB recording the GPS coordinates as the positional information. The entire information of the field lot is linked to the yield DB, the insect fauna DB, the phenology DB, the picture record DB, and the coordinate DB. The entire information of the ridge lot is linked to the seeding DB, the vegetation DB, the phenology DB, the picture record DB, and the coordinate DB.

Figure 20:
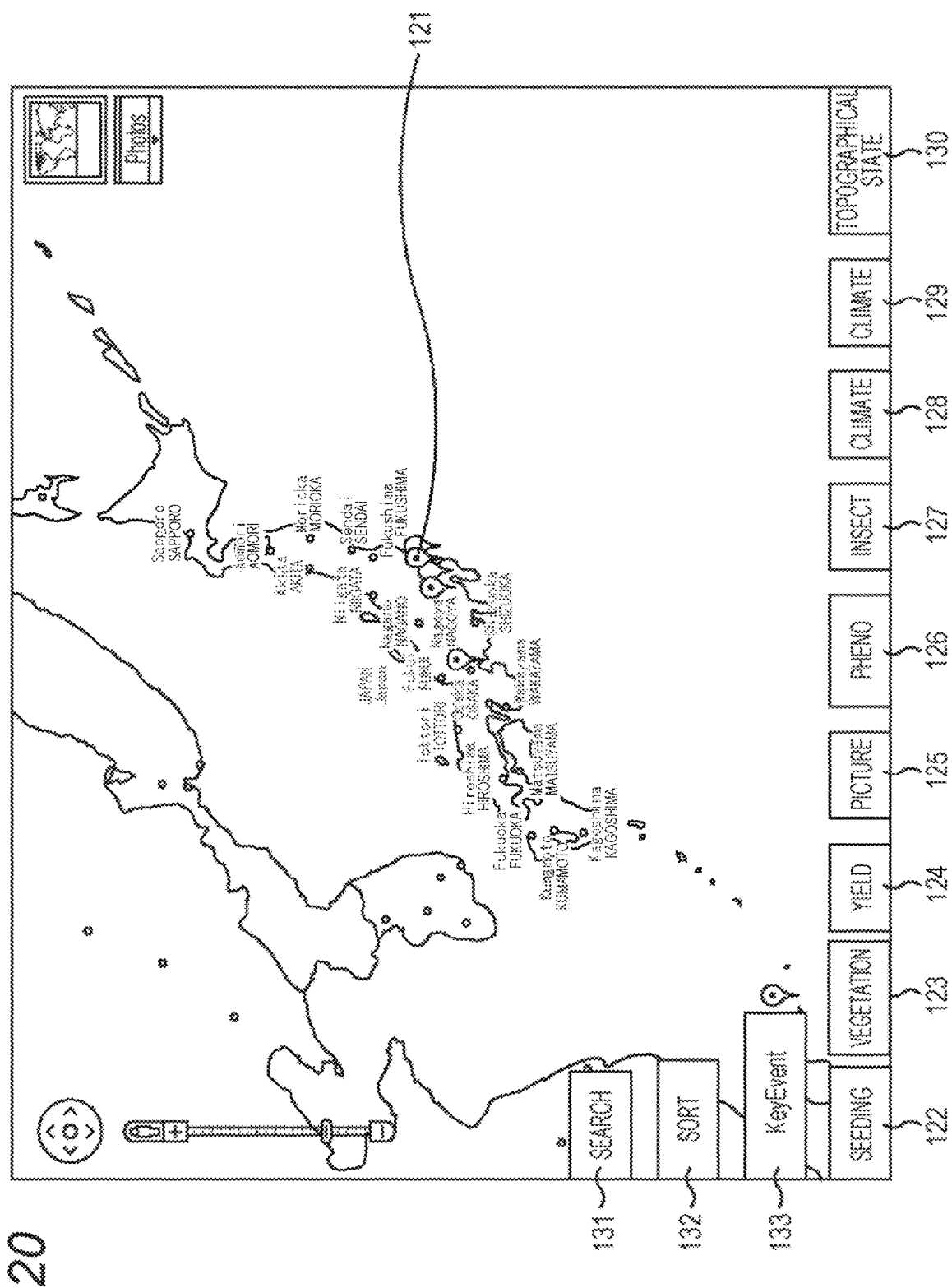
FIG. 20 is a diagram illustrating a display example of a distribution of fields on a map provided on the Synecoculture (registered trademark) page.

FIG. 20 is a diagram illustrating a display example of the distribution of the fields on the map which is provided on the Synecoculture (registered trademark) page.

In this example, the position of the field is represented by a flag 121 on the map of the planet earth. Icons 122 to 129 are respectively operated at the time of being read out corresponding to the seeding DB, the vegetation DB, the yield DB, the picture record DB, the phenology DB, the insect fauna DB, the climatic division DB, and the weather DB. An icon 130 of the topographical state, for example, is operated at the time of selecting the level of the field, such as the field lot or the ridge lot.

An icon 131 is operated at the time of instructing search, an icon 132 is operated at the time of instructing sort, and an icon 133 is operated at the time of instructing a key event.

In a case where the icon 131 of the search is operated, the Synecoculture (registered trademark) CMS 71 of the server 13 searches all phrases or file names. The Synecoculture (registered trademark) CMS 71 also has a synonym search function. With this arrangement, it is possible to perform collective search in different formats of a date. For example, a date of "Apr. 1, 2011" is equated with "20110401", "01042011", "2011/4/1", "1/4/2011", and "April 1, 2011 (written in Chinese characters)". In addition, it is also possible to perform collective search in which Katakana notation/Chinese character notation/Japanese name/scientific name/English name/common name and the like of the species name are equated with each other. For example, "JAGAIMO" is equated with the potato.

In a case where the icon 132 of the sort is operated, the Synecoculture (registered trademark) CMS 71 performs sort for each of all parameters. For example, search results can be sorted for each parameter such as the order of the date or the order of the Japanese alphabet of the species name.

Furthermore, in the icons 122 to 133, only the icons which can be operated on the screen are displayed.

<Processing of Referring to Information of Agricultural Field>

FIG. 21 is a flowchart illustrating a processing example in a case the user refers to the information of the agricultural field (the field).

In step S41, the acquisition unit 51 of the terminal 12 acquires level information of the field. That is, in a case where the user refers to the information associated with the field, the operation unit 34 is operated, and thus, the icon 130 of the topographical state (refer to FIG. 20) is selected. In a case where such an operation is performed, the display unit 35 displays a screen of selecting the level of the field. That is, a level of a list of the fields is displayed. The user operates the operation unit 34, and selects a field which is a reference target, from the screen. In a case where the acquisition unit 51 acquires information of the selection, the communication unit 40 transmits the information of the selection to the server 13.

In step S61, the communication unit 67 of the server 13 receives information of the level of the field which is selected by the terminal 12. In step S62, processing of preparing and outputting a list of the fields of the level selected by the terminal 12 in step S41 is performed. That is, the Synecoculture (registered trademark) CMS 71 searches the coordinate DB, and thus, generates a list of the fields of the level received in step S61, and the communication unit 67 transmits the list to the terminal 12.

In step S42, processing of receiving and displaying the list is performed. That is, the list output from the server 13 is received by the communication unit 40 of the terminal 12, and the display control unit 52 displays the list on the display unit 35.

The user operates the operation unit 34, and selects a field, which is a reference target, from the displayed list. In step S43, the communication unit 40 transmits information of a field selected from the list.

In step S63, the communication unit 67 of the server 13 receives the information of the field selected by the terminal 12.

In step S64, the Synecoculture (registered trademark) CMS 71 searches a DB to which the field received in step S63 is relevant, from the Synecoculture (registered trademark) DB. That is, a DB to which the field of the level designated by the user is relevant, is searched from the Synecoculture (registered trademark) DB. In step S65, processing of outputting a list of the searched DBs of the field is performed. That is, the Synecoculture (registered trademark) CMS 71 prepares a list of relevant DBs on the basis of a search result, and the communication unit 67 outputs the list to the terminal 12.

In step S44, the communication unit 40 of the terminal 12 receives the list of the searched DBs of the field. In step S45, the display control unit 52 displays the list of the DBs of the field, which is received by the communication unit 40, on the display unit 35.

The user operates the operation unit 34, and inputs a reference DB and the coordinates of the field from the displayed list. In step S46, the acquisition unit 51 acquires the input information of the reference DB and the coordinates of the field. In step S47, the communication unit 40 transmits the information acquired in step S46, to the server 13.

In step S66, the communication unit 67 of the server 13 receives the information transmitted by the terminal 12. In step S67, the Synecoculture (registered trademark) CMS 71 reads out information of the field of the designated coordinates of the designated DB, on the basis of the received information. That is, the information of the field of the coordinates input by the user, of the DB received in step S66, is read out. In step S68, the communication unit 67 transmits the read information of the field to the terminal 12.

In step S48, the communication unit 40 of the terminal 12 receives the information of the field read out from the DB, from the server 13. In step S49, the display control unit 52 displays the information of the field received by the communication unit 40 on the display unit 35.

The user operates the operation unit 34 by confirming the information of the field displayed on the display unit 35, and selects a date of reference information. In step S50, the acquisition unit 51 acquires information of selection of the date of the reference information. Then, the information of the selection of the date is transmitted to the server 13 by the communication unit 40.

In step S69, the communication unit 67 of the server 13 receives the information of the selection of the date of the reference information from the terminal 12. In step S70, the Synecoculture (registered trademark) CMS 71 reads out information of the designated date from the Synecoculture (registered trademark) DB, and in step S71, the communication unit 67 transmits the read information of the date to the terminal 12.

In step S51, the communication unit 40 of the terminal 12 receives the read information of the date from the server 13. In step S52, the display control unit 52 displays the information of the date received in step S51 on the display unit 35.

As described above, the Synecoculture (registered trademark) DB planned to be referred to, the coordinates of the field lot or the like, and the date are designated, and thus, it is possible for the user to confirm information of the Synecoculture (registered trademark) DB of each of the coordinates, for example, history information of the previous agricultural field designated by the user or other agricultural fields, which is displayed on the display unit 35.

Furthermore, in the above description, the level of the field is selected by the icon 130 of the topographical state, but it is possible to directly designate a reference field by operating the flag 121.

<Upload Processing of Picture>

Figure 22:
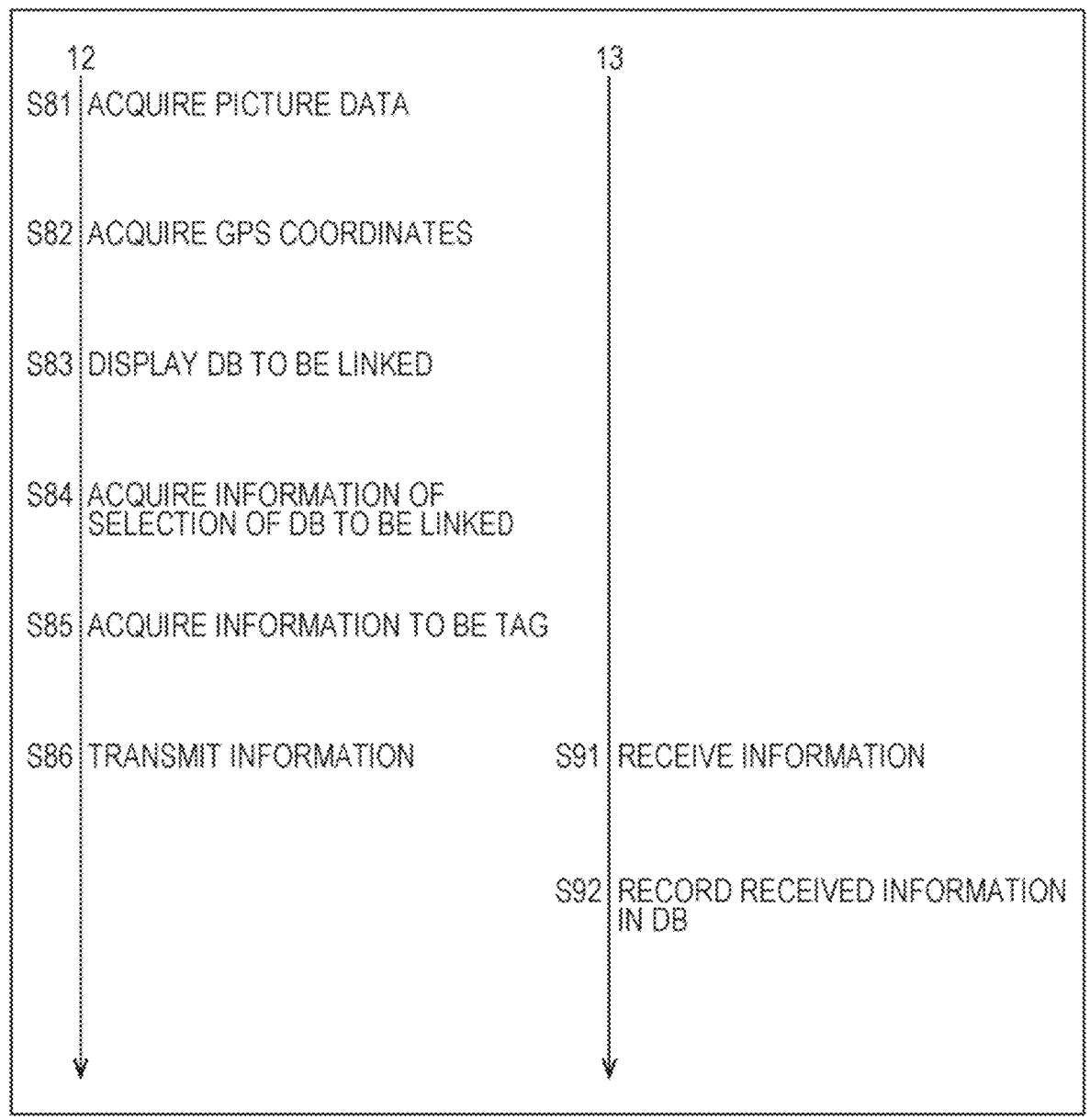
FIG. 22 is a flowchart illustrating a processing example of uploading a picture.

FIG. 22 is a flowchart illustrating a processing example of uploading a picture.

In a case where the user uploads a picture (an image as the picture) from the terminal 12 to the server 13, in step S81, the acquisition unit 51 of the terminal 12 acquires picture data. In a case where the user, for example, finds (observes) a predetermined vegetable organism in the field, and uploads a picture thereof to the server 13, the vegetable organism is captured by the camera 37. In a case where the capturing is performed, the picture data (image data) is acquired by the acquisition unit 51. Obviously, the picture data stored in advance in a memory or the like can also be acquired as the picture data to be uploaded.

In step S82, the position detection unit 39 of the terminal 12 detects the GPS coordinates as the positional information. That is, the coordinates of a subject captured by the terminal 12 are acquired. The coordinates can be a current position of the terminal 12, or can be more accurate coordinates of the subject by calculating a distance and a direction from the current position to the subject, and by correcting the current position. In addition, the user operates the operation unit 34, and thus, the coordinates can be input.

In step S83, the display control unit 52 displays a list of information items of the Synecoculture (registered trademark) DB linked to the picture data, on the display unit 35. In step S84, the acquisition unit 51 acquires information of the selection of the information linked to the picture data. That is, in a case where the user operates the operation unit 34, and thus, the information linked to the picture data is selected from the list displayed on the display unit 35, the information of the selection is acquired by the acquisition unit 51.

Further, the user operates the operation unit 34, and thus, it is possible to input information (mainly character information) which is added to a picture to be uploaded as a comment. For example, in a case where a picture of the Chinese cabbage is captured, the name of "Chinese cabbage" is input as a comment. Furthermore, in the input, it is possible to use not only character input from a keyboard, but also a method of selecting a predetermined section from an input page prepared in advance, for example. In step S85, the acquisition unit 51 acquires information which is the input comment. In step S86, the communication unit 40 transmits the information acquired in steps S81, S82, S84, and S85 to the server 13.

In step S91, the communication unit 67 of the server 13 receives the information which is transmitted from the terminal 12. In step S92, the Synecoculture (registered trademark) CMS 71 registers the information received in step S91 in the Synecoculture (registered trademark) DB. That is, the picture captured by the user is registered in the picture record DB along with the comment, and is linked to the information of the Synecoculture (registered trademark) DB selected by the user.

As described above, it is possible for the user to upload the predetermined picture and the comment to the server 13 from the terminal 12. It is possible for the user to refer to the uploaded information later, according to the processing of FIG. 21 described above.

Furthermore, even in the case of uploading various information items other than the picture, the similar processing is performed. For example, in a case where 1 Kg of the Chinese cabbage is harvested from a predetermined ridge, "1 Kg of Chinese cabbage" is input as information to be uploaded. Then, for example, the information of "1 Kg of Chinese cabbage" is recorded in the yield DB by being linked to the coordinates of the predetermined ridge.

<Registration of Key Event>

FIG. 23 is a flowchart illustrating a processing example of registering a key event.

The user is capable of registering an arbitrary event in the meta DB of the Synecoculture (registered trademark) DB as a key event. An event which is assumed as important on the management of Synecoculture (registered trademark) can be adopted as the key event, and the key event is defined by a linkage between name recording with a natural language and corresponding items of each DB of the Synecoculture (registered trademark) DB.

When the key event is registered, the user operates the operation unit 34, and selects the icon 133 of the key event (refer to FIG. 20). At this time, in step S101, the acquisition unit 51 receives the selection of the icon 133 of the key event. In step S102, the acquisition unit 51 acquires the picture data and the date. That is, for example, in a case where the user captures a vegetable organism or the like as an event planned to be recorded as the key event with the camera 37, and inputs the data by operating the operation unit 34, the information is acquired by the acquisition unit 51.

In step S103, the position detection unit 39 acquires the GPS coordinates as the positional information. That is, the coordinates corresponding to the captured picture (the GPS coordinates of the vegetable organism or the like which is seen on the picture as an event) are acquired.

In step S104, the acquisition unit 51 acquires an input character. That is, in a case where the user inputs the character information as the key event by operating the operation unit 34, the input character is acquired. For example, when the user finds the Chinese cabbage which is subjected to rosette formation, the picture of the Chinese cabbage can be captured, and a character of "rosette formation of Chinese cabbage" can be input as the key event.

In step S105, the communication unit 40 transmits the information acquired in steps S102 to S104 to the server 13.

In step S121, the communication unit 67 of the server 13 receives the information which is transmitted from the terminal 12. In step S122, the Synecoculture (registered trademark) CMS 71 records the information which is received in the communication unit 67, in the meta DB. That is, the information which is acquired by the terminal 12 in steps S102 to S104, is recorded (registered) in the meta DB as the key event DB.

In step S106, the acquisition unit 51 of the terminal 12 acquires the level of the field. That is, in a case where the key event is recorded, the user operates the operation unit 34, and selects the icon 130 of the topographical state (FIG. 20). In a case where such an operation is performed, the display unit 35 displays a screen of selecting the level of the field. The user operates the operation unit 34, and selects the level of the field, which is a reference target, from the screen. The acquisition unit 51 acquires information of the selection, and the communication unit 40 transmits the information of the selection to the server 13.

In step S123, the communication unit 67 of the server 13 receives the information of the level of the field selected by the terminal 12. In step S124, processing of preparing and outputting a list of the fields of the level selected by the terminal 12 in step S106 is performed. That is, the Synecoculture (registered trademark) CMS 71 searches the coordinate DB, and thus, generates the list of the fields of the level received in step S123, and the communication unit 67 transmits the list to the terminal 12.

In step S107, processing of receiving and displaying the list is performed. That is, the list output from the server 13 is received by the communication unit 40 of the terminal 12, and the display control unit 52 displays the list on the display unit 35.

The user operates the operation unit 34, and selects a field, which is a recording target, from the displayed list. In step S108, the communication unit 40 transmits information of the field selected from the list to the server 13.

In step S125, the communication unit 67 of the server 13 receives the information of the field selected by the terminal 12.

In step S126, the Synecoculture (registered trademark) CMS 71 searches a DB in which the information of the field received in the step S125 is registered, from the Synecoculture (registered trademark) DB. That is, a DB to which the field of the level designated by the user is relevant is searched from the Synecoculture (registered trademark) DB. In step S127, processing of outputting a list of the searched DBs is performed. That is, the Synecoculture (registered trademark) CMS 71 prepares a list of DBs to which the field of the level designated by the user is relevant, on the basis of a search result, and the communication unit 67 transmits the list to the terminal 12.

In step S109, the communication unit 40 of the terminal 12 receives the list of the DBs from the server 13. In step S110, the display control unit 52 displays the list of the DBs from the server 13 on the display unit 35.

The user operates the operation unit 34, and inputs the DB linked to the key event and the coordinates of the field with reference to the displayed list. In step S111, the acquisition unit 51 acquires information of the input DB linked to the key event and the input coordinates of the field. In step S112, the communication unit 40 transmits the information acquired in step S111 to the server 13.

In step S128, the communication unit 67 of the server 13 receives the information which is transmitted by the terminal 12. In step S129, the Synecoculture (registered trademark) CMS 71 reads out information of the field of the designated coordinates from the designated DB in the Synecoculture (registered trademark) DB. That is, from the DB input by the user, the information of the field of the coordinates input by the user in the same way is read out. In step S130, the communication unit 67 transmits the read information of the field to the terminal 12.

In step S113, the communication unit 40 of the terminal 12 receives the read information of the field. The information is displayed on the display unit 35. The user confirms that the field designated (input) by the user is the field linked to the key event by confirming the display. After the confirmation is performed, the user operates the operation unit 34, and instructs the information of the field designated by the user in the DB designated (input) by the user to be linked to the key event. In step S114, the communication unit 40 transmits a command for a linkage to the server 13 on the basis of the instruction.

In step S131, the communication unit 67 of the server 13 receives the command for a linkage which is transmitted from the terminal 12. In step S132, the Synecoculture (registered trademark) CMS 71 links a newly recorded key event to the information of the designated field. That is, the key event newly recorded in the meta DB in step S122 is linked to the information of the field designated by the user in step S111.

As described above, the key event is linked to the information of the field, and then, the user operates the operation unit 34 of the terminal 12, and thus, it is possible to refer to the information of the field which is linked to the key event from the key event, or to access the key event which is linked to the information of the field from the information of the field.

Hereinafter, an event as a specific example of the key event will be described in the order of a key event name, recording with a free language, and an associated DB, which is a DB where the information of the field liked to the key event, is registered.

Key Event Name: Recording Windbreak Effect

Recording with Free Language: The growth of the vegetable increases in a location surrounded by a structure blocking wind, such as a fence, even in the same land condition.

Associated DB: Coordinate DB, Yield DB, Management record DB, Vegetation DB, and Phenology DB Key Event Name: Decrease in soil formation and a budbreak rate of the lettuce Recording with Free Language: The lettuce is easily subjected to budbreak in a cultivated land, but in a case where a soil structure is formed by continuing non-tillage, it is difficult to cause the budbreak.

Associated DB: Seeding DB, Management Record DB, Vegetation DB, and Phenology DB Key Event Name: Competitive Growth Recording with Free Language: Even in a case where the nutritive substances in the soil are the same, the vegetable more largely grows by competing with other vegetation.

Associated DB: Vegetation DB, Phenology DB, and Yield DB

Furthermore, a specific example of the competitive growth includes an example of the carrot which has largely grown by competing with the black nightshade, an example in which the budbreak rate is not excellent, but the growth of each vegetable increases, in a ridge where the summer grass is not mowed, and the like.

Key Event Name: Rosette Formation

Recording with Free Language: The vegetable is changed into the form which flatly crawls the land surface according to the vegetable seeds at the wintertime, and thus, even in a case where it is cold, survives to the spring in the form without withering. In such a form, the harvest can be performed.

Associated DB: Vegetation DB, Phenology DB, Yield DB, and Weather DB

Key Event Name: Autumn Leaves

Recording with Free Language: There is a case where the vegetable such as the carrot or the cabbage changes the color at the wintertime. Even in a case where the color is changed, the harvest can be performed.

Associated DB: Vegetation DB, Phenology DB, Yield DB, and Weather DB

Key Event Name: Late Spring Frost

Recording with Free Language: In a case where the temperature of the land surface is lower than or equal to 4° C. immediately after the budbreak of the spring, the cotyledon is completely destroyed due to the late spring frost, and thus, it is necessary to respond to the full-over seeding or the settled planting of the saplings.

Associated DB: Seeding DB, Management Record DB, Vegetation DB, Phenology DB, and Weather DB <Relationship Graph>

Figure 24:
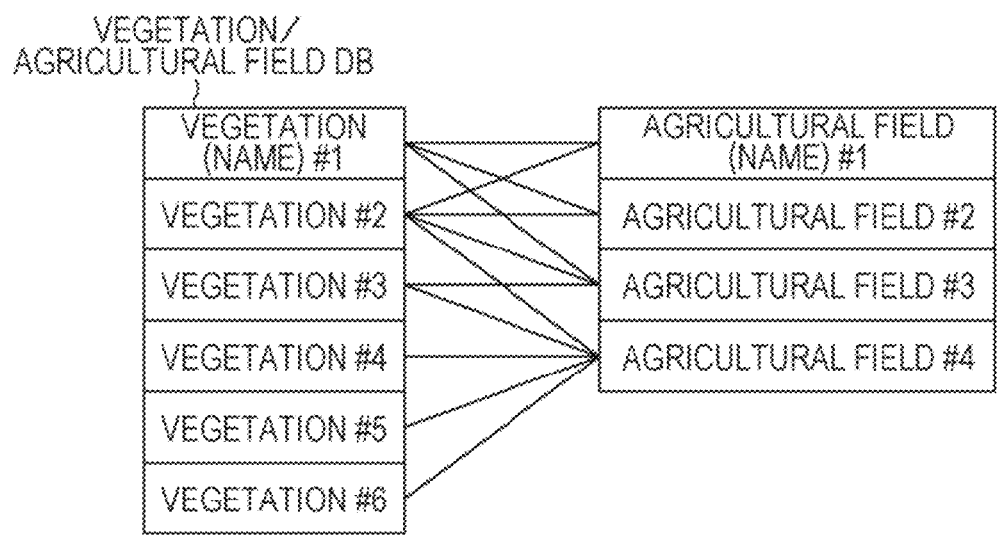
FIG. 24 is a diagram illustrating a relationship graph generated by a graph display control unit 72 of the server 13 (or an acquisition unit 51 of the terminal 12).

FIG. 24 is a diagram illustrating a relationship graph generated by the graph display control unit 72 of the server 13 (or the acquisition unit 51 of the terminal 12).

In the arbitrary DB, in a case where information i1 of a certain category (aggregation) is associated with information i2 of other categories, it is possible to generate a relationship graph, which is a graph (a network relationship diagram) indicating a relationship between the information i1 items by using the information i2 as a scale (a rule).

Here, in a DB in which the information i1 and the information i2 are associated with each other, contrary to the case described above, it is also possible to generate a relationship graph indicating a relationship between the information i2 items by using the information i1 as a scale.

In addition, in order to generate the relationship graph, it is also possible to use a DB in which the information i1 and the information i2 are implicitly associated with each other, in addition to the DB in which the information i1 and the information i2 are explicitly associated with each other.

Here, for example, in a case where the information i1 is the observed vegetation (a vegetation name of the observed vegetation), and the information i2 is an agricultural field in which the vegetation is observed (an agricultural field name of the agricultural field), the DB in which the information i1 and the information i2 are explicitly associated with each other, is a DB in which the vegetation and the agricultural field where the vegetation is observed are associated with each other and registered.

In addition, the DB in which the information i1 and the information i2 are implicitly associated with each other, for example, is a DB in which a natural language of "vegetation #1 is observed in an agricultural field #1" is registered.

The graph display control unit 72, for example, generates a bipartite graph, as a multi-partite graph, from the DB in which the information i1 and the information i2 are associated with each other, and generates the relationship graph from the bipartite graph.

FIG. 24 is a diagram illustrating an example of the bipartite graph generated from the DB.

In FIG. 24, a vegetation/agricultural field DB in which the vegetation and the agricultural field where the vegetation is observed are associated with each other, is adopted as the DB.

The bipartite graph of FIG. 24 indicates that the vegetation #1 is observed in agricultural fields #1 to #4, vegetation #2 is observed in the agricultural fields #1 to #4, vegetation #3 is observed in the agricultural fields #3 and #4, and each of vegetation #4 to vegetation #6 is observed in the agricultural field #4.

In order to generate the relationship graph from the bipartite graph as described above, the relationship score indicating a relationship (the intensity of the relationship) between the vegetation #i and vegetation #j is obtained (i≠j) by using an agricultural field #k as a scale.

FIG. 25 is a diagram illustrating an example of the relationship score which is obtained from the bipartite graph of the vegetation/agricultural field DB of FIG. 24.

A value corresponding to the number of agricultural fields associated with both of the vegetation #i and the vegetation #j, that is, the number of agricultural fields in which both of the vegetation #i and the vegetation #j are observed (for example, a proportional value) can be adopted as the relationship score between the vegetation #i and the other vegetation #j.

In FIG. 25, a value obtained by dividing the number of agricultural fields in which both of the vegetation #i and the vegetation #j are observed, by the total number of agricultural fields (here, 4), is adopted as the relationship score between the vegetation #i and the other vegetation #j.

According to the bipartite graph of FIG. 24, for example, as illustrated on the upper side of FIG. 25, in the vegetation #1, the number of agricultural fields observed along with the vegetation #2 is three of the agricultural fields #1 to #3, the number of agricultural fields observed along with the vegetation #3 is one of the agricultural field #3, and the number of agricultural fields observed along with the vegetation #4 to vegetation #6 is 0.

Therefore, in the vegetation #1, the relationship score with respect to the vegetation #2 is 3/4, and the relationship score with respect to the vegetation #3 is 1/4. Further, in the vegetation #1, all of the relationship scores with respect to each of the vegetation #4 to vegetation #6, is 0.

Similarly, for example, as illustrated on the lower side of FIG. 25, in the vegetation #3 of FIG. 24, the relationship score with respect to the vegetation #1 is 1/4, and the relationship score with respect to the vegetation #2 is 2/4 (=1/2). Further, in the vegetation #3, all of the relationship scores with respect to each of the vegetation #4 to vegetation #6 is 1/4.

The graph display control unit 72 obtains the relationship score from the bipartite graph, generates the relationship graph by using the relationship score, and generates a graph display screen on which the relationship graph is displayed.

FIG. 26 is a diagram illustrating an example of the graph display screen on which the bipartite graph of FIG. 24 and the relationship graph generated by using the relationship score of FIG. 25 are displayed.

The relationship graph is configured of a node represented by a circle in the drawing, and a linkage represented by a line segment connecting the nodes together.

In FIG. 26, the node corresponds to the vegetation, and the linkage indicates a relationship between the nodes, that is, here, a relationship between types of vegetation.

The relationship graph of FIG. 26 indicates a relationship with respect to the vegetation #1 represented by the node of interest and each of the other vegetation #2 to #6, by using a node of the vegetation #1 (a node corresponding to the vegetation #1) as the node of interest.

In the graph display screen, the relationship graph, for example, the node of interest, that is, here, the node of the vegetation #1 is disposed to be positioned (approximately) in the center of the screen.

In addition, in the relationship graph, a length of a linkage between the node of the vegetation #1, which is the node of interest, and the nodes of the other vegetation #2 to #6, is a length corresponding to the relationship score between the vegetation #1 and each of the vegetation #2 to #6 as illustrated in FIG. 25.

That is, the length of the linkage between the node of the vegetation #1, which is the node of interest, and the node of the other vegetation #j, decreases as the relationship score between the vegetation #1 and the vegetation #j increases, that is, the relationship between the vegetation #1 and the vegetation #j becomes stronger.

In such a case, the relationship between the vegetation #1 and the vegetation #j being strong corresponds to an increase in the number of agricultural fields in which both of the vegetation #1 and the vegetation #j are observed.

Therefore, the vegetation #j represented by a node in a position close to the node of the vegetation #1, which is the node of interest, can be assumed to have a symbiotic relationship with respect to the vegetation #1, and the user who observes the relationship graph of FIG. 26, is capable of easily recognizing (predicting) (assuming) the vegetation suitable for constructing the mixed dense state along with the vegetation #1.

As a result thereof, according to the relationship graph of FIG. 26, it is possible to assist the vegetation design as one type of assistance of the ecosystem utilization.

In FIG. 26, the node of the vegetation #1 is set to the node of interest, but in the graph display screen, an arbitrary node can be selected as the node of interest.

That is, in the terminal 12, in a case where the graph display screen is displayed on the display unit 35, the user operates the operation unit 34, for example, and a node of the vegetation #3 is selected, the display control unit 52 displays a graph display screen on which a relationship graph where the node of the vegetation #3 is set to the node of interest is displayed.

FIG. 27 is a diagram illustrating an example of the graph display screen on which the relationship graph where the node of the vegetation #3 is set to the node of interest is displayed.

In the graph display screen of FIG. 27, the relationship graph is disposed such that the node of the vegetation #3, which is the node of interest, is positioned in the center of the screen.

In addition, in the relationship graph, the length of a linkage between the node of the vegetation #3, which is the node of interest, and nodes of the other vegetation #1, #2, and #4 to #6, is a length corresponding to the relationship score between the vegetation #3 and each of the vegetation #1, #2, and #4 to #6, as illustrated in FIG. 25.

In the relationship graph indicating the relationship between the information i1 items using the information i2 as a scale, it is also possible to indicate a relationship between the information i1 and the information i2 associated with the information i1, in addition to the relationship between the information i1 items.

That is, for example, in the relationship graph generated from the vegetation/agricultural field DB illustrated in FIG. 24, it is possible to indicate a relationship between the vegetation and the agricultural field associated with the vegetation, in addition to the relationship between types of vegetation.

FIG. 28 is a diagram illustrating an example of a graph display screen on which the relationship graph indicating the relationship between the vegetation and the agricultural field associated with the vegetation in addition to the relationship between types of vegetation is displayed.

In the relationship graph of FIG. 28, a node of the agricultural field associated with the vegetation (in the drawing, a portion represented by a triangle) and a linkage indicating the relationship between the vegetation and the agricultural field (in the drawing, a portion represented by a dotted line) are added to the relationship graph of FIG. 26.

That is, in the relationship graph of FIG. 28, nodes of each of the agricultural fields #1 to #3 where the vegetation #1 indicated by the node of interest is observed, and a linkage connecting each of the nodes and the node of the vegetation #1, which is the node of interest are added to the relationship graph of FIG. 26.

According to the relationship graph of FIG. 28, as with the case of FIG. 26, the user is capable of easily recognizing the vegetation suitable for constructing the mixed dense state along with the vegetation #1, and of easily recognizing the agricultural field in which vegetation #1 is observed.

In this case, the user is capable of assuming an environment in which the vegetation #1 is observed by accessing the Synecoculture (registered trademark) DB to investigate the environment of the agricultural field in which the vegetation #1 is observed.

Here, in a case where the relationship graph indicates a node of information of different categories, such as the vegetation and the agricultural field, the node can be displayed such that the node of the vegetation and the node of the agricultural field can be distinguished from each other.

That is, the node of the vegetation and the node of the agricultural field, for example, can be displayed by adopting different colors, different sizes, different shapes, different patterns, and the like.

As illustrated in FIG. 28, in the graph display screen on which the relationship graph indicating the relationship between the vegetation and the agricultural field associated with the vegetation in addition to the relationship between types of vegetation is displayed, as illustrated in FIG. 27, it is possible to select the node of the vegetation, and to select the node of the agricultural field, as the node of interest.

That is, in the terminal 12, in a case where the graph display screen of FIG. 28 is displayed on the display unit 35, and the user operates the operation unit 34, and selects the node of the agricultural field, the display control unit 52 displays the graph display screen on which the relationship graph indicating the node of the agricultural field selected by the user is set to the node of interest is displayed.

The relationship graph in which the node of the agricultural field is set to the node of interest indicates a relationship between the agricultural fields by using the vegetation associated with the agricultural field in the vegetation/agricultural field DB as a scale. For this reason, the graph display screen displaying the relationship graph in which the node of the agricultural field is set to the node of interest is displayed, a relationship score indicating a relationship between an agricultural field #i and an agricultural field #j is obtained by using vegetation #k as a scale (i≠j).

FIG. 29 is a diagram illustrating an example of the relationship score obtained from the bipartite graph of FIG. 24.

Furthermore, FIG. 25 illustrates a relationship score between types of vegetation, and FIG. 29 illustrates a relationship score between the agricultural fields.

A value corresponding to the number of types of vegetation associated with both of the agricultural field #i and the agricultural field #j, that is, the number of types of vegetation observed in both of the agricultural field #i and the agricultural field #j (for example, a proportional value) can be adopted as a relationship score between the agricultural field #i and the other agricultural field #j.

In FIG. 29, a value obtained by dividing the number of types of vegetation observed in both of the agricultural field #i and the agricultural field #j by the total number of types of vegetation (here, 6) can be adopted as the relationship score between the agricultural field #i and the other agricultural field #j.

According to the bipartite graph of FIG. 24, for example, in the agricultural field #1, as illustrated in the upper side of FIG. 29, the number of types of vegetation observed in both of the agricultural field #1 and the agricultural field #2 is two of the vegetation #1 and the vegetation #2, the number of types of vegetation observed in both of the agricultural field #1 and the agricultural field #3 is one of the vegetation #1, and the number of types of vegetation observed in both of the agricultural field #1 and the agricultural field #4 is 0.

Therefore, in the agricultural field #1, a relationship score with respect to the agricultural field #2 is 2/6 (=1/3), and a relationship score with respect to the agricultural field #3 is 1/6. Further, in the agricultural field #1, a relationship score with respect to the agricultural field #4 is 0.

Similarly, for example, in the agricultural field #3 of FIG. 24, as illustrated in the lower side of FIG. 29, all of relationship scores with respect to each of the agricultural fields #1, #2, and #4 are 2/6.

The graph display control unit 72 obtains the relationship score from the bipartite graph, generates the relationship graph by using the relationship score, and generates a graph display screen on which the relationship graph is displayed.

FIG. 30 is a diagram illustrating an example of the graph display screen on which the relationship graph generated by using the relationship score of FIG. 29 is displayed.

That is, FIG. 30 illustrates an example of the graph display screen of the relationship graph which is displayed in a case where the user selects the node of the agricultural field #1 as the node of interest, for example, in the relationship graph of FIG. 28.

In the relationship graph of FIG. 30, a relationship between the agricultural field #1 indicated by the node of interest and each of the other agricultural fields #2 to #4 is indicated by using the node of the agricultural field #1 as the node of interest.

In the graph display screen, as illustrated in FIG. 26, the relationship graph is disposed such that the node of the agricultural field #1, which is the node of interest, is positioned in the center of the screen.

In addition, in the relationship graph of FIG. 30, the length of a linkage between the node of the agricultural field #1, which is the node of interest, and nodes of each of the other agricultural fields #2 to #4 is a length corresponding to the relationship score between the agricultural field #1 and each of the agricultural fields #2 to #4, as illustrated in FIG. 29.

That is, the length of a linkage between the node of the agricultural field #1, which is the node of interest, and the node of the other agricultural field #j decreases as the relationship score between the agricultural field #1 and the agricultural field #j increases, that is, as the relationship between agricultural field #1 and the agricultural field #j becomes stronger.

In such a case, the relationship between the agricultural field #1 and the agricultural field #j being strong corresponds to an increase in the number of types of vegetation observed in both of the agricultural field #1 and the agricultural field #j.

Therefore, it is possible to assume that the agricultural field #1 indicated by the node of interest, and the agricultural field #j indicated by a node in a position close to the node of interest are an agricultural field in an environment which is common to the environment suitable for the vegetation observed in both of the agricultural field #1 and the agricultural field #j in many entries.

As a result thereof, from the relationship graph of FIG. 30, for example, the user investigates the environment common to the agricultural field #1 and the agricultural field #j by accessing the Synecoculture (registered trademark) DB, and thus, is capable of assuming the environment suitable for the vegetation observed in both of the agricultural field #1 and the agricultural field #j.

Furthermore, in the relationship graph of FIG. 30, the nodes of the vegetation #1 and the vegetation #2 observed in the agricultural field #1 are displayed to be linked to the agricultural field #1 indicated by the node of interest, in addition to the relationship between the agricultural fields.

The user is capable of selecting an arbitrary node as the node of interest by operating the operation unit 34.

Here, in the relationship graph of FIG. 30, for example, in a case where the node of the agricultural field #3 is selected as the node of interest, the display control unit 52 displays a graph display screen on which a relationship graph where the node of the agricultural field #3 is set to the node of interest is displayed.

Figure 31:
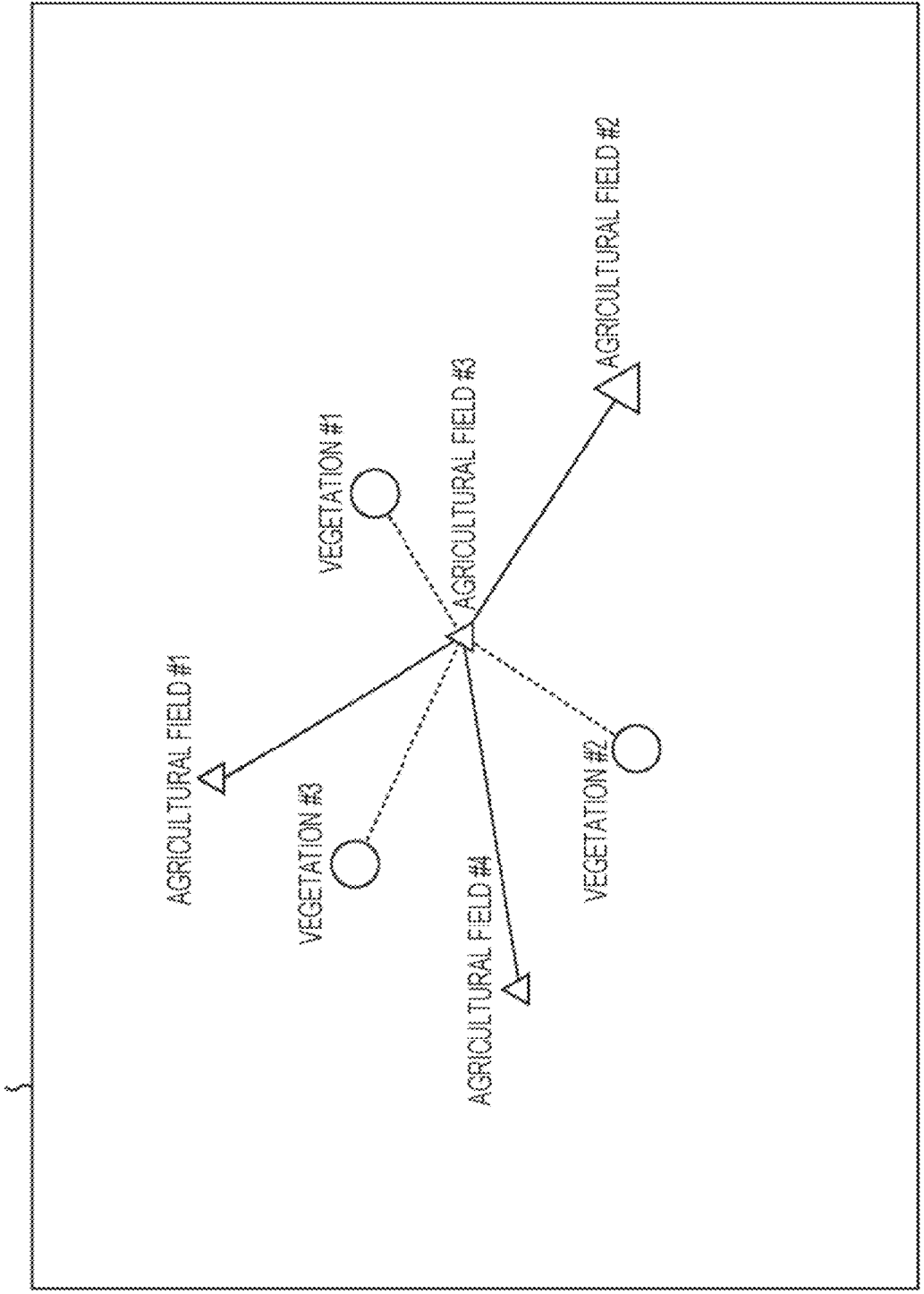
FIG. 31 is a diagram illustrating an example of a graph display screen on which a relationship graph using a node of an agricultural field #3 as a node of interest is displayed.

FIG. 31 is a diagram illustrating an example of the graph display screen on which the relationship graph where the node of the agricultural field #3 is set to the node of interest.

In the graph display screen of FIG. 31, the relationship graph is disposed such that the node of the agricultural field #3, which is the node of interest, is positioned in the center of the screen.

In addition, in the relationship graph, the length of the linkage between the node of the agricultural field #3, which is the node of interest, and the nodes of the other agricultural fields #1, #2, and #4 is a length corresponding to a relationship score between the agricultural field #3 and each of the agricultural fields #1, #2, and #4, as illustrated in FIG. 29.

Furthermore, in the relationship graph of FIG. 31, as with FIG. 30, nodes of vegetation #1 to #3 observed in the agricultural field #3 are also displayed to be linked to the agricultural field #3 indicated by the node of interest, in addition to the relationship between the agricultural fields.

In the relationship graph of FIG. 31, for example, in a case where the node of the vegetation #1 is newly selected as the node of interest, the relationship graph is as illustrated in FIG. 28 described above.

According to the relationship graph as described above, the user, for example, refers to the relationship graph of FIG. 28, and thus, it is possible to easily recognize the other vegetation symbiotic with the vegetation #1 indicated by the node of interest, and to easily recognize the agricultural field in which the vegetation #1 indicated by the node of interest is observed.

In addition, in the relationship graph of FIG. 28, in a case where a node of vegetation other than the vegetation #1 is newly selected as the user node of interest, as illustrated in FIG. 26 and FIG. 27, a relationship graph is displayed in which the newly selected node is set to the node of interest, and thus, it is possible for the user to easily recognize the other vegetation symbiotic with the vegetation indicated by the node which is newly set to the node of interest.

Further, in the relationship graph of FIG. 28, in a case where user selects the node of the agricultural field as the node of interest, as illustrated in FIG. 30, the relationship between the agricultural fields, and the relationship graph indicating the vegetation in which the agricultural field indicated by the node of interest is observed are displayed, and thus, it is possible for the user to easily recognize an agricultural field in which many types of vegetation similar to that observed in the agricultural field indicated by the node of interest are observed, and the vegetation observed in the agricultural field indicated by the node of interest.

Figures 32, 33:
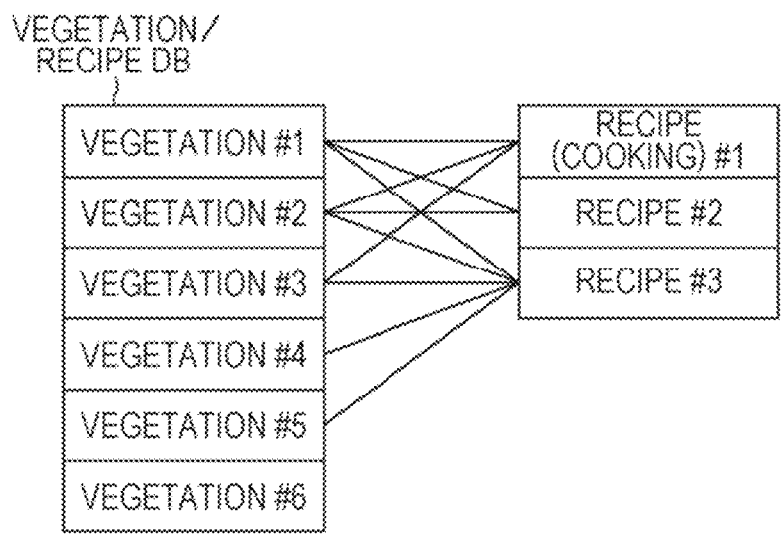
FIG. 32 is a diagram illustrating an example of a bipartite graph generated from a vegetation/recipe DB.
FIG. 33 is a diagram illustrating an example of the relationship score.

FIG. 32 is a diagram illustrating an example of the bipartite graph generated from the vegetation/recipe DB.

Here, the vegetation/recipe DB is a DB in which the vegetation is associated with a cooking recipe using the vegetation as a material.

The bipartite graph of FIG. 32 indicates that the vegetation #1 is observed in recipes #1 to #3 (is a material), the vegetation #2 is observed in the recipes #1 to #3, the vegetation #3 is observed in the recipes #1 and #3, each of the vegetation #4 and #5 is observed in the recipe #3, and the vegetation #6 is observed in all of the recipes #1 to #3.

From the bipartite graph as described above, in order to generate the relationship graph, for example, a relationship score indicating a relationship with respect to the vegetation #i and #j (the intensity of the relationship) is obtained by using a recipe #k as a scale (i≠j).

FIG. 33 is a diagram illustrating an example of a relationship score from the bipartite graph of the vegetation/recipe DB of FIG. 32.

A value corresponding to the number of recipes associated with both of the vegetation #i and the vegetation #j, that is, the number of recipes in which both of the vegetation #i and the vegetation #j are observed can be adopted as the relationship score between the vegetation #i and the other vegetation #j.

In FIG. 33, a value obtained by dividing the number of the recipes in which both of the vegetation #i and the vegetation #j are observed by the total number of recipes (here, 3) can be adopted as the relationship score between the vegetation #i and the other vegetation #j.

According to the bipartite graph of FIG. 32, for example, in the vegetation #1, the number of recipes observed along with the vegetation #2 is two of the recipes #1 and #2, the number of recipes observed along with the vegetation #3 is two of the recipes #1 and #3, the number of recipes observed along with the vegetation #4 is one of the recipe #3, the number of recipes observed along with the vegetation #5 is one of the recipe #3, and the number of recipes observed along with the recipe #6 is 0.

Therefore, in the vegetation #1, a relationship score respect to each of the vegetation #2 and vegetation #3 is 2/3, and a relationship score respect to each of the vegetation #4 and vegetation #5 is 1/3. Further, in the vegetation #1, a relationship score with respect to the vegetation #6 is 0.

The graph display control unit 72 obtains the relationship score from the bipartite graph, generates a relationship graph by using the relationship score, and generates a graph display screen on which the relationship graph is displayed.

Figure 34:
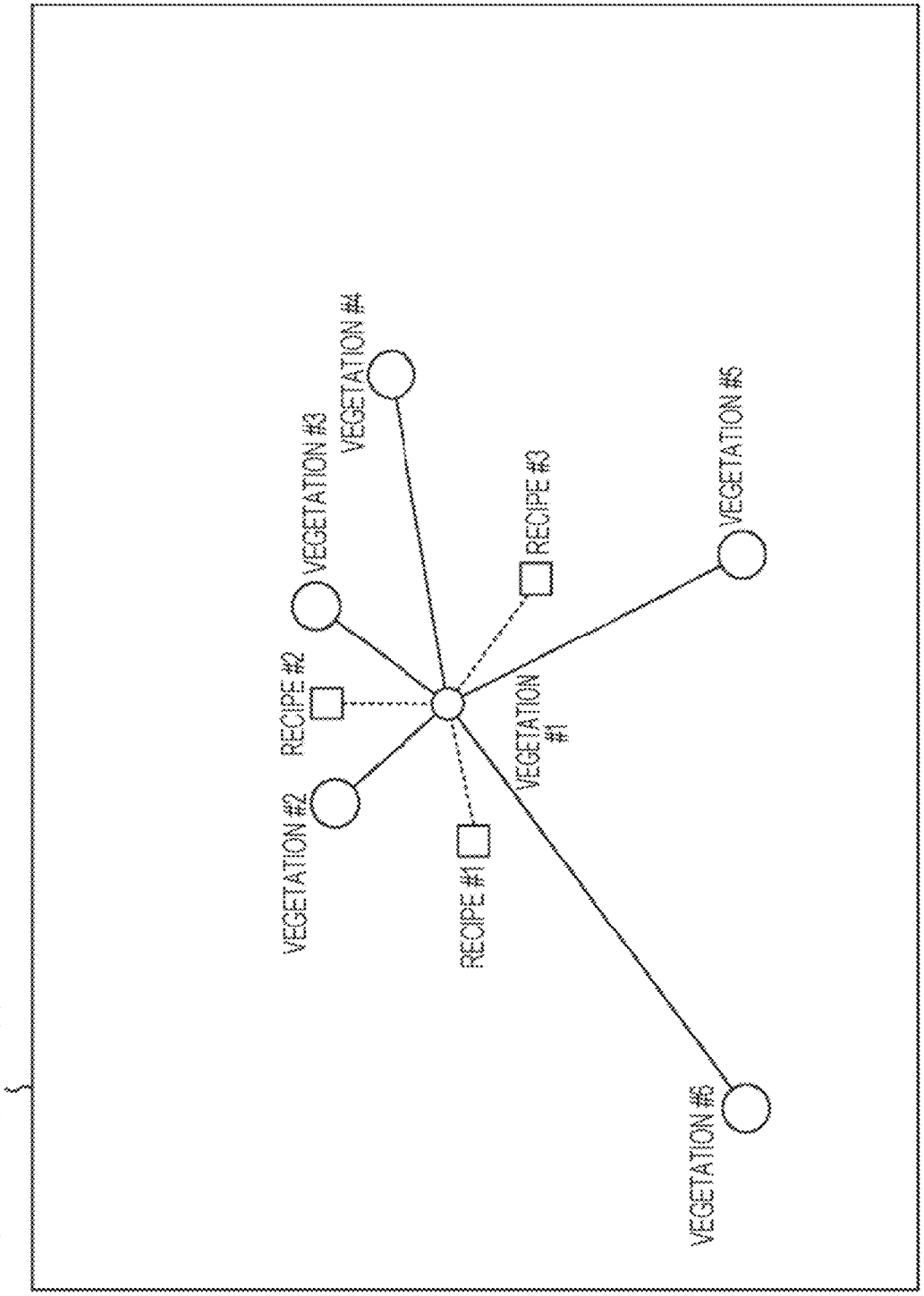
FIG. 34 is a diagram illustrating an example of the graph display screen.

FIG. 34 is a diagram illustrating an example of a graph display screen in which the bipartite graph of FIG. 32 and the relationship graph generated by using the relationship score of FIG. 33 are displayed.

The relationship graph of FIG. 34 indicates a relationship between the vegetation #1 indicated by the node of interest and each of the other vegetation #2 to #6 by using the node of the vegetation #1 as the node of interest.

As with FIG. 28, the relationship graph of FIG. 34 indicates a relationship between the vegetation and the recipe associated with the vegetation, in addition to the relationship between types of vegetation.

Further, in the relationship graph of FIG. 34, as with the relationship graph obtained from the bipartite graph of the vegetation/agricultural field DB as described above, the length of a linkage between the node of the vegetation #1, which is the node of interest, and the nodes of the other vegetation #2 to #6 is a length corresponding to a relationship score between the vegetation #1 and each of the vegetation #2 to vegetation #6, illustrated in FIG. 33.

That is, the length of a linkage between the node of the vegetation #1, which is node of interest, and the node of the other vegetation #j decreases as the relationship score between the vegetation #1 and the vegetation #j increases, that is, as the relationship between the vegetation #1 and the vegetation #j becomes stronger.

In such a case, the relationship between the vegetation #1 and the vegetation #j being strong corresponds to an increase in the number of recipes in which both of the vegetation #1 and the vegetation #j are observed.

Therefore, the vegetation #j indicated by the node in a position close to the node of the vegetation #1, which is the node of interest, can be assumed to be generally used for cooking along with the vegetation #1, and it is possible for the user observing the relationship graph of FIG. 34 to easily recognize the vegetation which is generally used for cooking along with the vegetation #1.

Furthermore, for example, the tomato and the basil are generally used for cooking together, but there is a case where such vegetation which is generally used for cooking together is in a symbiotic relationship.

Even in the relationship graph of FIG. 34, the user is capable of operating the operation unit 34, of selecting a node of vegetation other than the vegetation #1 as the node of interest, and of displaying a relationship graph in which the selected node of the vegetation is set to the node of interest.

In addition, the user is capable of selecting a node of a recipe as the node of interest, and of displaying a relationship graph in which the selected node of the recipe is set to the node of interest.

In this case, a recipe indicated by a node in a position close to the node of the recipe which is the node of interest indicates that the number of types of vegetation used along with the recipe indicated by the node of interest increases.

The relationship graph can be generated from the vegetation/agricultural field DB or the vegetation/recipe DB (a bipartite graph of the vegetation/recipe DB) described above, and can be generated from a DB in which the vegetation is associated with other arbitrary information items.

In addition, the relationship graph can be generated from a DB in which (creation) species other than the vegetation are associated with other information items other than the species.

Further, the relationship graph can be generated from one DB of the vegetation/agricultural field DB, the vegetation/recipe DB, and the like, and can be generated from a plurality of DBs such as a first DB and a second DB.

Figure 35:
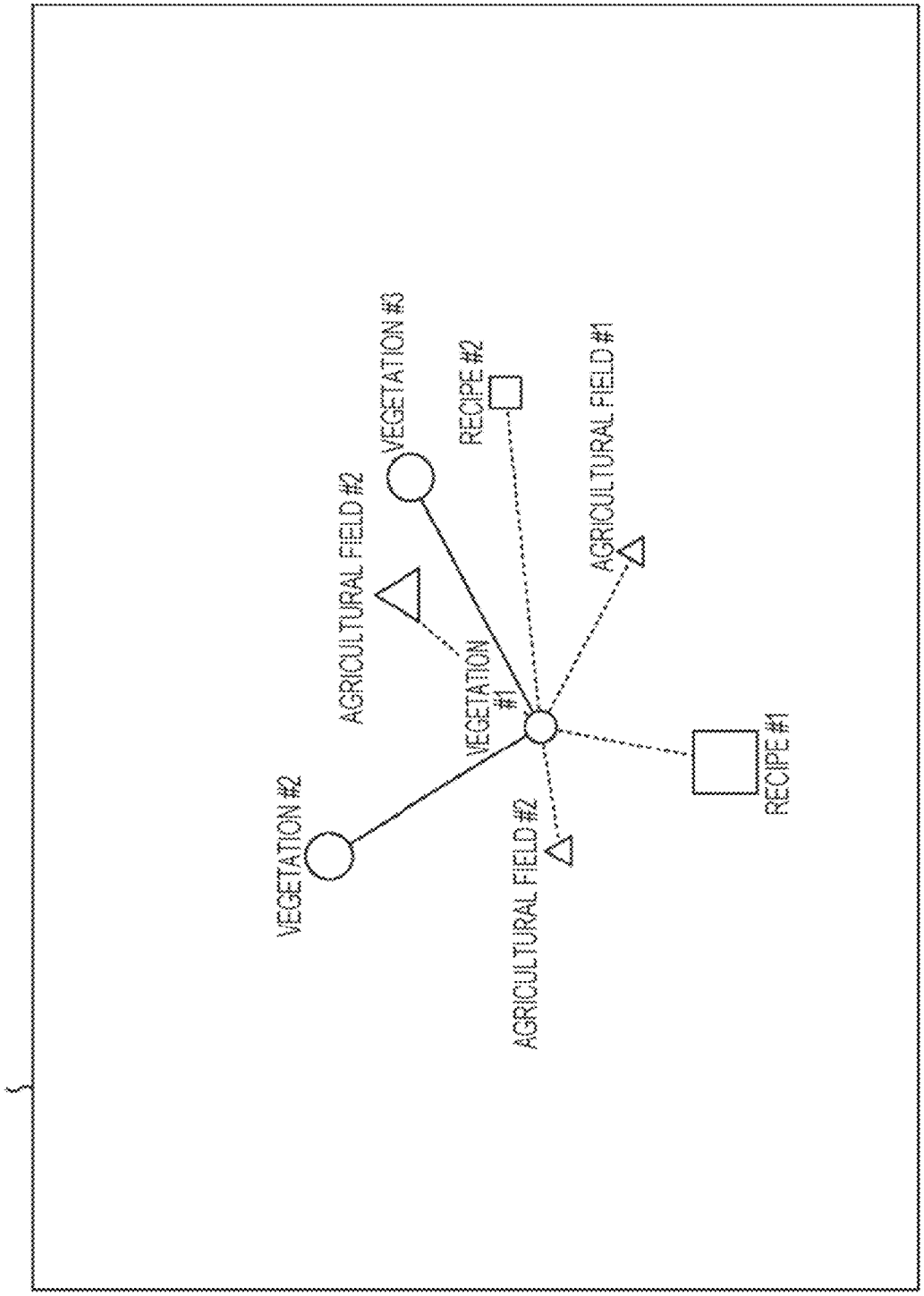
FIG. 35 is a diagram illustrating an example of a bipartite graph generated from two DBs.

FIG. 35 is a diagram illustrating an example of a bipartite graph generated from two DBs of the vegetation/agricultural field DB and the vegetation/recipe DB described above.

The relationship graph of FIG. 35 indicates a relationship between the vegetation #1 indicated by the node of interest, and each of the other vegetation #2 to vegetation #6, by using the node of the vegetation #1 as the node of interest.

The relationship graph of FIG. 35 also illustrates a relationship between vegetation and each of an agricultural field and a recipe associated with the vegetation, in addition to the relationship between types of vegetation.

In the relationship graph of FIG. 35, a relationship score between the vegetation #1, which is the node of interest, and each of the vegetation #2 to vegetation #6, can be obtained by using the agricultural field #k associated with the vegetation #i as a scale in the vegetation/agricultural field DB, and can be obtained by using the recipe #k associated with the vegetation #i as a scale in the vegetation/recipe DB.

Further, the relationship score between the vegetation #1, which is the node of interest, and each of the other vegetation #2 to vegetation #6 can be obtained by using both of the agricultural field #k associated with the vegetation #i as a scale in the vegetation/agricultural field DB, and the recipe #k associated with the vegetation #i as a scale in the vegetation/recipe DB.

In a case where the relationship score between the vegetation #1, which is the node of interest, and each of the other vegetation #2 to vegetation #6 is obtained by using both of the agricultural field #k and the recipe #k as a scale, for example, it is possible to obtain the relationship score by using a weighted additional value such as an average value of the relationship score obtained by using the agricultural field #k as a scale, and the relationship score obtained by using the recipe #k as a scale, as the relationship score between the vegetation #1, which is the node of interest, and each of the other vegetation #2 to vegetation #6.

Furthermore, for example, in the vegetation #i, which is information indicated by the node of interest, it is possible to rank all of the other vegetation #j with respect to the vegetation #i, on the basis of the relationship between the vegetation #i and the other vegetation #j, indicated by the relationship graph, that is, the relationship score between the vegetation #i and the other vegetation #j.

In the relationship graph, the ranking of the vegetation becomes higher as the other vegetation #j is close to the vegetation #i indicated by the node of interest.

Further, in this case described above, for example, in the vegetation/agricultural field DB, the value corresponding to the number of agricultural fields in which both of the vegetation #i and the vegetation #j are observed is adopted as the relationship score between the vegetation #i and the vegetation #j, but for example, an arbitrary value obtained by using an agricultural field associated with the vegetation as a scale in the vegetation/agricultural field DB, such as the number of times of observing both of the vegetation #i and the vegetation #j in the same agricultural field or closeness between the agricultural field in which the vegetation #i is observed and the agricultural field in which the vegetation #j is observed, can be adopted as the relationship score between the vegetation #i and the vegetation #j.

In addition, the relationship graph is capable of controlling the display on the basis of various factors.

For example, in the relationship graph indicating the relationship between types of vegetation, it is possible to display a linkage between the node of the vegetation and the node of interest to be thick, or to display the linkage by changing the color thereof, as the ranking of the vegetation becomes higher.

Further, for example, in the relationship graph generated from the vegetation/agricultural field DB, it is possible to increase the size of the node of the agricultural field #k in which the number of times of observing the vegetation #i indicated by the node of interest increases, or to dispose the node of the agricultural field #k to be in a position close to the node of interest.

In addition, in the relationship graph indicating the relationship between types of vegetation, it is possible to increase the size of the node of the vegetation #i of which the number of times of being observed increases.

Further, for example, in the relationship graph generated from the vegetation/recipe DB, it is possible to increase the size of the node of the recipe in which the used amount of the vegetation #i indicated by the node of interest increases, or to dispose the node of the recipe to be in a position close to the node of interest.

In addition, for example, in the relationship graph indicating the relationship between types of vegetation, it is possible to perform animation display such that the node of the vegetation #j in which a relationship with respect to the vegetation #i indicated by the node of interest is strong (a relationship score is large) is close to the node of interest, and a node of vegetation #j' in which a relationship with respect to the vegetation #i indicated by the node of interest is weak (a relationship score is small) is separated from the node of interest.

Further, for example, in the relationship graph indicated by the relationship between types of vegetation, in the node of the vegetation registered in the vegetation/agricultural field DB or the vegetation/recipe DB, it is possible to display the nodes of all of the vegetation, and to display the node of the vegetation #i, which is the node of interest, a node of vegetation #j in which a relationship score with respect to the vegetation #i is greater than 0, that is, only a node of vegetation #j in which the agricultural field #k observed along with the vegetation #i exists.

In this case, the node of the vegetation configuring the relationship graph is limited, and thus, a plurality of nodes of the vegetation are displayed, and therefore, it is possible to prevent the relationship graph from being hardly seen.

Figure 36:
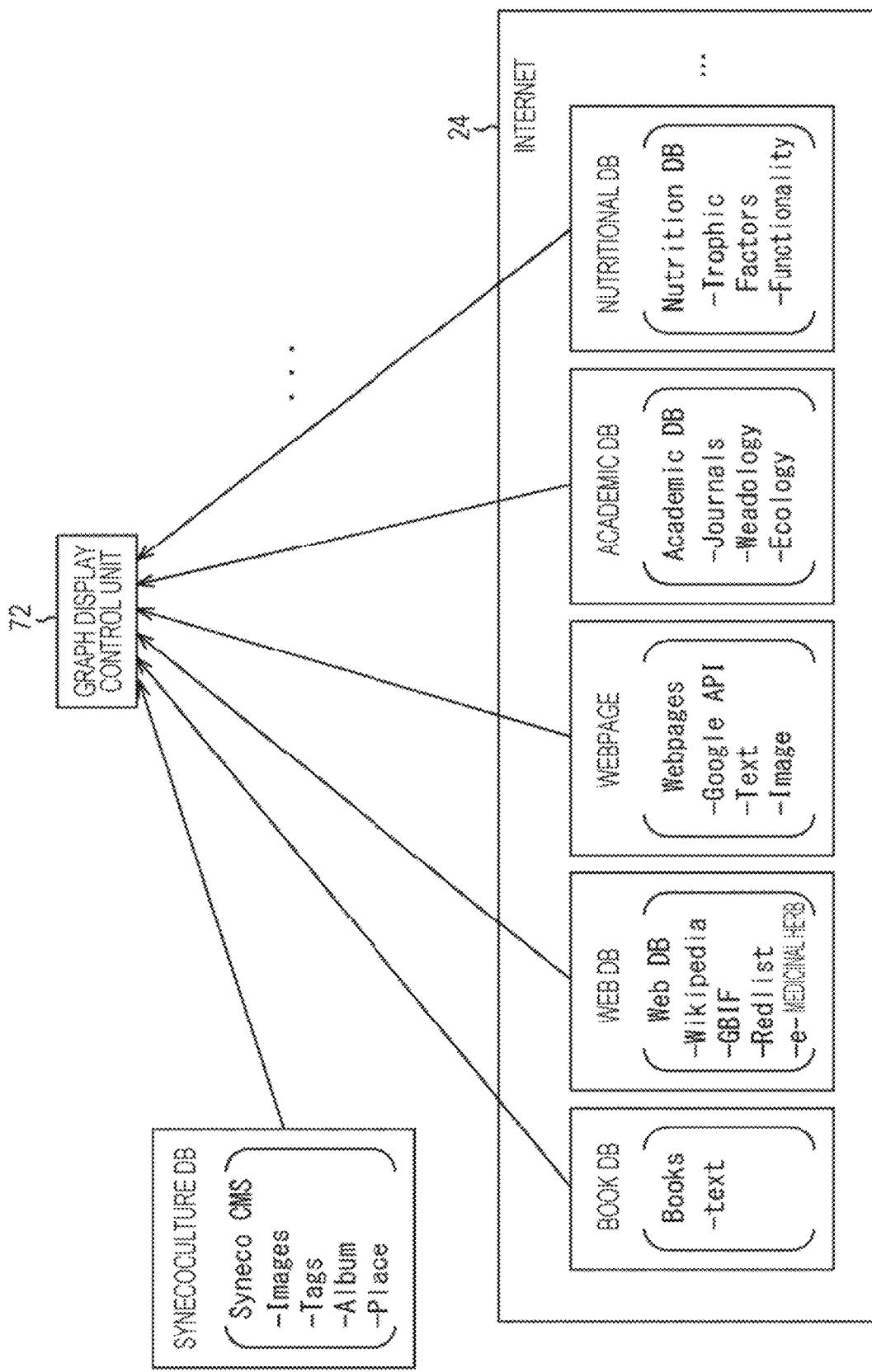
FIG. 36 is a diagram illustrating an example of a DB which is used for generating the relationship graph.

FIG. 36 is a diagram illustrating an example of a DB which is used for generating the relationship graph in the graph display control unit 72 (or the acquisition unit 51).

The relationship graph can be generated by using the Synecoculture (registered trademark) DB registered in the storage 63 of the server 13 (various DBs configuring the Synecoculture (registered trademark) DB).

In addition, the relationship graph can be generated, for example, by using various DBs, such as a DB in which the seeds and the other information items are associated with each other, on the Internet 24.

That is, the relationship graph can be generated by using various DBs such as a book DB which is a DB of books, a web DB, which is a DB provided on a webpage, an academic DB in which a webpage and scholarly information are registered, and a nutritional DB in which nutritional information is registered, on the Internet 24.

The user of the terminal 12 is capable of selecting a DB to be used for generating the relationship graph by operating the operation unit 34.

That is, for example, it is possible to select a DB to be used for generating the relationship graph from a plurality of DBs illustrated in FIG. 36, according to the operation of the operation unit 34.

Here, as described above, in a case where it is possible to select the DB to be used for generating the relationship graph from the plurality of DBs, there is a case where it is difficult for the user to know a relationship graph which is currently displayed is a relationship graph of which DB (a relationship graph generated by using which DB).

Therefore, it is possible to change one or more of the background color of the relationship graph, the shape of the node, the color of the node, and the like, according to the selection (switching) of the DB to be used for generating the relationship graph.

In addition, in the terminal 12, it is possible to output different sounds from the speaker 36 according to the selection of the DB to be used for generating the relationship graph.

As described above, it is possible for the user to recognize which DB is used for generating the relationship graph.

Figure 37:
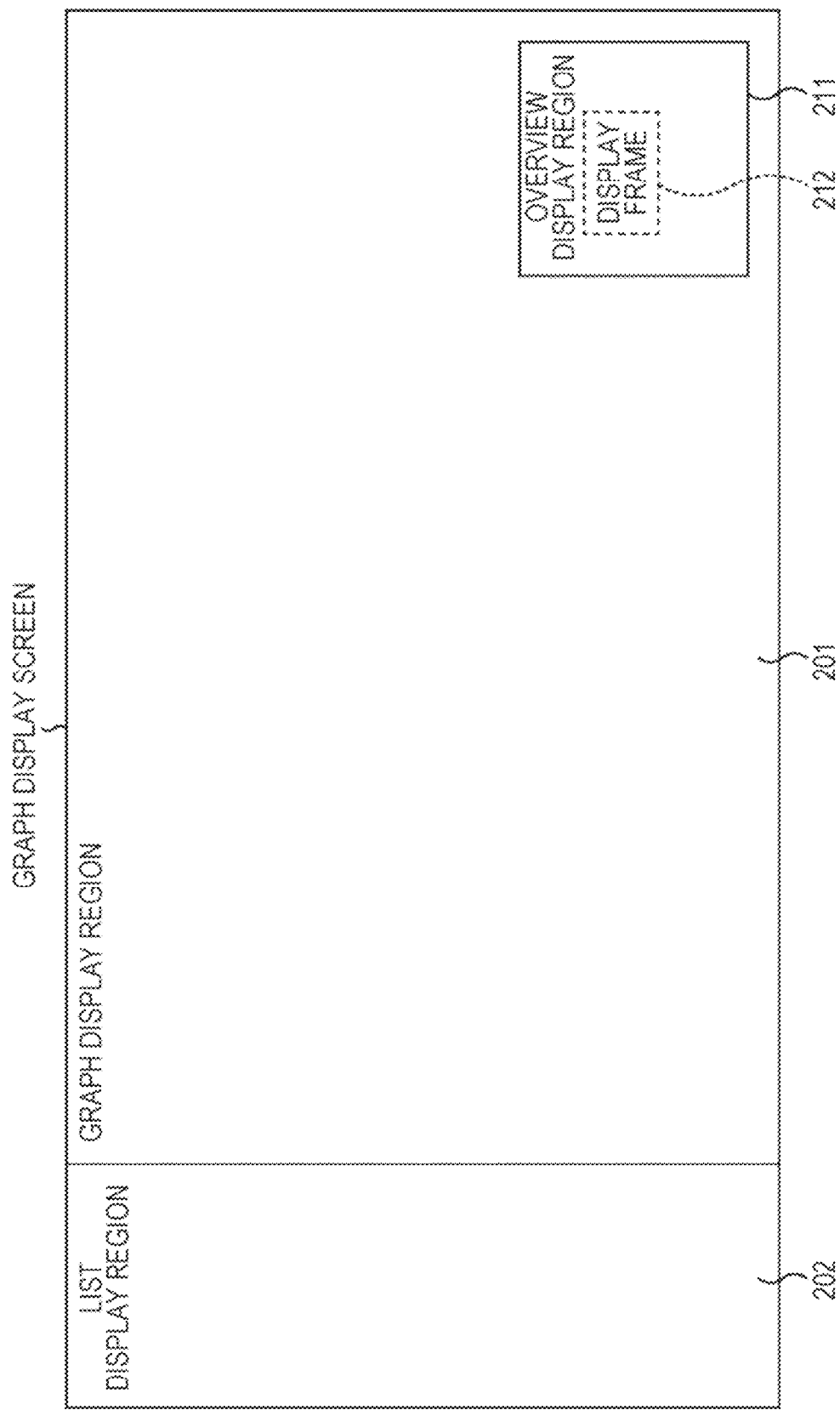
FIG. 37 is a diagram illustrating a configuration example of the graph display screen.

FIG. 37 is a diagram illustrating a configuration example of the graph display screen on which the relationship graph is displayed.

The graph display screen is capable of including a graph display region 201 and a list display region 202.

In FIG. 37, the left end of the graph display screen is the list display region 202, and the rest is the graph display region 201.

The relationship graph is displayed on the graph display region 201.

Further, an overview display region 211 can be provided in the graph display region 201.

In FIG. 37, the overview display region 211 is provided on the lower right side of the graph display region 201.

The entire relationship graph, which is used for generating the relationship graph and includes all nodes of the information i1 registered in a DB in which the information i1 and the information i2 are associated with each other, is displayed on the overview display region 211.

In the entire relationship graph including all of the nodes of the information i1 registered in the DB, there is a case where the number of nodes is enormous, and in a case where the entire relationship graph is displayed on the graph display region 201, there is a concern that the relationship graph is hardly seen.

Therefore, in the graph display region 201, it is possible to display a part of the entire relationship graph to be large. In this case, it is possible to display a display frame 212 indicating a part of the relationship graph displayed on the graph display region 201 of the entire relationship graph displayed on the overview display region 211, on the overview display region 211.

According to the display frame 212, it is possible for the user to easily recognize which portion of the entire relationship graph is displayed on the graph display region 201.

A ranking list is displayed on the list display region 202.

Here, for example, as illustrated in FIG. 35, according to the relationship graph (the relationship score) indicating the relationship between the vegetation #i and the other vegetation #j, it is possible to rank all of the other vegetation #j with respect to the other vegetation #i, on the basis of the relationship between the vegetation #i and the other vegetation #j, that is, the relationship score between the vegetation #i and the other vegetation #j.

A ranking list, which is a list of vegetation (vegetation names of the vegetation) ranked with such vegetation #j, is displayed on the list display region 202.

Furthermore, it is possible to turn on and off the display of the overview display region 211 or the display of the ranking list, according to the operation of the operation unit 34 performed by the user.

The graph display screen as described above, for example, can be generated by using Gephi, which is an open-source software package.

Figure 38:
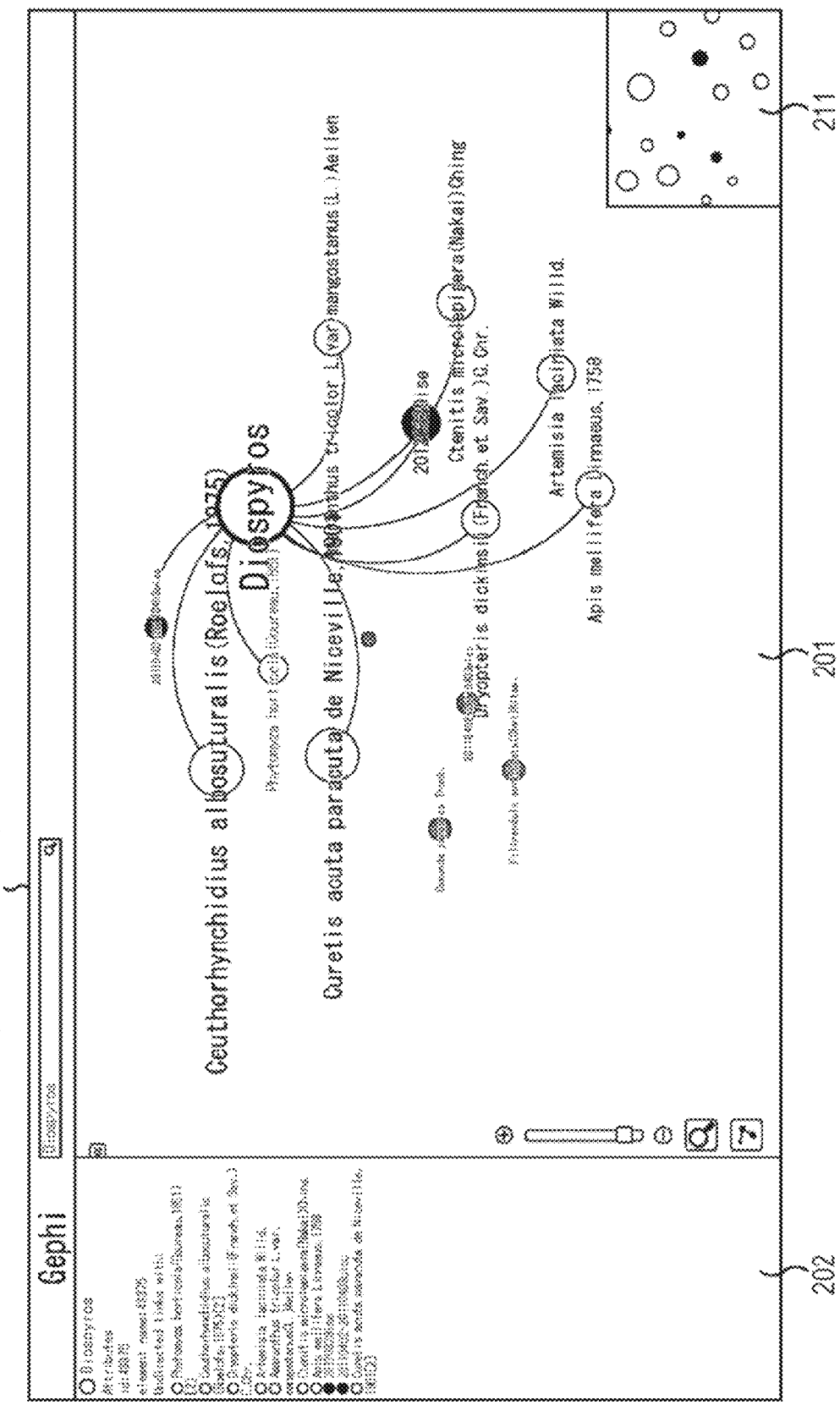
FIG. 38 is a diagram illustrating an example of a graph display screen using Gephi.

FIG. 38 is a diagram illustrating an example of a graph display screen of Gephi.

In FIG. 38 (the same also applies to FIG. 39 to FIG. 41 as described later), a white circle indicates the node of the vegetation, and a black circle indicates the node of the agricultural field.

In the graph display screen of FIG. 38, the relationship graph generated by using the vegetation/agricultural field DB is displayed on the graph display region 201 by using a node of vegetation "Diospyros" as the node of interest.

In addition, in the graph display screen of FIG. 38, a ranking list of the other vegetation ranked with respect to the vegetation "Diospyros" indicated by the node of interest is displayed on the list display region 202.

Furthermore, in the ranking list displayed on the list display region 202, it is also possible to display an agricultural field in which the vegetation "Diospyros" indicated by the node of interest is observed, in addition to the vegetation.

In FIG. 38, in the ranking list, agricultural fields "20120329ise" and "20110402-20110403oiso" (and dates) in which the vegetation "Diospyros" indicated by the node of interest is observed are displayed immediately after vegetation "Apis mellifera Linnaeus, 1758".

Figure 39:
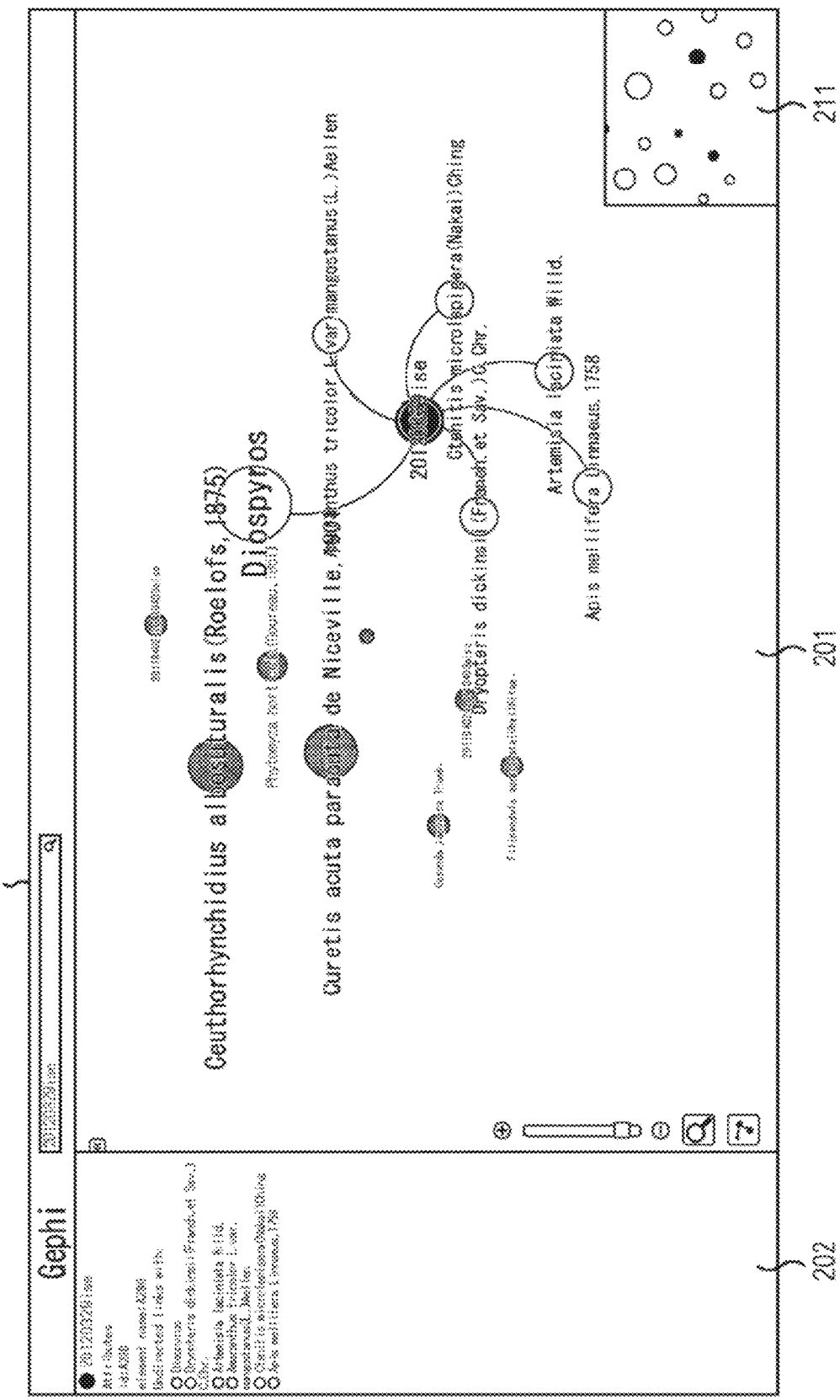
FIG. 39 is a diagram illustrating an example of the graph display screen using Gephi.

FIG. 39 is a diagram illustrating an example of the graph display screen using Gephi in a case where the agricultural field "20120329ise" in which the vegetation "Diospyros" indicated by the node of interest is observed is selected as a new node of interest in the relationship graph of FIG. 38.

Figure 40:
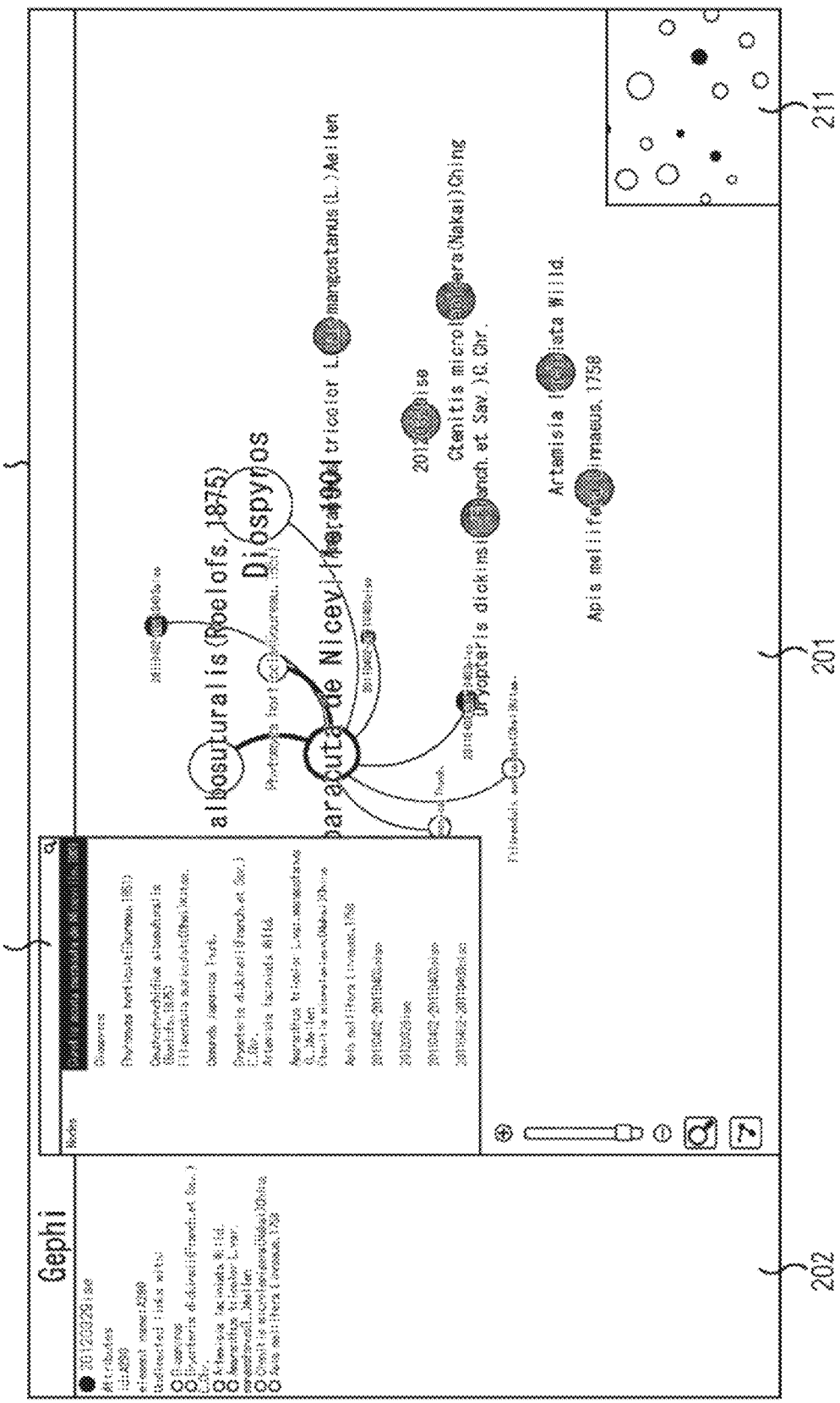
FIG. 40 is a diagram illustrating another example of the graph display screen using Gephi.

FIG. 40 is a diagram illustrating another example of the graph display screen using Gephi.

A search box is provided in an upper portion of Gephi, and in a case where the user clicks (or taps) the search box, a list of the vegetation and the agricultural fields indicated by the node is displayed in a pull-down manner. The user selects the vegetation or the agricultural field from the list, and thus, is capable of setting the node of the selected vegetation or agricultural field as the node of interest.

Figure 41:
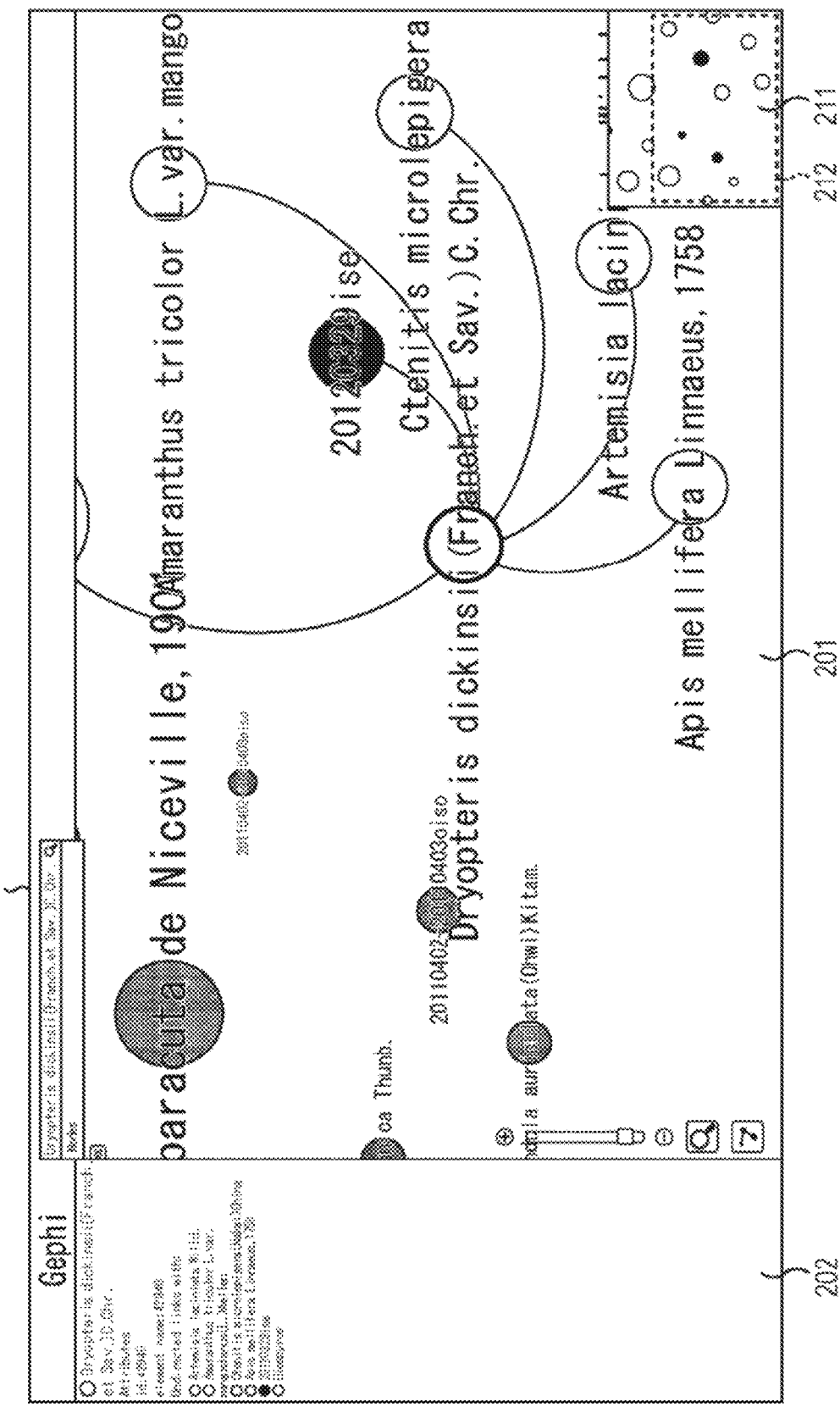
FIG. 41 is a diagram illustrating still another example of graph display screen using Gephi.

FIG. 41 is a diagram illustrating still another example of the graph display screen using Gephi.

In FIG. 41, the display frame 212 is displayed to represent a portion of the relationship graph displayed on the graph display region 201 in the entire relationship graph displayed on the overview display region 211.

Furthermore, in the relationship graph, a user profile relevant to the user of the terminal 12, for example, can be registered in the storage 33 of the terminal 12, or the like, and the relationship graph can be changed on the basis of the user profile.

For example, in a case where the user is capable of recognizing years of experience that the user is concerned with species such as the vegetation (for example, years of experience that the user is concerned with the agriculture, or the like) on the basis of the user profile, it is possible to change the relationship graph (the display of the relationship graph) on the basis of the years of experience.

Specifically, for example, in a case where the user is at a scholar level at which the years of experience are long, it is possible to display the relationship graph including the nodes of all of the vegetation registered in the DB, and in a case where the user is at a beginner level at which the years of experience are short (or) 0, in the vegetation registered in the DB, for example, it is possible to display the relationship graph limited to nodes of three best types of vegetation in the ranking (top three types of vegetation in the relationship score). In a case where many types of vegetation (the nodes of the vegetation) are displayed, there is a case where the user at the beginner level is confused, and thus, the relationship graph is displayed according to the level of the user in order to prevent such confusion.

In addition, in the relationship graph, it is possible to select the DB used for generating the relationship graph on the basis of the user profile.

Specifically, for example, in a case where it is possible to recognize that the user is a housewife on the basis of the user profile, in the generation of the relationship graph, for example, it is possible to select the vegetation/recipe DB as a DB for a housewife. In addition, for example, in a case where it is possible to recognize that the user is an agriculture worker on the basis of the user profile, in the generation of the relationship graph, for example, it is possible to select the vegetation/agricultural field DB as a DB for an agriculture worker.

Further, in a case where a content profile relevant to the species such as the vegetation registered in the DB used for generating the relationship graph, for example, exists in a site or the like on the Internet 24, it is possible to change the relationship graph on the basis of the content profile.

For example, in a case where it is possible to recognize the years of experience of the user on the basis of the user profile, and to recognize the publicity or the scarcity of the vegetation registered in the DB on the basis of the content profile, the user at the scholar level at which the years of experience are long, is capable of selecting vegetation having low publicity or vegetation having high scarcity in the vegetation registered in the DB, and of displaying the relationship graph limited to the node of the selected vegetation. This is because it is considered that the user at the scholar level is not interested in vegetation having high publicity or vegetation having low scarcity as all that.

On the other hand, the user at the beginner level at which the years of experience are short, is capable of selecting only the vegetation having high publicity or the vegetation having low scarcity in the vegetation registered in the DB, and of displaying the relationship graph limited to the node of the selected vegetation. This is because it is considered that the user at the beginner level is not interested in the vegetation having low publicity or the vegetation having high scarcity as all that.

In addition, in the relationship graph generated by using the DB in which the species such as the vegetation are registered, it is possible to correct a relationship between the species, that is, a relationship score on the basis of the user profile or the content profile.

For example, in a case where it is possible to recognize the years of experience of the user on the basis of the user profile, and to recognize the publicity or the scarcity of the vegetation registered in the DB on the basis of the content profile, the user at the scholar level at which the years of experience are long, is capable of correcting the relationship score between the vegetation having high publicity and the vegetation having low scarcity to be higher, in the vegetation registered in the DB.

In this case, in the ranking list, the vegetation having low publicity or the vegetation having high scarcity is ranked at a higher level, and is displayed in a position close to the node of interest in the relationship graph.

On the other hand, the user at the beginner level at which the years of experience are short, it is possible to correct the relationship score between the vegetation having high publicity and the vegetation having low scarcity to be higher, in the vegetation registered in the DB.

In this case, in the ranking list, the vegetation having high publicity or the vegetation having low scarcity is ranked at a higher level, and is displayed in the position close to the node of interest in the relationship graph.

Figure 42:
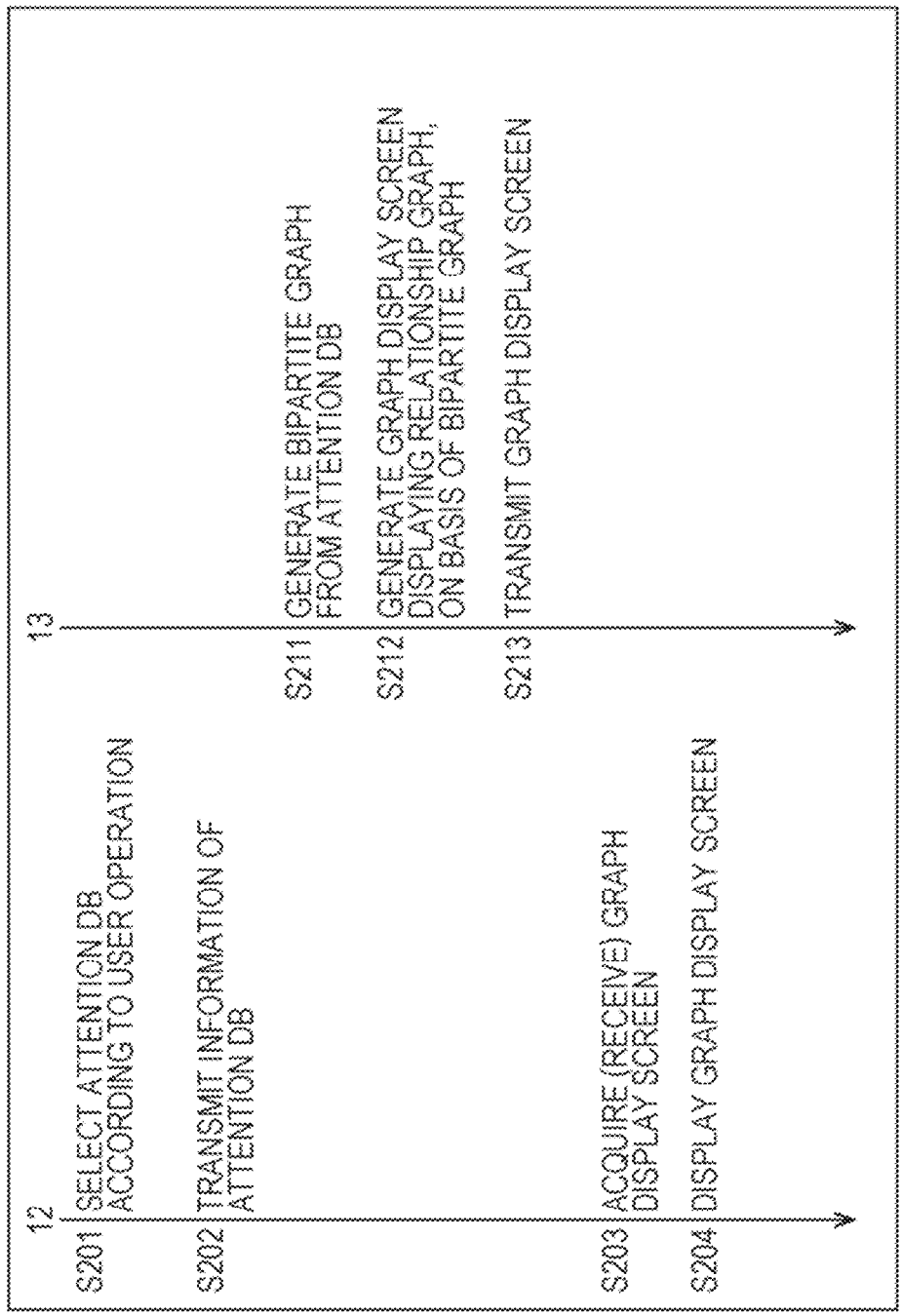
FIG. 42 is a flowchart illustrating a processing example of displaying the graph display screen.

FIG. 42 is a flowchart illustrating a processing example of displaying the graph display screen.

In step S201, the user of the terminal 12 operates the operation unit 34, and thus, selects an attention DB, which is a DB to be used for generating a relationship graph, from a plurality of DBs.

In step S202, the communication unit 40 of the terminal 12 transmits information of the attention DB (information indicating the attention DB) to the server 13.

The communication unit 67 of the server 13 receives the information of the attention DB from the terminal 12, and in step S211, the graph display control unit 72 accesses the attention DB, and generates a bipartite graph from the attention DB.

In step S212, the graph display control unit 72 generates a graph display screen displaying the relationship graph from the bipartite graph of the attention DB.

In step S213, the communication unit 67 transmits the graph display screen generated by the graph display control unit 72 to the terminal 12.

In step S203, the communication unit 40 of the terminal 12 receives the graph display screen from the server 13, and the acquisition unit 51 acquires the graph display screen.

In step S204, the display control unit 52 of the terminal 12 displays the graph display screen acquired by the acquisition unit 51 on the display unit 35.

Furthermore, in the case described above, in the server 13, the graph display screen is generated from the bipartite graph of the attention DB, and is transmitted to the terminal 12, but in the server 13, the bipartite graph of the attention DB can be transmitted to the terminal 12, and in the terminal 12, the graph display screen can be acquired by being generated from the bipartite graph from the server 13 in the acquisition unit 51.

As described above, in the case of displaying a relationship graph which is obtained from a DB in which the species and information other than the species are associated with each other, indicates the relationship between the species using the other information as a scale, and is configured of a node and a linkage, the user is capable of obtaining the relationship between the species as knowledge, and of using the knowledge in the ecosystem utilization such as Synecoculture (registered trademark).

<Outline of Assistance of Synecoculture (Registered Trademark) Using AR Display/VR Display of AR Object>

Figure 43:
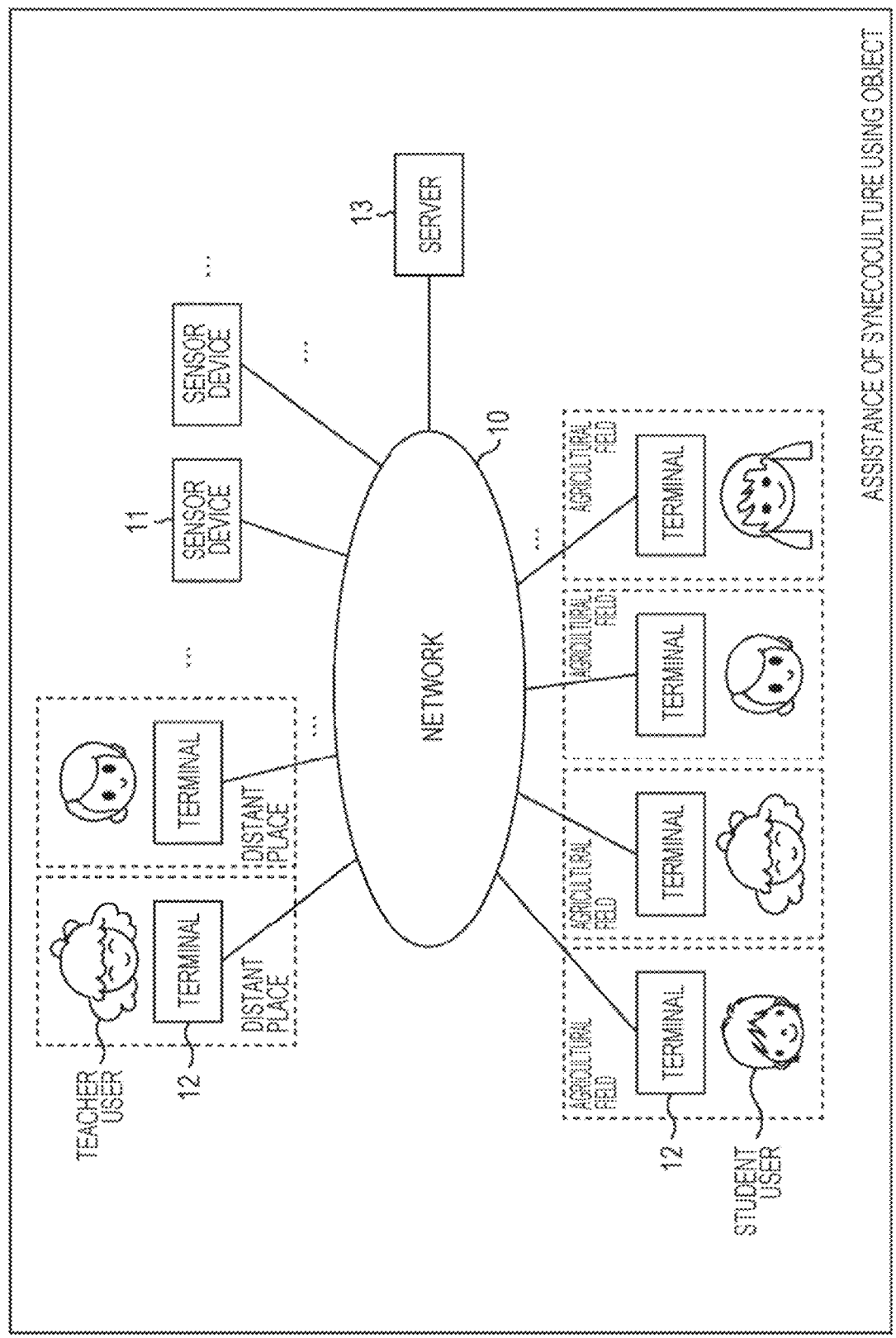
FIG. 43 is a diagram illustrating outline of assistance of Synecoculture (registered trademark) using AR display/VR display of the AR object.

FIG. 43 is a diagram illustrating the outline of the assistance of Synecoculture (registered trademark) using the AR display/VR display of the AR object.

In the ecosystem utilization system of FIG. 1, in the terminal 12, it is possible to perform the AR display/VR display of the AR object, and to assist Synecoculture (registered trademark) by using the AR display/VR display of the AR object.

In the assistance of Synecoculture (registered trademark) using the AR display/VR display of the AR object, the server 13 collects a subset of various information items of the ecosystem from the sensor device 11 or the terminal 12, organizes the subset by various scales, associates the subset with a multi-partite graph or the like, and provides the subset to the user of the terminal 12 in the AR display or the VR display.

Here, a real space of a reality, a captured real space (an image of the captured real space) in which the real space is captured, or a VR space (an image of the VR space) in which the real space is modeled, is used as a background space (an image of the background space), and thus, the AR object is displayed in the background space in a superimposed manner.

Herein, the AR display indicates that the AR object is displayed in the background space in a superimposed manner by using a real space, a captured real space, or a VR space of the current location where the user exists, as a background space. In addition, an arbitrary location (and necessary date and time) is designated, and a captured real space or a VR space of the designated location (and the date and time) is used as a background space, and thus, the VR display indicates that the AR object is displayed in the background space in a superimposed manner.

Therefore, for example, in a case where a see-through HMD is used as the terminal 12, the AR display can be performed by using a real space which is directly observed by the user with a see-through HMD, as a background space.

In addition, for example, in a case where an immersive HMD or a smart phone is used as the terminal 12, the AR display can be performed by using a captured real space (an image of the captured real space) which is obtained by capturing a real space on that spot or a VR space (an image of the VR space) in which the real space of that spot is modeled, as a background space (an image of the background space).

On the other hand, the VR display, for example, can be performed by designating an arbitrary position (or an agricultural field, a district, or the like) in the terminal 12 as a designated position, by setting a captured real space or a VR space of the designated position as a background space (an image of the background space), and by acquiring the background space from the server 13.

Furthermore, in the VR display, it is possible to designate date and time, other than the location of the captured real space or the VR space as a background space, as necessary. Previous date and time are designated as the date and time, and thus, it is possible to display the AR object in a previous agricultural field (an image of the previous agricultural field) in a superimposed manner.

Here, hereinafter, a display mode of displaying the AR object in the AR display may be referred to as an AR mode, and a display mode of displaying the AR object in the VR display may be referred to as a VR mode.

The display mode, for example, is set according to the operation of the user, the specification of the terminal 12, or the like. For example, in a case where the terminal 12 is a see-through HMD, the display mode is set to the AR mode. In addition, for example, in a case where the terminal 12 is an immersive HMD, the display mode can be set to the VR mode or the AR mode according to the operation of the user, or the like.

In the VR mode, the AR object and the background space can be provided to the terminal 12 from the server 13, in a divided state, and in the terminal 12, the AR object can be displayed in the background space in a superimposed manner. In addition, in the VR mode, in the server 13, the AR object can be provided to the terminal 12 by being displayed in background space in a superimposed manner in advance, and in the terminal 12, the AR object provided from the server 13 is capable of displaying the background space which is superimposed in advance.

In the assistance of Synecoculture (registered trademark) using the AR display/VR display of the AR object, the user using the terminal 12 can be broadly divided into two types of users of a teacher user and a student user.

The student user, for example, is a user who performs the operation in the agricultural field, and observes the AR display/VR display of the AR object, and thus, receives the advice of Synecoculture (registered trademark).

The teacher user, for example, is a user who observes the AR display/VR display of the AR object in a distant place which is separated from the agricultural field, and thus, recognizes the situation of the agricultural field, and edits the AR object, and therefore, provides the advice of Synecoculture (registered trademark) to the student user.

In the terminal 12, the AR object is displayed, and thus, the teacher user is capable of easily performing the assistance of Synecoculture (registered trademark) with respect to the student data, and the student user is capable of easily receiving the assistance of Synecoculture (registered trademark) from the teacher user.

Here, the student user may be a teacher user, and the teacher user may be a student user.

Hereinafter, various display examples in the terminal 12 will be described.

Furthermore, in the terminal 12 (FIG. 3), the acquisition unit 51 acquires the ecosystem object, the task object, the background space, and the information necessary for display from the server 13, and the display control unit 52 performs display control using the information acquired by the acquisition unit 51, and thus, various displays described below are performed.

In addition, in the terminal 12, it is possible to download a predetermined AR object or background space in advance from the server 13. In this case, in the terminal 12, it is possible to perform the AR display/VR display in standalone without communicating with the server 13, in a range of the AR object or the background space downloaded in advance from the server 13.

<Display Example of AR Display/VR Display>

Figure 44:
FIG. 44 is a diagram illustrating a display example of the AR display in the terminal 12.

FIG. 44 is a diagram illustrating a display example of the AR display in the terminal 12.

In FIG. 44, a real space or a captured real space of a certain agricultural field is set as a background space, and the AR object is displayed in the background space in a superimposed manner.

Here, the AR object used in the assistance of Synecoculture (registered trademark) using the AR display/VR display of the AR object, is divided into an ecosystem object and a task object according to a difference in a target indicated by the AR object.

The ecosystem object indicates an ecosystem constituent configuring an ecosystem of an agricultural field in which Synecoculture (registered trademark) is performed, that is, an agricultural field in which a plurality of types of vegetation are mixed up, and is applied to the ecosystem constituent.

For example, various elements configuring the ecosystem of the agricultural field, for example, various sensor data items of the environment of the agricultural field, such as the vegetation, the climate of the agricultural field, the insect and the other creations, and a temperature sensed by the sensor device 11 disposed in the agricultural field, correspond to the ecosystem constituent configuring the ecosystem of the agricultural field. For example, the stone in the agricultural field, a reach point of the shade on the summer solstice, a good location/bad location for water drainage, and the like also correspond to the ecosystem constituent.

The task object indicates a task which is performed with respect to the ecosystem constituent. The task performed with respect to the ecosystem constituent, for example, is the harvest of the vegetation, the planting of the vegetation, tree trimming (weeding), or the like, as the ecosystem constituent.

As described above, the AR object can be divided into the ecosystem object and the task object according to a difference in the target indicated by the AR object, and for example, can be divided into a picture (data of the picture), an icon (data of the icon), and sensor data (a symbol indicating the sensor data) according to a category of data.

For example, the picture, the icon, or the sensor data is adopted as the ecosystem object, and for example, the icon is adopted as the task object.

In FIG. 44, in the terminal 12, for example, a picture as the ecosystem object is displayed (exists) in the background space by using the real space or the captured real space of the real agricultural field as a background space.

In FIG. 44, printed matter on which an image as the marker is printed is disposed in the agricultural field. In the terminal 12, for example, the marker is detected from an image obtained by capturing the agricultural field with the camera 37, and the ecosystem object of the picture is displayed in a relative position based on the marker.

The relative position based on the marker, in which the ecosystem object of the picture is displayed, for example, is (in the vicinity of) a position in which vegetation or the like reflected on the picture exists (is observed).

Therefore, the user observes the ecosystem object of the picture, and thus, is capable of easily recognizing that the vegetation seen on the picture is in (the vicinity of) the position of the ecosystem object.

In addition, the user is capable of easily recognizing the arrangement of a plurality of types of vegetation seen on each of pictures as the plurality of ecosystem objects according to a position relationship in a plurality of ecosystem objects.

Furthermore, in FIG. 44, the marker is associated with the ecosystem object, and the ecosystem object is displayed in the relative position based on the marker which is associated with the ecosystem object.

One marker can be associated with one ecosystem object, and can be associated with the plurality of ecosystem objects. In addition, a plurality of markers can be associated with one ecosystem object.

In a case where the plurality of markers are associated with the ecosystem object, it is possible to determine the position in which the ecosystem object is displayed, on the basis of each of the plurality of markers. In this case, it is possible to accurately display the ecosystem object in the position of the ecosystem constituent to which the ecosystem object is applied, that is, the position of the ecosystem constituent indicated by the ecosystem object.

Here, in the marker provided in the agricultural field, there is a case where a part of the marker is damaged or inclined overtime, or a part of the marker is hidden by the grown vegetation, for example. In addition, the marker is not necessarily captured from a front side such that the entire mark is obviously seen, but there is a case where the marker is captured from an inclined direction.

For this reason, even in a case where the marker is seen on the image obtained by capturing the agricultural field with the camera 37, the marker is not necessarily detected from the image, and even in a case where the marker is detected, there is a case where a detection accuracy of the marker is degraded.

In this case, even in a case where the ecosystem object to be displayed is not displayed or the ecosystem object is displayed, there is a case where the marker is displayed in a position shifted from a position in which the marker is planned to be originally displayed.

The plurality of markers are associated with the ecosystem object, and thus, as described above, it is possible to prevent the ecosystem object to be displayed from not being displayed, of the ecosystem object from being displayed in the position shifted from the position in which the marker is planned to be originally displayed.

Figure 45:
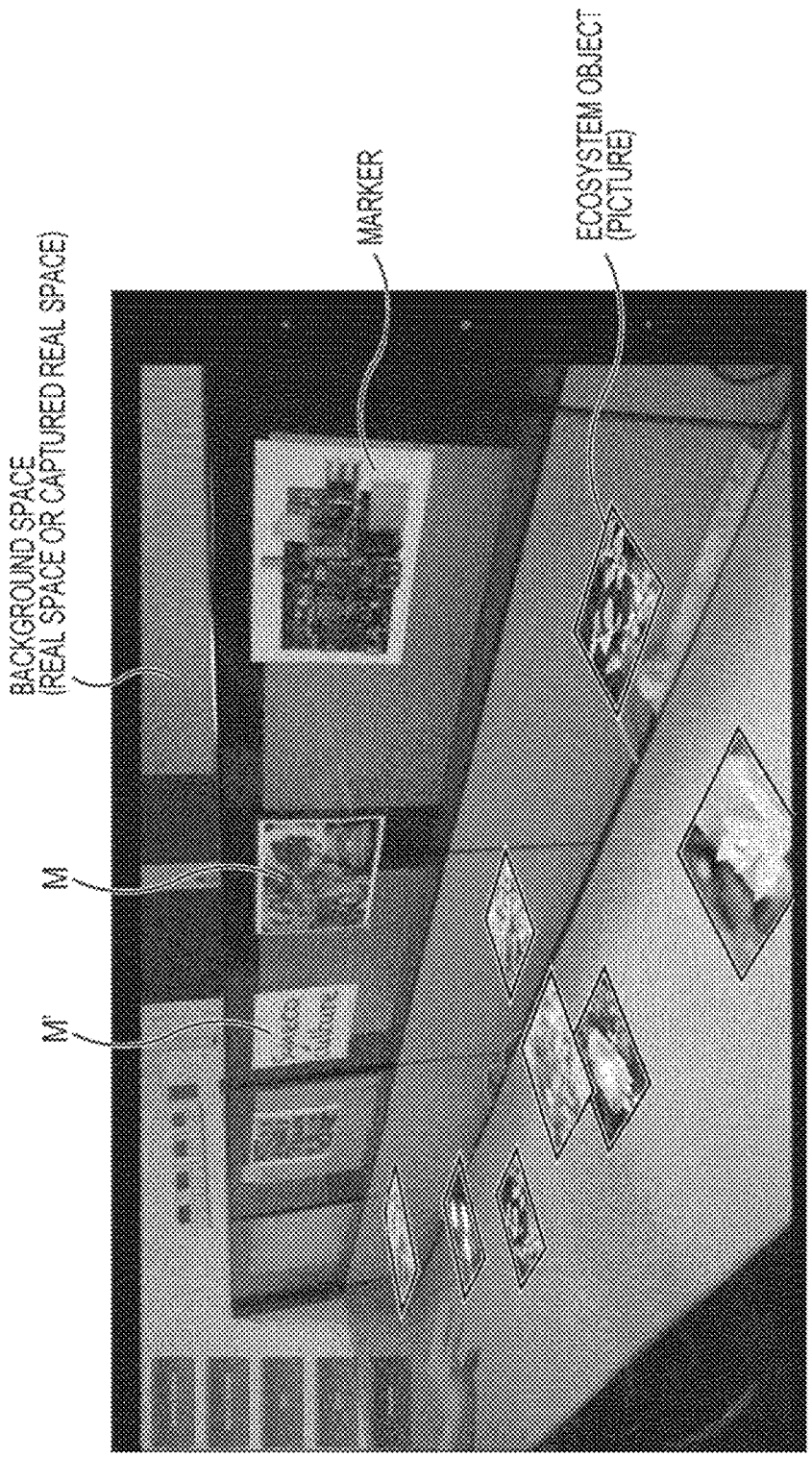
FIG. 45 is a diagram illustrating a display example of the AR display in the terminal 12.

FIG. 45 is a diagram illustrating a display example of the AR display in the terminal 12.

In FIG. 45, in the terminal 12, for example, a real space or a captured real space of a room of a real office is used as a background space, and the picture as the ecosystem object is displayed in the background space.

In FIG. 45, printed matter as the marker is provided in the room of the office. In the terminal 12, as with a case of the agricultural field of FIG. 44, the marker is detected from the image obtained by capturing the office with the camera 37, and the ecosystem object of the picture is displayed in the relative position based on the marker.

That is, as illustrated in FIG. 44, the marker is associated with the ecosystem object, and the ecosystem object is displayed in the relative position based on the marker which is associated with the ecosystem object.

In the office, a marker having the same contents as those of the marker provided in the agricultural field of FIG. 44 is provided, and thus, the user is capable of observing the ecosystem object similar to that displayed in the agricultural field, not in the agricultural field but in the office in a distant place separated from the agricultural field.

Therefore, the user is capable of easily recognizing, for example, the vegetation planted in the agricultural field or the arrangement of the vegetation in the agricultural field, in the office in the distant place separated from the agricultural field.

Accordingly, for example, the teacher user is capable of recognizing the vegetation planted in the agricultural field or the arrangement of the plurality of types of vegetation in the agricultural field, in the office, and then, is capable of giving, for example, the advice of vegetation design (strategy), or the like to the student user of the agricultural field.

Further, in the office, a plurality of users are capable of simultaneously observing the ecosystem object of the agricultural field (the ecosystem object indicating the ecosystem constituent of the agricultural field) by using each of the terminals 12.

Therefore, the plurality of users is capable of recognizing, for example, the vegetation of the real agricultural field or the arrangement of the vegetation while being in the office, and of performing discussion with respect to suitability with respect to certain vegetation, the arrangement of the vegetation, or the like.

In addition, in FIG. 45, a plurality of markers are provided in the office.

Each of the plurality of markers provided in the office, for example, is a marker having the same contents as those of the marker provided in a different agricultural field. That is, in FIG. 45, for example, a marker M is a marker having the same contents as those of a marker provided in a certain agricultural field F, and a marker M' is a marker having the same contents as those of a marker provided in the other agricultural field F'.

As a result thereof, in FIG. 45, in the office, an ecosystem object of the agricultural field F and an ecosystem object of the other agricultural field F' are displayed.

Therefore, in the office in a distant place separated from the agricultural fields F and F', the user, for example, is capable of easily recognizing the vegetation of the agricultural fields F and F', and the arrangement of the vegetation, and of comparing the vegetation with the arrangement of the vegetation between the agricultural fields F and F'.

Furthermore, for example, the marker M can be associated with a biological system object of the agricultural field F, and an office marker, which is a marker different from the marker M, can be further associated with the biological system object of the agricultural field F.

In this case, in the office, it is also possible to display the ecosystem object of the agricultural field F by providing the office marker in addition to the marker M.

Further, the marker M' can be associated with a biological system object of the agricultural field F', and the office marker different from the marker M can be further associated with the biological system object of the agricultural field F'.

In a case where the office marker is associated with the ecosystem object of the agricultural field F and the ecosystem object of the agricultural field F', the office marker is provided in the office, and thus, it is possible to display the ecosystem object of the agricultural field F and the ecosystem object of the agricultural field F'.

Furthermore, in a case where the ecosystem object is displayed by using the marker, it is possible to display the ecosystem object by changing the size of the ecosystem object according to the size of the marker. In this case, it is possible to display the ecosystem object, for example, in a size proportional to the size of the marker.

In addition, in FIG. 45, the ecosystem object is arranged (displayed) on a front side of the marker, but an arrangement position of the ecosystem object is not limited to the front side of the marker. That is, the ecosystem object, for example, can be arranged in an arbitrary position such as a back side (a rear side) of the marker. With this arrangement, for example, in a case where an observation deck is in a certain agricultural field, the marker is provided in a position which can be captured from the observation deck, and the marker is captured from the observation deck, and thus, it is possible to display all of the ecosystem objects which are applied to the agricultural field including the observation deck.

Figure 46:
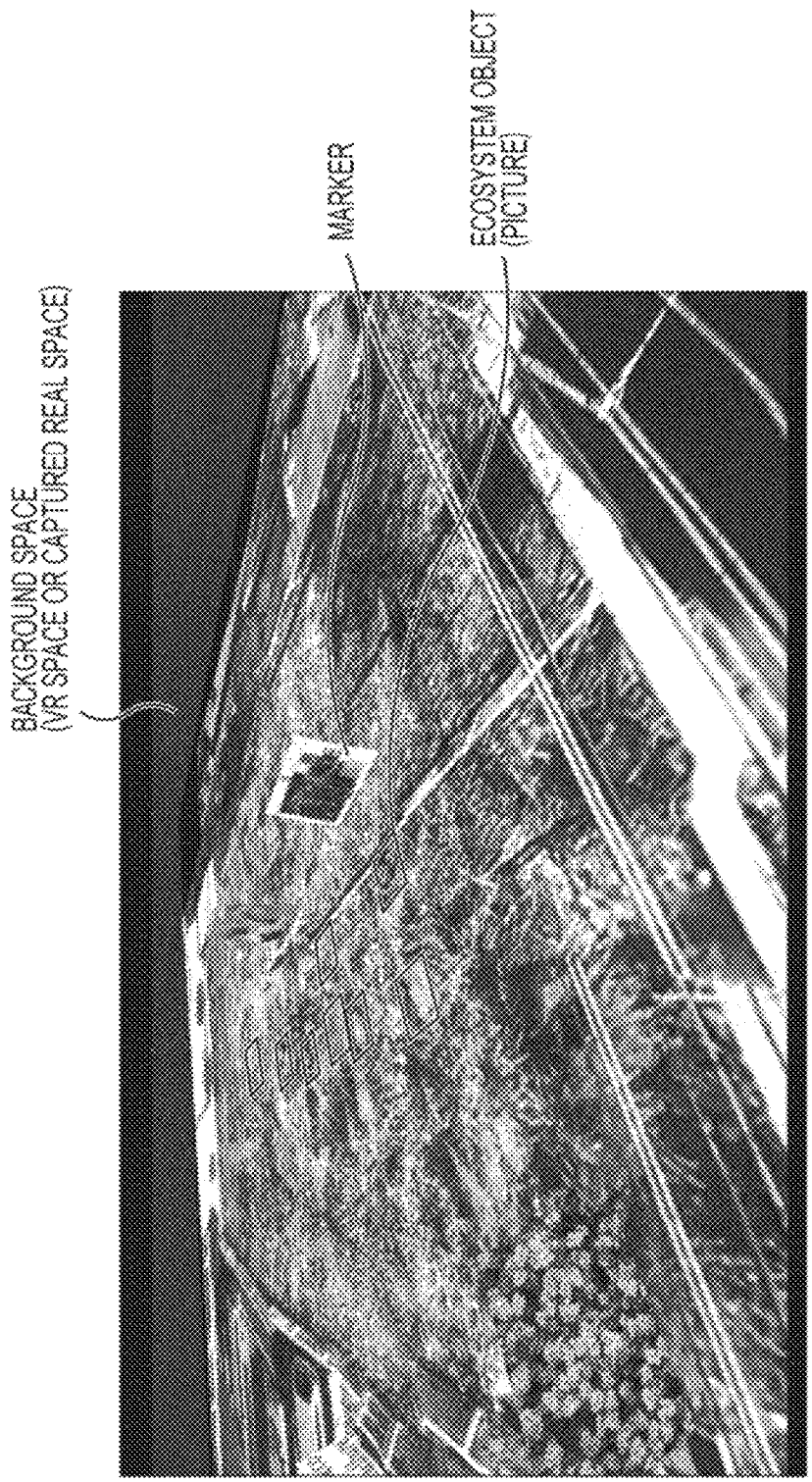
FIG. 46 is a diagram illustrating a display example of the VR display in the terminal 12.

FIG. 46 is a diagram illustrating a display example of the VR display in the terminal 12.

In FIG. 46, a VR space or a captured real space of a certain agricultural field is used as a background space, and the ecosystem object indicated by the vegetation is displayed in the background space in a superimposed manner.

As with a case of the AR display, even in the case of the VR display, the marker can be provided in the background space, and the ecosystem object associated with the marker can be displayed in the relative position based on the marker.

According to the VR display, the user is capable of observing the ecosystem object indicating the ecosystem constituent, such as the vegetation of the agricultural field, by using a VR space in which an agricultural field in an arbitrary location and at an arbitrary timing is modeled in an arbitrary location and at an arbitrary timing as a background space, by using the terminal 12.

Accordingly, the user, for example, is capable of easily recognizing the vegetation of the agricultural field in an arbitrary location and at an arbitrary timing or the arrangement of the vegetation, and of considering the vegetation design or the advice with respect to the student user of the agricultural field.

Furthermore, in a case where the VR space is adopted as the background space, the ecosystem object (and the task object) can be displayed in the background space according to the marker, and can be included in advance in the VR space as the background space (the ecosystem object or the like can be provided in advance in the VR space in a superimposed manner), as the constituent of the background space.

Figure 47:
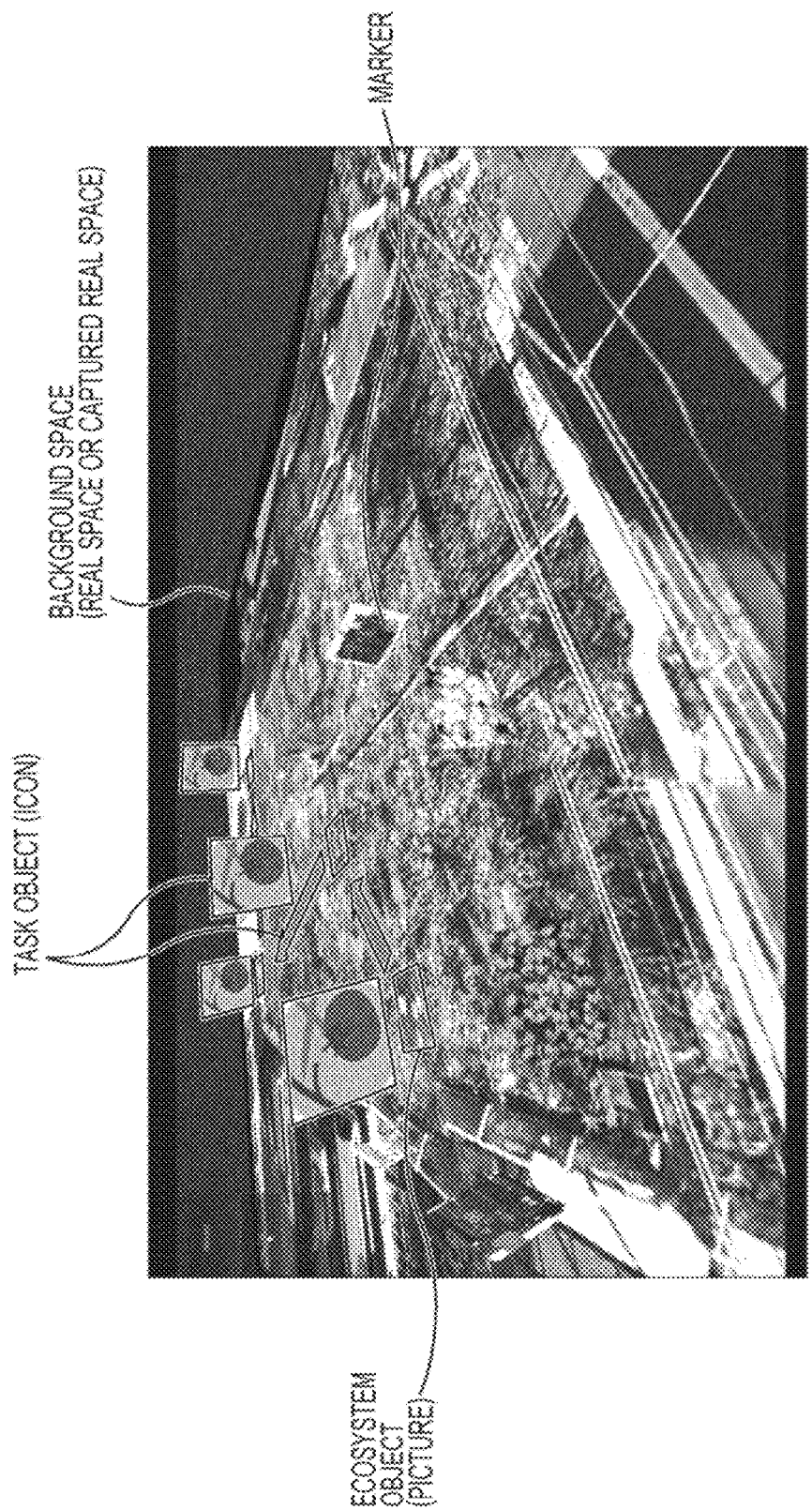
FIG. 47 is a diagram illustrating a display example of the AR display in the terminal 12.

FIG. 47 is a diagram illustrating a display example of the AR display in the terminal 12.

In FIG. 47, a real space or a captured real space of a certain agricultural field is used as a background space, and the AR object is displayed in the background space in a superimposed manner.

That is, in FIG. 47, as with FIG. 44, in the terminal 12, for example, a real space or a captured real space of a real agricultural field is used as a background space, and a picture as the ecosystem object is displayed (exists) in the background space according to the marker.

Further, in FIG. 47, in the terminal 12, the task object is displayed (exists) in the background space of the agricultural field.

In FIG. 47, an icon on which the fruit is displayed, and an arrow-like icon are displayed as the task object.

The icon as the task object, on which the fruit is displayed, indicates a task of harvesting the vegetation indicated by the ecosystem object close to the task object.

Therefore, in the real agricultural field, the user of the agricultural field observes the icon as the task object, on which the fruit is displayed, and thus, is capable of recognizing that the vegetation indicated by the ecosystem object close to the task object is planned to be harvested.

As with the icon as the task object, on which the fruit is displayed, the arrow-like icon as the task object indicates the task of harvesting the vegetation and a harvest order.

In the real agricultural field, the user of the agricultural field observes the arrow-like icon as the task object, and thus, is capable of recognizing the order of harvesting the vegetation.

Figure 48:
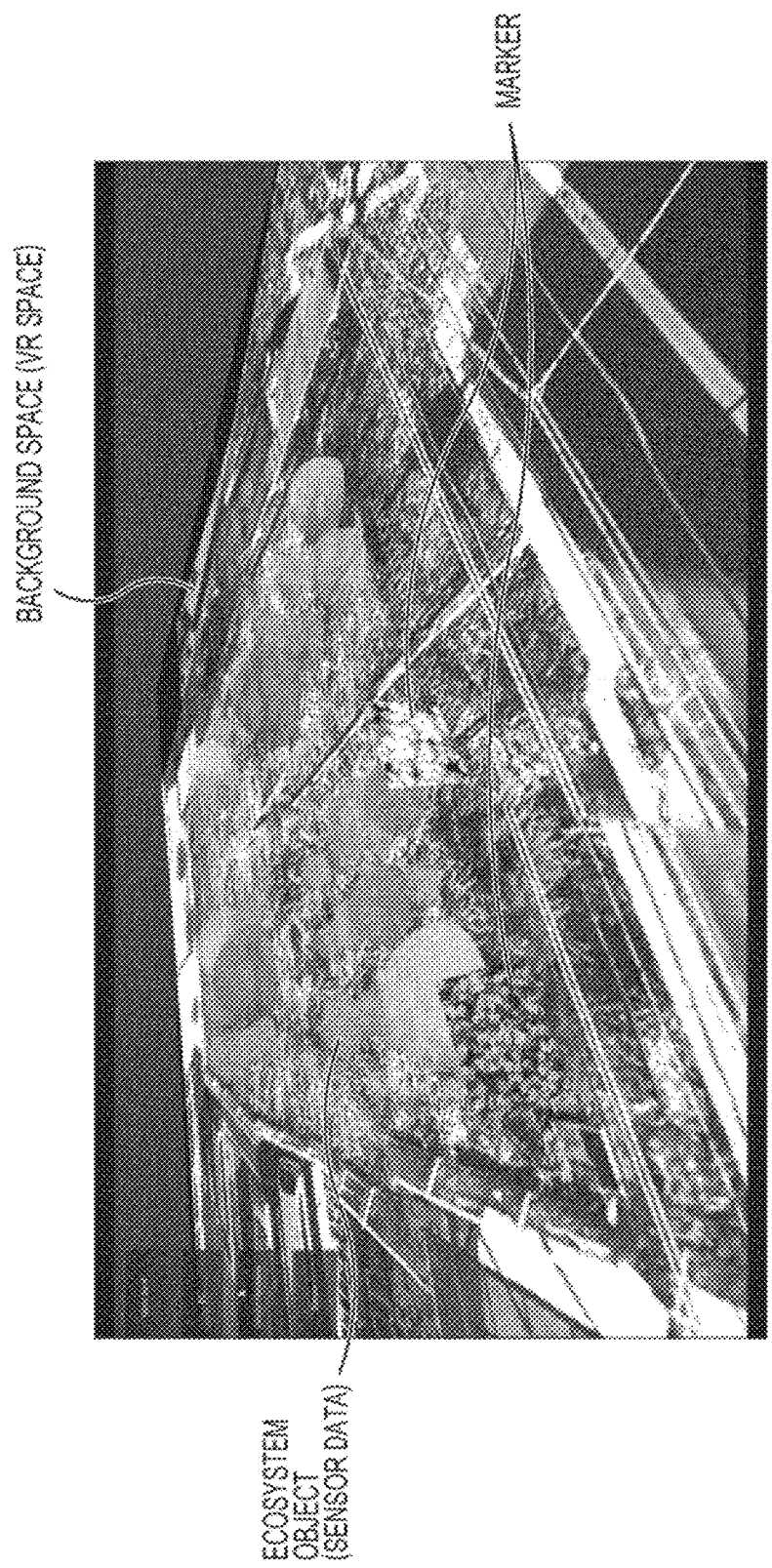
FIG. 48 is a diagram illustrating a display example of the VR display in the terminal 12.

FIG. 48 is a diagram illustrating a display example of the VR display in the terminal 12.

In FIG. 48, a VR space of a certain agricultural field is used as a background space, and the ecosystem object indicating the sensor data is displayed in the background space according to the marker.

In the agricultural field, for example, environment information of the agricultural field, such as a concentration of a nitric acid, an electric conductivity, and a soil hardness in the soil of each location, is sensed by the sensor device 11, and in FIG. 48, the ecosystem object indicating the sensor data obtained by the sensing is displayed in a position in the background space corresponding to the real position where the sensor data is obtained, according to the marker.

In FIG. 48, for example, a semispherical symbol is adopted as the ecosystem object of the sensor data.

The semispherical symbol, for example, can be displayed in a size or a color strength according to the value of the sensor data such as the concentration of a nitric acid, the electric conductivity, and the soil hardness. In addition, the semispherical symbol, for example, can be displayed in a color according to the type of the sensor data such as the concentration of a nitric acid, the electric conductivity, and the soil hardness.

In a distant place separated from the agricultural field, the teacher user, for example, observes the ecosystem object of the sensor data using the agricultural field as a background space, and thus, is capable of recognizing the environment of the agricultural field, and of advising the student user of the agricultural field against vegetation design suitable for the environment, a change in the environment, and the like.

Furthermore, as described above, in the background space, the ecosystem object which is associated with the marker, is displayed in the relative position based on the marker, but positional information indicating an absolute position such as the GPS coordinates can be associated with the ecosystem object, and the ecosystem object can be displayed in the absolute position indicated by the positional information.

Figure 49:
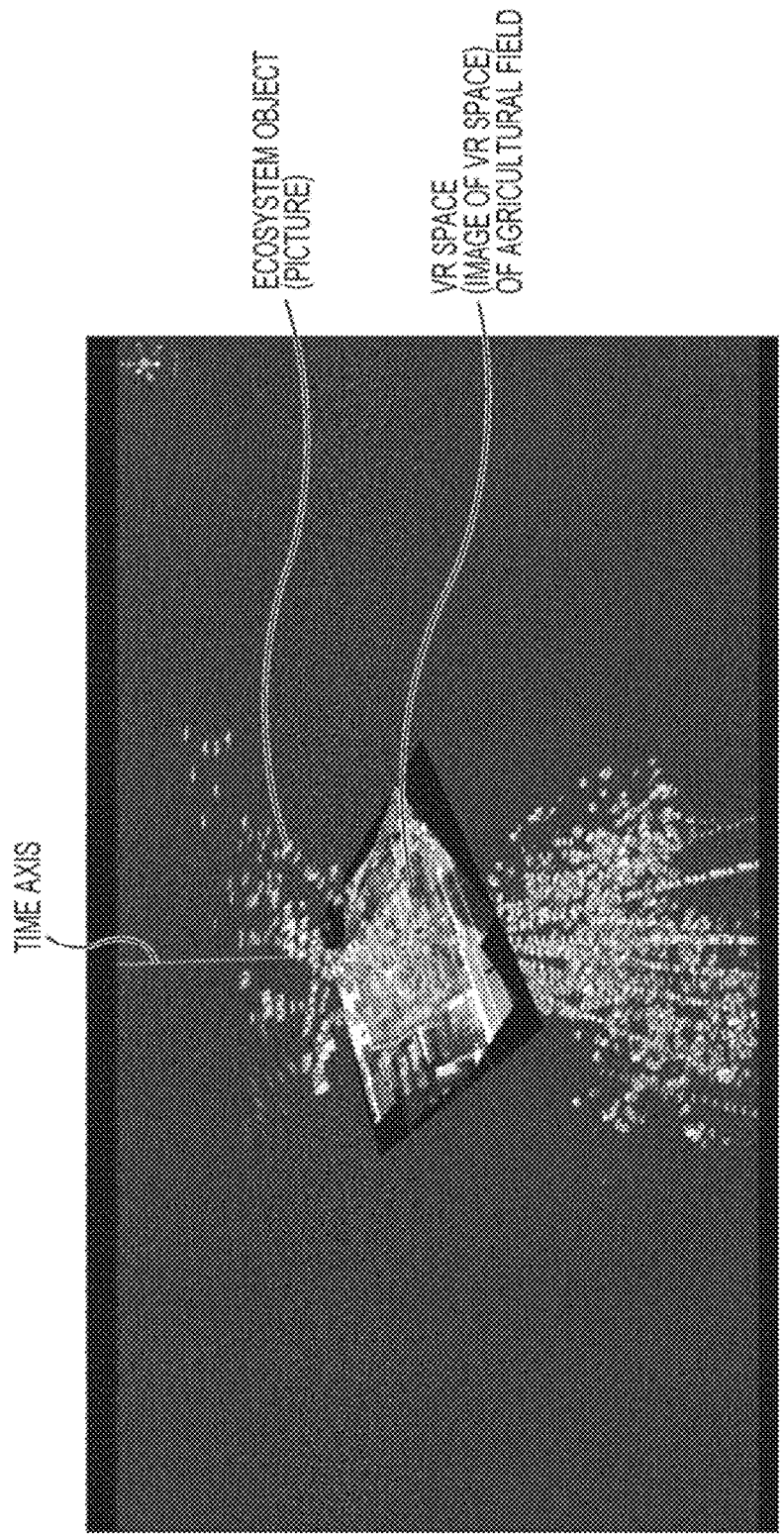
FIG. 49 is a diagram illustrating a display example of display in a time-lapse mode of an ecosystem object in the terminal 12.

FIG. 49 is a diagram illustrating a display example of display in a time-lapse mode of the ecosystem object in the terminal 12.

In the time-lapse mode, in the terminal 12, an ecosystem object of a picture captured in one location (range) of a certain agricultural field or the like is displayed along one axis, that is, for example, along a time axis.

In FIG. 49, for example, a direction directed towards an upper side from a lower side is set to the elapse of time, and thus, a time axis in a log scale is provided.

Further, in FIG. 49, an agricultural field in a predetermined position is used as an attention agricultural field, and a VR space (an image of the VR space) of the attention agricultural field is displayed in a position where the time axis is approximately bisected.

Then, an ecosystem object of a picture captured in the attention agricultural field is displayed in spiral arrangement, along the time axis.

Here, for example, a current location of the terminal 12 (the user of the terminal 12), or an agricultural field in a position designated by operating the terminal 12 by the user can be adopted as the attention agricultural field. In addition, for example, an agricultural field in which a picture as an ecosystem object designated by operating the terminal 12 by the user of the terminal 12 is captured can be adopted as the attention agricultural field.

Here, in a case where data of the position of the time axis in which the VR space of the attention agricultural field is displayed is set to an attention date, in the display of the time-lapse mode, in the position where the VR space of the attention agricultural field is displayed, the ecosystem object of the picture captured in the attention agricultural field on the attention date is displayed.

Then, in a position lower than the position in which the VR space of the attention agricultural field is displayed, the ecosystem object of the picture captured in the attention agricultural field in the past from the attention date is displayed. In addition, in a position upper than the position in which the VR space of the attention agricultural field is displayed, the ecosystem object of the picture captured in the attention agricultural field in the future from the attention date is displayed.

The attention date, for example, can be changed by subjecting a drag (swipe) operation with respect to a display screen in the display of the time-lapse mode of FIG. 49 in a perpendicular direction.

In addition, the user operates the terminal 12, and thus, it is possible to select any one ecosystem object of the ecosystem objects of the picture displayed in the time-lapse mode as a selected object.

Here, in the server 12, associated information which is associated with an ecosystem constituent indicated by the ecosystem object can be linked to the ecosystem object. Information stored in a DB (hereinafter, also referred to as a CMS database) such as the Synecoculture (registered trademark) DB that the Synecoculture (registered trademark) CMS 71 is capable of accessing, and information which is the node of the relationship graph can be adopted as the associated information.

In the terminal 12, in a case where the selected object is selected, the associated information linked to the selected object can be displayed.

In addition, in the terminal 12, information associated with the other agricultural field (the other agricultural farm) in which an ecosystem constituent indicated by the selected object exists, can be displayed.

That is, in the terminal 12, for example, in a case where the ecosystem constituent indicated by the selected object is vegetation, it is possible to perform same vegetation agricultural field information display of displaying the information of the other agricultural field close to the attention agricultural field, in which the same vegetation as the vegetation exists.

Figure 50:
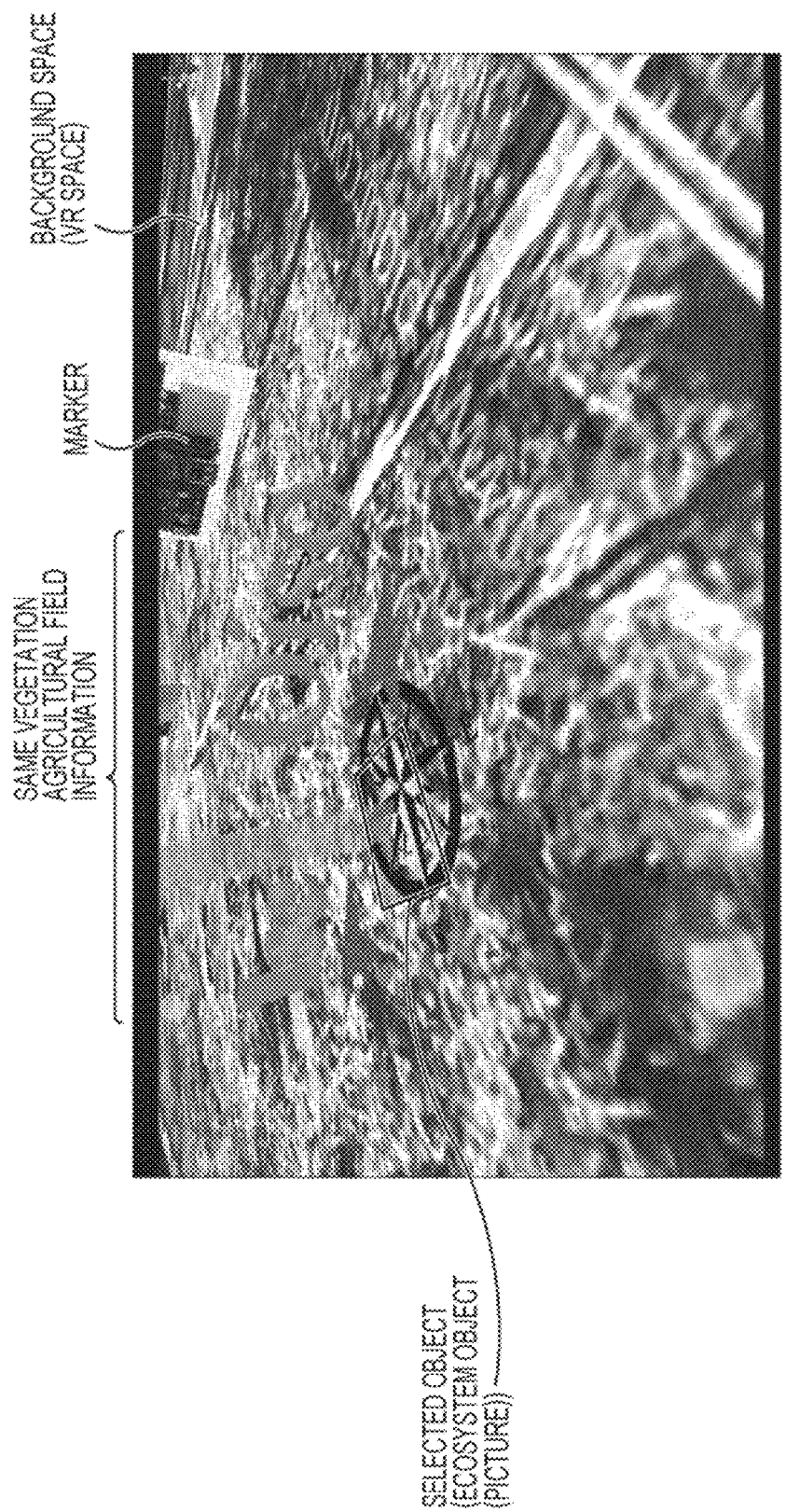
FIG. 50 is a diagram illustrating a display example of same vegetation agricultural field information display performed by the terminal 12.

FIG. 50 is a diagram illustrating a display example of the same vegetation agricultural field information display performed by the terminal 12.

In FIG. 50, the VR space of display example of the same vegetation agricultural field information display performed by the is used as a background space, and the ecosystem object of the picture as the selected object is displayed in the background space in a superimposed manner.

That is, in FIG. 50, as with FIG. 48 or the like, in the terminal 12, for example, the VR space in which the real agricultural field is modeled, is used as a background space, and the picture as the ecosystem object is displayed (exists) in the background space according to the marker.

Further, in FIG. 50, in the terminal 12, same vegetation agricultural field information which is the information of the other agricultural field the same vegetation as vegetation indicated by the selected object of the attention agricultural field exists, is displayed in the background space in a superimposed manner.

The same vegetation agricultural field information of FIG. 50, includes a character strings "Ise" and "Oiso" indicating that there are agricultural fields (agricultural farms) of Ise and Oiso, as the other agricultural field close to the attention agricultural field, in which the same vegetation as the vegetation indicated by the selected object of the attention agricultural field exists. Further, the same vegetation agricultural field information of FIG. 50 includes an arrow indicating that the agricultural field of Ise is positioned in a left depth direction of the background space in the same vegetation agricultural field information display of FIG. 50, and an arrow indicating that the agricultural field of Oiso is positioned in a right hand direction of the background space in the same vegetation agricultural field information display of FIG. 50.

The user observes the same vegetation agricultural field information of FIG. 50, and thus, it is possible to easily recognize the other agricultural field in which the same vegetation as that the vegetation indicated by the selected object exists.

The user operates the terminal 12, and thus, it is possible to select the other agricultural field displayed in the same vegetation agricultural field information display of FIG. 50 as a selected agricultural field.

In the terminal 12, in a case where the user selects the other agricultural field as the selected agricultural field, the display of the display unit 35 is transitioned to the display of the selected agricultural field from the same vegetation agricultural field information display of the attention agricultural field of FIG. 50, through predetermined transition display.

Accordingly, for example, a user of a certain agricultural field A is capable of easily confirming a state of the other agricultural field B in which the same vegetation as vegetation existing in the agricultural field A exists.

In addition, for example, the teacher user is capable of comparing the state of the certain agricultural field A with the state of the other agricultural field B in which the same vegetation as the vegetation existing in the agricultural field A exists, and of contributing to the vegetation design or the like.

Figure 51:
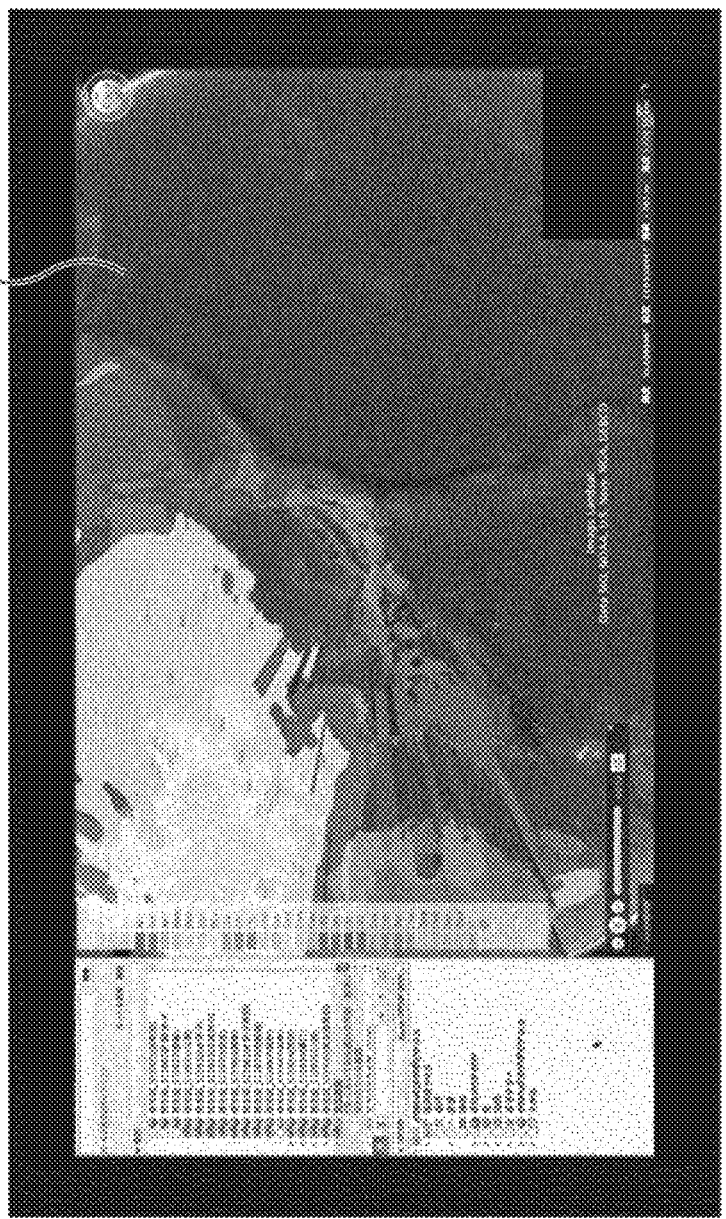
FIG. 51 is a diagram illustrating a display example of transition display performed by the terminal 12.

FIG. 51 is a diagram illustrating a display example transition display performed by the terminal 12.

In the transition display, a screen which is gradually drawn out from the display of the attention agricultural field of FIG. 50 is obtained, and after that, an overview screen overviewing a country which is the attention agricultural field or the entire planet earth is obtained. Then, in the transition display, a screen gradually approaching to the selected agricultural field from the overview screen is obtained, and finally, the display of the selected agricultural field, that is, and display in which the VR space of the selected agricultural field is set to the background space, is obtained.

FIG. 51 illustrates an example of the overview screen which is one scene of the transition display as described above.

The entire Japan (and a part of the Eurasia continent) is displayed on the overview screen of FIG. 51. Further, in the overview screen, environment information such as an atmospheric temperature or a rainfall amount of a district is displayed in a position of each district seen on the overview screen by a bar graph or a color.

Therefore, the user observes the transition display, and thus, for example, is capable of visually grasping the environment of the attention agricultural field and the selected agricultural field, or the outline of the environment of the district from the attention agricultural field to the selected agricultural field.

Furthermore, in the transition display, for example, it is possible to use Google Earth (registered trademark) provided by Google Inc.

Figure 52:
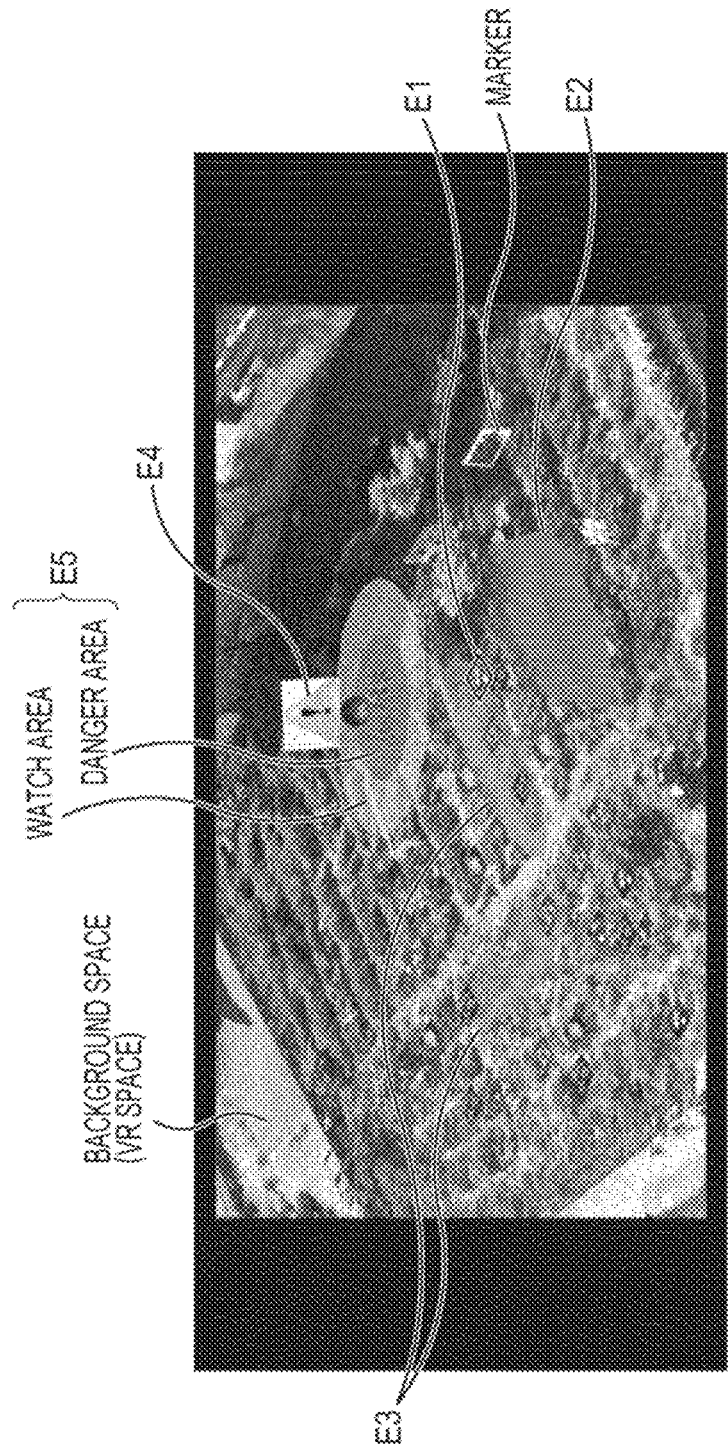
FIG. 52 is a diagram illustrating a display example of display of a selected agricultural field finally reached through the transition display.

FIG. 52 is a diagram illustrating a display example of the display of the selected agricultural field finally reached through the transition display of FIG. 51.

That is, FIG. 52 illustrates a display example of the VR display in the terminal 12.

In FIG. 52, the VR space of the selected agricultural field is used as a background space, and ecosystem objects E1, E2, E3, E4, and E5 are displayed in the background space according to the marker.

The ecosystem object E1, for example, is an ecosystem object of a picture obtained by capturing vegetation as an ecosystem constituent, and is displayed in the position of the vegetation.

The ecosystem objects E2 and E3, for example, are an ecosystem object of an icon indicating the quality of soil as an ecosystem constituent (for example, easiness or difficulty in the growing of the vegetation, or the like), and are displayed in the position of the corresponding soil.

The ecosystem object E4, for example, is an ecosystem object of an icon indicating a bee-hive as an ecosystem constituent, and is displayed in a position where the bee-hive exists.

The ecosystem object E5, for example, is an ecosystem object of an icon indicating a dangerous area or an area to be watched of the agricultural field as an ecosystem constituent, and is displayed in the position (the range) of the dangerous area (a danger area) or the area to be watched (a watch area).

In FIG. 52, a circular area around the bee-hive indicated by the ecosystem object E4 is the danger area and the watch area indicated by the ecosystem object E5.

Furthermore, in the danger area and the watch area, a dangerous extent is higher in the danger area than in the watch area.

In FIG. 52, in the circular area around the bee-hive indicated by the ecosystem object E4, a donut-like area of an outer circumference portion is the watch area, and a circular area of a center portion is the danger area.

Furthermore, in FIG. 52, the VR display is performed, but the ecosystem objects E1 to E5 of FIG. 52 can be subjected to the AR display in the selected agricultural field.

In this case, the user who actually performs an operation in the selected agricultural field, for example, observes the ecosystem objects E2 and E3 indicating the quality of the soil, and thus, is capable of considering a location where the vegetation is planted.

Further, the user, for example, observes the ecosystem object E4 indicating the bee-hive, the ecosystem object E5 indicating the danger area and the watch area, and thus, is capable of safely performing an operation by avoiding the bees.

Furthermore, in a case where the user of the terminal 12 actually performs an operation in the selected agricultural field, the user is capable of being notified that the user enters the danger area or the watch area with a sound or a vibration by the terminal 12 when the user enters the danger area or the watch area, without realizing the ecosystem object E4 indicating the bee-hive or the ecosystem object E5 indicating the danger area and the watch area.

Figure 53:
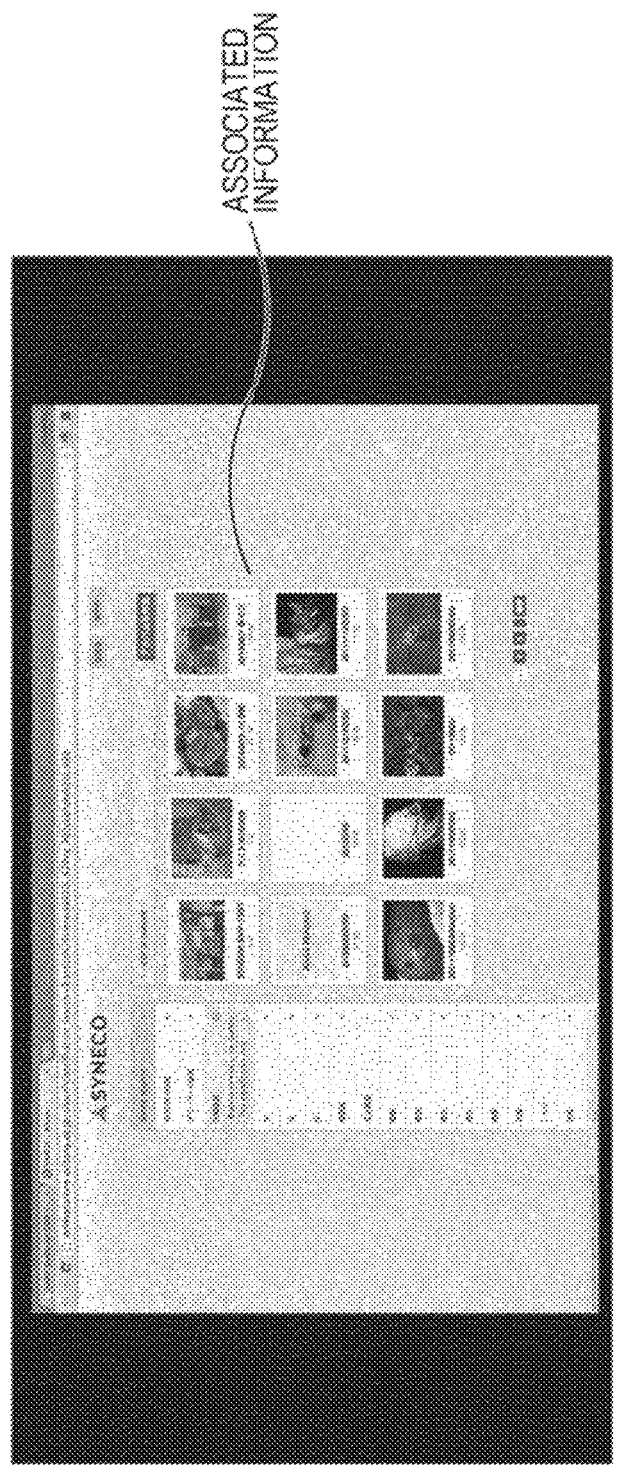
FIG. 53 is a diagram illustrating a display example of associated information in the terminal 12.

FIG. 53 is a diagram illustrating a display example of the associated information in the terminal 12.

As described in FIG. 49, the ecosystem object can be linked to the associated information which is associated with the ecosystem constituent indicated by the ecosystem object in the information of the CMS database such as the Synecoculture (registered trademark) DB.

Then, in the display of the time-lapse mode of FIG. 49, in a case where the user selects a certain ecosystem object as a selected object, in the terminal 12, it is possible to display the associated information which is linked to the selected object.

FIG. 53 illustrates a display example of the associated information which is displayed on the terminal 12 as described above.

In FIG. 53, a list of the associated information items is displayed in the format of a webpage.

Figure 54:
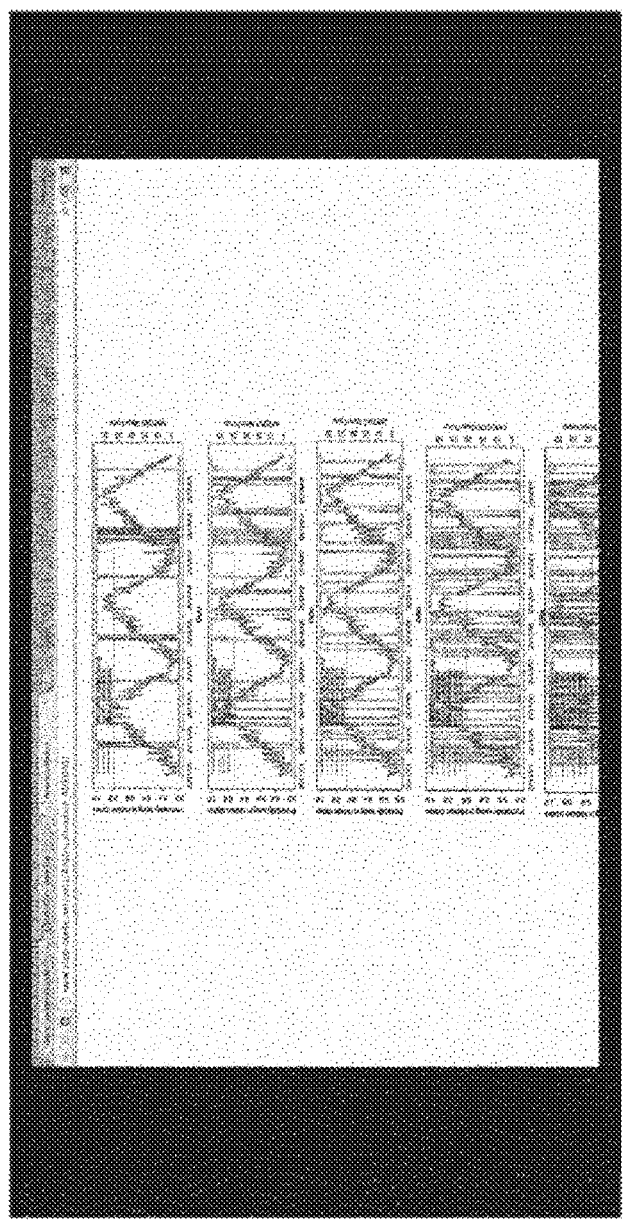
FIG. 54 is a diagram illustrating a display example of an analysis result of sensor data in the terminal 12.

FIG. 54 is a diagram illustrating a display example of an analysis result of the sensor data in the terminal 12.

The terminal 12, for example, is capable of requiring the server 13 to perform various analysis items with respect to the sensor data according to the operation of the user.

In the server 13 (FIG. 4), the analysis unit 76 analyzes the sensor data according to a request or the like from the terminal 12, and provides (transmits) the analysis result to the terminal 12.

In the terminal 12, the analysis result of the sensor data which is provided from the server 13 is displayed.

In the server 13, in the analysis unit 76, for example, analysis or the like can be performed by dividing one year, for example, into three seasons, four seasons, five seasons, or the like, according to the environment information such as an atmospheric temperature, and FIG. 54 illustrates a display example of an analysis result of such analysis.

<Copy of Ecosystem Object>

Figure 55:
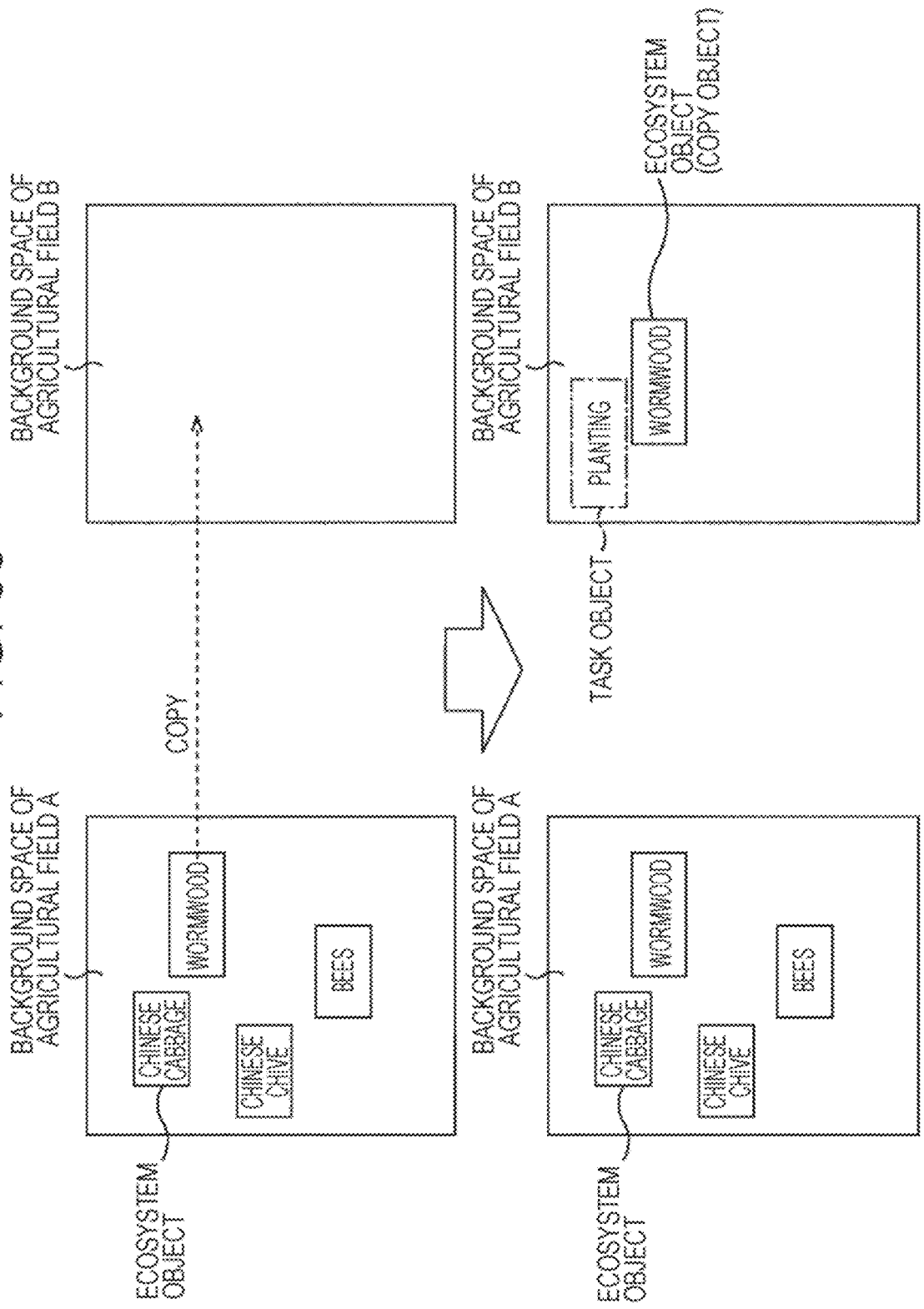
FIG. 55 is a diagram illustrating copy of the ecosystem object.

FIG. 55 is a diagram illustrating the copy of the ecosystem object.

In the server 13 (FIG. 4), in the editing unit 75, it is possible to edit the AR object which is registered in the storage 63 according to the operation of the terminal 12 by the user.

The editing of the AR object, for example, includes the copy of the ecosystem object. In the copy of the ecosystem object, for example, the ecosystem object of the certain agricultural field A is copied to the other agricultural field B.

In the case of copying the ecosystem object, in the terminal 12, for example, the VR display is performed by using each of VR spaces of two agricultural fields A and B as a plurality of agricultural fields as a background space.

In FIG. 55, in the agricultural field A, the Chinese cabbage, the wormwood, the Chinese chive, and the bees as an ecosystem constituent are observed, and ecosystem objects indicating each of the ecosystem constituents are arranged in the position of the background space of the agricultural field A in which each of the ecosystem constituents is observed.

On the other hand, an ecosystem object has not been applied yet to the agricultural field B, and thus, the ecosystem object is not provided in the background space of the agricultural field B.

In the server 13, as described above, in the terminal 12, the copy of the ecosystem object, for example, is performed according to the operation of the user of the terminal 12 operation, in a state where two or more agricultural fields such as two agricultural fields A and B are subjected to the VR display.

That is, the user of the terminal 12 performs a copy operation of designating the ecosystem object which is a copy target, and designating the position of a copy destination of the ecosystem object.

For example, in the ecosystem objects of the agricultural field A, in a case where the ecosystem object indicating the wormwood is copied to the agricultural field B, the user of the terminal 12 drags the ecosystem object indicating the wormwood of the agricultural field A to the background space of the agricultural field B, and thus, is capable of designating the ecosystem object which is the copy target, and of designating the position of the copy destination of the ecosystem object.

That is, in this case, in the terminal 12, the dragged ecosystem object indicating the wormwood of the agricultural field A is registered as the ecosystem object which is the copy target, and the position in the background space of the agricultural field B where the dragging is ended, is recognized as the position of the copy destination of the ecosystem object.

For example, in a case where a user of the agricultural field B observes the wormwood in the agricultural field B, in the ecosystem objects of the agricultural field A, the ecosystem object indicating the wormwood can be copied to a position where the wormwood of the agricultural field B is observed. In this case, the user of the agricultural field B is capable of easily applying the ecosystem object indicating the wormwood to the wormwood of the agricultural field B.

In addition, for example, in a case where the teacher user, for example, instructs the student user performing an operation in the agricultural field B, to plant the wormwood as the advice of the vegetation design, in the ecosystem objects of the agricultural field A, the ecosystem object indicating the wormwood can be copied to a position in the agricultural field B where the wormwood is planned to be planted. In this case, the teacher user is capable of easily advising the student user against the planting of the wormwood.

Here, for example, as described above, in a case where the teacher user copies the ecosystem object in order to advise the student data, in the server 13, a task object indicating a task to be performed with respect to the ecosystem constituent indicated by the ecosystem object of the copy target can be added (registered).

That is, for example, in a case where the ecosystem object indicating the wormwood is not applied to the agricultural field B, in the server 13, the editing unit 75 specifies a task to be performed with respect to the wormwood indicated by the ecosystem object copied to the agricultural field B (hereinafter, also referred to as a copy object) when the ecosystem object indicating the wormwood of the agricultural field A is copied to the agricultural field B.

Then, the editing unit 75 generates the task object indicating the task to be performed with respect to the wormwood (allows the generation unit 73 to generate the task object), and registers the task object in the storage 63.

Further, in the server 13, the AR/VR display control unit 74 displays the task object registered in the storage 63 on the terminal 12.

Accordingly, in the terminal 12, the task object indicating the task to be performed with respect to the wormwood is displayed to be close to an ecosystem object as the copy object indicating the wormwood of the agricultural field B.

In FIG. 55, a task object indicating the planting of the wormwood is displayed as the task to be performed with respect to the wormwood.

As described above, the ecosystem object as the copy object indicating the wormwood and the task object indicating the planting, which are applied to the agricultural field B are capable of performing the AR display in the terminal 12 of the user of the agricultural field B when the user of the agricultural field B actually performs an operation in the agricultural field B.

In this case, the user of the agricultural field B observes the ecosystem object as the copy object indicating the wormwood and the task object indicating the planting, and thus, is capable of easily recognizing that the wormwood is planned to be planted in a position where the copy object indicating the wormwood is displayed.

Furthermore, in FIG. 55, a case where the ecosystem object of the agricultural field A is copied to the other agricultural field B, is described, and for example, an ecosystem object in a certain position of the agricultural field A can be copied to the other position of the agricultural field A, as the copy of the ecosystem object.

<Change of Display Scale>

Figure 56:
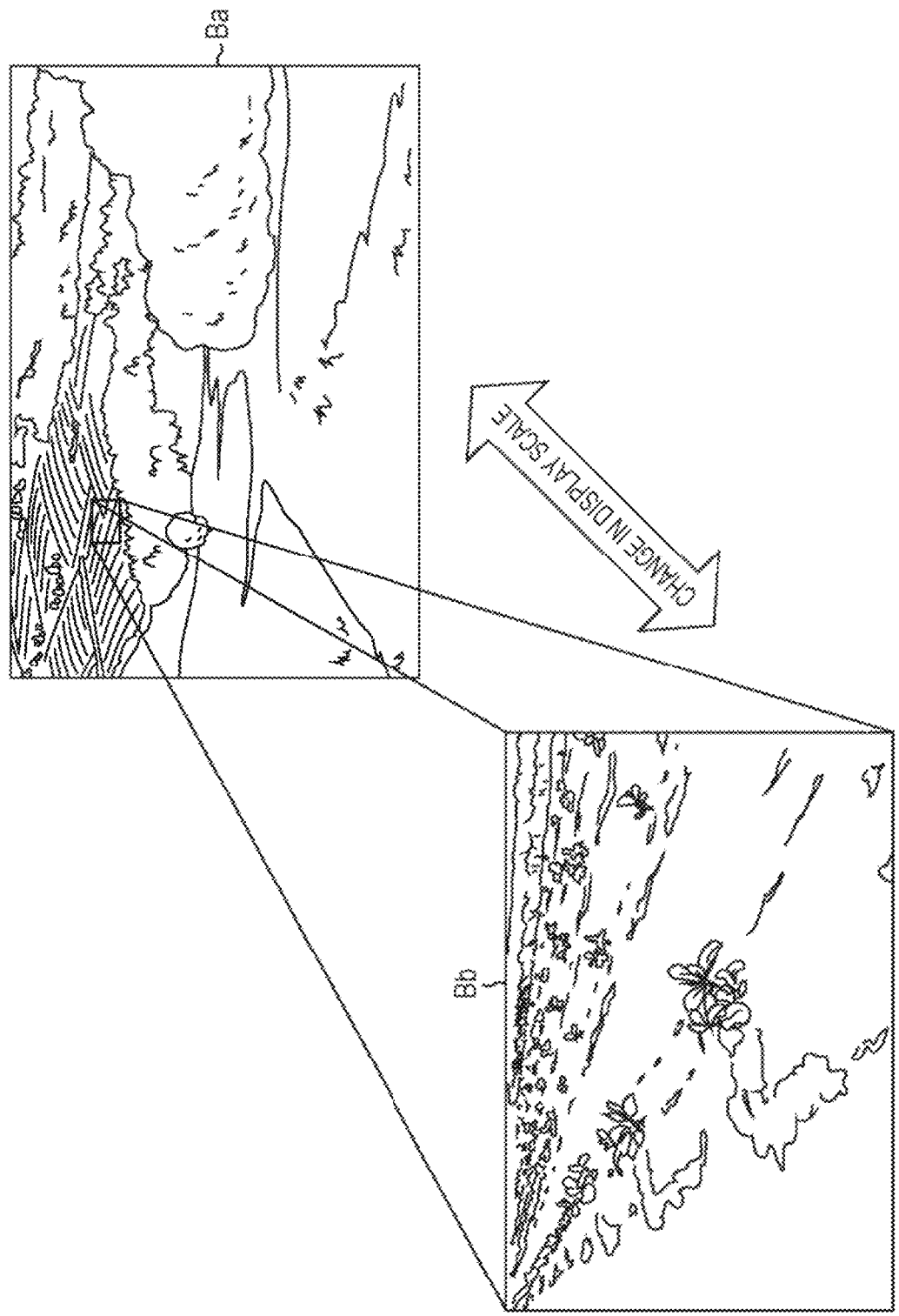
FIG. 56 is a diagram illustrating an example of a change in a display scale of a background space in the terminal 12.

FIG. 56 is a diagram illustrating an example of a change in a display scale of the background space in the terminal 12.

In the terminal 12, in a case where the AR display or the VR display is performed by using a captured real space or a VR space as a background space, the display scale of the background space (an image of the background space) can be changed according to the operation or the like of the user.

FIG. 56 illustrates an example of a background space Ba in which a reduction scale as the display scale is small, and a background space Bb in which the reduction scale is large.

In FIG. 56, the background space Ba is an image obtained by overviewing a certain agricultural field, and the background space Bb is an image obtained by enlarging a part of the background space Ba.

Figure 57:
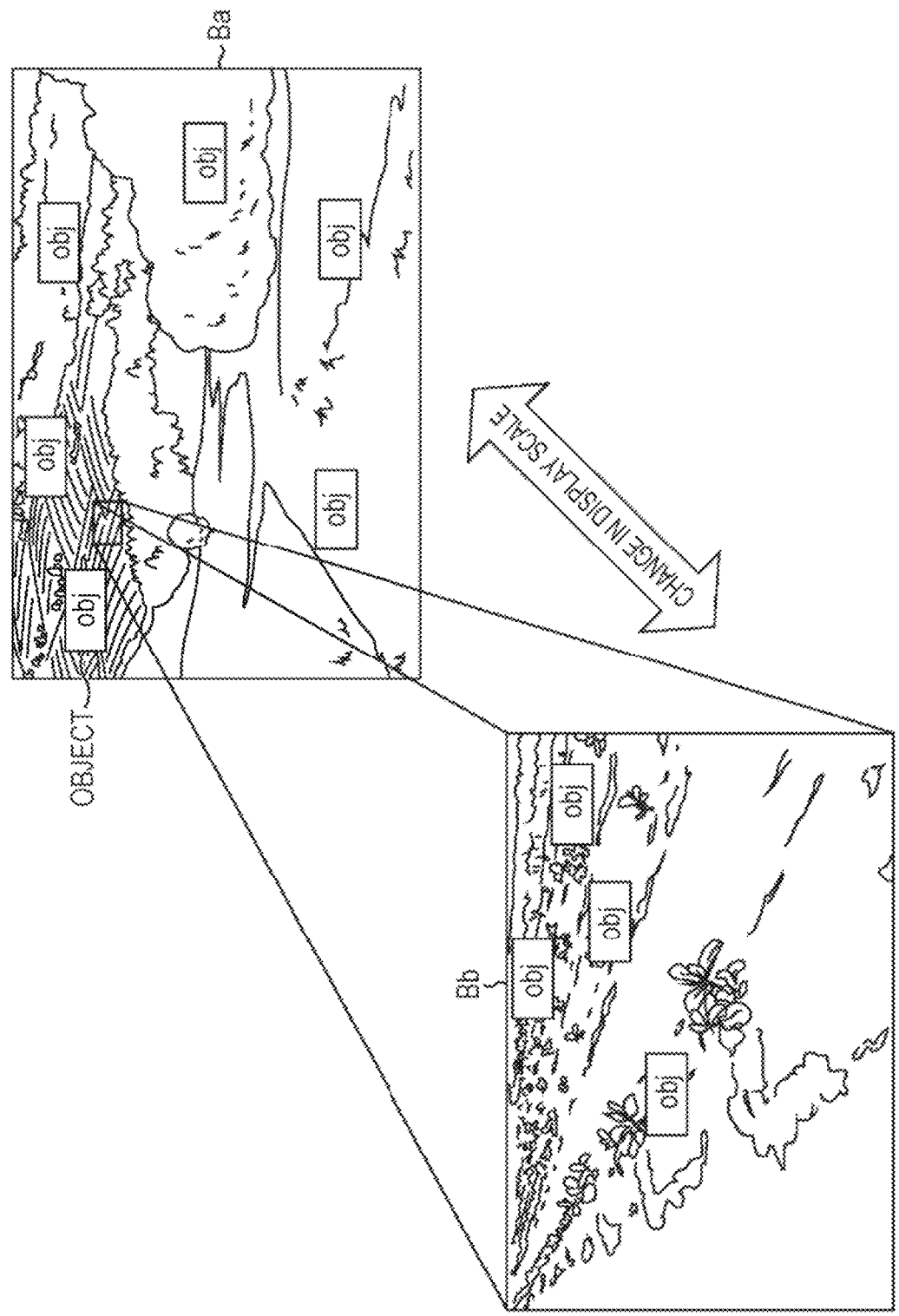
FIG. 57 is a diagram illustrating an example of a change in the display of the AR object according to the change in the display scale of the background space in the terminal 12.

FIG. 57 is a diagram illustrating an example of a change in the display of the AR object according to the change in the display scale of the background space in the terminal 12.

In FIG. 57, the AR object (the ecosystem object and the task object) is displayed in the same background space Ba or Bb as that of FIG. 56, in a superimposed manner.

Here, in a case where all AR objects applied to the agricultural field are displayed in the background space Ba, which is the image obtained by overviewing a certain agricultural field, in a superimposed manner, the number of AR objects is excessively large, and thus, there is a case where it is difficult to see the display.

Therefore, in a case where the reduction scale as the display scale is small, that is, for example, in a case where the background space Ba, which is the image obtained by overviewing a certain agricultural field, is displayed, the AR object to the agricultural field seen in the background space Ba can be displayed to be thinned out.

In addition, in a case where the reduction scale as the display scale is large, that is, for example, in a case where the background space Bb, which is the image obtained by enlarging a part of the background space Ba, is displayed, the AR object applied to the agricultural field seen in the background space Bb can be displayed without being thinned out.

As described above, in a case where the reduction scale as the display scale is small, the AR object is displayed to be thinned out, and thus, it is possible to prevent the number of AR objects from being excessively large, and the display from being hardly seen.

Furthermore, the degree of the thinning of the AR object, for example, can be set according to the display scale or the number of AR objects applied to the agricultural field seen in the background space.

In addition, in the thinning of the AR object, the maximum number of AR objects displayed on one screen is set, and the thinning of the AR object can be performed such that the number of AR objects is less than or equal to the maximum number.

<VR Display Using each of Plurality of Agricultural Fields as Background Space>

Figure 58:
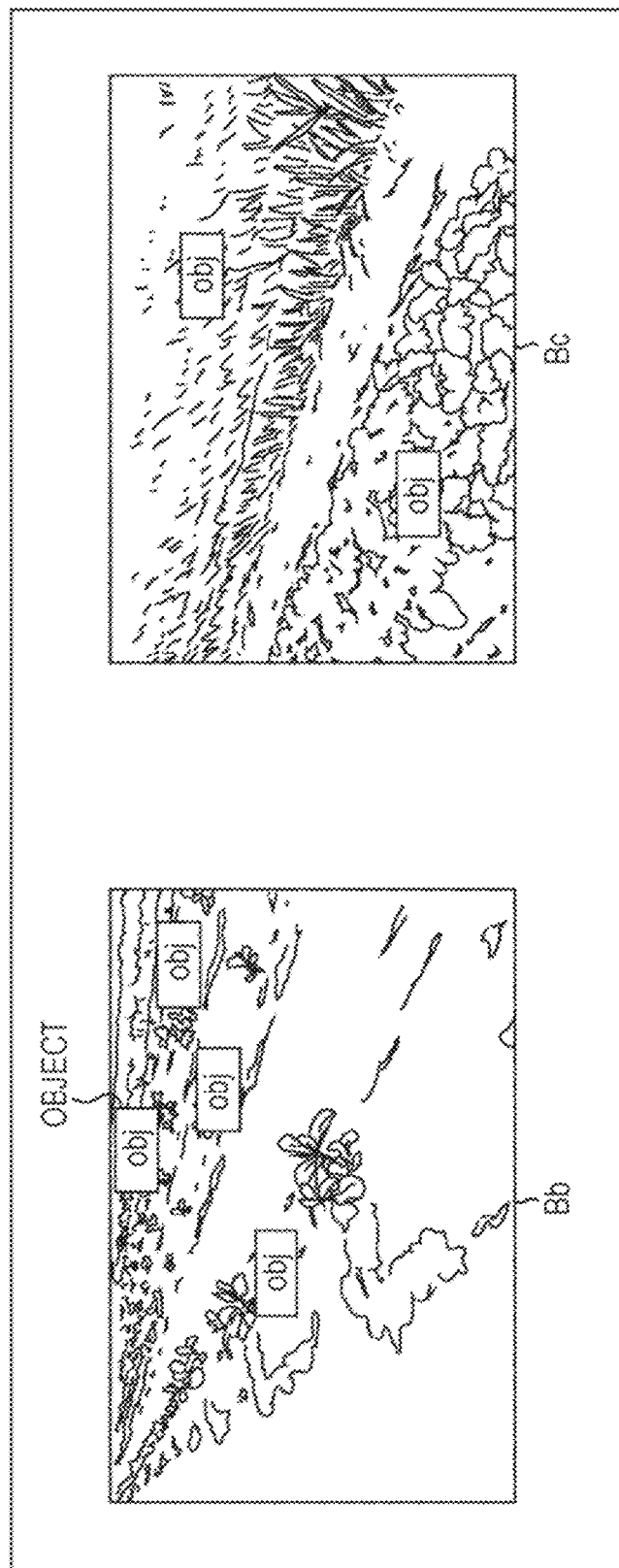
FIG. 58 is a diagram illustrating an example of the VR display using each of a plurality of agricultural fields as a background space.

FIG. 58 is a diagram illustrating an example of the VR display using each of a plurality of agricultural fields as a background space.

As described in the copy of the ecosystem object in FIG. 55, in the terminal 12, it is possible to perform the VR display by using each VR space of two agricultural fields as a background space.

Further, in the terminal 12, the number of agricultural fields is not limited to 2, but it is possible to simultaneously perform the VR display by using each VR space of three of more agricultural fields as a background space.

In the terminal 12, in a case where the VR display is performed by using each VR space of a plurality of agricultural fields as a background space, the VR displays of each of the plurality of agricultural fields can be displayed side by side.

In FIG. 58, the background spaces Bb and Bc where each of two agricultural fields is seen, are subjected to the VR display side by side.

In the terminal 12, as described above, the VR displays of each of the plurality of agricultural fields are displayed in side by side, and for example, the VR displays each of the plurality of agricultural fields can be displayed in a superimposed manner at a predetermined permeation rate.

In the terminal 12, the VR display is performed by using each of the VR spaces of the plurality of agricultural fields as a background space, and thus, for example, it is possible to easily compare types of vegetation or the like existing in each of the plurality of agricultural fields.

Furthermore, the display scale of the background space (the VR display in which the AR object is superimposed on the background space) in which each of the plurality of agricultural fields is seen, can be changed as described in FIG. 56 and FIG. 57.

A wide agricultural field and a narrow agricultural field are displayed such that sizes on the display are coincident with each other, by changing the display scale, and thus, for example, it is possible to easily compare a vegetation distribution of the wide agricultural field with a vegetation distribution of the narrow agricultural field.

In addition, in the case of simultaneously performing the VR display using each of the plurality of agricultural fields as a background space (hereinafter, also referred to as a plurality of agricultural field displays), agricultural fields in which positions (locations) are different from each other, and agricultural fields in which positions are the same, but time is different, can be adopted as the plurality of agricultural fields which are used as a target of the plurality of agricultural field displays.

That is, in the plurality of agricultural field displays, for example, it is possible to perform the VR display by using each of the current state of a certain agricultural field, and the previous state of the agricultural field as a background space. In addition, for example, it is possible to perform the VR display by using each of a state of a certain agricultural field at the previous time point and a state of the agricultural field at the other previous time point as a background space.

In this case, for example, it is possible to easily compare types of vegetation with each other in a certain agricultural field at different time points.

<Association of Marker with Respect to Ecosystem Object>

Figure 59:
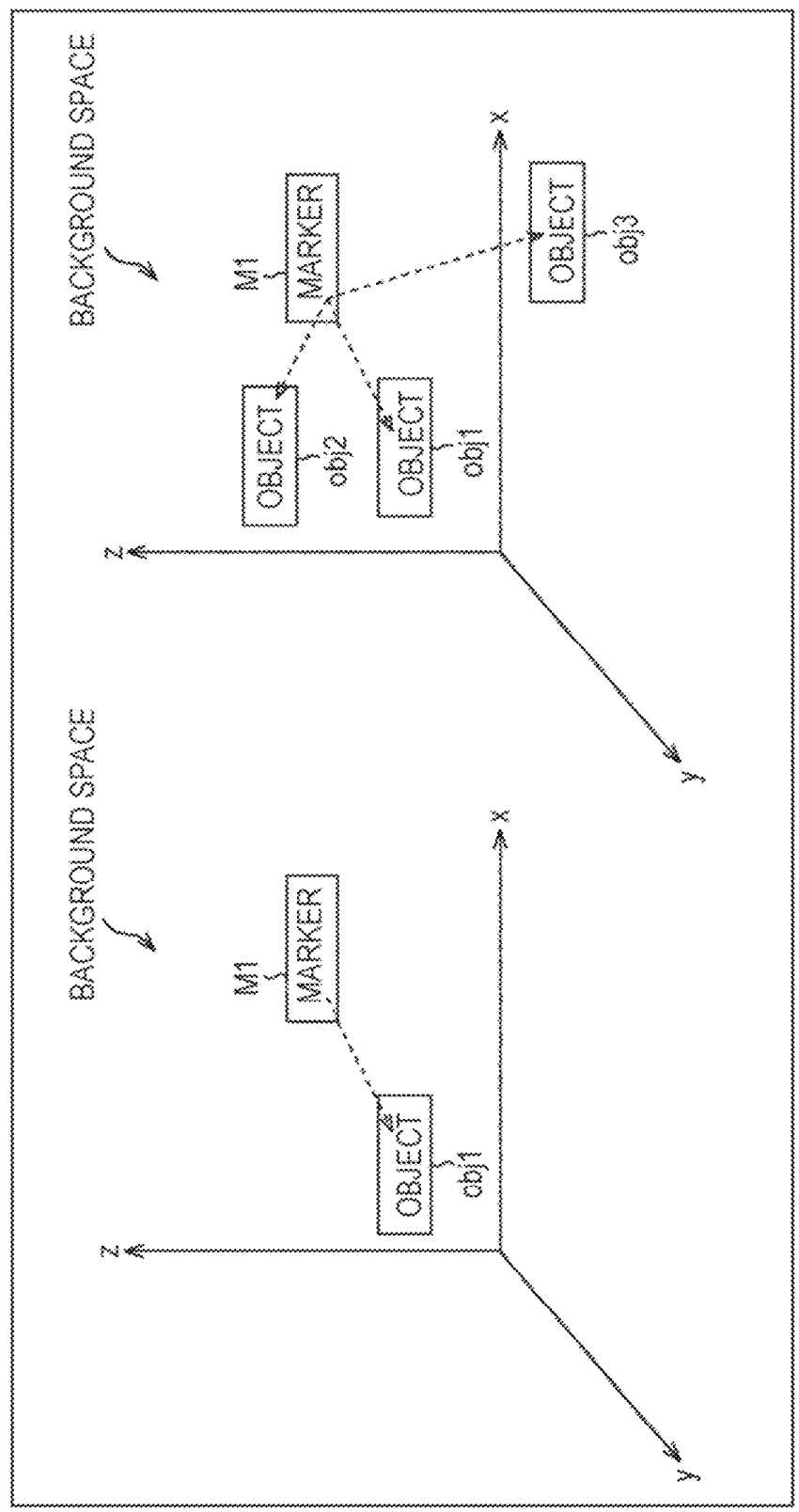
FIG. 59 is a diagram illustrating an association example of a marker with respect to the ecosystem object.

FIG. 59 is a diagram illustrating an association example of the marker with respect to the ecosystem object.

In the server 13, the generation unit 73, for example, generates an ecosystem object according to the operation of the terminal 12 by the user, and as necessary, associates a marker with ecosystem object.

As described in FIG. 44 or the like, in the terminal 12, the ecosystem object can be displayed (provided) in a relative position in the background space based on the marker associated with the ecosystem object.

As illustrated in FIG. 59, one marker M1 can be associated with one ecosystem object obj1.

Further, one marker can be associated with a plurality of ecosystem objects. That is, for example, as illustrated in FIG. 59, one marker M1 can be associated with three ecosystem objects obj1, obj2, and obj3 as the plurality of ecosystem objects.

In a case where the marker M1 is associated with one ecosystem object obj1, in the terminal 12, in a case where the marker M1 is detected from an image obtained by being captured with the camera 37, one ecosystem object obj1 associated with the marker M1 is displayed in a relative position based on the marker M1.

In addition, in a case where the marker M1 is associated with three ecosystem objects obj1 to obj3, in the terminal 12, in a case where the marker M1 is detected from the image obtained by being captured with the camera 37, three ecosystem objects obj1 to obj3 associated with the marker M1 are displayed in the relative position based on the marker M1.

The relative position based on the marker M1, displaying the ecosystem objects obj1 to obj3, can be individually set for each of the ecosystem objects obj1 to obj3.

As described above, one marker can be associated with the plurality of ecosystem objects, and thus, for example, one marker can be associated with a part or all of ecosystem objects applied to one agricultural field.

Figure 60:
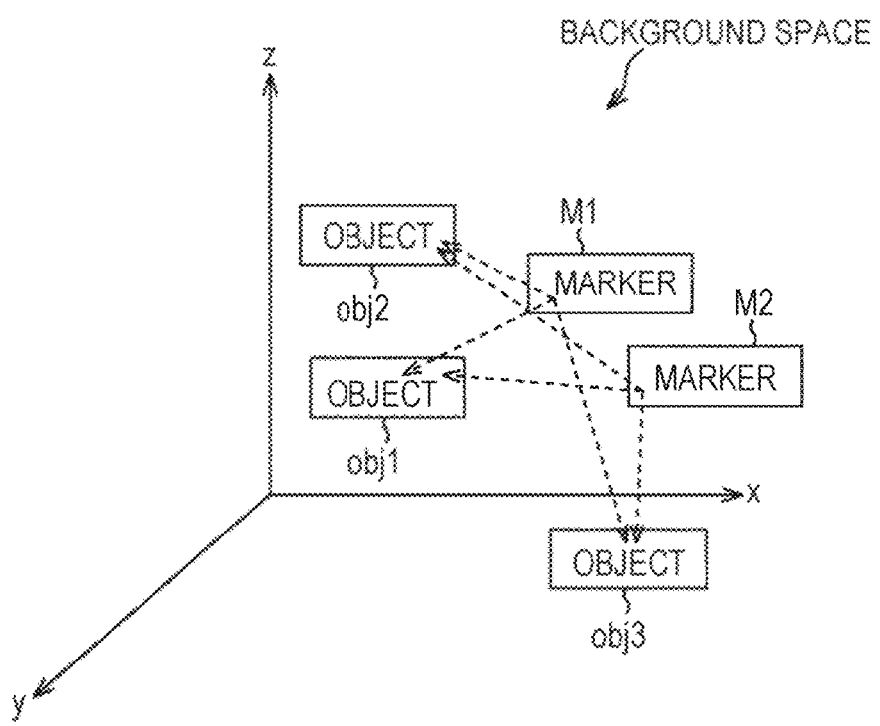
FIG. 60 is a diagram illustrating an association example of the marker with respect to the ecosystem object.

FIG. 60 is a diagram illustrating an association example of the marker with respect to the ecosystem object.

A plurality of different markers can be associated with one ecosystem object.

In FIG. 60, each of markers M1 and M2 is associated with each of the ecosystem objects obj1 to obj3.

In a case where each of the markers M1 and M2 is associated with an ecosystem object obj #i (here, i=1, 2, and 3), a relative position based on the marker M1, in which the ecosystem object obj #i is displayed, and a relative position based on the marker M2, in which the ecosystem object obj #i is displayed, are set to be in the same position, but can be set to be in different positions.

As described above, in a case where each of the markers M1 and M2 is associated with the ecosystem object obj #i, for example, the marker M1, which is one of the markers M1 and M2, can be provided in an agricultural field where an ecosystem constituent indicated by the ecosystem object obj #i exists, and the ecosystem object obj #i can be subjected to the AR display in the agricultural field.

Further, in the marker M2, which is the other of the markers M1 and M2, for example, the teacher user provides the marker M2 in an arbitrary location, and thus, the ecosystem object obj #i can be subjected to the AR display in such an arbitrary location.

Therefore, in a distant place separated from the agricultural field in which the ecosystem constituent indicated by the ecosystem object obj #i exists, the teacher user is capable of observing the ecosystem object obj #i indicating the ecosystem constituent existing in the agricultural farm.

Accordingly, in the distant place separated from the agricultural field, the teacher user is capable of easily recognizing the vegetation planted in the agricultural field or the arrangement of the vegetation in the agricultural field, and of capable advising the student user of the agricultural field, for example, against the vegetation design.

Furthermore, two different markers can be associated with the ecosystem object, and three or more different markers can be associated with the ecosystem object.

Figure 61:
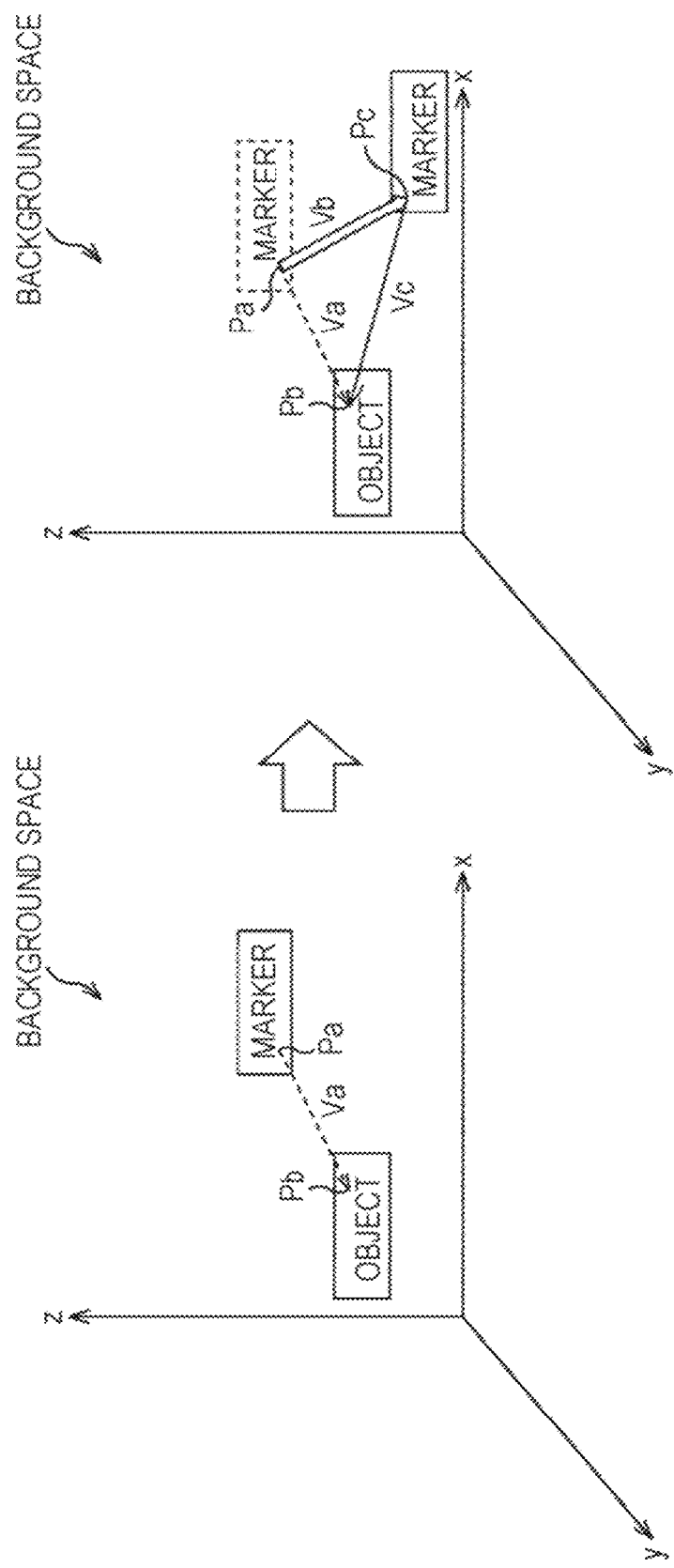
FIG. 61 is a diagram illustrating a change in a disposition position of the marker.

FIG. 61 is a diagram illustrating a change in a disposition position of the marker.

As described in FIG. 44 or the like, in the terminal 12, the ecosystem object is displayed (provided) in a relative position in the background space based on the marker associated with the ecosystem object.

In FIG. 61, the ecosystem object is displayed in a position Pb which is separated from a position Pa by only a vector Va, on the basis of the position Pa of the marker.

As described above, the ecosystem object is displayed in the relative position based on the marker, and thus, in a case where the marker is moved, an absolute position in which the ecosystem object is displayed, is also moved according to the movement of the marker.

Here, for example, in the agricultural field, there is a case where the disposition position of the marker is planned to be moved after the marker is provided.

However, in a case where the marker is moved, as described above, a position in which the ecosystem object is displayed is moved according to the movement of the marker. In this case, for example, in the AR display using the real agricultural field as a background space, the ecosystem object is displayed in a position which is not relevant to the ecosystem constituent indicated by the ecosystem object.

Therefore, the marker can be moved in a position invariant mode where a (absolute) position in which the ecosystem object associated with the marker is displayed is not changed, before and after the marker is moved.

As described above, in the marker before being moved, the ecosystem object is displayed in a position Pb separated from a position Pa of the marker by only a vector Va.

In the position invariant mode, in a case where the marker is moved from the position Pa to a position Pc by only the vector Vb, in the marker after being moved, the ecosystem object is displayed in a position separated from the position Pc after being moved, by only a vector Vc=Va−Vb.

A position Pc+Vc=(Pa+Vb)+(Va−Vb) separated from the position Pc (=Pa+Vb) of the marker after being moved by only the vector Vc (=Va−Vb) is a position Pb=Pa+Va separated from the position Pa of the marker before being moved by only the vector Va, and thus, the ecosystem object associated with the marker is displayed in the same position Pb as that before the marker is moved even after the marker is moved.

Therefore, according to the position invariant mode, for example, in the AR display using the real agricultural field as a background space, it is possible to prevent the ecosystem object from being displayed in a position not relevant to the ecosystem constituent indicated by the ecosystem object due to the movement of the marker.

Furthermore, in the position invariant mode, in the server 13, the vector Vc=Va−Vb as a position in which the ecosystem object is displayed, based on the position Pc of the marker after being moved, is obtained. Then, the ecosystem object is displayed in the position separated from the position Pc of the marker after being moved by only the vector Vc, that is, the same position Pb as that in the case of the marker before being moved.

<Display of Ecosystem Object Indicating Ecosystem Constituent Relevant to Entire Agricultural Field>

Figure 62:
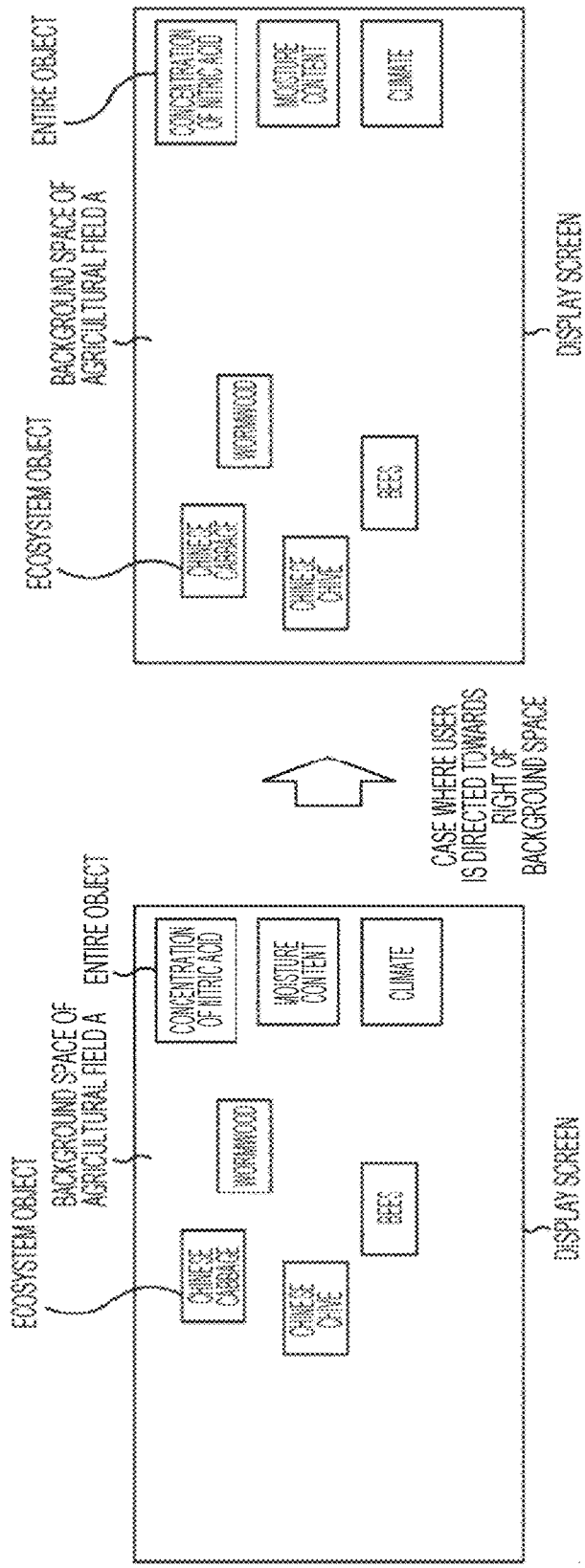
FIG. 62 is a diagram illustrating a display example of the ecosystem object indicating an ecosystem constituent relevant to the entire agricultural field.

FIG. 62 is a diagram illustrating a display example of an ecosystem object indicating an ecosystem constituent relevant to the entire agricultural field.

In FIG. 62, the ecosystem object is displayed by using a certain agricultural field A (a real space of the agricultural field A, a captured real space, or a VR space) as a background space.

Further, in FIG. 62, the ecosystem object indicating each of the Chinese cabbage, the wormwood, the Chinese chive, bee-hive, and a concentration of a nitric acid, a moisture content, and climate of the agricultural field A, is displayed.

In the agricultural field A, the ecosystem object of the Chinese cabbage, the wormwood, the Chinese chive, and the bee-hive is displayed in (the vicinity of) a position where the Chinese cabbage, the wormwood, the Chinese chive, and the bee-hive exist.

On the other hand, the ecosystem object indicating each of the concentration of a nitric acid, the moisture content, and the climate of the agricultural field A is an ecosystem object indicating an ecosystem constituent relevant to the entire agricultural field A (hereinafter, also referred to the an entire object), and thus, is displayed in a fixed position on the display screen of the display unit 35 (in FIG. 62, a position on a right end of the display screen) in which the background space of the agricultural field A is displayed.

For example, the terminal 12 is a see-through HMD, and in the see-through HMD, in the background space, the ecosystem object is subjected to the AR display in a superimposed manner, by using the real space of the agricultural field A as a background space. In this case where the user, for example, inclines his head in a right direction, in a state of being mounted with the see-through HMD as the terminal 12, the background space seen on the display screen (entering the sight of the user) is moved to a range on a right side of the agricultural field A from a state before the user inclines his head.

As a result thereof, in the background space seen on the display screen after the user inclines his head, the position in which the Chinese cabbage, the wormwood, the Chinese chive, and the bee-hive exist, is moved to a left side from the state before the user inclines his head. For this reason, the position in which the ecosystem object indicating each of the Chinese cabbage, the wormwood, the Chinese chive, and the bee-hive is displayed is also moved to the left side.

On the other hand, the entire object indicating each of the concentration of a nitric acid, the moisture content, and the climate of the agricultural field A is displayed in the fixed position on the display screen, and thus, is displayed in the same position as that in a case where the user inclines his head, that is, in FIG. 62, the position on the right end of the display screen, even after the user inclines his head.

As described above, in the terminal 12 (the display control unit 52 of the terminal 12), in a case where the AR display or the VR display is performed by using the agricultural field A as a background space, it is possible to display the entire object indicating the ecosystem constituent relevant to the entire agricultural field A in the fixed position on the display screen.

Accordingly, in a case where the AR display or the VR display is performed by using the agricultural field A as the background space, the user is capable of recognizing, for example, the concentration of a nitric acid, the moisture content, the climate, and the like, as the ecosystem constituent relevant to the entire agricultural field A, at an arbitrary timing.

Furthermore, in the entire object, for example, it is possible to turn the display On/Off according to the operation of the user.

<Display of Associated Information>

Figure 63:
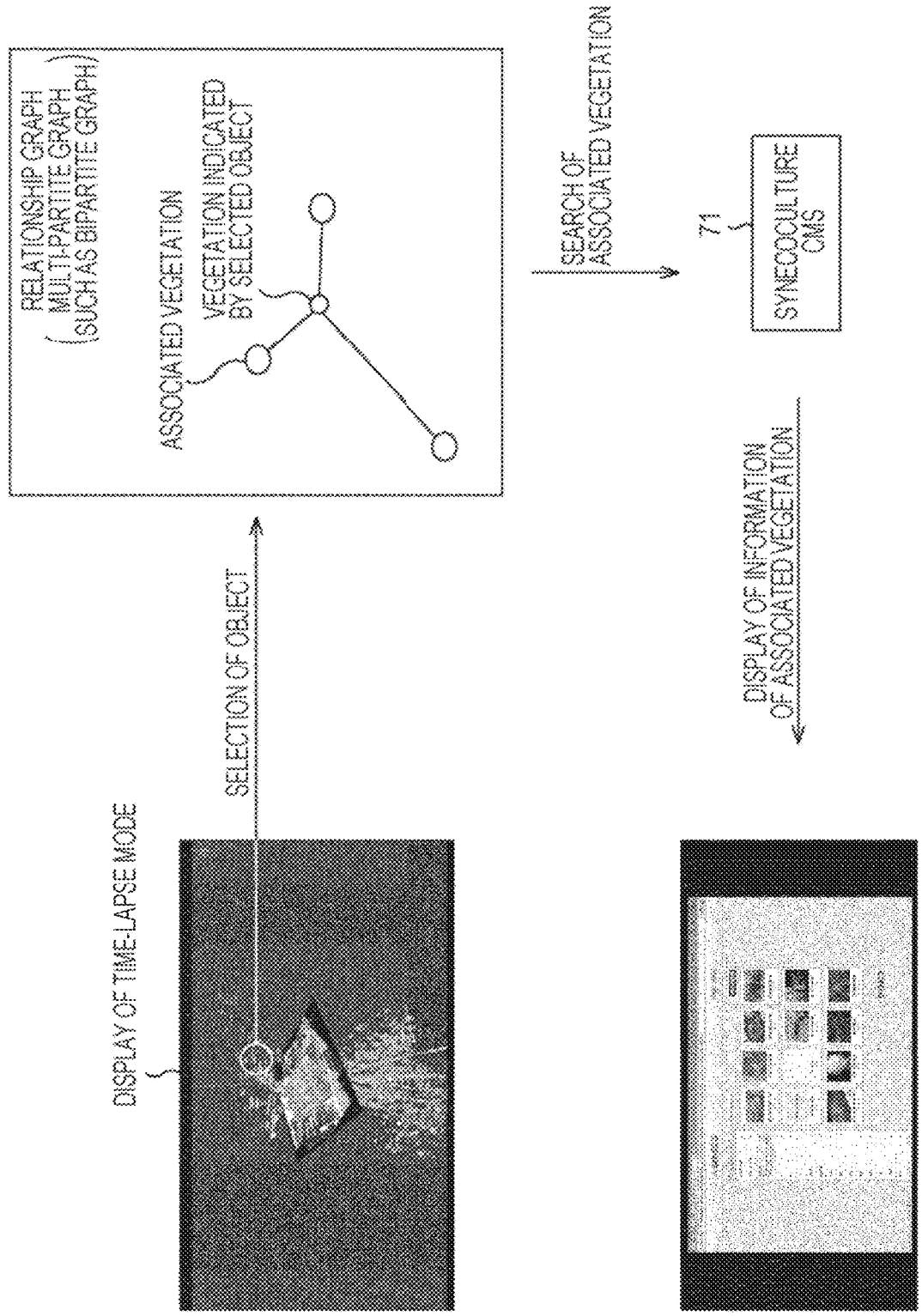
FIG. 63 is a diagram illustrating display of the associated information in the terminal 12.

FIG. 63 is a diagram illustrating the display of the associated information in the terminal 12.

As described in FIG. 49, the ecosystem object can be linked to associated information associated with the ecosystem constituent indicated by the ecosystem object. For example, information stored in the CMS database such as the Synecoculture (registered trademark) DB that the Synecoculture (registered trademark) CMS 71 is capable of accessing, information which is the node of the relationship graph described in FIG. 24 to FIG. 41, and the like can be adopted as the associated information.

Then, for example, as described in FIG. 53, in the display of the time-lapse mode of FIG. 49, in a case where the user selects a certain ecosystem object as a selected object, in the terminal 12, it is possible to display the associated information linked to the selected object.

In FIG. 63, in the terminal 12, a certain ecosystem object is selected as a selected object from the display of the time-lapse mode (FIG. 49), according to the operation of the user.

In FIG. 63, the selected object is an ecosystem object indicating certain vegetation.

The terminal 12 transmits the selected object, for example, to the server 13 according to the operation or the like of the user, and the server 13 specifies vegetation as associated information associated with vegetation indicated by the selected object from the terminal 12 (hereinafter, also referred to as associated vegetation), from the relationship graph.

That is, in the server 13, the graph display control unit 72, for example, specifies vegetation (of a node) linked to the vegetation (of a node) indicated by the selected object, in a multi-partite graph such as a relationship graph (a bipartite graph), as the associated vegetation.

Further, in the server 13, the Synecoculture (registered trademark) CMS 71 searches information of the associated vegetation, that is, for example, the picture, the name, or the like of the associated vegetation from the CMS database, and transmits the information to the terminal 12 in the format of a webpage.

Accordingly, in the terminal 12, as described in FIG. 53, a list of the associated vegetation is displayed in the format of a webpage along with the information of the associated vegetation (the picture or the like).

Therefore, the user of the terminal 12 is capable of easily obtaining the information of the vegetation associated with the vegetation indicated by the selected object, by only selecting the selected object.

<Selection of AR Object Subjected to AR Display or VR Display>

Figure 64:
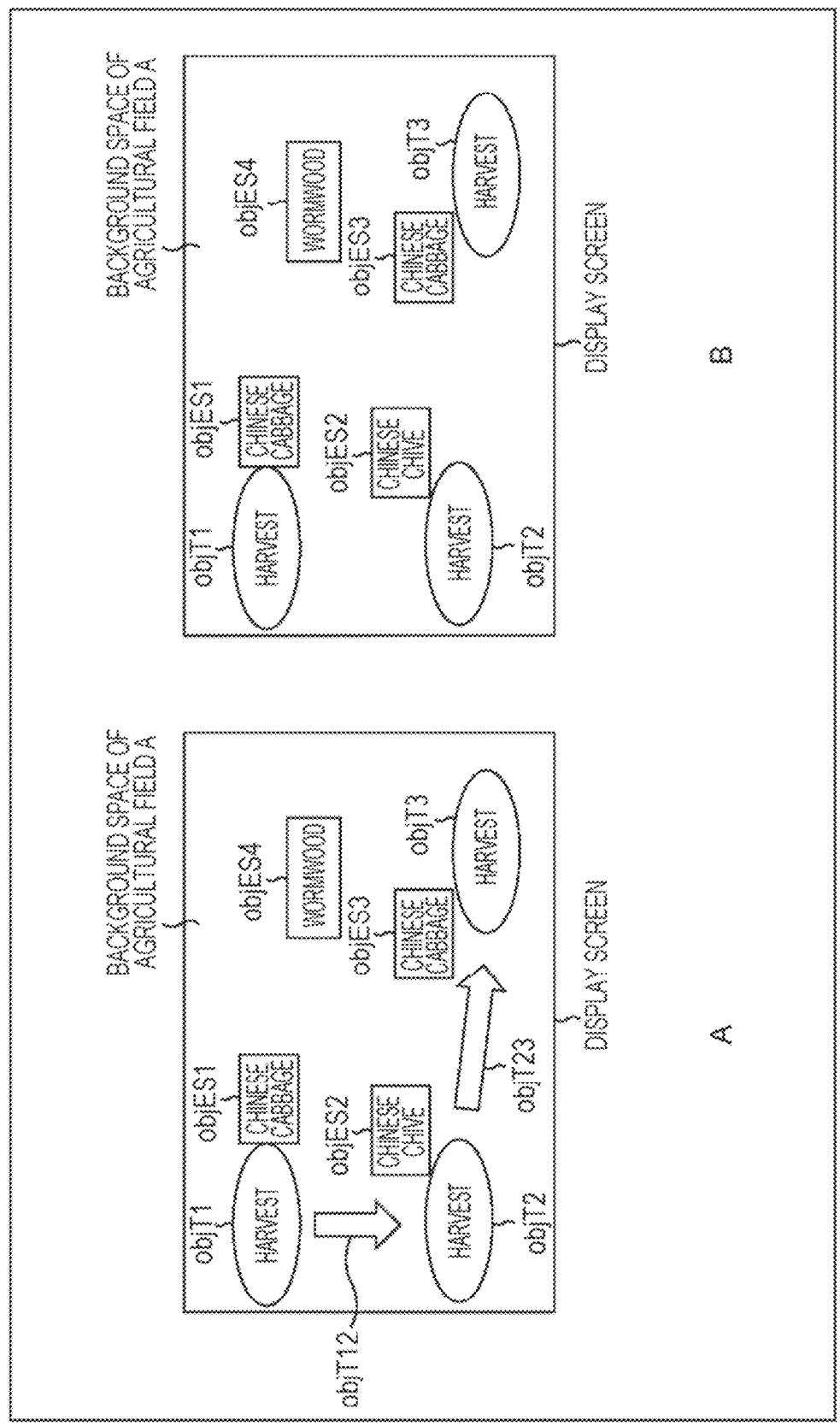
FIG. 64 is a diagram illustrating an example of selecting the AR object subjected to the AR display or the VR display.

FIG. 64 is a diagram illustrating an example of selecting the AR object to be subjected to the AR display or the VR display.

In the terminal 12, it is possible to suitably select, that is, change the AR object to be subjected to the AR display or the VR display in the background space in a superimposed manner (hereinafter, also referred to as a display target object) on the display screen of the display unit 35.

For example, in the terminal 12, it is possible to select (change) the display target object according to the degree of proficiency of the user of the terminal 12 with respect to Synecoculture (registered trademark).

Here, the user inputs the profile of the user in advance to be registered in the terminal 12 or the server 13, and thus, the degree of proficiency of the user of the terminal 12 can be recognized on the basis of the profile.

A of FIG. 64 illustrates a display example of the AR display or the VR display for the user as a beginner.

In A of FIG. 64, ecosystem objects objES1, objES2, objES3, and objES4, and task objects objT1, objT2, objT3, objT12, and objT23 are displayed by using a certain agricultural field A as a background space.

The ecosystem objects objES1 and objES3 indicate the Chinese cabbage. The ecosystem object objES2 indicates the Chinese chive, and the ecosystem object objES4 indicates the wormwood.

The task objects objT1 to objT3 indicate the harvest of the vegetation, and the task objects objT12 and objT23 indicate the harvest order.

The user as a beginner observes the ecosystem objects objES1 to objES4, and thus, it is possible to easily recognize a position in the agricultural field A where vegetation such as the Chinese cabbage indicated by each of the ecosystem objects objES1 to objES4 exists. Further, the user as a beginner is capable of easily recognizing that the Chinese cabbage indicated by the ecosystem object objES1, the Chinese chive indicated by the ecosystem object objES2, and the Chinese cabbage indicated by the ecosystem object objES3 are planned to be harvested in this order, according to the task objects objT1 to objT3, and the task objects objT12 and objT23.

As described above, in the AR display or the VR display for the user as a beginner, in order to teach Synecoculture (registered trademark) to a beginner by so-called spoon-feeds, an ecosystem object indicating an ecosystem constituent of which the expertise is not so high, a task object suavely indicating a task performed with respect to the ecosystem constituent, or the like, is selected as the display target object, and is displayed.

B of FIG. 64 illustrates a display example of the AR display or the VR display for the user as a user as a skilled person.

In B of FIG. 64, the ecosystem object objES1, objES2, objES3, and objES4, and the task object objT1, objT2, and objT3 are displayed by using a certain agricultural field A as a background space.

Therefore, the AR display or the VR display in B of FIG. 64, are different from the AR display or the VR display for a beginner in A of FIG. 64 in which the task objects objT12 and objT23 are selected as the display target object, and are displayed, in that the task objects objT12 and objT23 are not displayed as the display target object.

The user as a skilled person, for example, obtains in advance that the harvest of the Chinese cabbage and the Chinese chive is planned to be performed in the order of the Chinese cabbage indicated by the ecosystem object objES1, the Chinese chive indicated by the ecosystem object objES2, and the Chinese cabbage indicated by the ecosystem object objES3, as knowledge.

For this reason, for the user as a skilled person, the task objects objT12 and objT23 indicating the harvest order of the Chinese cabbage and the Chinese chive are redundant information, and in the display of such task objects objT12 and objT23, there is a case where the user as a skilled person feels annoying.

Therefore, in the AR display or the VR display for a skilled person in B of FIG. 64, the ecosystem objects objES1 to objES4, and the task objects objT1 to objT3 are selected as the display target object, and are displayed, by excluding the task objects objT12 and objT23 from the ecosystem objects objES1 to objES4, and the task objects objT1 to objT3, objT12, and objT23.

Furthermore, for example, in FIG. 64, in a case where many types of vegetation exist in the agricultural field A as the background space, and an ecosystem object indicating each of all types of vegetation existing in the agricultural field A, and all task objects indicating a task to be performed with respect to each of types of vegetation are displayed, there is a case where the number of ecosystem objects or task objects increases, and thus, it is difficult to observe the ecosystem objects or the task objects.

In addition, for example, rare vegetation is important for the user as a skilled person, but is not important for the user as a beginner.

Therefore, in the ecosystem object indicating the vegetation, in the terminal 12, for example, only an ecosystem object indicating the rare vegetation can be displayed to a user whose degree of proficiency is high, and only an ecosystem object indicating major vegetation can be displayed to a user whose degree of proficiency is low, according to the degree of proficiency of the user.

Furthermore, the display target object according to the degree of proficiency, for example, can be selected by allocating a level indicating the degree of proficiency into the AR object, and by selecting the AR object into which the level indicating the degree of proficiency of the user is allocated.

Figure 65:
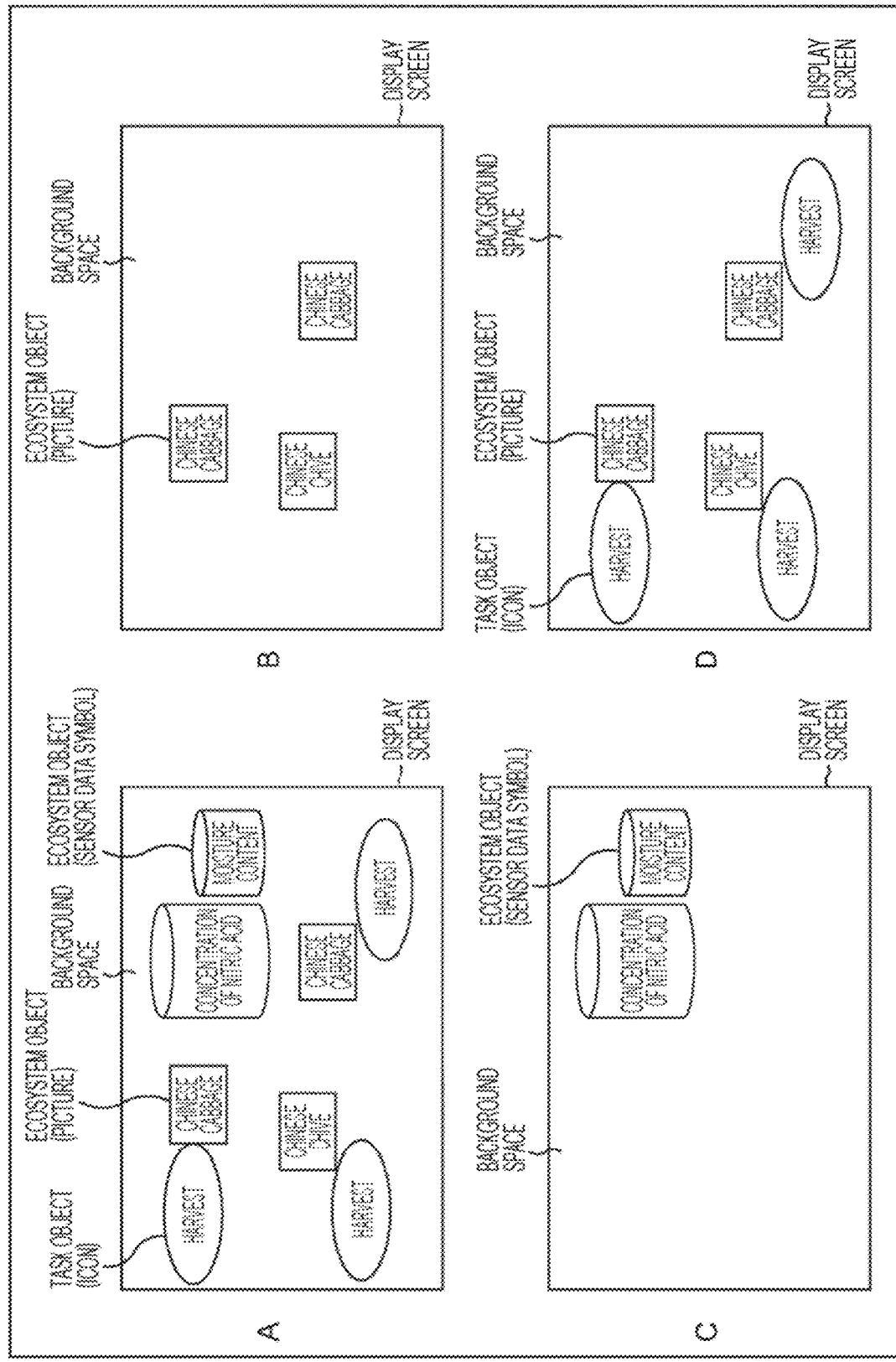
FIG. 65 is a diagram illustrating another example of selecting the AR object subjected to the AR display or the VR display.

FIG. 65 is a diagram illustrating another example of selecting the AR object to be subjected to the AR display or the VR display.

As described in FIG. 64, the display target object can be selected according to the degree of proficiency of the user, and can be selected by designating a category of data.

That is, a described in FIG. 44, the AR object, for example, can be divided into a picture (data of the picture), an icon (data of the icon), and sensor data (a symbol indicating the sensor data), according to the category of the data as the AR object.

In the terminal 12, for example, one or more categories can be selected from categories of the picture, the icon, and the sensor data as described above, and an AR object of the category can be selected as the display target object, according to the operation of the user.

A of FIG. 65 illustrates a display example of the AR display or the VR display in a case where AR objects of all of the categories of the picture, the icon, and the sensor data are selected as the display target object.

In A of FIG. 65, an ecosystem object of a picture indicating each of the Chinese cabbage and the Chinese chive, a task object of an icon indicating a task of harvesting the Chinese cabbage or the Chinese chive, and an ecosystem object of sensor data indicating each of the concentration of a nitric acid and a moisture content are selected as the display target object, and are displayed.

B of FIG. 65 illustrates a display example of the AR display or the VR display in a case where only the AR object of the category of the picture is selected from the categories of the picture, the icon, and the sensor data, as the display target object.

In B of FIG. 65, the ecosystem object of the picture indicating each of the Chinese cabbage and the Chinese chive is selected as the display target object, and is displayed.

C of FIG. 65 illustrates a display example of the AR display or the VR display in a case where only the AR object of the category of the sensor data is selected from the categories of the picture, the icon, and the sensor data, as the display target object.

In C of FIG. 65, the ecosystem object of the sensor data indicating each of the concentration of the nitric acid and the moisture content is selected as the display target object, and is displayed.

D of FIG. 65 illustrates a display example of the AR display or the VR display in a case where the AR objects of the picture and the icon are selected from the categories of the picture, the icon, and the sensor data, as the display target object.

In D of FIG. 65, the ecosystem object of the picture indicating each of the Chinese cabbage and the Chinese chive, and the task object of the icon indicating the task of harvesting the Chinese cabbage or the Chinese chive are selected as the display target object, and are displayed.

As described above, in the terminal 12, for example, it is possible to select one or more categories from the category of the AR object, and to select the AR object of the category as the display target object. Therefore, it is possible to display only the AR object of the category that the user requires, in the AR display or the VR display.

<Processing Example of Registering Ecosystem Object>

Figure 66:
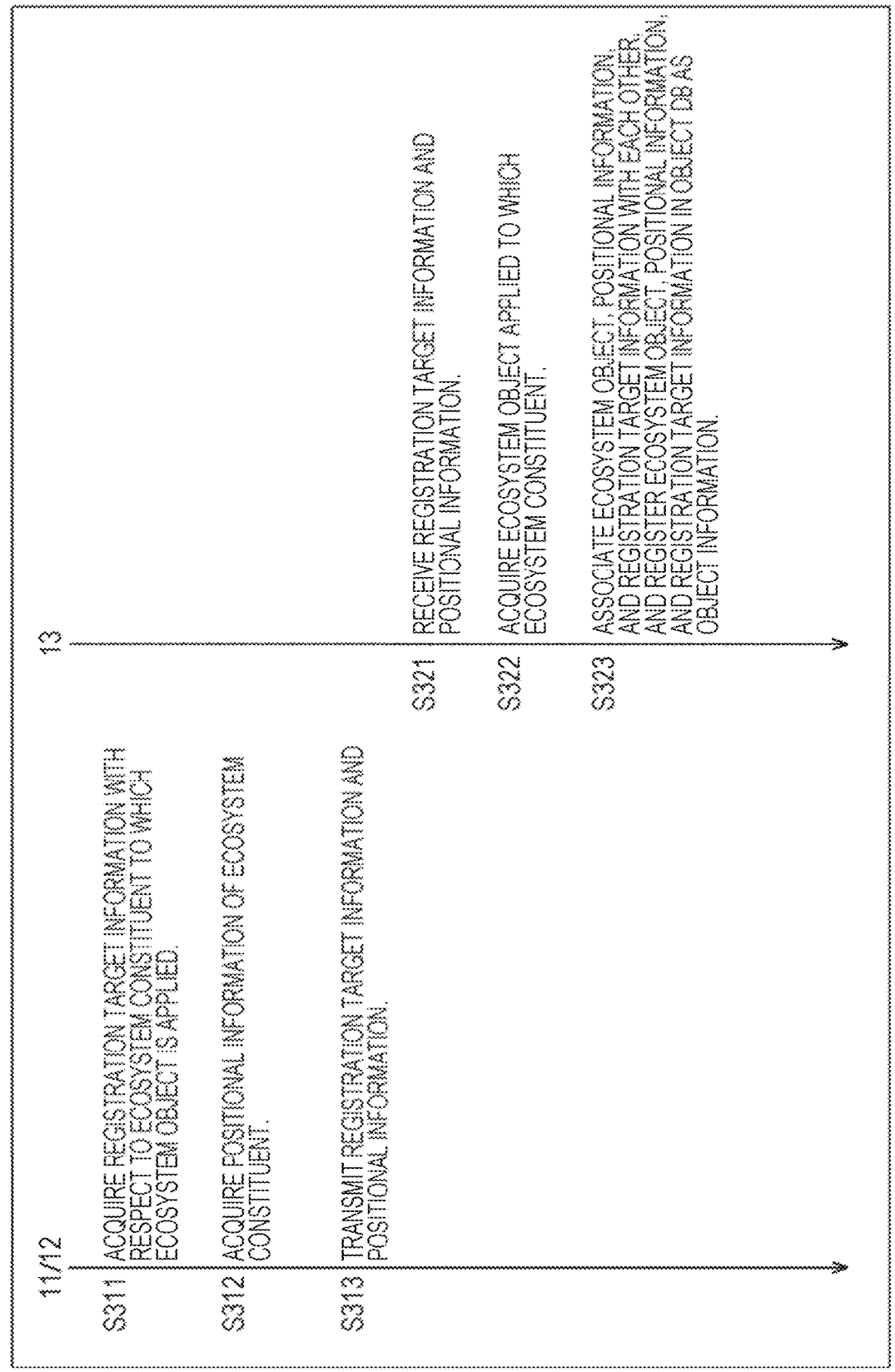
FIG. 66 is a flowchart illustrating a processing example of registering the ecosystem object in the ecosystem utilization system.

FIG. 66 is a flowchart illustrating a processing example of registering the ecosystem object in the ecosystem utilization system of FIG. 1 (FIG. 43).

In step S311, the sensor device 11 or the terminal 12 acquires registration target information with respect to an ecosystem constituent to which an ecosystem object is applied (hereinafter, also referred to as an attention ecosystem constituent).

That is, the sensor device 11, for example, acquires sensor data obtained by sensing a predetermined physical amount of an atmospheric temperature, moisture, or the like, as the attention ecosystem constituent, as the registration target information.

In addition, in the acquisition unit 51, the terminal 12 (FIG. 3), for example, acquires a picture of an attention ecosystem constituent of vegetation or the like captured in an agricultural field, a comment input by the user (for example, "observe bees", "what is this vegetable organism?", or the like), as the registration target information, according to the operation of the user.

In step S312, the sensor device 11 or the terminal 12 acquires positional information of the attention ecosystem constituent.

That is, the sensor device 11, for example, acquires GPS coordinates indicating the position of the sensor device 11 itself, as the positional information of the attention ecosystem constituent.

In addition, the terminal 12, for example, acquires the GPS coordinates indicating the position of the terminal 12 itself, as the positional information of the attention ecosystem constituent.

Furthermore, in the terminal 12, for example, is capable of detecting a relative position of the attention ecosystem constituent on the basis of the position of the terminal 12 itself, and of acquiring coordinates which is obtained by correcting the GPS coordinates of the terminal 12 itself with the relative position of the attention ecosystem constituent, as the positional information of the attention ecosystem constituent.

In addition, in the terminal 12, for example, the user operates the operation unit 34, and thus, it is possible to input the positional information of the attention ecosystem constituent.

In step S313, the sensor device 11 or the terminal 12 transmits the registration target information and the positional information acquired with respect to the attention ecosystem constituent, to the server 13.

In step S321, the server 13 receives the registration target information and the positional information of the attention ecosystem constituent, which are transmitted from the sensor device 11 or the terminal 12.

In step S322, the generation unit 73 of the server 13 (FIG. 4) acquires the ecosystem object to which the attention ecosystem constituent is applied.

That is, in a case where a picture obtained by capturing the attention ecosystem constituent is included in the registration target information of the attention ecosystem constituent, the generation unit 73, for example, adopts the picture as the ecosystem object applied to the attention ecosystem constituent.

In addition, in a case where the sensor data is included in the registration target information of the attention ecosystem constituent, the generation unit 73 generates a symbol indicating the sensor data as the ecosystem object applied to the attention ecosystem constituent.

In addition, in the generation unit 73, for example, the ecosystem object of the icon indicating the bee-hive described in FIG. 52, the ecosystem object of the icon indicating the dangerous area, or the like, can be displayed on the terminal 12 as a candidate object of the ecosystem object applied to the attention ecosystem constituent.

Then, in the generation unit 73, the candidate object, which is selected from the candidate object displayed on the terminal 12 by the user, can be adopted as the ecosystem object applied to the attention ecosystem constituent.

In step S323, the generation unit 73 generates object information associated with the registration target information of the attention ecosystem constituent, the positional information, the ecosystem object applied to the attention ecosystem constituent, and the like. Then, the generation unit 73 registers the object information, for example, in the object DB for registering the object information, stored in the storage 63.

Figure 67:
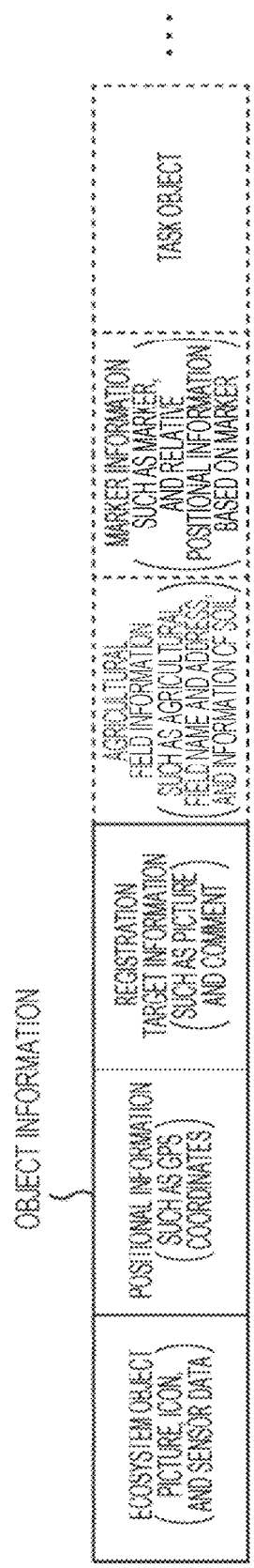
FIG. 67 is a diagram illustrating outline of object information.

FIG. 67 is a diagram illustrating the outline of the object information.

As described in FIG. 66, the object information includes the ecosystem object indicating the ecosystem constituent, the positional information of the ecosystem constituent, and the registration target information.

In addition, the object information is capable of including agricultural field information, marker information, a task object, or the like.

The agricultural field information is information associated with an agricultural in which an ecosystem constituent is observed (an agricultural field existing in a position indicated by the positional information). The agricultural field information is capable of including an agricultural field name, an agricultural field address, information of the soil in the agricultural field, or the like.

According to the agricultural field information, for example, the object information is searched by using the agricultural field name as a keyword, and thus, it is possible to pick up an ecosystem object indicating an ecosystem constituent existing in a certain agricultural field.

The marker information is information associated with a marker displaying an ecosystem object. The marker information, for example, includes relative positional information indicating a relative position displaying the ecosystem object, or the like, on the basis of an image as the marker or the marker.

The image as the marker, for example, can be uploaded to the server 13 from the terminal 12. In addition, the image as the marker, for example, can be generated in the server 13, and can be downloaded to the terminal 12.

The relative positional information of the marker, for example, can be input according to the operation of the terminal 12 by the user, or can be calculated from the disposition position of the marker and the positional information of the ecosystem object.

In the terminal 12, in a case where the image as the marker included in the marker information is detected from an image captured with the camera 37, the ecosystem object is displayed in a position indicated by the relative positional information included in the marker information, based on the marker.

Furthermore, in a plurality of object information items of which the positional information items are close to each other, the same image can be adopted as the image as the marker included in the marker information. In this case, one marker can be associated with a plurality of ecosystem objects, and the plurality of ecosystem objects indicating each of a plurality of ecosystem constituents in positions close to each other, can be displayed by one marker.

In the object information, the task object indicates a task performed with respect to the ecosystem constituent indicated by the ecosystem object included in the object information.

<Processing Example of Displaying AR Object>

Figure 68:
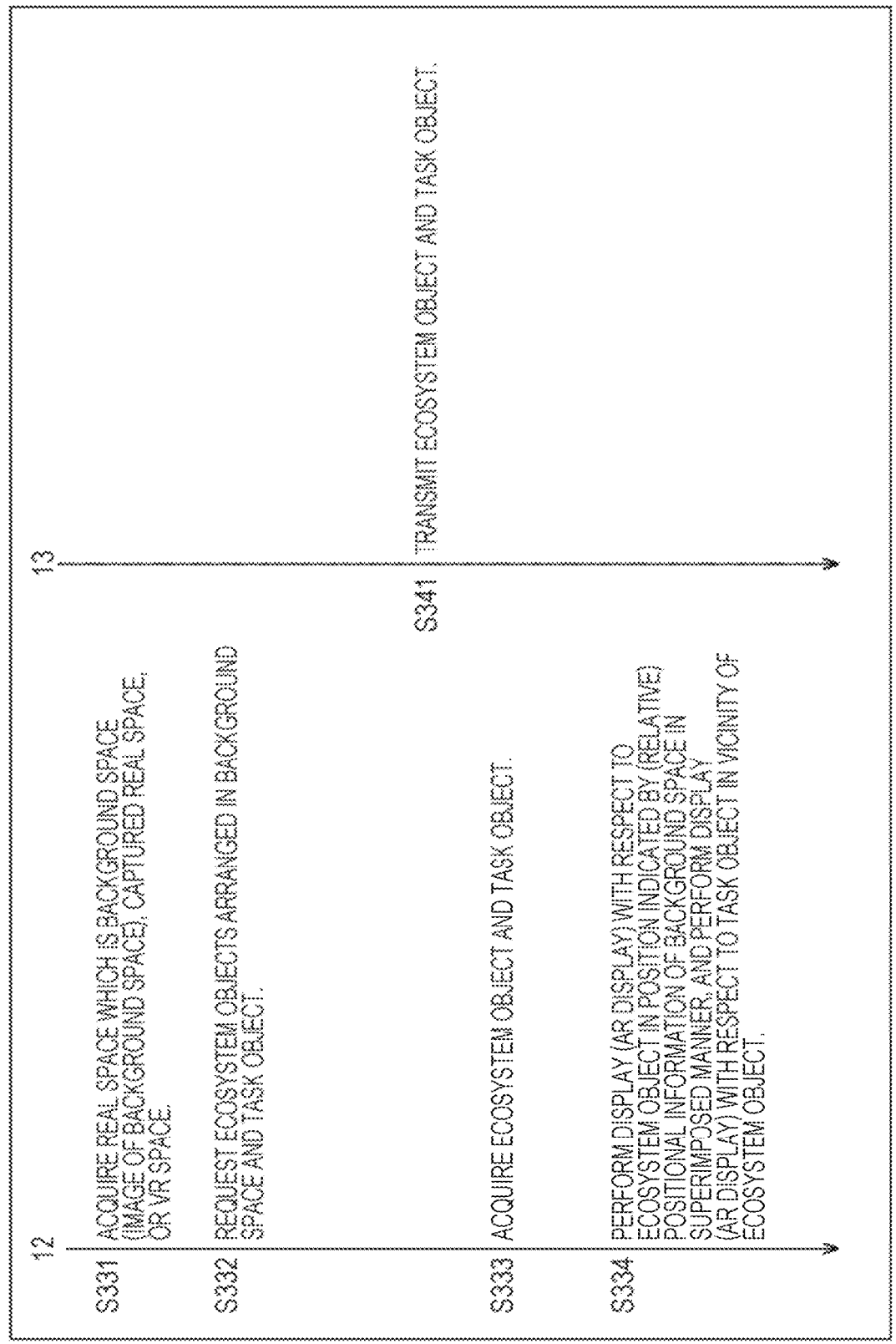
FIG. 68 is a flowchart illustrating a processing example of displaying the AR object in an AR mode in the ecosystem utilization system.

FIG. 68 is a flowchart illustrating a processing example of displaying the AR object in the AR mode in the ecosystem utilization system of FIG. 1 (FIG. 43).

In step S331, the acquisition unit 51 of the terminal 12 (FIG. 3) acquires a real space which is a background space, a captured real space, or a VR space.

That is, for example, in a case where the terminal 12 is an immersive HMD or a smart phone, the captured real space obtained by capturing the real space with the camera 37, or the VR space (an image of the VR space) in which the real space is modeled, is acquired as a background space (an image of the background space).

In addition, for example, in a case where the terminal 12 is a see-through HMD, areal space that the user of the terminal 12 observes in a see-through manner, is directly used as a background space.

In step S332, the acquisition unit 51 of the terminal 12 transmits ecosystem objects arranged in the background space and an object request of requesting a task object to the server 13 (through the communication unit 40).

That is, the acquisition unit 51, for example, detects a marker from the background space, and transmits the object request to the server 13 along with the marker. Alternatively, the acquisition unit 51 acquires the current location of the terminal 12, and transmits the object request to the server 13 along with the current location.

In step S341, the AR/VR display control unit 74 of the server 13 (FIG. 4) transmits the ecosystem object and the task object to the terminal 12 (through the communication unit 67), according to the object request which is transmitted from the terminal 12.

That is, the AR/VR display control unit 74 searches the object information including the marker which is transmitted from the terminal 12 along with the object request, or the object information including the positional information indicating a position close to the current location of the terminal 12, which is transmitted from the terminal 12 along with the object request (hereinafter, also referred to as absolute positional information), from the object DB stored in the storage 63, as the attention object information.

Then, the AR/VR display control unit 74 transmits the ecosystem object included in the attention object information, the relative positional information of the marker, or the absolute positional information (hereinafter, also referred to as object positional information including both thereof) to the terminal 12.

Further, in a case where the attention object information includes the task object, the AR/VR display control unit 74 transmits the task object to the terminal 12.

In step S333, the acquisition unit 51 of the terminal 12 acquires the ecosystem object, the task object, or the object positional information, which is transmitted from the server 13, by receiving the ecosystem object, the task object, or the object positional information.

In step S334, the display control unit 52 of the terminal 12 performs the AR display with respect to the ecosystem object acquired in the acquisition unit 51 in a position of the background space acquired in step S331, which is indicated by the object positional information, in a superimposed manner.

Further, in a case where the acquisition unit 51 acquires the task object, the display control unit 52 performs the AR display with respect to the task object acquired in the acquisition unit 51, in the vicinity of the ecosystem object in the background space in a superimposed manner.

As described above, in the terminal 12, for example, the AR display described in FIG. 44, FIG. 45, or the like is performed.

Furthermore, in the terminal 12, the object information including the absolute positional information indicating the position close to the current location of the terminal 12 can be constantly downloaded from the server 13.

In this case, in the terminal 12, the ecosystem object or the task object included in the object information which has been downloaded from the server 13, can be displayed without performing the object request with respect to the server 13, that is, without performing the communication with respect to the server 13.

Figure 69:
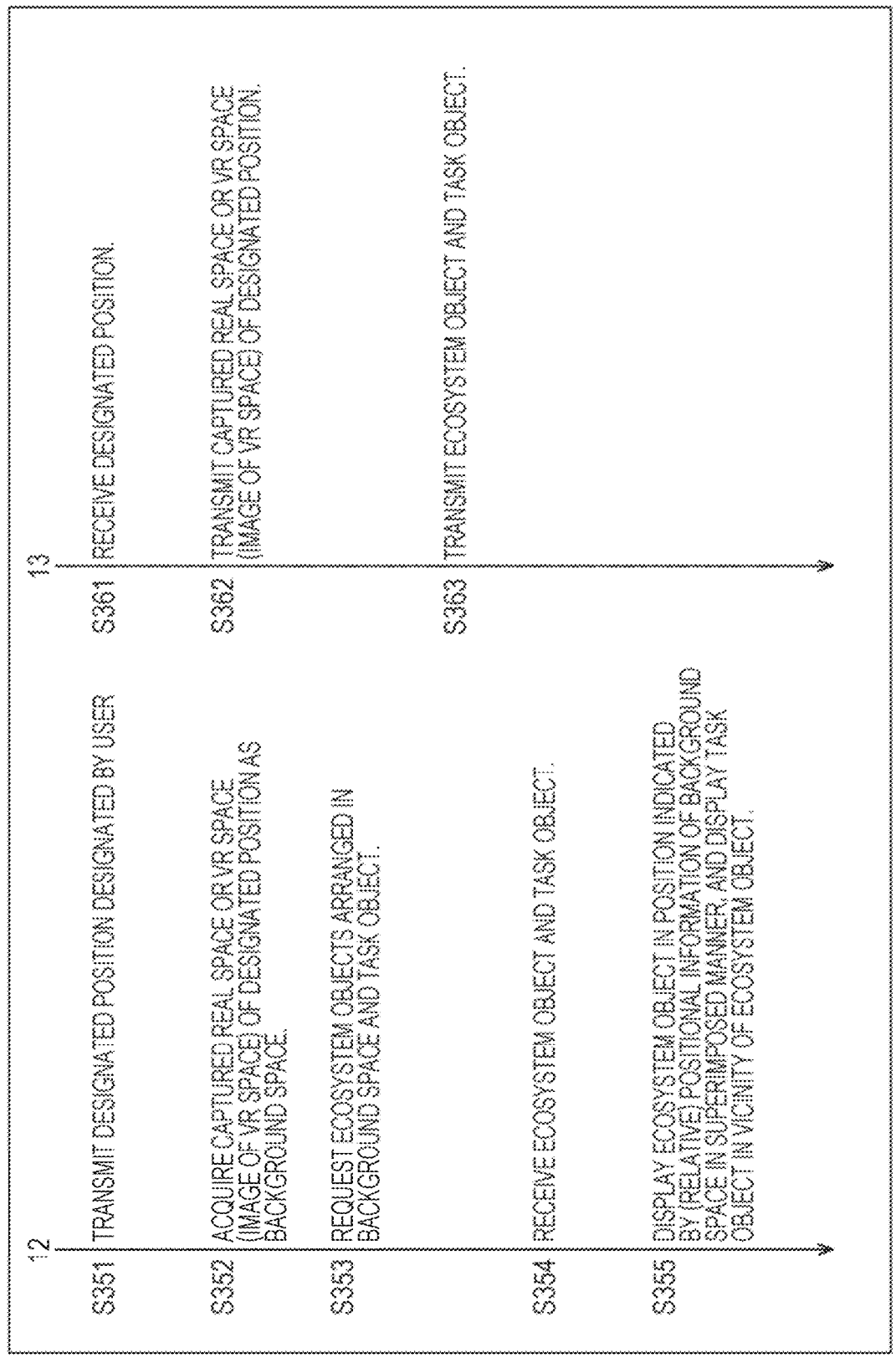
FIG. 69 is a flowchart illustrating a processing example of displaying the AR object in a VR mode in the ecosystem utilization system.

FIG. 69 is a flowchart illustrating a processing example of displaying the AR object in the VR mode in the ecosystem utilization system of FIG. 1 (FIG. 43).

In step S351, the terminal 12 waits for the user to designate a predetermined position as a designated position, and transmits the designated position to the server 13.

In step S361, the server 13 receives the designated position from the terminal 12.

In step S362, the server 13 transmits a captured real space obtained in which a real space in a predetermined range including the designated position from the terminal 12 is captured, or a VR space (an image of the VR space) in which the real space is modeled, to the terminal 12.

That is, in the server 13, the storage 63 stores the captured real space in which the real space is captured, and VR space in which the real space is modeled. Then, in the server 13, the AR/VR display control unit 74 reads out the captured real space in which the real space including the designated position is captured, and the VR space in which the real space is modeled, from the captured real space or the VR space stored in the storage 63, and transmits the captured real space and the VR space to the terminal 12.

In step S352, the acquisition unit 51 of the terminal 12 acquires the captured real space or the VR space from the server 13, as a background space.

In step S353, the acquisition unit 51 of the terminal 12 transmits ecosystem objects arranged in the background space and an object request of requesting a task object to the server 13.

That is, the acquisition unit 51 detects a marker from the background space, and transmits the object request to the server 13 along with the marker. Alternatively, the acquisition unit 51 transmits the object request to the server 13 along with the designated position.

In step S363, the AR/VR display control unit 74 of the server 13 transmits the ecosystem object and the task object, to the terminal 12, according to the object request which is transmitted from the terminal 12.

That is, the AR/VR display control unit 74 searches the object information including the marker which is transmitted from the terminal 12 along with the object request, or the object information including the absolute positional information indicating a position close to the designated position, which is transmitted from the terminal 12 along with the object request, from the object DB stored in the storage 63, as the attention object information.

Then, the AR/VR display control unit 74 transmits the ecosystem object included in the attention object information, the relative positional information of the marker as the object positional information, or the absolute positional information to the terminal 12.

Further, in a case where the attention object information includes the task object, the AR/VR display control unit 74 transmits the task object to the terminal 12.

Hereinafter, in steps S354 and S355, in the terminal 12, processing similar to that in each of steps S333 and S334 of FIG. 68 is performed, and thus, the ecosystem object or the task object is subjected to the VR display in the captured real space or the VR space as the background space acquired in step S352 in a superimposed manner.

As described above, in the terminal 12, for example, the VR display described in FIG. 46, FIG. 48, or the like is performed.

Furthermore, in FIG. 69, in the terminal 12, the ecosystem object or the task object is subjected to the VR display in the background space in a superimposed manner, but for example, in the server 13, an image can be generated in which the ecosystem object or the task object is superimposed in the background space, and is transmitted to the terminal 12, and in the terminal 12, the image transmitted from the server 13, can be displayed in which the ecosystem object or the task object are superimposed in the background space.

<Processing Example of Editing AR Object>

Figure 70:
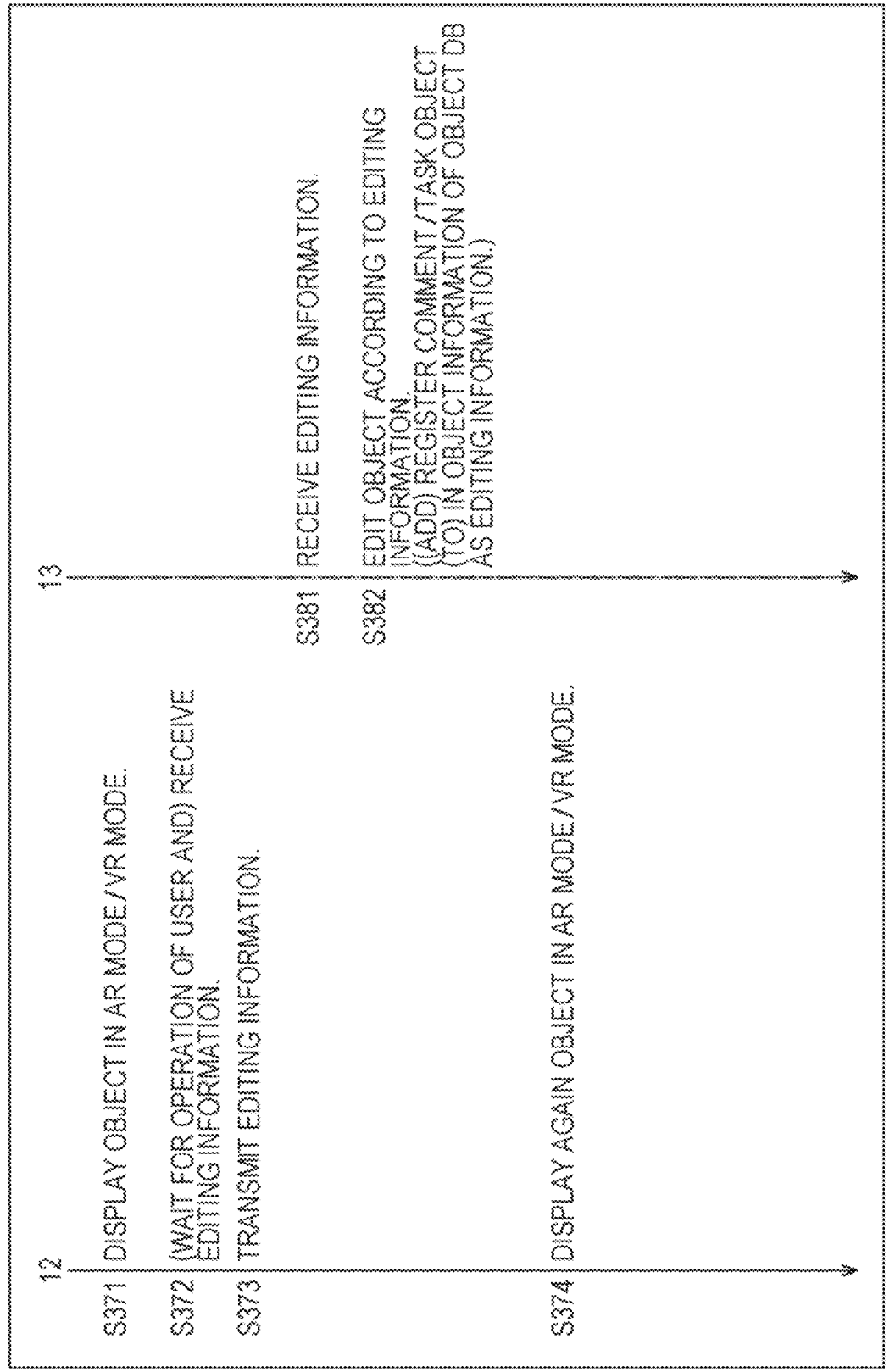
FIG. 70 is a flowchart illustrating a processing example of editing the AR object in the ecosystem utilization system.

FIG. 70 is a flowchart illustrating a processing example of editing the AR object in the ecosystem utilization system of FIG. 1 (FIG. 43).

That is, FIG. 70 illustrates a processing example in a case where, for example, a comment with respect to an ecosystem object is input, a task object indicating a task which is performed with respect to an ecosystem constituent indicated by the ecosystem object is associated with the ecosystem object, as the editing of the AR object.

In step S371, as described in FIG. 68 or FIG. 69, the terminal 12 displays the AR object in the AR mode or the VR mode.

In step S372, the acquisition unit 51 of the terminal 12 edits the AR object displayed in step S371, waits for the user to perform an operation of inputting editing information, and receives the editing information.

That is, in a case where the user, for example, performs the operation of inputting a comment with respect to the ecosystem object, as the editing of the AR object, the acquisition unit 51 receives the comment as the editing information. In addition, in a case where the user performs the operation of associating the task object indicating the task which is performed with respect to the ecosystem constituent indicated by the ecosystem object, with the ecosystem object, as the editing of the AR object, the acquisition unit 51 receives the task object as the editing information.

Here, in a case where the task object is associated with the ecosystem object, in the terminal 12, for example, it is possible to display a candidate of the task object which can be associated with the ecosystem object. The user is capable of selecting the task object associated with the ecosystem object from the candidate of the task object displayed on the terminal 12. In the terminal 12, the candidate of the task object, for example, can be acquired from the server 13.

In step S373, the acquisition unit 51 of the terminal 12 transmits the editing information received in step S372 to the server 13 along with identification information identifying the corresponding AR object.

Here, for example, the identification information for identifying the AR object is allocated into the AR object. In step S373, the terminal 12 transmits the editing information along with the identification information of the ecosystem object to which a comment is input, or the ecosystem object associated with the task object.

In step S381, the editing unit 75 of the server 13 receives the identification information and the editing information which are transmitted from the terminal 12.

In step S382, the editing unit 75 of the server 13 edits the AR object according to the editing information from the terminal 12.

That is, for example, in a case where the editing information is a comment, the editing unit 75 adds a comment as the editing information to the object information (FIG. 67) including the ecosystem object identified by the identification information which is transmitted from the terminal 12 along with the editing information.

In addition, for example, in a case where the editing information is a task object, the editing unit 75 adds a task object as the editing information to the object information including the ecosystem object identified by the identification information which is transmitted from the terminal 12 along with the editing information.

After that, in step S374, as described in FIG. 68 or FIG. 69, the terminal 12 displays again the AR object in the AR mode or the VR mode.

That is, in the terminal 12, the acquisition unit 51 acquires again the AR object after being edited from the server 13, and the display control unit 52 displays the AR object after being edited.

As a result thereof, for example, in a case where the user performs the operation of inputting a comment with respect to the ecosystem object, in step S374, the ecosystem object is displayed along with the comment input by the user.

In addition, for example, in a case where the user performs the operation of associating the task object with the ecosystem object, in step S374, the ecosystem object is displayed along with the task object associated by the user.

Furthermore, the display of the comment with respect to the ecosystem object can be turned On/Off according to the operation of the user.

In addition, in FIG. 70, a case of editing the ecosystem object has been described, but the editing of the task object, that is, the inputting of a comment with respect to the task object can be performed in addition to the editing of the ecosystem object, as the editing of the AR object.

Figure 71:
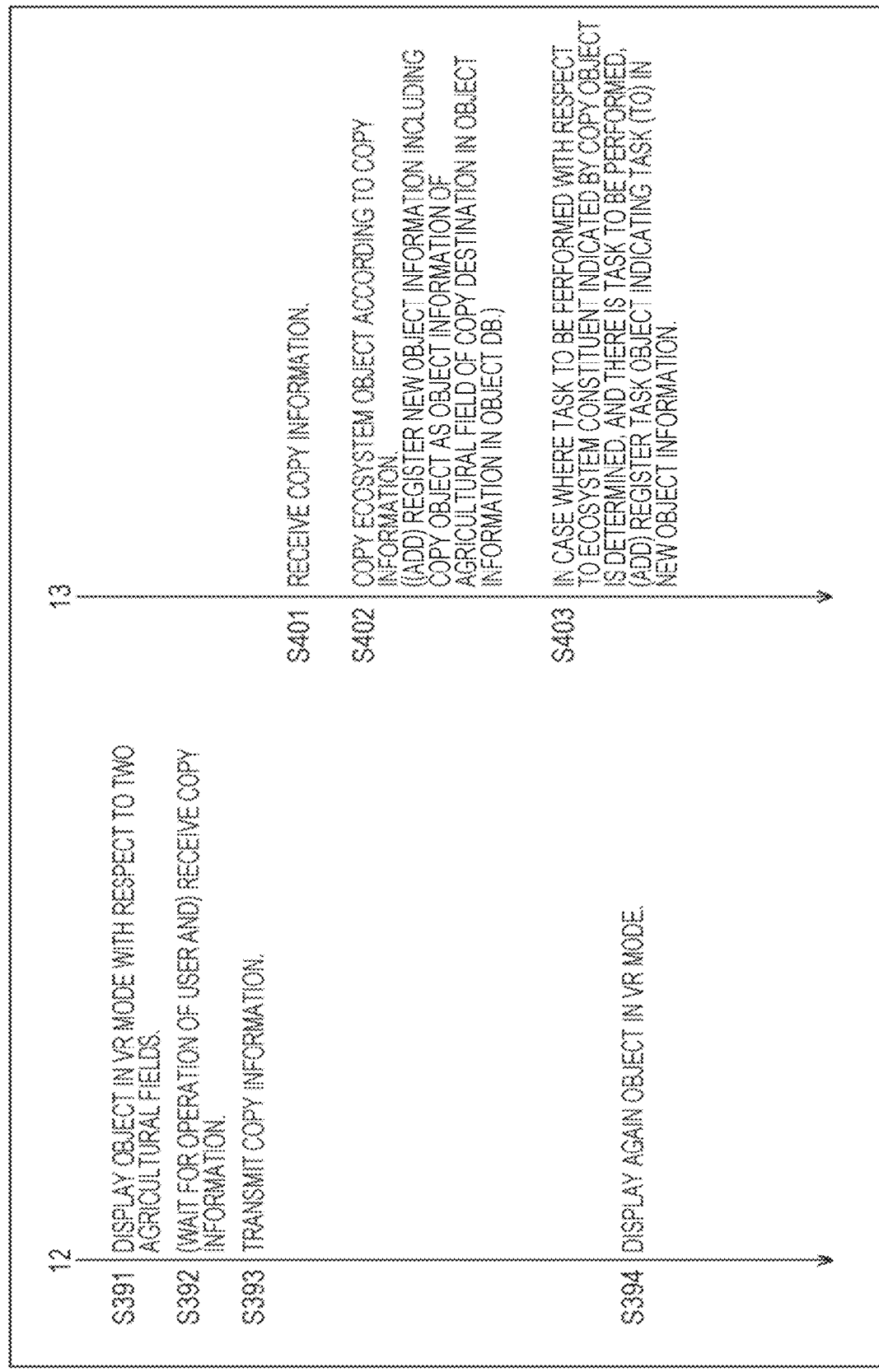
FIG. 71 is a flowchart illustrating another processing example of editing the AR object in the ecosystem utilization system.

FIG. 71 is a flowchart illustrating another processing example of editing the AR object in the ecosystem utilization system of FIG. 1 (FIG. 43).

That is, FIG. 70 illustrates a processing example in a case where, for example, the ecosystem object is copied, as the editing of the AR object.

In step S391, as described in FIG. 69, the terminal 12, for example, displays the AR object in the VR mode, with respect to each of two agricultural fields A and B.

That is, the terminal 12 waits for the user to designate two agricultural fields A and B, and for example, as illustrated in FIG. 55, performs the VR display by using each of VR spaces of two agricultural fields A and B designated by the user as a background space.

In step S392, the acquisition unit 51 of the terminal 12 waits for the user to perform an operation of inputting copy information as the editing of the AR object displayed in step S391, and receives the copy information.

That is, as described in FIG. 55, the user, for example, is capable of copying an ecosystem object of a copy target to a desired position in a background space of the agricultural field B, by using a certain ecosystem object displayed in a background space of the agricultural field A as the copy target.

The acquisition unit 51 receives the copy object which is the ecosystem object of the copy target, and an agricultural field and a position of a copy destination to which the copy object is copied, as the copy information.

In step S393, the acquisition unit 51 of the terminal 12 transmits the copy information received in step S392 to the server 13.

In step S401, the editing unit 75 of the server 13 receives the copy information which is transmitted from the terminal 12.

In step S402, the editing unit 75 of the server 13 copies the ecosystem object according to the copy information from the terminal 12.

That is, the editing unit 75 generates new object information including the copy object which is included in the copy information, as the object information of the agricultural field of the copy destination included in the copy information. Further, the editing unit 75 sets positional information indicating the position of the copy destination included in the copy information, as (absolute) positional information of the new object information, and (adds) registers the new object information in the object DB of the storage 63.

In step S403, the editing unit 75 determines a task to be performed with respect to the ecosystem constituent indicated by the copy object.

For example, in a case where the ecosystem constituent indicated by the copy object is the bee-hive, the editing unit 75 determines that there is no task to be performed with respect to the ecosystem constituent indicated by the copy object. In this case, in the server 13, the subsequent processing is not performed.

In addition, for example, in a case where the ecosystem constituent indicated by the copy object is vegetation, the editing unit 75 determines the planting of the vegetation as a task to be performed with respect to the ecosystem constituent indicated by the copy object.

In this case, the editing unit 75 includes (registers) a task object indicating the planting in the new object information which is added to and registered in the object DB in step S402, and thus, the task object is associated with the copy object included in the new object information.

After that, in step S394, as described in FIG. 69, the terminal 12 displays again the AR object in the VR mode.

That is, in the terminal 12, the acquisition unit 51 acquires again the AR object after being edited from the server 13, and the display control unit 52 displays the AR object after being edited.

As a result thereof, for example, in a case where the copy object is copied to a desired position in the background space of the agricultural field B by using a certain ecosystem object displayed in the background space of the agricultural field A as the copy object, in step S394, the copy object is displayed in a desired position in the background space of the agricultural field B.

Further, in the server 13, in a case where the task object is associated with the copy object, in step S394, the task object associated with the copy object is also displayed along with the copy object.

<Transition Example of Display Screen of Terminal 12>

Figure 72:
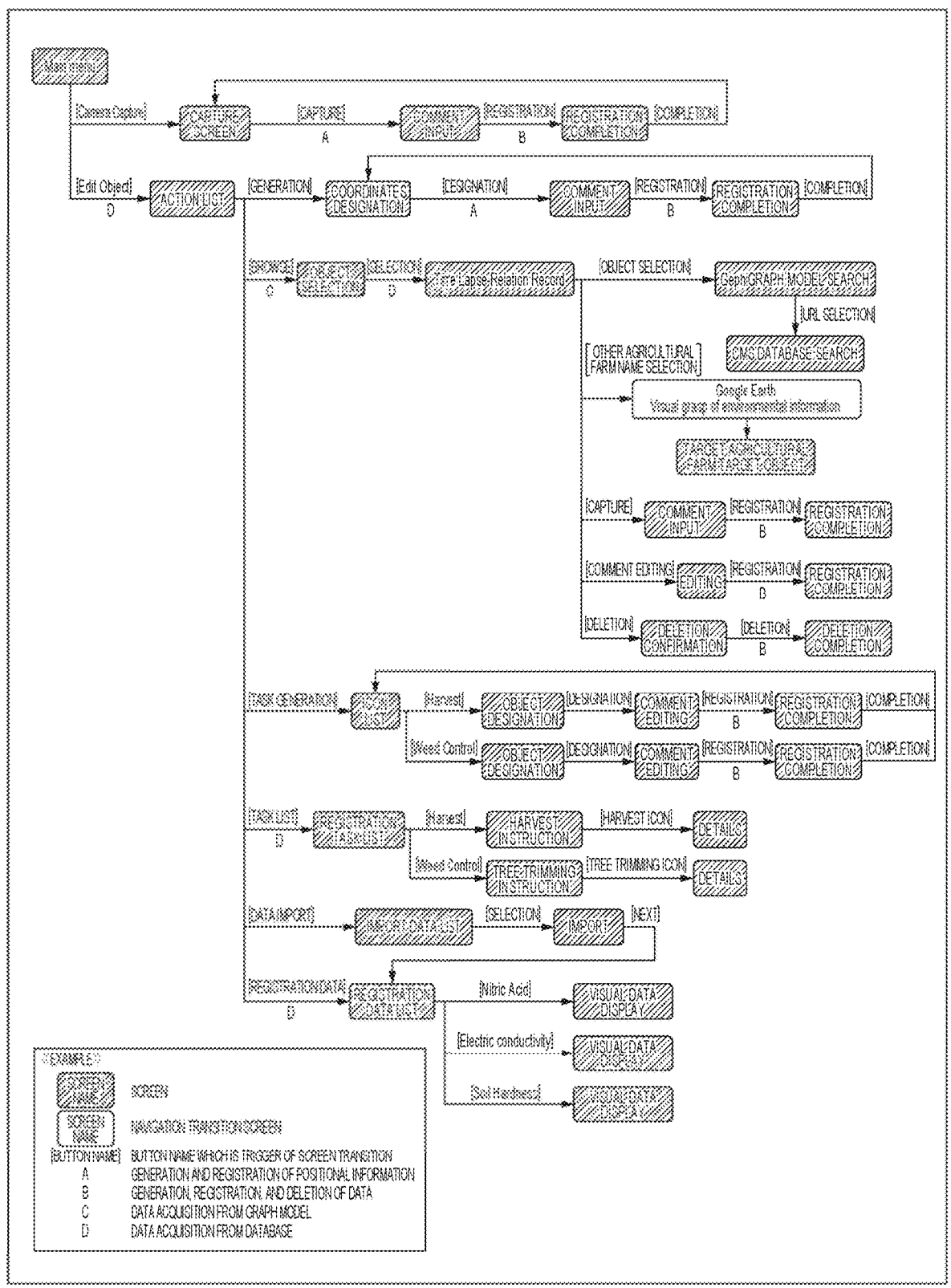
FIG. 72 is a diagram illustrating an example of transition of a display screen of a display unit 35 in a case where the AR object is registered or edited in the terminal 12.

FIG. 72 is a diagram illustrating a transition example of the display screen of the display unit 35 in a case where the AR object is registered or edited in the terminal 12.

The terminal 12 exchanges necessary information with respect to the server 13, and thus, the display screen of the display unit 35 is transitioned as illustrated in FIG. 72.

In the terminal 12, in a case where the user performs a predetermined operation, a screen of "Main Menu" is displayed on the display screen of the display unit 35.

The screen of "Main Menu" includes a button of [Camera Capture] and a button of [Edit Object].

In a case where the button of [Camera Capture] of the screen of "Main Menu" is operated, the screen of "Capture" including a button of [Capture] is displayed on the display screen of the display unit 35.

In a case where the button of [Capture] of the screen of "Capture" is operated, in the terminal 12, a picture is captured by the camera 37, and the GPS coordinates (the positional information) are acquired at the time of capturing the picture. Then, a screen of "Comment Input" of inputting a comment with respect to the picture is displayed on the display screen of the display unit 35.

The screen of "Comment Input" includes a button of [Registration], and in a case where the user inputs a comment, and operates the button of [Registration], a screen of "Registration Completion" including a button of [Completion] is displayed on the display screen of the display unit 35.

In a case where the button of [Completion] of the screen of "Registration Completion" is operated, the user transmits the picture captured on screen of "Capture" and the comment input on the screen of "Comment Input" to the server 13 from the terminal 12, as the registration target information described in FIG. 66. Further, the GPS coordinates acquired at the time of capturing the picture is transmitted to the server 13 from the terminal 12, as the positional information described in FIG. 66. Then, in the server 13, the object information including the positional information and the registration target information from the terminal 12 is registered.

After that, the display screen of the display unit 35 is returned to the screen of "Capture".

In a case where the button of [Edit Object] of the screen of "Main Menu" is operated, a screen of "Action List" is displayed on the display screen of the display unit 35.

The screen of "Action List" includes a button of [Generation], a button of [Browse], a button of [Task Generation], a button of [Task List], a button of [Data Import], and a button of [Registration Data].

In a case where the button of [Generation] is operated on the screen of "Action List", a screen of "Coordinates Designation" including a button of [Designation] is displayed on the display screen of the display unit 35.

In a case where the user inputs coordinates and operates [Designation Button] on the screen of "Coordinates Designation", the screen of "Comment Input" including the button of [Registration] is displayed on the display screen of the display unit 35.

In a case where the user inputs a comment and operates the button of [Registration] on the screen of "Comment Input", the screen of "Registration Completion" including the button of [Completion] is displayed on the display screen of the display unit 35.

In a case where the button of [Completion] of the screen of "Registration Completion" is operated, the user transmits the coordinates input on the screen of "Coordinates Designation" to the server 13 from the terminal 12, as the positional information described in FIG. 66. Further, the comment input on the screen of "Comment Input" by the user is transmitted to the server 13 from the terminal 12, as the registration target information described in FIG. 66. Then, in the server 13, the object information including the positional information and the registration target information from the terminal 12 is registered. That is, in this case, object information not including a picture as an ecosystem object, in other words, so-called object information including an empty picture is registered.

After that, the display screen of the display unit 35 is returned to the screen of "Coordinates Designation".

In a case where the button of [Browse] is operated on the screen of "Action List", a screen of "Object Selection" including a button of [Selection] is displayed on the display screen of the display unit 35.

For example, a list of pictures registered in the object DB of the server 13 as the ecosystem object is displayed on the screen of "Object Selection".

In a case where the user selects a picture as a certain ecosystem object and operates the button of [Selection] on the screen of "Object Selection", a screen of "Time Lapse-Relation Record" is displayed on the display screen of the display unit 35.

A time-lapse mode of the ecosystem object, in which an agricultural field where an ecosystem constituent indicated by the ecosystem object selected on the screen of "Object Selection" by the user is observed (the agricultural field indicated by the agricultural field information included in the object information of the ecosystem object selected by the user (FIG. 67)), is displayed on the screen of "Time Lapse-Relation Record", as the attention agricultural field described in FIG. 49.

The screen of "Time Lapse-Relation Record" includes a button of [Object Selection], a button of [Other Agricultural Farm Name Selection], a button of [Capture], a button of [Comment Editing], and a button of [Deletion].

In a case where on the user selects a certain ecosystem object as a selected object and operates the button of [Object Selection] on the screen of "Time Lapse-Relation Record", the server 13 generates the relationship graph using the node of the ecosystem constituent indicated by the selected object as the node of interest (FIG. 26 or the like), and a screen of "Gephigraph Model Search" including the relationship graph is displayed on the display screen of the display unit 35 of the terminal 12 by using Gephi.

The screen of "Gephigraph Model Search" includes a button of [URL Selection], and in a case where the user selects the node of the relationship graph and operates the button of [URL Selection] on the screen of "Gephigraph Model Search", a screen of "CMS Database Search" is displayed on the display screen of the display unit 35.

For example, as described in FIG. 53, associated information associated with vegetation or the like indicated by the node selected on the screen of "Gephigraph Model Search" by the user is searched from the CMS database of the server 13 and is displayed on the screen of "CMS Database Search".

In a case where the user selects a certain ecosystem object as a selected object and operates a button of [Other Farm Name Selection] on the screen of "Time Lapse-Relation Record", for example, the same vegetation agricultural field information display illustrated in FIG. 50 is displayed on the display screen of the display unit 35.

Then, in a case where the user selects an agricultural field other than the attention agricultural field in which the ecosystem constituent indicated by the selected object exists, in the same vegetation agricultural field information display of FIG. 50, as a selected agricultural field, the display screen of the display unit 35, for example, is switched to a screen of "Target Agricultural Farm Target Object" through transition display using Google Earth illustrated in FIG. 51.

For example, the selected agricultural field as illustrated in FIG. 52 is displayed on the screen of "Target Agricultural Farm Target Object".

In a case where the user selects a certain ecosystem object as a selected object and operates the button of [Capture] on the screen of "Time Lapse-Relation Record", the screen of "Comment Input" is displayed on the display screen of the display unit 35.

The user is capable of performing an operation of replacing a picture as a selected object (including the empty picture) with the other picture on the screen of "Comment Input".

The screen of "Comment Input" includes a button of [Registration]. In a case where the user replaces the picture as the selected object with the other picture and operates the button of [Registration] on the screen of "Comment Input", in the server 13, the picture as the selected object included in the object information (FIG. 67) is replaced.

Then, the screen of "Registration Completion" indicating that the replacement of the picture as the selected object is completed is displayed on the display screen of the display unit 35.

In a case where the user selects a certain ecosystem object as a selected object and operates a button of [Comment Editing] on the screen of "Time Lapse-Relation Record", a screen of "Editing" is displayed on the display screen of the display unit 35.

The user is capable of performing an operation of editing the comment included in the object information (FIG. 67) of the selected object on the screen of "Editing".

The screen of "Editing" includes a button of [Registration]. In a case where the user edits the comment included in the object information of the selected object and operates the button of [Registration] on the screen of "Editing", in the server 13, an editing result of the comment is reflected on the object information (FIG. 67).

Then, the screen of "Registration Completion" indicating that the editing of the comment is completed is displayed on the display screen of the display unit 35.

In a case where the user selects a certain ecosystem object as a selected object and operates the button of [Deletion] on the screen of "Time Lapse-Relation Record", the screen of "Deletion Confirmation" is displayed on the display screen of the display unit 35.

The screen of "Deletion Confirmation" includes a button of [Deletion]. In a case where the user operates the button of [Deletion] on the screen of "Deletion Confirmation", in the server 13, the object information of the selected object (FIG. 67) is deleted.

Then, the screen of "Deletion Completion" indicating that the deletion of the object information is completed is displayed on the display screen of the display unit 35.

In a case where the button of [Task Generation] is operated on the screen of "Action List", a screen of "Icon List" is displayed on the display screen of the display unit 35.

The screen of "Icon List" includes a button corresponding to a task which can be performed with respect to an ecosystem constituent.

In FIG. 72, in order to simplify the description, two tasks of harvest and tree trimming are adopted as the task which can be performed with respect to the ecosystem constituent, and thus, the screen of "Icon List" includes a button of [Harvest] indicating harvest and a button of [Weed Control] indicating tree trimming.

In a case where the user operates the button of [Harvest] on the screen of "Icon List", a screen of "Object Designation" including a button of "Designation" is displayed on the display screen of the display unit 35.

An ecosystem object indicating an ecosystem constituent capable of being a target of harvest which is a task corresponding to the button of [Harvest] is displayed on the screen of "Object Designation". In a case where the user selects an ecosystem object and operates the button of "Designation" on such a screen of "Object Designation", a screen of "Comment Editing" including a button of [Registration] is displayed on the display screen of the display unit 35.

The user is capable of inputting a comment with respect to a task object indicating a task corresponding to the button of [Harvest], associated with the ecosystem object selected on the screen of "Object Designation", (hereinafter, also referred to as a harvest object) on the screen of "Comment Editing".

In a case where the user inputs the comment with respect to the harvest object and operates the button of [Registration] on the screen of "Comment Editing", in the server 13, the harvest object and the comment input by the user are (added to) registered in the object information of the ecosystem object selected on the screen of "Object Designation" by the user (FIG. 67).

Then, the screen of "Registration Completion" indicating that the registration of the harvest object is completed is displayed on the display screen of the display unit 35.

The screen of "Registration Completion" includes a button of [Completion], and in a case where the user operates the button of [Completion], the display screen of the display unit 35 is returned to the screen of "Icon List".

In a case where the user operates the button of [Weed Control] on the screen of "Icon List", the screen of "Object Designation" including a button of "Designation" is displayed on the display screen of the display unit 35.

An ecosystem object indicating an ecosystem constituent capable of being a target of tree trimming which is a task corresponding to the button of [Weed Control] is displayed on the screen of "Object Designation". In a case where the user selects the ecosystem object and operates the button of "Designation" on such a screen of "Object Designation", the screen of "Comment Editing" including the button of [Registration] is displayed on the display screen of the display unit 35.

The user is capable of inputting a comment with respect to a task object indicating the task corresponding to the button of [Weed Control], associated with the ecosystem object selected on the screen of "Object Designation", (hereinafter, also referred to as a tree trimming object), on the screen of "Comment Editing".

In a case where the user inputs the comment with respect to the tree trimming object and operates the button of [Registration] on the screen of "Comment Editing", in the server 13, the tree trimming object and the comment input by the user are (added to) registered in the object information of the ecosystem object selected on the screen of "Object Designation" by the user (FIG. 67).

Then, the screen of "Registration Completion" indicating that the registration of the tree trimming object is completed, is displayed on the display screen of the display unit 35.

The screen of "Registration Completion" includes a button of [Completion], and in a case where the user operates the button of [Completion], the display screen of the display unit 35 is returned to the screen of "Icon List".

In a case where the button of [Task List] is operated on the screen of "Action List", a screen of "Registration Task List" is displayed on the display screen of the display unit 35.

The button of [Task Generation] of the screen of "Action List" is operated on the screen of "Registration Task List", and thus, a list of the registered task objects is displayed as a button to be operable.

Here, as described in the screen of "Icon List", in this embodiment, there are two types of harvest and tree trimming as a task which can be performed with respect to an ecosystem constituent, and a task object indicating the harvest or the tree trimming is registered by being associated with the ecosystem object selected on the screen of "Object Designation" by the user.

As described above, the task object indicating the harvest or the tree trimming, registered by being associated with the ecosystem object, is displayed on the screen of "Registration Task List" in the format of a button.

For convenience, the button of the task object indicating the harvest or the tree trimming will be referred to as a button of [Harvest] and a button of [Weed Control], respectively.

In a case where a certain button of [Harvest] is operated on the screen of "Registration Task List", a screen of "Harvest Instruction" is displayed on the display screen of the display unit 35.

For example, an icon as the task object indicating the harvest, an arrow-like icon indicating a harvest order, or the like, as described in FIG. 47, is displayed with respect to the harvest indicated by the button of [Harvest] operated on the screen of "Registration Task List", and thus, it is visually presented that the harvest is started from which location, and is performed in which order, on the screen of "Harvest Instruction".

Furthermore, in the terminal 12, the user is capable of collectively designating the harvest order of the ecosystem constituent at the time of selecting the ecosystem object indicating the ecosystem constituent which is the target of the harvest, on the screen of "Object Designation" displayed when the button of [Harvest] of "Icon List" is operated. Then, in the server 13, the arrow-like icon indicating the harvest order can be generated in the harvest order of the ecosystem constituent designated by the user.

The icon as the task object indicating the harvest is displayed on the screen of "Harvest Instruction", as a button of [Harvest Icon] to be operable.

In a case where a certain button of [Harvest Icon] is operated on the screen of "Harvest Instruction", a screen of "Details" is displayed on the display screen of the display unit 36.

Detailed information of the harvest indicated by the task object corresponding to the button of [Harvest Icon] operated on the screen of "Harvest Instruction" is displayed on the screen of "Details".

The detailed information of the harvest displayed on the screen of "Details", for example, includes a species name of a fruit (vegetation) to be harvested, a standard for selecting fruits to be harvested, such as harvesting red ripe fruits and allowing blue underripe fruits to remain, balance information with the other operation such as allowing 20% of the fruits for in-house seed to remain without harvesting all of the fruits, and the like.

Such detailed information, for example, can be input as a comment, on the screen of "Comment Editing" of inputting the comment with respect to the harvest object.

In a case where a certain button of [Weed Control] is operated on the screen of "Registration Task List", a screen of "Tree Trimming Instruction" is displayed on the display screen of the display unit 35.

For example, the icon as the task object indicating the tree trimming, the arrow-like icon indicating a tree trimming order, or the like, is displayed with respect to the tree trimming indicated by the button of [Weed Control] operated on the screen of "Registration Task List", and thus, it is visually presented that the tree trimming is started from grass or trees in which location, and is performed in which order, on the screen of "Tree Trimming Instruction".

Furthermore, in the terminal 12, the user is capable of collectively designating the tree trimming order of the ecosystem constituent at the time of selecting the ecosystem object indicating the ecosystem constituent which is the target of the tree trimming, on the screen of "Object Designation" displayed when the button of [Weed Control] of "Icon List" is operated. Then, in the server 13, the arrow-like icon indicating the tree trimming order can be generated in the tree trimming order of the ecosystem constituent designated by the user.

The icon as the task object indicating the tree trimming is displayed on the screen of "Tree Trimming Instruction", as a button of [Tree Trimming Icon] to be operable.

In a case where a certain button of [Tree Trimming Icon] is operated on the screen of "Tree Trimming Instruction", the screen of "Details" is displayed on the display screen of the display unit 36.

Detailed information of the tree trimming indicated by the task object corresponding to the button of [Tree Trimming Icon] operated on the screen of "Tree Trimming Instruction" is displayed on the screen of "Details".

The detailed information of the tree trimming displayed on the screen of "Details", for example, includes a species name of a fruit (vegetation) to be subjected to tree trimming, a tree trimming method such as root elimination, mowing at the level of the land surface, mowing at the level of the height of the vegetable, and performing which vegetation strategy after the mowing, balance information with the other operation, and the like.

Such detailed information, for example, can be input as a comment, on the screen of "Comment Editing" of inputting the comment with respect to the tree trimming object.

In a case where the button of [Data Import] is operated on the screen of "Action List", a screen of "Import Data List" is displayed on the display screen of the display unit 35.

A list of sensor data items managed by a CMS other than the Synecoculture (registered trademark) CMS 71, and a button of [Selection] are displayed on the screen of "Import Data List".

In a case where the user selects certain sensor data and operates the button of [Selection] on the screen of "Import Data List", a screen of [Import] is displayed on the display screen of the display unit 35.

Then, sensor data selected on the screen of "Import Data List" by the user is imported to the object DB of the storage 63 of the server 13.

A screen of "Import" includes a button of [Next], and in a case where the button of [Next] is operated, a screen of [Registration Data List] is displayed on the display screen of the display unit 35.

Here, the screen of [Registration Data List] is also displayed in a case where the button of [Registration Data] is operated on the screen of "Action List".

For example, each agricultural field (an agricultural field name of each of the agricultural fields), a button of [Nitric Acid], a button of [Electric Conductivity], and a button of [Soil Hardness] are displayed on the screen of [Registration Data List].

In a case where the user selects a certain agricultural field and operates the button of [Nitric Acid] on the screen of [Registration Data List], a screen of "Visual Data Display" of a concentration of a nitric acid is displayed on the display screen of the display unit 35.

Sensor data of the concentration of a nitric acid (a symbol of the sensor data) sensed in the agricultural field which is selected on the screen of [Registration Data List] by the user, is displayed on the screen of "Visual Data Display" of the concentration of a nitric acid.

In a case where user selects a certain agricultural field and operates the button of [Electric Conductivity] on the screen of [Registration Data List], a screen of "Visual Data Display" of an electric conductivity is displayed on the display screen of the display unit 35.

Sensor data of the electric conductivity sensed in the agricultural field which is selected on the screen of [Registration Data List] by the user is displayed on the screen of "Visual Data Display" of the electric conductivity.

In a case where the user selects a certain agricultural field and operates the button of [Soil Hardness] on the screen of [Registration Data List], a screen of "Visual Data Display" of a soil hardness is displayed on the display screen of the display unit 35.

Sensor data of the soil hardness sensed in the agricultural field which is selected on the screen of [Registration Data List] by the user is displayed on the screen of "Visual Data Display" of the soil hardness.

Here, the processing performed by a computer (CPU) according to a program is not necessarily performed in chronological order along the order described herein as a flowchart. That is, the processing performed by the computer according to the program also includes processing executed in parallel or individually (for example, parallel processing or processing according to an object).

In addition, the program may be processed by one computer (processor), or may be subjected to distribute processing by a plurality of computers. Further, the program may be executed by being transmitted to a distant computer.

Further, herein, the system indicates an aggregation of a plurality of constituents (a device, a module (a component), or the like), and it does not matter whether or not all of the constituents are in the same housing. Therefore, both of a plurality of devices which are contained in an individual housing and are connected to each other through a network, and one device in which a plurality of modules are contained in one housing are the system.

Furthermore, the embodiment of the present technology is not limited to the embodiment described above, but various modifications can be performed within a range not departing from the gist of the present technology. That is, the present technology can be applied to general ecosystem management in addition to the assistance of Synecoculture (registered trademark).

Further, for example, the present technology is capable of including a cloud computing configuration of performing processing by sharing and collaborating one function in a plurality of devices through a network.

In addition, each step described in the flowchart can be executed in one device, and can be executed by being shared in a plurality of devices.

Further, in a case where a plurality of processings are included in one step, the plurality of processings included in one step can be executed in one device, and can be executed by being shared in a plurality of devices.

In addition, the effect described herein is merely an example, but is not limited thereto, and other effects may be obtained.

Furthermore, the present technology is capable of including the following configurations.

<1>
An information processing device, including:
an acquisition unit that acquires an ecosystem object indicating an ecosystem constituent configuring an ecosystem of an agricultural field in which a plurality of types of vegetation are mixed up, and a task object indicating a task performed with respect to the ecosystem constituent; and
a display control unit that performs display control of performing augmented reality (AR) display of the ecosystem object in a position in a predetermined background space, corresponding to a real position of the ecosystem constituent, and performing AR display of the task object in the background space.

<2>
The information processing device according to <1>,
in which a predetermined marker or a positional information of a global positioning system (GPS) is associated with the ecosystem object, and
the display control unit performs display control of displaying the ecosystem object in a relative position based on the marker or a position indicated by the positional information in the background space.

<3>
The information processing device according to <1> or <2>,
in which the background space is a real space of a reality, a captured real space in which the real space is captured, or a virtual reality (VR) space in which the real space is modeled.

<4>
The information processing device according to any one of <1> to <3>,
in which the ecosystem object or the task object is edited according to an operation of a user, and
the acquisition unit acquires the ecosystem object and the task object after being edited.

<5>
The information processing device according to <4>,
in which the ecosystem object of one agricultural field is copied on another agricultural field as editing of the ecosystem object.

<6>
The information processing device according to <5>,
in which a task object indicating a task to be performed with respect to an ecosystem constituent indicated by the ecosystem object to be copied on the another agricultural field is added.

<7>
The information processing device according to any one of <1> to <6>,
in which a display scale of the background space is capable of being changed.

<8>
The information processing device according to any one of <1> to <7>,
in which images of two or more agricultural fields are capable of being simultaneously displayed as the background space.

<9>
The information processing device according to <2>,
in which one marker is associated with the ecosystem object of a part or all of one agricultural field.

<10>
The information processing device according to <2>,
in which two different markers are associated with the same ecosystem object.

<11>
The information processing device according to <2>,
in which the marker associated with the ecosystem object is movable, and
the ecosystem object is displayed in the same position as the position before the marker is moved, after the marker associated with the ecosystem object is moved.

<12>
The information processing device according to any one of <1> to <11>,
in which the display control unit further performs display control of displaying the ecosystem object along one axis.

<13>
The information processing device according to <12>,
in which the display control unit further performs display control of displaying the ecosystem object along a time axis.

<14>
The information processing device according to any one of <1> to <13>,
in which the ecosystem object is a picture in which the ecosystem constituent is captured, a symbol indicating sensor data which is obtained by sensing the ecosystem constituent, or an icon indicating the ecosystem constituent.

<15>
The information processing device according to any one of <1> to <14>,
in which the display control unit further performs display control of displaying the ecosystem object indicating the ecosystem constituent relevant to the entire agricultural field in a fixed position.

<16>

The information processing device according to any one of <1> to <15>, in which associated information associated with the ecosystem constituent which is indicated by the ecosystem object is linked to the ecosystem object, and, the display control unit further performs display control of displaying the associated information.

<17>

The information processing device according to any one of <1> to <16>, in which the ecosystem object or the task object to be displayed, is changed according to a degree of proficiency of a user.

<18>

The information processing device according to any one of <1> to <17>, in which the ecosystem constituent includes a dangerous area or an area to be watched of the agricultural field.

<19>

The information processing device according to any one of <1> to <18>, in which ecosystem objects of one or more categories selected from a plurality of categories are displayed.

<20>

An information processing method, including:

acquiring an ecosystem object indicating an ecosystem constituent configuring an ecosystem of an agricultural field in which a plurality of types of vegetation are mixed up, and a task object indicating a task performed with respect to the ecosystem constituent; and performing display control of performing augmented reality (AR) display of the ecosystem object in a position in a predetermined background space, corresponding to a real position of the ecosystem constituent, and performing AR display of the task object in the background space.

<21>

A program for allowing a computer to function as:

an acquisition unit acquiring an ecosystem object indicating an ecosystem constituent configuring an ecosystem of an agricultural field in which a plurality of types of vegetation are mixed up, and a task object indicating a task performed with respect to the ecosystem constituent; and a display control unit performing augmented reality (AR) display of the ecosystem object in a position in a predetermined background space, corresponding to a real position of the ecosystem constituent, and display control of AR display of the task object in the background space.

REFERENCE SIGNS LIST

10 Network
11 Sensor device
12 Terminal
13 Server
21 Wireless relay device
22 Wireless LAN
23 Mobile phone network
24 Internet
31 CPU
32 Memory
33 Storage
34 Operation unit
35 Operation unit
36 Speaker
37 Camera
38 Microphone
39 Position detection unit
40 Communication unit
41 External I/F
42 Drive
42A Removable recording medium
43 Sensor
51 Acquisition unit
52 Display control unit
61 CPU
62 Memory
63 Storage
64 Operation unit
65 Display unit
66 Speaker
67 Communication unit
68 External I/F
69 Drive
69A Removable recording medium
71 Synecoculture (registered trademark) CMS
72 Graph display control unit
73 Generation unit
74 AR/VR display control unit
75 Editing unit
76 Analysis unit
101 to 104 Chinese cabbage
105 Chinese chive
106 Radish
107 Cauliflower
108 Japanese mustard spinach
109 Burdock root
110 Wormwood stand zone
121 Flag
122 to 133 Icon
201 Graph display region
202 List display region
211 Overview display region
212 Display frame

The invention claimed is:

1. An information processing device, comprising:
an acquisition unit configured to acquire an ecosystem object indicating an ecosystem constituent configuring an ecosystem of an agricultural field in which a plurality of types of vegetation are mixed up, a task object indicating a task performed with respect to the ecosystem constituent, and sensor data associated with the ecosystem constituent; and
a display control unit configured to control augmented reality (AR) display of the ecosystem object in a position in a predetermined background space, corresponding to a real position of the ecosystem constituent, to control AR display of the task object as an icon in the background space, and to control AR display of the sensor data in the background space, wherein the AR display of the ecosystem object and the AR display of the task object are displayed in the predetermined background space in a superimposed manner and wherein the superimposed ecosystem object is a picture in which the ecosystem constituent is captured.

2. The information processing device according to claim 1,
wherein a predetermined marker or a positional information of a global positioning system (GPS) is associated with the ecosystem object, and
the display control unit performs display control of displaying the ecosystem object in a relative position based on the marker or a position indicated by the positional information in the background space.

3. The information processing device according to claim 2,
wherein one marker is associated with the ecosystem object of a part or all of one agricultural field.

4. The information processing device according to claim 2,
wherein two different markers are associated with the same ecosystem object.

5. The information processing device according to claim 2,
wherein the marker associated with the ecosystem object is movable, and
the ecosystem object is displayed in the same position as the position before the marker is moved, after the marker associated with the ecosystem object is moved.

6. The information processing device according to claim 1,
wherein the ecosystem object or the task object is edited according to an operation of a user, and
the acquisition unit acquires the ecosystem object and the task object after being edited.

7. The information processing device according to claim 6,
wherein the ecosystem object of one agricultural field is copied on another agricultural field as editing of the ecosystem object.

8. The information processing device according to claim 7,
wherein a task object indicating a task to be performed with respect to an ecosystem constituent indicated by the ecosystem object to be copied on the another agricultural field is added.

9. The information processing device according to claim 1,
wherein a display scale of the background space is capable of being changed.

10. The information processing device according to claim 1,
wherein images of two or more agricultural fields are capable of being simultaneously displayed as the background space.

11. The information processing device according to claim 1,
wherein the display control unit further performs display control of displaying the ecosystem object along one axis.

12. The information processing device according to claim 11,
wherein the display control unit further performs display control of displaying the ecosystem object along a time axis.

13. The information processing device according to claim 1,
wherein the display control unit further performs display control of displaying the ecosystem object indicating the ecosystem constituent relevant to the entire agricultural field in a fixed position.

14. The information processing device according to claim 1,
wherein associated information associated with the ecosystem constituent which is indicated by the ecosystem object is linked to the ecosystem object, and
the display control unit further performs display control of displaying the associated information.

15. The information processing device according to claim 1,
wherein the ecosystem object or the task object to be displayed is changed according to a degree of proficiency of a user.

16. The information processing device according to claim 1,
wherein the ecosystem constituent includes a dangerous area or an area to be watched of the agricultural field.

17. The information processing device according to claim 1,
wherein ecosystem objects of one or more categories selected from a plurality of categories are displayed.

18. An information processing method, comprising:
acquiring an ecosystem object indicating an ecosystem constituent configuring an ecosystem of an agricultural field in which a plurality of types of vegetation are mixed up, a task object indicating a task performed with respect to the ecosystem constituent, and sensor data associated with the ecosystem constituent; and
controlling augmented reality (AR) display of the ecosystem object in a position in a predetermined background space, corresponding to a real position of the ecosystem constituent, controlling AR display of the task object as an icon in the background space, and controlling AR display of the sensor data in the background space, wherein the AR display of the ecosystem object and the AR display of the task object are displayed in the predetermined background space in a superimposed manner and wherein the superimposed ecosystem object is a picture in which the ecosystem constituent is captured.

* * * * *